US008962195B2

(12) United States Patent
Shizuka et al.

(10) Patent No.: US 8,962,195 B2
(45) Date of Patent: Feb. 24, 2015

(54) LITHIUM TRANSITION METAL-BASED COMPOUND POWDER, METHOD FOR MANUFACTURING THE SAME, SPRAY-DRIED SUBSTANCE SERVING AS FIRING PRECURSOR THEREOF, AND LITHIUM SECONDARY BATTERY POSITIVE ELECTRODE AND LITHIUM SECONDARY BATTERY USING THE SAME

(75) Inventors: Kenji Shizuka, Ibaraki (JP); Kaoru Terada, Ibaraki (JP); Kenji Okahara, Ibaraki (JP); Tomohiro Kusano, Ibaraki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 985 days.

(21) Appl. No.: 12/676,467

(22) PCT Filed: Sep. 4, 2008

(86) PCT No.: PCT/JP2008/065985
§ 371 (c)(1),
(2), (4) Date: Mar. 4, 2010

(87) PCT Pub. No.: WO2009/031619
PCT Pub. Date: Mar. 12, 2009

(65) Prior Publication Data
US 2010/0209771 A1    Aug. 19, 2010

(30) Foreign Application Priority Data

Sep. 4, 2007   (JP) ................................ 2007-229205
May 1, 2008   (JP) ................................ 2008-119939

(51) Int. Cl.
| H01M 10/0562 | (2010.01) |
| H01M 6/14 | (2006.01) |
| H01M 10/0525 | (2010.01) |
| B82Y 30/00 | (2011.01) |
| C01G 53/00 | (2006.01) |
| H01M 4/505 | (2010.01) |
| H01M 4/525 | (2010.01) |
| H01M 4/131 | (2010.01) |
| H01M 4/136 | (2010.01) |
| H01M 4/36 | (2006.01) |
| H01M 4/58 | (2010.01) |
| H01M 4/02 | (2006.01) |

(52) U.S. Cl.
CPC ........... *H01M 10/0525* (2013.01); *B82Y 30/00* (2013.01); *C01G 53/006* (2013.01); *H01M 4/505* (2013.01); *H01M 4/525* (2013.01); *C01G 53/44* (2013.01); *C01G 53/50* (2013.01); *H01M 4/131* (2013.01); *H01M 4/136* (2013.01); *H01M 4/366* (2013.01); *H01M 4/5815* (2013.01); *C01P 2002/52* (2013.01); *C01P 2002/72* (2013.01); *C01P 2004/03* (2013.01); *C01P 2004/51* (2013.01); *C01P 2004/61* (2013.01); *C01P 2004/62* (2013.01); *C01P 2004/64* (2013.01); *C01P 2006/10* (2013.01); *C01P 2006/11* (2013.01); *C01P 2006/12* (2013.01); *C01P 2006/40* (2013.01); *H01M 2004/021* (2013.01); *H01M 2004/028* (2013.01); *Y02E 60/122* (2013.01); *C01P 2002/54* (2013.01); *C01P 2002/74* (2013.01); *C01P 2002/76* (2013.01); *C01P 2002/77* (2013.01); *C01P 2004/32* (2013.01); *C01P 2004/45* (2013.01); *C01P 2006/17* (2013.01)
USPC ........................................................ 429/322

(58) Field of Classification Search
USPC ........................................................ 429/207
See application file for complete search history.

(56) References Cited

U.S. PATENT DOCUMENTS

| 6,258,486 | B1 * | 7/2001 | Fauteux et al. ................ 429/232 |
| 6,680,143 | B2 | 1/2004 | Thackeray et al. |
| 7,309,543 | B2 | 12/2007 | Shizuka |
| 2002/0172862 | A1 * | 11/2002 | Tamura et al. ............. 429/218.1 |

(Continued)

FOREIGN PATENT DOCUMENTS

| EP | 1 351 327 A1 | 10/2003 |
| EP | 1 487 038 A2 | 12/2004 |

(Continued)

OTHER PUBLICATIONS

Office Action issued Aug. 15, 2012 in Chinese Patent Application No. 200880105384.6 (with English-language translation).

(Continued)

*Primary Examiner* — Ula C. Ruddock
*Assistant Examiner* — Jacob Marks
(74) *Attorney, Agent, or Firm* — Oblon, Spivak, McClelland, Maier & Neustadt, L.L.P.

(57) ABSTRACT

A lithium transition metal-based compound powder for a lithium secondary battery positive electrode material that can achieve both improvements of load characteristics such as rate and output characteristics and a higher density is a lithium transition metal-based compound powder containing, as a main component, a lithium transition metal-based compound that has a function of allowing elimination and insertion of lithium ions, and including a crystal structure belonging to a layer structure, wherein primary particles are aggregated to form secondary particles, the ratio A/B of a median diameter A of the secondary particles to an average diameter (average primary particle diameter B) is in the range of 8 to 100, and $0.01 \leq \text{FWHM}(110) \leq 0.5$ where FWHM(110) is the half width of a (110) diffraction peak present near a diffraction angle $2\theta$ of 64.5° in a powder X-ray diffraction analysis using a CuKα line.

1 Claim, 84 Drawing Sheets

(56) References Cited

U.S. PATENT DOCUMENTS

| | | |
|---|---|---|
| 2005/0202316 A1 | 9/2005 | Hwang et al. |
| 2006/0105241 A1 | 5/2006 | Tode et al. |
| 2006/0134521 A1 | 6/2006 | Shima |
| 2007/0072080 A1* | 3/2007 | Inagaki et al. ............ 429/231.1 |
| 2007/0202405 A1 | 8/2007 | Shizuka et al. |
| 2008/0182169 A1 | 7/2008 | Shizuka |
| 2009/0011334 A1 | 1/2009 | Shizuka et al. |
| 2009/0104530 A1 | 4/2009 | Shizuka et al. |
| 2011/0003200 A1 | 1/2011 | Shizuka et al. |
| 2012/0176089 A1 | 7/2012 | Hwang et al. |

FOREIGN PATENT DOCUMENTS

| | | |
|---|---|---|
| EP | 1 667 260 A1 | 6/2006 |
| EP | 2 006 937 A2 | 12/2008 |
| EP | 2 110 872 A1 | 10/2009 |
| JP | 11 307094 | 11/1999 |
| JP | 2000 133262 | 5/2000 |
| JP | 3088716 | 9/2000 |
| JP | 2000 294242 | 10/2000 |
| JP | 3110728 | 11/2000 |
| JP | 2002 75367 | 3/2002 |
| JP | 2002 145623 | 5/2002 |
| JP | 2002 151071 | 5/2002 |
| JP | 2003 31219 | 1/2003 |
| JP | 3362025 | 1/2003 |
| JP | 2003 51308 | 2/2003 |
| JP | 2003 68298 | 3/2003 |
| JP | 2003 81639 | 3/2003 |
| JP | 2003 178756 | 6/2003 |
| JP | 2003 203633 | 7/2003 |
| JP | 2003 221236 | 8/2003 |
| JP | 2003 238165 | 8/2003 |
| JP | 2003 297354 | 10/2003 |
| JP | 2004 6267 | 1/2004 |
| JP | 2004 31091 | 1/2004 |
| JP | 2004 139853 | 5/2004 |
| JP | 2004-235166 | 8/2004 |
| JP | 2004 265849 | 9/2004 |
| JP | 2004 528691 | 9/2004 |
| JP | 3571671 | 9/2004 |
| JP | 2004 281253 | 10/2004 |
| JP | 2004 303673 | 10/2004 |
| JP | 2004 311427 | 11/2004 |
| JP | 2005 123179 | 5/2005 |
| JP | 2005 150057 | 6/2005 |
| JP | 2005 150093 | 6/2005 |
| JP | 2005 150102 | 6/2005 |
| JP | 2005 187282 | 7/2005 |
| JP | 2005 235628 | 9/2005 |
| JP | 2005 251716 | 9/2005 |
| JP | 2005-324973 | 11/2005 |
| JP | 2006-107845 | 4/2006 |
| JP | 2006 164934 | 6/2006 |
| JP | 2006 202647 | 8/2006 |
| JP | 2006 202702 | 8/2006 |
| JP | 2006 253119 | 9/2006 |
| JP | 2007 18985 | 1/2007 |
| JP | 2007 63033 | 3/2007 |
| JP | 2007 242581 | 9/2007 |
| JP | 2008-257992 | 10/2008 |
| JP | 2008-305777 | 12/2008 |
| WO | 02 40404 | 5/2002 |
| WO | 02 41419 | 5/2002 |
| WO | 02 073718 | 9/2002 |
| WO | 02 086993 | 10/2002 |
| WO | 03 044881 | 5/2003 |
| WO | 03 044882 | 5/2003 |
| WO | WO 2005/081338 A1 | 9/2005 |
| WO | WO 2006/085467 A1 | 8/2006 |
| WO | WO 2007/116971 A1 | 10/2007 |

OTHER PUBLICATIONS

European Office Action issued Mar. 14, 2012, in European Patent Application 08 829 308.9-1227.

Partial European Search Report issued Apr. 19, 2012, in Patent Application No. 12155144.4

U.S. Appl. No. 12/517,813, filed Jun. 5, 2009, Shizuka, et al.

Extended Search Report issued Jun. 8, 2011 in Europe Application No. 08829308.9.

Shuji Yamada, et al., "Synthesis and properties of $LiNiO_2$ as cathode material for secondary batteries", Journal of Power Sources, vol. 54, No. 2, Apr. 30, 1995, XP-002638803, pp. 209-213.

Extended European Search Report issued Jul. 23, 2012 in European Patent Application No. 12155144.4.

Chinese Office Action issued Feb. 13, 2012, in Chinese Patent Application No. 200880105384.6 with English translation.

Office Action issued Aug. 6, 2013, in Japanese Patent Application No. 2008-227232 with English translation.

Office Action issued Apr. 2, 2013 in Japanese Patent Application No. JP 2008-227232 (with English translation).

Office Action issued Apr. 2, 2013 in Japanese Patent Application No. JP 2008-235011 (with English translaiton).

Combined Chinese Office Action with English Translation and Search Report issued Nov. 15, 2012 in Patent Application No. 200880105384.6 with English Translation of Category of Cited Documents.

Office Action issued Oct. 31, 2012 in European Patent Application No. 08 829 308.9.

The First Chinese Office Action with English translation issued Feb. 24, 2014 in corresponding Chinese application 201210266142.3, 18pp.

* cited by examiner

W CONCENTRATION DISTRIBUTION CURVE OF LITHIUM NICKEL MANGANESE COBALT-BASED COMPOSITE OXIDE POWDER MANUFACTURED IN EXAMPLE 1 FROM PARTICLE SURFACE IN DEPTH DIRECTION

W CONCENTRATION DISTRIBUTION CURVE OF LITHIUM NICKEL MANGANESE COBALT-BASED COMPOSITE OXIDE POWDER MANUFACTURED IN EXAMPLE 2 FROM PARTICLE SURFACE IN DEPTH DIRECTION

B AND W CONCENTRATION DISTRIBUTION CURVES OF LITHIUM NICKEL MANGANESE COBALT-BASED COMPOSITE OXIDE POWDER MANUFACTURED IN EXAMPLE 3 FROM PARTICLE SURFACE IN DEPTH DIRECTION

Ta CONCENTRATION DISTRIBUTION CURVE OF LITHIUM NICKEL MANGANESE COBALT-BASED COMPOSITE OXIDE POWDER MANUFACTURED IN EXAMPLE 6 FROM PARTICLE SURFACE IN DEPTH DIRECTION

Ta CONCENTRATION DISTRIBUTION CURVE OF LITHIUM NICKEL MANGANESE COBALT-BASED COMPOSITE OXIDE POWDER MANUFACTURED IN EXAMPLE 7 FROM PARTICLE SURFACE IN DEPTH DIRECTION

W CONCENTRATION DISTRIBUTION CURVE OF LITHIUM NICKEL MANGANESE COBALT-BASED COMPOSITE OXIDE POWDER MANUFACTURED IN COMPARATIVE EXAMPLE 3 FROM PARTICLE SURFACE IN DEPTH DIRECTION

Fig. 22 PORE DISTRIBUTION CURVE OF LITHIUM NICKEL MANGANESE COBALT-BASED COMPOSITE OXIDE POWDER MANUFACTURED IN EXAMPLE 1

PORE DISTRIBUTION CURVE OF LITHIUM NICKEL MANGANESE COBALT-BASED COMPOSITE OXIDE POWDER MANUFACTURED IN EXAMPLE 2

Fig. 26 PORE DISTRIBUTION CURVE OF LITHIUM NICKEL MANGANESE COBALT-BASED COMPOSITE OXIDE POWDER MANUFACTURED IN EXAMPLE 5

Fig. 30  PORE DISTRIBUTION CURVE OF LITHIUM NICKEL MANGANESE COBALT-BASED COMPOSITE OXIDE POWDER MANUFACTURED IN COMPARATIVE EXAMPLE 2

Fig. 31 PORE DISTRIBUTION CURVE OF LITHIUM NICKEL MANGANESE COBALT-BASED COMPOSITE OXIDE POWDER MANUFACTURED IN COMPARATIVE EXAMPLE 3

PORE DISTRIBUTION CURVE OF LITHIUM NICKEL MANGANESE COBALT-BASED COMPOSITE OXIDE POWDER MANUFACTURED IN COMPARATIVE EXAMPLE 4

SEM IMAGE OF LITHIUM NICKEL MANGANESE COBALT-BASED
COMPOSITE OXIDE POWDER MANUFACTURED IN EXAMPLE 1

SEM IMAGE OF LITHIUM NICKEL MANGANESE COBALT-BASED
COMPOSITE OXIDE POWDER MANUFACTURED IN EXAMPLE 2

SEM IMAGE OF LITHIUM NICKEL MANGANESE COBALT-BASED
COMPOSITE OXIDE POWDER MANUFACTURED IN EXAMPLE 3

SEM IMAGE OF LITHIUM NICKEL MANGANESE COBALT-BASED
COMPOSITE OXIDE POWDER MANUFACTURED IN EXAMPLE 4

SEM IMAGE OF LITHIUM NICKEL MANGANESE COBALT-BASED
COMPOSITE OXIDE POWDER MANUFACTURED IN EXAMPLE 5

SEM IMAGE OF LITHIUM NICKEL MANGANESE COBALT-BASED
COMPOSITE OXIDE POWDER MANUFACTURED IN EXAMPLE 6

SEM IMAGE OF LITHIUM NICKEL MANGANESE COBALT-BASED
COMPOSITE OXIDE POWDER MANUFACTURED IN EXAMPLE 7

SEM IMAGE OF LITHIUM NICKEL MANGANESE COBALT-BASED
COMPOSITE OXIDE POWDER MANUFACTURED IN COMPARATIVE EXAMPLE 1

SEM IMAGE OF LITHIUM NICKEL MANGANESE COBALT-BASED
COMPOSITE OXIDE POWDER MANUFACTURED IN COMPARATIVE EXAMPLE 2

SEM IMAGE OF LITHIUM NICKEL MANGANESE COBALT-BASED
COMPOSITE OXIDE POWDER MANUFACTURED IN COMPARATIVE EXAMPLE 3

SEM IMAGE OF LITHIUM NICKEL MANGANESE COBALT-BASED
COMPOSITE OXIDE POWDER MANUFACTURED IN COMPARATIVE EXAMPLE 4

SEM IMAGE OF LITHIUM NICKEL MANGANESE COBALT-BASED
COMPOSITE OXIDE POWDER MANUFACTURED IN COMPARATIVE EXAMPLE 5

POWDER X-RAY DIFFRACTION PATTERN OF LITHIUM NICKEL MANGANESE COBALT-BASED COMPOSITE OXIDE POWDER MANUFACTURED IN COMPARATIVE EXAMPLE 2

POWDER X-RAY DIFFRACTION PATTERN OF LITHIUM NICKEL MANGANESE COBALT-BASED COMPOSITE OXIDE POWDER MANUFACTURED IN COMPARATIVE EXAMPLE 4

W CONCENTRATION DISTRIBUTION CURVE OF LITHIUM NICKEL MANGANESE COBALT-BASED COMPOSITE OXIDE POWDER MANUFACTURED IN EXAMPLE 10 FROM PARTICLE SURFACE IN DEPTH DIRECTION

B AND W CONCENTRATION DISTRIBUTION CURVES OF LITHIUM NICKEL MANGANESE COBALT-BASED COMPOSITE OXIDE POWDER MANUFACTURED IN EXAMPLE 12 FROM PARTICLE SURFACE IN DEPTH DIRECTION

W CONCENTRATION DISTRIBUTION CURVE OF LITHIUM NICKEL MANGANESE COBALT-BASED COMPOSITE OXIDE POWDER MANUFACTURED IN COMPARATIVE EXAMPLE 6 FROM PARTICLE SURFACE IN DEPTH DIRECTION

SEM IMAGE OF LITHIUM NICKEL MANGANESE COBALT-BASED
COMPOSITE OXIDE POWDER MANUFACTURED IN EXAMPLE 8

SEM IMAGE OF LITHIUM NICKEL MANGANESE COBALT-BASED
COMPOSITE OXIDE POWDER MANUFACTURED IN EXAMPLE 9

SEM IMAGE OF LITHIUM NICKEL MANGANESE COBALT-BASED
COMPOSITE OXIDE POWDER MANUFACTURED IN EXAMPLE 10

SEM IMAGE OF LITHIUM NICKEL MANGANESE COBALT-BASED
COMPOSITE OXIDE POWDER MANUFACTURED IN EXAMPLE 11

SEM IMAGE OF LITHIUM NICKEL MANGANESE COBALT-BASED
COMPOSITE OXIDE POWDER MANUFACTURED IN EXAMPLE 12

SEM IMAGE OF LITHIUM NICKEL MANGANESE COBALT-BASED COMPOSITE OXIDE POWDER MANUFACTURED IN COMPARATIVE EXAMPLE 6

SEM IMAGE OF LITHIUM NICKEL MANGANESE COBALT-BASED COMPOSITE OXIDE POWDER MANUFACTURED IN COMPARATIVE EXAMPLE 7

SEM IMAGE OF LITHIUM NICKEL MANGANESE COBALT-BASED COMPOSITE
OXIDE POWDER MANUFACTURED IN COMPARATIVE EXAMPLE 8

LITHIUM TRANSITION METAL-BASED COMPOUND POWDER, METHOD FOR MANUFACTURING THE SAME, SPRAY-DRIED SUBSTANCE SERVING AS FIRING PRECURSOR THEREOF, AND LITHIUM SECONDARY BATTERY POSITIVE ELECTRODE AND LITHIUM SECONDARY BATTERY USING THE SAME

FIELD OF INVENTION

The present invention relates to a lithium transition metal-based compound powder used as a lithium secondary battery positive electrode material and a method for manufacturing the same, a spray-dried substance serving as a firing precursor thereof, a lithium secondary battery positive electrode using the lithium transition metal-based compound powder, and a lithium secondary battery including the lithium secondary battery positive electrode.

BACKGROUND OF INVENTION

Lithium secondary batteries have good energy densities, output densities, and the like and are effective for achieving size and weight reduction. Therefore, the demands therefor as power supplies of portable appliances such as notebook personal computers, cellular phones, and handy video cameras are growing sharply. Lithium secondary batteries have also attracted much attention as power supplies for electric vehicles, load leveling of electric power, and the like. In recent years, demands as power supplies for hybrid electric vehicles are expanding rapidly. In particular, for electric vehicle applications, excellence is necessary in terms of low cost, safety, lifetime (at high temperatures in particular), and load characteristics, and improvements of materials have been desired.

Among materials constituting lithium secondary batteries, substances that have a function of allowing elimination and insertion of lithium ions can be used as positive electrode active materials. There are a variety of positive electrode active materials and each has its own characteristics. A common objective toward improvements of performance is improvements of load characteristics and improvements of materials are strongly desired.

Moreover, materials with good performance balance that are excellent in terms of low cost, safety, and lifetime (at high temperatures in particular) are desired.

Presently, lithium manganese-based composite oxides having a spinel structure, layer lithium nickel-based composite oxides, layer lithium cobalt-based composite oxides, and the like are put into practice as the positive electrode active materials for lithium secondary batteries. Lithium secondary batteries that use these lithium-containing composite oxides have advantages and disadvantages in terms of their characteristics. That is, lithium manganese-based composite oxides having a spinel structure are inexpensive and relatively easily synthesized and exhibit high safety when made into batteries on one hand, but have low capacities and poor high-temperature characteristics (cycle and storage) on the other hand. Layer lithium nickel-based composite oxides have high capacities and good high-temperature characteristics but have disadvantages such as that they are difficult to synthesize, exhibit poor safety when made into batteries, and require care for storage. Layer lithium cobalt-based composite oxides are easy to synthesize and exhibit an excellent battery performance balance and are thus widely used as power supplies for portable appliances but have significant disadvantages such as insufficient safety and high cost.

Under such current circumstances, lithium nickel manganese cobalt-based composite oxides having layer structures have been proposed as promising candidates of active materials that eliminate or minimize disadvantages of these positive electrode active materials and exhibit a good battery performance balance. In particular, as the demands for cost reduction, higher voltage, and higher safety increase in recent years, lithium nickel manganese cobalt-based composite oxides are regarded as promising positive electrode active materials that can meet all such demands.

In particular, one of the possible solutions that meet the demands for lower cost and higher capacity is to reduce the proportion of expensive cobalt, set the nickel/manganese ratio to about 1 or less, and use the battery by setting a higher charge voltage. However, when the charge voltage is set higher, a high load is applied on an electrolytic solution, which leads to problems such as generation of gas and deterioration of storage characteristics. An alternative for this is to reduce the proportion of expensive cobalt, set the nickel/manganese ratio to about 1 or more, and to use the battery without setting a high charge voltage. However, since lithium nickel manganese cobalt-based composite oxides having such a composition range are easily sinterable at a relatively low firing temperature, the productivity lowers and high crystallinity is not obtained. Thus, lithium secondary batteries that use these oxides as the positive electrode material have relatively low capacities and exhibit low output characteristics. Thus, further improvements are needed for practical application.

Heretofore, lithium nickel manganese cobalt-based composite oxides having manganese/nickel atomic ratios and cobalt ratios that fall within composition ranges corresponding to values defined by the present invention have been disclosed in Patent Documents 1 to 32 and Non-Patent Documents 1 to 73.

However, Patent Documents 1 to 32 and Non-Patent Documents 1 to 73 contain no descriptions that focus on additives that suppress growth and sintering of active substance particles during firing in the composition ranges defined by the present invention and do not satisfy prerequisites for improving battery performance in the present invention. It is extremely difficult for these technologies to solely achieve improvements of battery performance attained by the present invention.

There is no literature that describes "to suppress growth and sintering of active material particles during firing" indicated by the present invention. However, Patent Documents 33 to 47 and Non-Patent Documents 74 and 75 below have been published as known literatures describing that lithium nickel manganese cobalt-based composite oxides are combined or substituted with a compound containing W, Mo, Nb, Ta, or Re, or the like so as to improve the positive electrode active materials.

Patent Document 33 and Patent Document 34 disclose the use of W, Mo, Ta, or Nb as an element substituting transition metal sites of a lithium nickel-based composite oxide having a layer structure and that this improves the thermal stability in a charged state. However, as for the property of particles, only the size and the value of specific surface area of secondary particles of a system using Nb are described and there is no description about primary particles.

It is described that at a stage of adjusting the particle size of raw materials, the raw materials are wet-ground in a wet bead mill until the particle diameter is 1 μm or less. However, at such a grinding level, fine primary particles cannot be obtained by firing. In addition, since the main components of the composition is Li and Ni, there is a problem in that an active substance that strikes a good balance between various properties cannot be obtained still.

Patent Document 35 discloses use of a lithium nickel manganese cobalt niobium-based composite oxide. However, as for the particle properties, the descriptions related to the size of the primary particles and secondary particles are not provided except for that the particles are substantially spherical and thus the control of particle size is not addressed. Furthermore, since the Mn molar ratio in the transition metal is significantly low, i.e., 0.1 or less, there remains a problem that an active substance that has well-balanced properties cannot be obtained still.

Patent Document 36 discloses use of a lithium nickel manganese cobalt-based composite oxide containing W, Mo and that this improves thermal stability in a charged state while achieving a lower cost and a higher capacity than $LiCoO_2$. However, in Examples, because a Ni—Mn—Co composite oxide having an average particle diameter of 10 μm, lithium hydroxide, and tungsten trioxide or molybdenum trioxide are mixed with each other and fired, the reaction becomes inhomogeneous and diffraction peaks of a composite oxide of Li and W and/or a composite oxide of Li and Mo are contained in addition to the main diffraction peaks belonging to a hexagonal crystal structure. Moreover, the manufacturing method involves homogeneously mixing the Ni—Mn—Co composite oxide having an average particle diameter of 10 μm, lithium hydroxide ground to 20 μm or less, and 1 to 20 μm tungsten trioxide or molybdenum trioxide and firing the resulting mixture. A raw material mixture of such particle sizes does not correspond to a fine and homogeneous mixture and it is impossible, by firing such a mixture, to obtain a fired powder containing spherical secondary particles formed by aggregation of fine primary as in the present invention. Thus, there is a problem in that an active substance that strikes a good balance between various properties cannot be obtained still.

Patent Document 37 discloses a lithium nickel manganese cobalt-based oxide having a layer structure in which Ta and Nb are used as the elements substituting transition metal sites, and that this achieves a wider operable voltage range, good charge/discharge cycle durability, high capacity, and high safety. However, the manufacturing method described in this document involves simply mixing a nickel manganese cobalt coprecipitate powder, a lithium compound, and a compound of Ta or Nb and firing the resulting mixture and is not a manufacturing method that takes into account the control of the particle morphology. Thus, it is impossible to obtain the spherical secondary particle morphology formed by aggregation of fine primary particles obtained in the present invention. Moreover, since a Ni—Mn—Co coprecipitate powder having an average particle diameter as large as 8 μm, a niobium oxide powder, and a lithium hydroxide powder are mixed and fired, the reaction becomes inhomogeneous. Thus there is a problem in that an active substance that strikes a good balance between various properties cannot be obtained still.

Patent Document 38 discloses Examples in which transition metal sites of a lithium nickel manganese cobalt-based composite oxide are substituted with W. However, the manufacturing method described in this document is not a manufacturing method that takes into account the control of the particle morphology and it is impossible to obtain the spherical second particle morphology formed by aggregation of fine primary particles obtained in the present invention. Patent Document 38 also discloses Examples in which transition metal sites of a lithium nickel manganese cobalt-based composite oxide are substituted with W. However, the Mn molar ratio in the transition metal sites is as low as 0.01 and the Ni molar ratio is significantly large, i.e., 0.8. Thus there is a problem in that an active substance that strikes a good balance between various properties cannot be obtained still.

Patent Document 39 discloses that a lithium manganese nickel-based composite oxide having a monoclinic structure with transition metal sites thereof substituted with Nb, Mo, W is used as a positive electrode active substance and that this can provide a lithium secondary battery having a high energy density, a high voltage, and high reliability. However, the manufacturing method described in this document is a manufacturing method that involves grinding and mixing raw material compounds in a ball mill or the like and firing the resulting mixture and does not take into account the control of the particle morphology. It is impossible to obtain the spherical second particle morphology formed by aggregation of fine primary particles obtained in the present invention. Moreover, since Co is not contained as the transition metal element, crystals do not develop sufficiently and the Nb, Mo, W molar ratio is excessively large, i.e., 5 mol %. Thus there is a problem in that an active substance that strikes a good balance between various properties cannot be obtained still.

Patent Document 40 discloses that a compound having molybdenum or tungsten is provided to at least surfaces of lithium transition metal oxide particles having a layer structure and that good battery characteristics can thereby be exhibited in a more hostile operation environment. However, according to Examples described in this document, the manufacturing method involves heating precipitates containing Co, Ni, and Mn, mixing a lithium compound and a molybdenum compound thereto, and firing the resulting mixture. Thus, the effect of suppressing particle growth or sintering during firing of the positive electrode active substance is not easily exhibited and fine primary particle morphology of the present invention cannot be achieved. Moreover, according to Examples, since the Co/(Ni+Co+Mn) molar ratio is as large as 0.33, there is a problem in that an active substance that strikes a good balance between various properties cannot be obtained still.

Patent Document 41 discloses a lithium nickel manganese cobalt molybdenum-based composite oxide having a layer structure. However, according to Examples described in this document, the manufacturing method involves grinding and mixing a lithium compound and a molybdenum compound with a Mn, Ni, Co coprecipitate hydroxide, i.e., mixing powder particles while grinding, and then firing the resulting mixture. Thus, it is impossible to obtain the spherical second particle morphology formed by aggregation of fine primary particles obtained in the present invention. Moreover, according to Examples, since LiOH is mixed with Mn—Ni—Co coprecipitate hydroxide and molybdenum oxide in a grinding mortar and the resulting mixture is fired, not only the reaction becomes inhomogeneous but also the Co ratio is high, i.e., the Co/(Ni+Co+Mn) molar ratio is as high as 0.34. Thus, there is a problem in that an active substance that strikes a good balance between various properties cannot be obtained still.

Patent Document 42 discloses an active substance for a lithium secondary battery, in which a surface layer containing Li and at least one element selected from the group consisting of Mo and W is preferably provided on surfaces of lithium nickel cobalt manganese-based composite oxide particles. It is described that thermal stability can thereby be made higher than that of conventionally proposed positive electrode active substances without significantly deteriorating the high initial discharge capacity. However, the manufacturing method described in this document is a manufacturing method involving mixing a Li composite oxide of Mo or W with a positive electrode active material powder later and then re-firing the resulting mixture. Thus, not only the effect of suppressing particle growth or sintering during firing of the positive electrode active substance is not exhibited but also a state in which the Li composite oxide of Mo or W simply coats surfaces of the positive electrode active substance is created. Thus, the resistance at the active substance surface increases and there is a problem in that good output characteristics cannot be obtained still.

Patent Document 43 discloses that particles of a lithium composite oxide are contained as the positive electrode active substance particles, that at least part of secondary particles have cracks, that W, Nb, Ta, or Mo is at least provided to surface layer portions of the active substance particles, and these elements are distributed more in surface layer portions than in the interiors of the active substance particles. As for the particle properties, the document discloses that part of secondary particles have cracks, that the median diameter is 1 to 30 μm, and that the average particle diameter of the primary particles is 0.1 to 3.0 μm in general. However, each of the descriptions is nothing more than a description of a general range and there is no description defining the ratio between the primary particle size and the secondary particle size. Moreover, according to Examples described in this document, the manufacturing method involves adding additive elements to surface layer portions of lithium composite oxide particles by a post-treatment (a solution method, 400° C. annealing). Thus, not only the effect of suppressing particle growth or sintering during firing of the positive electrode active substance is not exhibited but also a state in which additive element-containing compounds simply coat the surfaces of the positive electrode active surfaces is created. Thus, the resistance at the active surfaces surface increases and there is a problem in that good output characteristics cannot be obtained still. Furthermore, since the method involves treating the aforementioned elements at a low temperature relative to the positive electrode active material so as to support these elements on the surfaces, only the additive elements are presumably present in the surface layer portions of the active substance and it is expected that a continuous composition slope structure that has a non-linear concentration gradient in the depth direction from the primary particle surfaces does not exist. Thus, there is a problem in that an active substance that strikes a good balance between various properties cannot be obtained still.

Patent Document 44 describes that Mo or W is added to a lithium nickel manganese cobalt composite oxide but there is a problem in that good output characteristics cannot be obtained still because the primary particle diameter is as large as 1 μm or more.

Patent Documents 45 and 46 disclose use of a lithium nickel manganese cobalt-based composite oxide containing Nb, Mo, and W. However, in Examples, none of the three elements are used and only examples with a Mn/Ni molar ratio of 1 are implemented. Thus, there is a problem in that an active substance that strikes a good balance between various properties cannot be obtained still.

Patent Document 47 discloses further adding Nb, W, and Mo to a lithium nickel manganese-based layer composite oxide containing Li in sites containing transition metals. However, not only Co is not contained but also only Examples with a Ni/Mn molar ratio of 1 or less are provided. Thus, there is a problem in that an active substance that strikes a good balance between various properties cannot be obtained still.

Non-Patent Document 74 discloses a $LiNi_{1/3}Mn_{1/3}Mo_{1/3}O_2$ composite oxide having a layer structure. However, the Mo content is excessively high and Co is not contained. Thus, there is a problem in that an active substance that strikes a good balance between various properties cannot be obtained still.

Non-Patent Document 75 discloses a Mo-doped $LiNi_{1/3}Mn_{1/3}Co_{1/3}O_2$ composite oxide. However, not only the Co/(Ni+Mn+Co) molar ratio is as large as 1/3 but also only compositions with a Ni/Mn molar ratio of 1 are described. Moreover, as for these compositions, the maximum firing temperature is low, i.e., 900° C. In addition, although an oxide (MoO3) is used as the Mo raw material, all other materials are acetic acid salts (water-soluble). As long as SEM images of Non-Patent Document 2 is concerned, primary particle size has grown to about 2 μm even at a low firing temperature of 800° C. Thus, there is a problem in that an active substance that strikes a good balance between various properties cannot be obtained still.

Patent Document 1: Japanese Patent No. 3110728
Patent Document 2: Japanese Patent No. 3571671
Patent Document 3: U.S. Pat. No. 6,680,143 B2
Patent Document 4: Japanese Unexamined Patent Application Publication No. 11-307094
Patent Document 5: Japanese Unexamined Patent Application Publication No. 2000-294242
Patent Document 6: Japanese Unexamined Patent Application Publication No. 2000-133262
Patent Document 7: WO2002-040404
Patent Document 8: WO2002-073718
Patent Document 9: WO2002-086993
Patent Document 10: Japanese Unexamined Patent Application Publication No. 2002-145623
Patent Document 11: WO2003-044881
Patent Document 12: WO2003-044882
Patent Document 13: Japanese Unexamined Patent Application Publication No. 2003-031219
Patent Document 14: Japanese Unexamined Patent Application Publication No. 2003-081639
Patent Document 15: Japanese Unexamined Patent Application Publication No. 2003-178756
Patent Document 16: Japanese Unexamined Patent Application Publication No. 2003-203633
Patent Document 17: Japanese Unexamined Patent Application Publication No. 2003-221236
Patent Document 18: Japanese Unexamined Patent Application Publication No. 2003-238165
Patent Document 19: Japanese Unexamined Patent Application Publication No. 2003-297354
Patent Document 20: Japanese Unexamined Patent Application Publication No. 2004-031091
Patent Document 21: Japanese Unexamined Patent Application Publication No. 2004-006267
Patent Document 22: Japanese Unexamined Patent Application Publication No. 2004-139853
Patent Document 23: Japanese Unexamined Patent Application Publication No. 2004-265849
Patent Document 24: Japanese Unexamined Patent Application Publication No. 2004-281253
Patent Document 25: Japanese Unexamined Patent Application Publication No. 2004-311427
Patent Document 26: Japanese Unexamined Patent Application Publication (Translation of PCT Application) No. 2004-528691
Patent Document 27: Japanese Unexamined Patent Application Publication No. 2005-150057

Patent Document 28: Japanese Unexamined Patent Application Publication No. 2005-150093
Patent Document 29: Japanese Unexamined Patent Application Publication No. 2005-150102
Patent Document 30: Japanese Unexamined Patent Application Publication No. 2005-187282
Patent Document 31: Japanese Unexamined Patent Application Publication No. 2003-051308
Patent Document 32: Japanese Unexamined Patent Application Publication No. 2005-123179
Patent Document 33: Japanese Patent No. 3088716
Patent Document 34: Japanese Patent No. 3362025
Patent Document 35: Japanese Unexamined Patent Application Publication No. 2002-151071
Patent Document 36: WO2002-041419
Patent Document 37: Japanese Unexamined Patent Application Publication No. 2003-68298
Patent Document 38: Japanese Unexamined Patent Application Publication No. 2004-303673
Patent Document 39: Japanese Unexamined Patent Application Publication No. 2005-235628
Patent Document 40: Japanese Unexamined Patent Application Publication No. 2005-251716
Patent Document 41: Japanese Unexamined Patent Application Publication No. 2006-164934
Patent Document 42: Japanese Unexamined Patent Application Publication No. 2002-75367
Patent Document 43: Japanese Unexamined Patent Application Publication No. 2007-18985
Patent Document 44: Japanese Unexamined Patent Application Publication No. 2007-63033
Patent Document 45: Japanese Unexamined Patent Application Publication No. 2006-202647
Patent Document 46: Japanese Unexamined Patent Application Publication No. 2006-202702
Patent Document 47: Japanese Unexamined Patent Application Publication No. 2007-242581
Non-Patent Document 1: J. Mater. Chem., 6 (1996) 1149.
Non-Patent Document 2: Chem. Lett., (2001) 744.
Non-Patent Document 3: Electrochem. Solid-State Lett., 4 (2001) A191.
Non-Patent Document 4: Electrochem. Solid-State Lett., 4 (2001) A200.
Non-Patent Document 5: Electrochem. Solid-State Lett., 5 (2002) A145.
Non-Patent Document 6: Electrochem. Solid-State Lett., 5 (2002) A263.
Non-Patent Document 7: J. Electrochem. Soc., 149 (2002) A778.
Non-Patent Document 8: J. Electrochem. Soc., 149 (2002) A815.
Non-Patent Document 9: J. Electrochem. Soc., 149 (2002) A1332.
Non-Patent Document 10: J. Power sources, 112 (2002) 41.
Non-Patent Document 11: J. Power sources, 112 (2002) 634.
Non-Patent Document 12: Electrochemistry, 71 (2003) 1214.
Non-Patent Document 13: Electrochim. Acta, 48 (2003) 1505.
Non-Patent Document 14: Electrochim. Acta, 48 (2003) 2589.
Non-Patent Document 15: J. Electrochem. Soc., 150 (2003) A1299.
Non-Patent Document 16: J. Power sources, 119-121 (2003) 139.
Non-Patent Document 17: J. Power sources, 119-121 (2003) 150.
Non-Patent Document 18: J. Power sources, 119-121 (2003) 156.
Non-Patent Document 19: J. Power sources, 119-121 (2003) 161.
Non-Patent Document 20: J. Power sources, 119-121 (2003) 166.
Non-Patent Document 21: J. Power sources, 124 (2003) 170.
Non-Patent Document 22: J. Power sources, 124 (2003) 533.
Non-Patent Document 23: Solid State Ionics, 164 (2003) 43.
Non-Patent Document 24: Chem. Mater., 16 (2004) 1996.
Non-Patent Document 25: Electrochem. Com., 6 (2004) 1085.
Non-Patent Document 26: Electrochem. Solid-State Lett., 7 (2004) A155.
Non-Patent Document 27: Electrochem. Solid-State Lett., 7 (2004) A167.
Non-Patent Document 28: Electrochem. Solid-State Lett., 7 (2004) A290.
Non-Patent Document 29: Electrochem. Solid-State Lett., 7 (2004) A294.
Non-Patent Document 30: Electrochim. Acta, 49 (2004) 803.
Non-Patent Document 31: Electrochim. Acta, 49 (2004) 1565.
Non-Patent Document 32: Electrochim. Acta, 49 (2004) 4425.
Non-Patent Document 33: Electrochim. Acta, 50 (2004) 427.
Non-Patent Document 34: Electrochim. Acta, 50 (2004) 449.
Non-Patent Document 35: J. Electrochem. Soc., 151 (2004) A246.
Non-Patent Document 36: J. Electrochem. Soc., 151 (2004) A504.
Non-Patent Document 37: J. Electrochem. Soc., 151 (2004) A1789.
Non-Patent Document 38: J. Mater. Chem., 14 (2004) 1424.
Non-Patent Document 39: J. Power sources, 129 (2004) 288.
Non-Patent Document 40: J. Power sources, 135 (2004) 262.
Non-Patent Document 41: Adv. Mater., 17 (2005) 2834.
Non-Patent Document 42: Chem. Mater., 17 (2005) 3695.
Non-Patent Document 43: Electrochem. Solid-State Lett., 8 (2005) A637.
Non-Patent Document 44: Electrochim. Acta, 50 (2005) 4778.
Non-Patent Document 45: Electrochim. Acta, 50 (2005) 5349.
Non-Patent Document 46: J. Electrochem. Soc., 152 (2005) A566.
Non-Patent Document 47: J. Electrochem. Soc., 152 (2005) A746.
Non-Patent Document 48: J. Electrochem. Soc., 152 (2005) A1879.
Non-Patent Document 49: J. Mater. Chem., 15 (2005) 2257.
Non-Patent Document 50: J. Power sources, 146 (2005) 598.
Non-Patent Document 51: J. Power sources, 146 (2005) 617.
Non-Patent Document 52: J. Power sources, 146 (2005) 626.
Non-Patent Document 53: J. Power sources, 146 (2005) 630.
Non-Patent Document 54: J. Power sources, 146 (2005) 645.
Non-Patent Document 55: J. Power sources, 146 (2005) 650.
Non-Patent Document 56: J. Power sources, 146 (2005) 654.
Non-Patent Document 57: J. Power sources, 146 (2005) 658.
Non-Patent Document 58: J. Power sources, 148 (2005) 85.
Non-Patent Document 59: Mater. Lett., 59 (2005) 2693.
Non-Patent Document 60: Mater. Res. Soc. Symp. Proc., 835 (2005) K10.8.1.
Non-Patent Document 61: Mater. Res. Soc. Symp. Proc., 835 (2005) K11.3.1,
Non-Patent Document 62: Solid State Ionics, 176 (2005) 1035.

Non-Patent Document 63: Solid State Ionics, 176 (2005) 2577.
Non-Patent Document 64: Trans. Nonferrous Met. Soc. China, 15 (2005) 1185.
Non-Patent Document 65: Chem. Mater., 18 (2006) 1658.
Non-Patent Document 66: Electrochem. Solid-State Lett., 9 (2006) A27.
Non-Patent Document 67: Electrochim. Acta, 51 (2006) 3413.
Non-Patent Document 68: J. Am. Chem. Soc., 128 (2006) 8694.
Non-Patent Document 69: J. Appl. Phys., 99 (2006) 06371.
Non-Patent Document 70: J. Electrochem. Soc., 153 (2006) A261.
Non-Patent Document 71: J. Electrochem. Soc., 153 (2006) A390.
Non-Patent Document 72: J. Mater. Chem., 16 (2006) 359.
Non-Patent Document 73: J. Power sources, 158 (2006) 524.
Non-Patent Document 74: Microelectronics Journal, 36 (2005) 491.
Non-Patent Document 75: J. Power Sources, 162 (2006) 1367.

SUMMARY OF INVENTION

An object of the present invention is to provide a lithium transition metal-based compound powder for lithium secondary battery positive electrode materials that improves load characteristics such as rate and output characteristics when used as a lithium secondary battery positive electrode material and that preferably achieves cost reduction, high voltage resistance, and high safety, a method for manufacturing the powder, a spray-dried substance obtained by a spray-drying step in the method, a lithium secondary battery positive electrode using the lithium transition metal-based compound powder, and a lithium secondary battery provided with this lithium secondary battery positive electrode.

In achieving this object, i.e., in achieving the object of improving the load characteristics such as rate and output characteristics, the inventors of the present invention thought it important to obtain fine particles by suppressing particle growth and sintering while securing sufficiently high crystallinity in the stage of firing the active material. Extensive researches have been conducted which have found that when a compound containing an element such as Mo, W, or the like is added to a layer lithium nickel manganese cobalt-based composite oxide in particular and then firing is performed at a particular temperature or higher, highly crystalline fine particles in which growth of primary particles and sintering between particles are suppressed can be obtained. In addition, a lithium transition metal-based compound powder including surface layers with a high additive element concentration can be obtained thereby. Thus, a lithium secondary battery positive electrode material can achieve cost reduction, high voltage resistance, and high safety as well as improvements of load characteristics such as rate and output characteristics.

However, according to existing manufacturing methods, the steps of simultaneously grinding a lithium raw material, a transition metal element, and an additive element to form a slurry and spray-drying and firing the slurry are performed. Thus, the secondary particles of the resulting active substance powder easily break up and only a powder with a low bulk density and a low electrode density is obtained, which is a problem.

In order to resolve such a problem related to powder physical properties, it is considered important to form secondary particles that do not break easily and have strong cohesion between primary particles from the time of a spray-dried substance. Extensive investigations have successfully found that secondary particles that are aggregates of fine primary particles and are not readily breakable can be formed by spray-drying a slurry free of a lithium raw material to obtain a spray-dried substance of desired secondary particles not readily breakable and then firing a mixture of the spray-dried substance and a lithium raw material. Accordingly, a lithium secondary battery positive electrode material that achieves not only a lower cost, high voltage resistance, high safety, and load characteristics such as rate and output characteristics but also a high bulk density and a high electrode density has been made possible.

A first invention has been achieved as such and provides the following:

A lithium transition metal-based compound powder for a lithium secondary battery positive electrode material, the lithium transition metal-based compound powder containing, as a main component, a lithium transition metal-based compound that has a function of allowing elimination and insertion of lithium ions, and including a crystal structure belonging to a layer structure, wherein primary particles are aggregated to form secondary particles, the ratio A/B of a median diameter A of the secondary particles to an average diameter (average primary particle diameter B) is in the range of 8 to 100, and $0.01 \leq FWHM(110) \leq 0.5$ where FWHM(110) is the half width of a (110) diffraction peak present near a diffraction angle $2\theta$ of 64.5° in a powder X-ray diffraction analysis using a CuKα line;

A lithium transition metal-based compound powder for a lithium secondary battery positive electrode material, the lithium transition metal-based compound powder containing, as a main component, a lithium transition metal-based compound that has a function of allowing elimination and insertion of lithium ions, wherein a fine and homogeneous mixture of a raw material of the main component and an additive that suppresses particle growth and sintering during firing is fired, primary particle crystals having an average diameter (average primary particle diameter B) of 0.05 μm or more and 0.9 μm or less are aggregated to form spherical secondary particles, and the ratio A/B of a median diameter A of the secondary particles to the average primary particle diameter B is in the range of 8 to 100;

A method for manufacturing the lithium transition metal-based compound powder for a lithium secondary battery positive electrode material described above, the method including a slurry preparation step of grinding an additive that suppresses particle growth and sintering during firing and at least one transition metal compound selected from V, Cr, Mn, Fe, Co, Ni, and Cu in a liquid medium to obtain a homogeneously dispersed slurry, a spray-drying step of spray-drying the resulting slurry, a mixed powder preparation step of mixing the resulting spray-dried substance and a lithium compound, a firing step of firing the resulting mixed powder, and a step of classifying the resulting fired substance;

A spray-dried substance obtained in the spray-drying step of the method for manufacturing the lithium transition metal-based compound powder for a lithium secondary battery positive electrode material described above, wherein the median diameter measured with a laser diffraction/scattering particle size distribution measuring instrument at a refractive index of 1.24 using the volume as the particle diameter basis after 5 minutes of ultrasonic dispersion (output: 30 W, frequency: 22.5 kHz) is 3 μm or more and 20 μm or less and a difference $\Delta D_{50}$ between this median diameter and the median diameter measured without conducting the ultrasonic dispersion is 0 μm or more and 3 μm or less;

A lithium secondary battery positive electrode including a positive electrode active substance layer on a collector, the positive electrode active substance layer containing a binder and the lithium transition metal-based compound powder for a lithium secondary battery positive electrode material described above; and A lithium secondary battery including a negative electrode capable of occluding and releasing lithium, a nonaqueous electrolyte containing a lithium salt, and a positive electrode capable of occluding and releasing lithium, wherein the lithium secondary battery positive electrode described above is used as the positive electrode.

Another object of the present invention is to provide a lithium transition metal-based compound powder for a lithium secondary battery positive electrode material, the powder capable of achieving, when used as a lithium secondary battery positive electrode material, a higher capacity and improved output characteristics, and more preferably cost reduction and longer lifetime; a method for making such a powder; a lithium secondary battery positive electrode using the lithium transition metal-based compound powder; and a lithium secondary battery including this lithium secondary battery positive electrode.

The inventors of the present invention have found that in order to achieve the object of improving the output characteristics while achieving a higher capacity, a compound containing a particular element such as W should be added to a layer lithium nickel manganese cobalt-based composite oxide having a particular composition range with a nickel/manganese ratio of 1 or more and a reduced cobalt ratio so as to form a highly homogeneous mixture. When the mixture is subjected to a firing treatment at a particular temperature or higher, a lithium transition metal-based compound powder that exhibits good capacity characteristics, high output characteristics, long lifetime characteristics and cost reduction can be obtained.

In other words, the inventors have considered it important to select a limited composition range, suppress sintering while retaining a sufficiently high crystallinity in the stage of firing, and modify the particle surfaces so that the resistance at the interface between the active substance and the electrolytic solution is low when made into a battery in order to improve output characteristics as well as achieving cost reduction, a higher capacity, and longer lifetime. Extensive investigations have found that when a compound containing an element such as W is added to a layer lithium nickel manganese cobalt-based composite oxide having a particular composition region and the resulting mixture is fired at a particular temperature or higher, sintering is suppressed and a lithium transition metal-based compound powder having a surface state in which the resistance at the interface with the electrolytic solution is significantly reduced when made into a battery can be obtained.

A second invention has been achieved as such and provides the following:

A lithium transition metal-based compound powder for a lithium secondary battery positive electrode material having a composition represented by formula (III) below and containing 0.1 mol % or more and 5 mol % or less of at least one element selected from Mo, W, Nb, Ta, and Re relative to the total molar amount of Mn, Ni, and Co in formula (III):

$$[L]_{3a}[Q]_{3b}[O_2]_{6c} \quad (III)$$

in the formula (III), L is an element containing at least Li, Q is an element containing at least Ni, Mn, and Co or Li, Ni, Mn, and Co, 0.4≤Ni/(Mn+Ni+Co) molar ratio<0.7

0.1<Mn/(Mn+Ni+Co) molar ratio≤0.4

0.1≤Co/(Mn+Ni+Co) molar ratio≤0.3, and the Li molar ratio in Q is 0 or more and 0.05 or less; and wherein the subscripts next to [ ] indicate the sites in the crystal structure, a 3a site is a Li site, a 3b site is a transition metal site, and a 6c site is an oxygen site;

A method for manufacturing the lithium transition metal-based compound powder for a lithium secondary battery positive electrode material described above, the method including a spray-drying step of spray-drying a slurry in which lithium carbonate, a Ni compound, a Mn compound, a Co compound, and a metal compound containing at least one element selected from Mo, W, Nb, Ta, and Re ground in a liquid medium are homogeneously dispersed, and a firing step of firing the resulting spray-dried substance;

A spray-dried substance that functions as a precursor of a lithium transition metal-based compound powder for a lithium secondary battery positive electrode material, the spray-dried substance being obtained by spray-drying a slurry in which lithium carbonate, a Ni compound, a Mn compound, a Co compound, and a metal compound containing at least one element selected from Mo, W, Nb, Ta, and Re ground in a liquid medium are homogeneously dispersed, wherein $D_{50}$ [US 5]/$D_{50}$ [US 0] is 0.03 or more and 0.7 or less where [US 5]/$D_{50}$ [US 0] is the ratio of a median diameter $D_{50}$ [US 5] measured after 5 minutes of ultrasonic dispersion (output: 30 W, frequency: 22.5 kHz) to a median diameter $D_{50}$ [US 0] measured without conducting ultrasonic dispersion with a laser diffraction/scattering particle size distribution analyzer at a refractive index of 1.24 using the volume as the particle diameter basis;

A lithium secondary battery positive electrode including a positive electrode active substance layer on a collector, the positive electrode active substance layer containing a binder and the lithium transition metal-based compound powder for a lithium secondary battery positive electrode material described above; and A lithium secondary battery including a negative electrode capable of occluding and releasing lithium, a nonaqueous electrolyte containing a lithium salt, and a positive electrode capable of occluding and releasing lithium, wherein the lithium secondary battery positive electrode described above is used as the positive electrode.

When the lithium transition metal-based compound powder for a lithium secondary battery positive electrode material of the first invention is used as a lithium secondary battery positive electrode material, both improvements of load characteristics and higher densities can be achieved. Thus, according to the first invention, a lithium secondary battery having a high density and good output characteristics can be provided.

When the lithium transition metal-based compound powder for a lithium secondary battery positive electrode material of the second invention is used as a lithium secondary battery positive electrode material, cost reduction, higher safety, high load characteristics, and improvements in powder handling property can be achieved. Thus, according to the second invention, a lithium secondary cost that is inexpensive and easy to handle and exhibits high safety and good performance can be provided.

DETAILED DESCRIPTION

Figure 1:
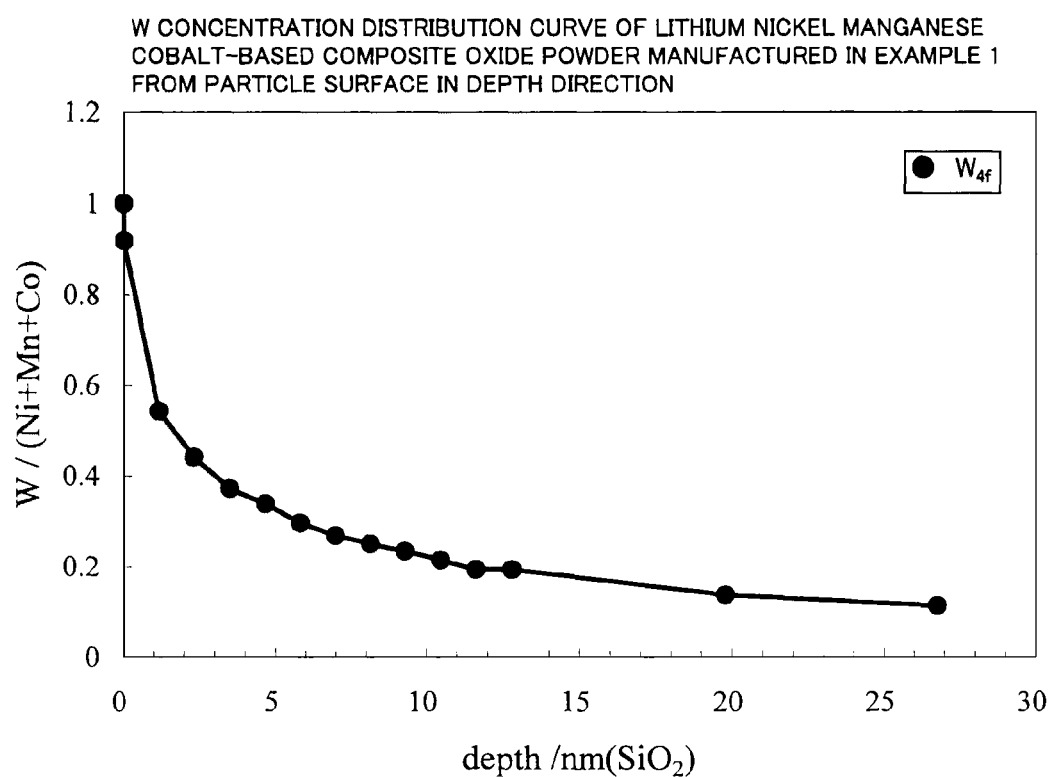
FIG. 1 is a graph showing a W concentration distribution in a depth direction from surfaces of particles of a manufactured lithium nickel manganese cobalt-based composite oxide in Example 1.
Figure 2:
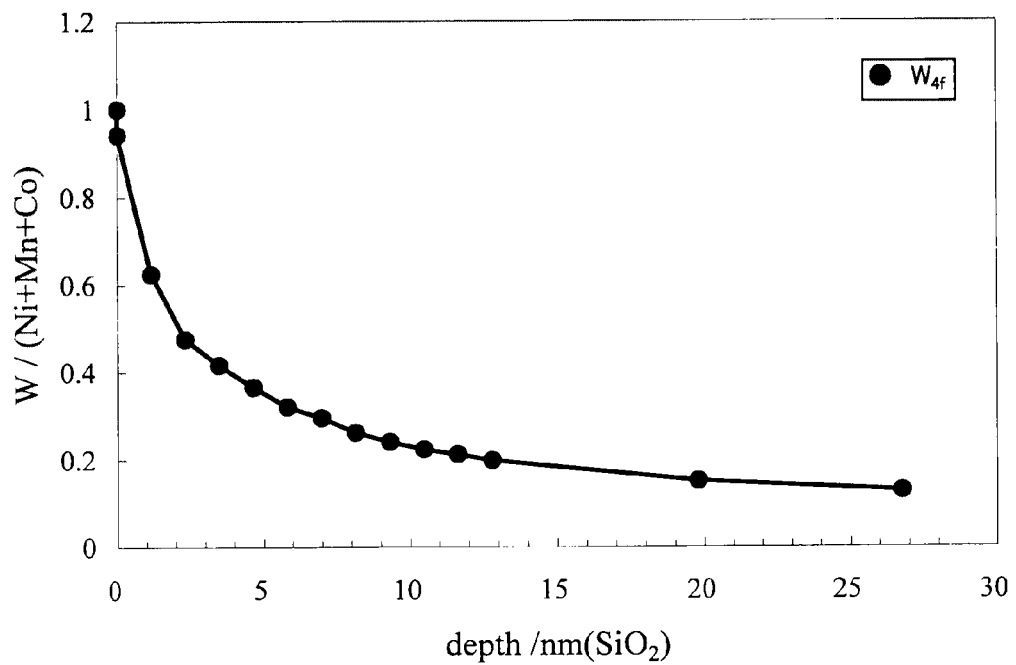
FIG. 2 is a graph showing a W concentration distribution in a depth direction from surfaces of particles of a manufactured lithium nickel manganese cobalt-based composite oxide in Example 2.
Figure 3:
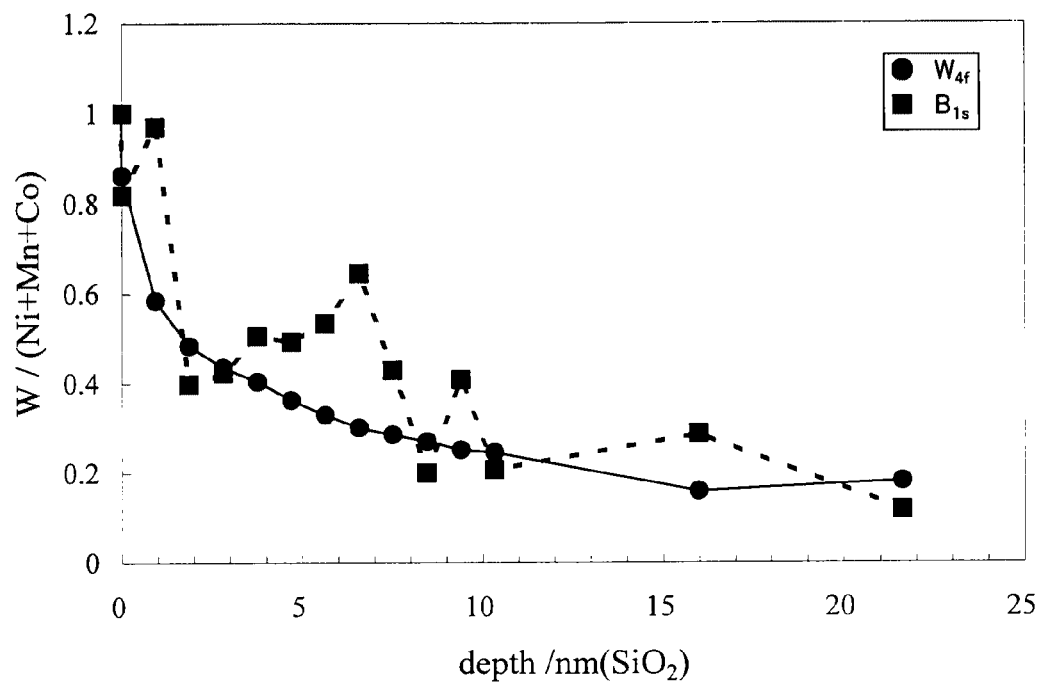
FIG. 3 is a graph showing a W concentration distribution and a B concentration distribution in a depth direction from surfaces of particles of a manufactured lithium nickel manganese cobalt-based composite oxide in Example 3.
Figure 4:
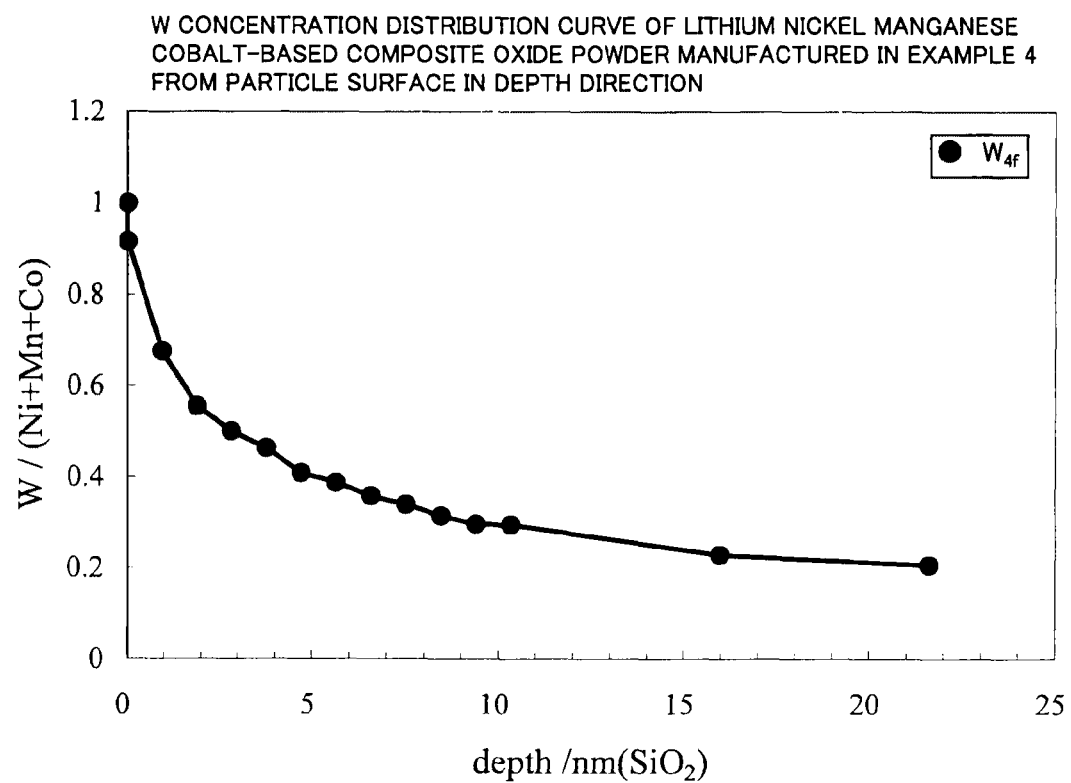
FIG. 4 is a graph showing a W concentration distribution in a depth direction from surfaces of particles of a manufactured lithium nickel manganese cobalt-based composite oxide in Example 4.
Figure 5:
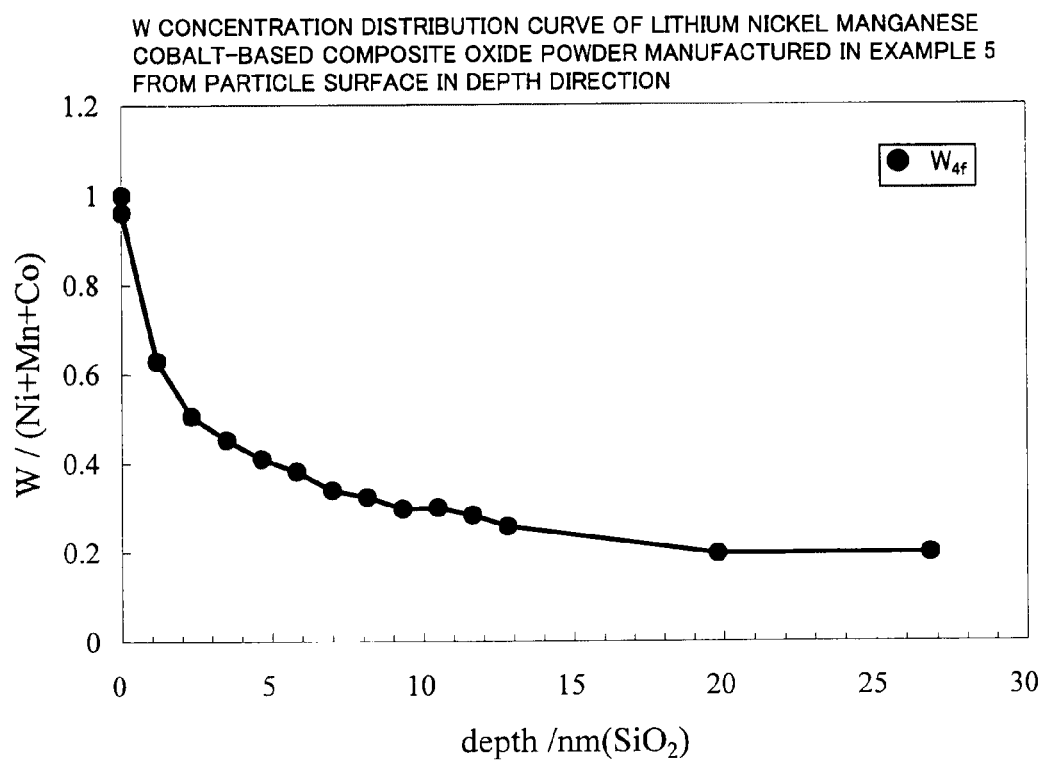
FIG. 5 is a graph showing a W concentration distribution in a depth direction from surfaces of particles of a manufactured lithium nickel manganese cobalt-based composite oxide in Example 5.
Figure 6:
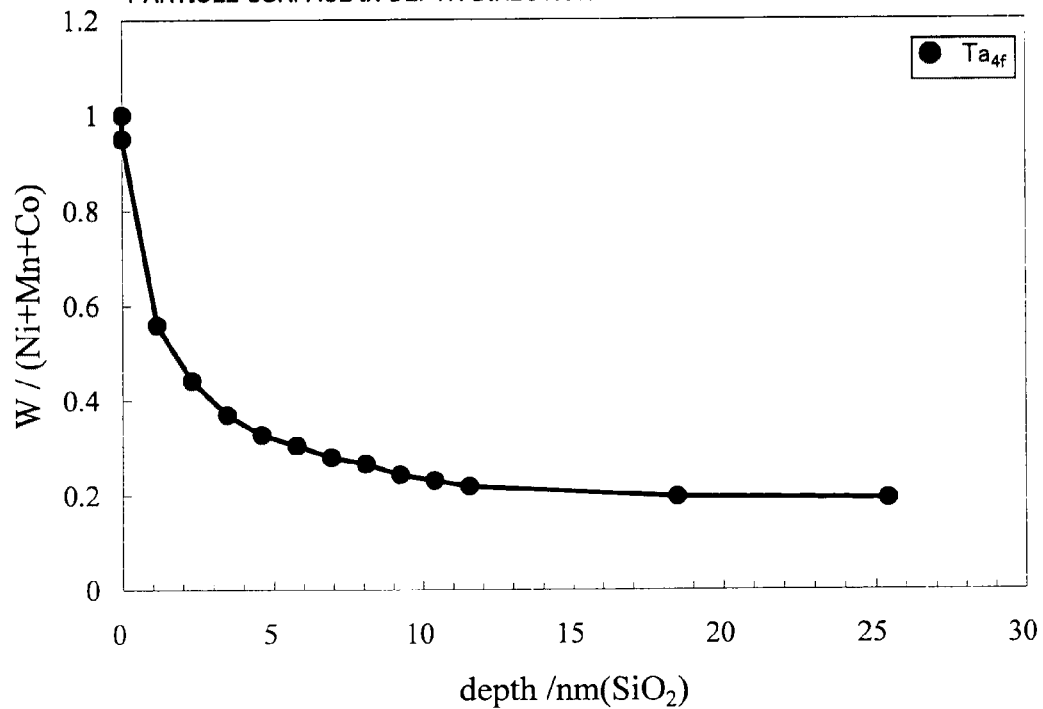
FIG. 6 is a graph showing a Ta concentration distribution in a depth direction from surfaces of particles of a manufactured lithium nickel manganese cobalt-based composite oxide in Example 6.
Figure 7:
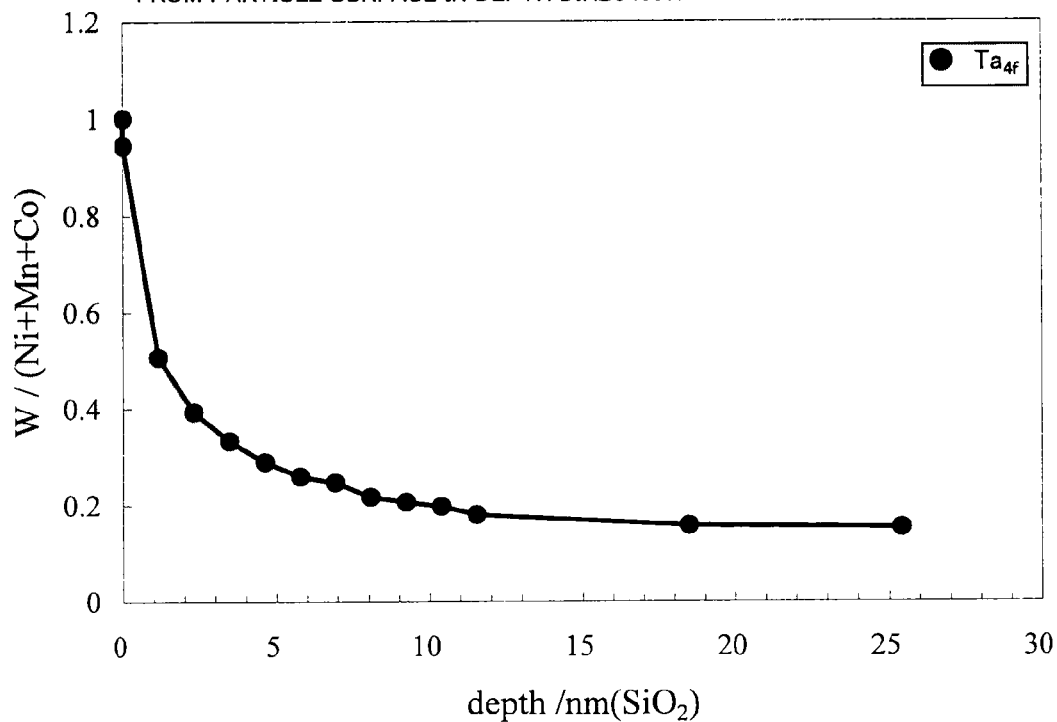
FIG. 7 is a graph showing a Ta concentration distribution in a depth direction from surfaces of particles of a manufactured lithium nickel manganese cobalt-based composite oxide in Example 7.
Figure 8:
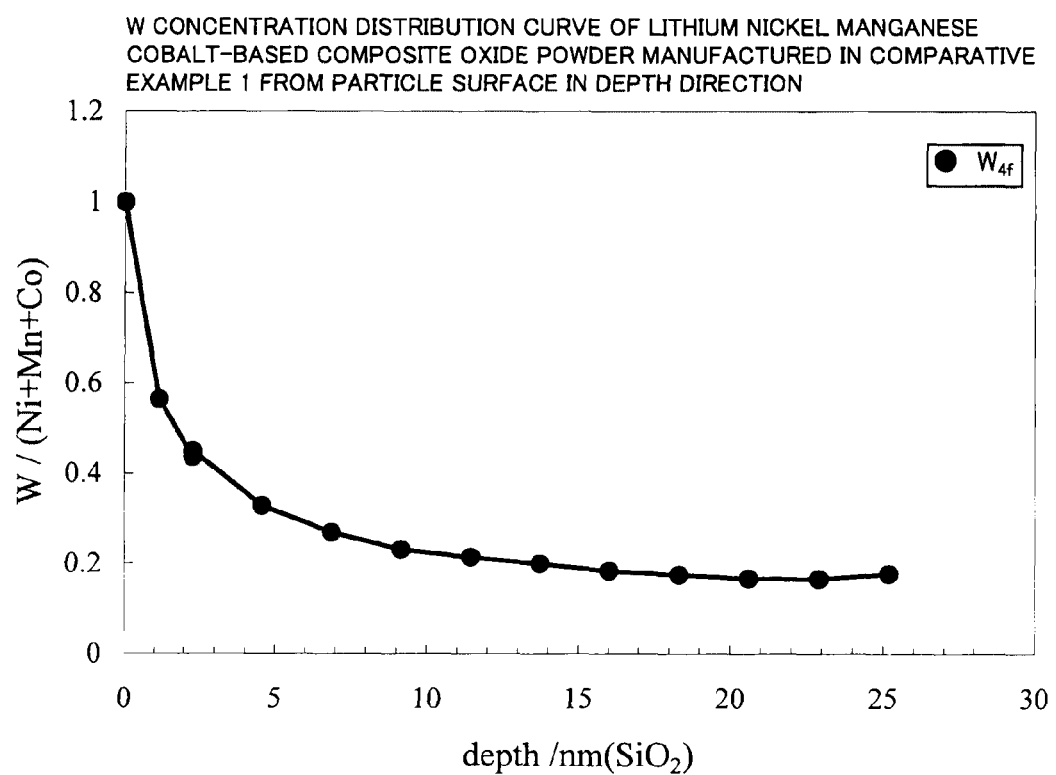
FIG. 8 is a graph showing a W concentration distribution in a depth direction from surfaces of particles of a manufactured lithium nickel manganese cobalt-based composite oxide in Comparative Example 1.
Figure 9:
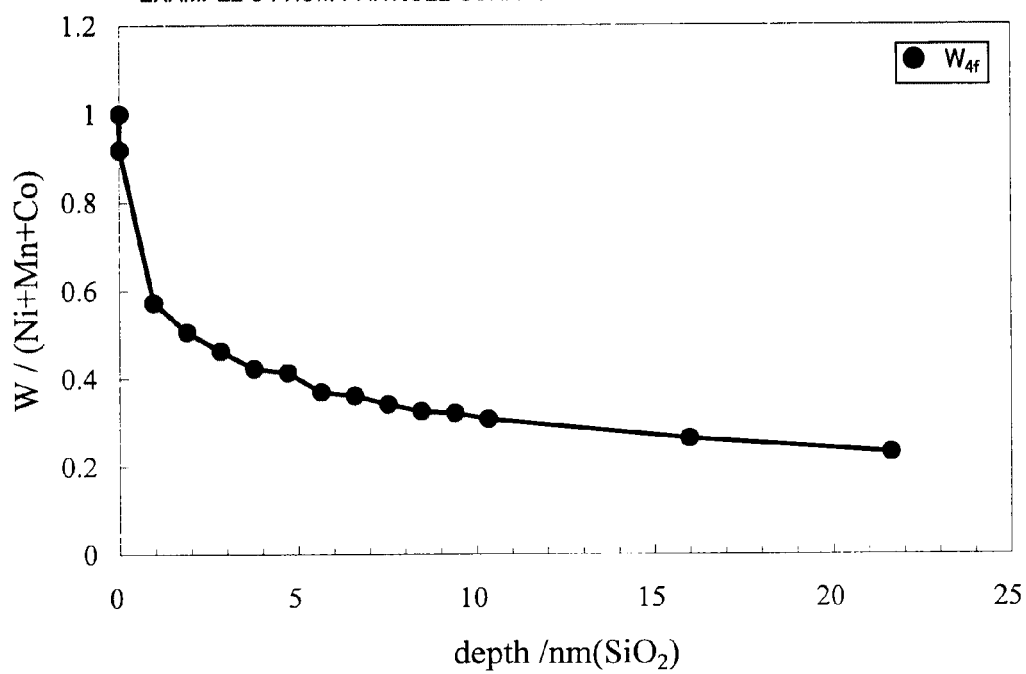
FIG. 9 is a graph showing a W concentration distribution in a depth direction from surfaces of particles of a manufactured lithium nickel manganese cobalt-based composite oxide in Comparative Example 3.
Figure 10:
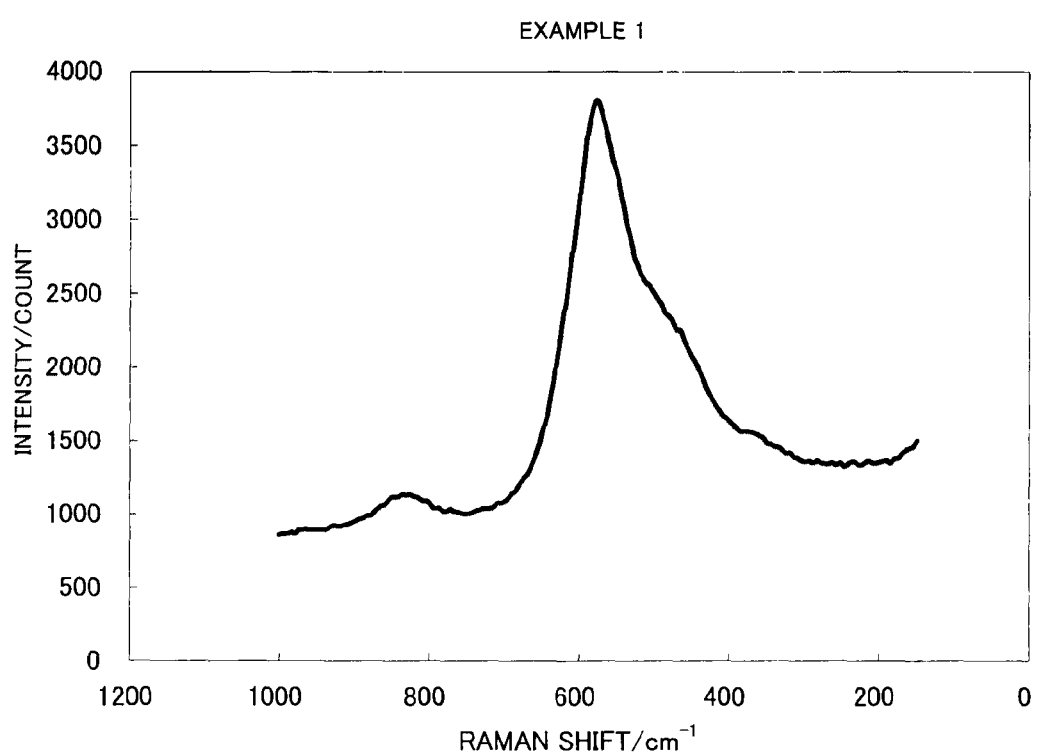
FIG. 10 is a graph showing a SERS pattern of a manufactured lithium nickel manganese cobalt-based composite oxide in Example 1.
Figure 11:
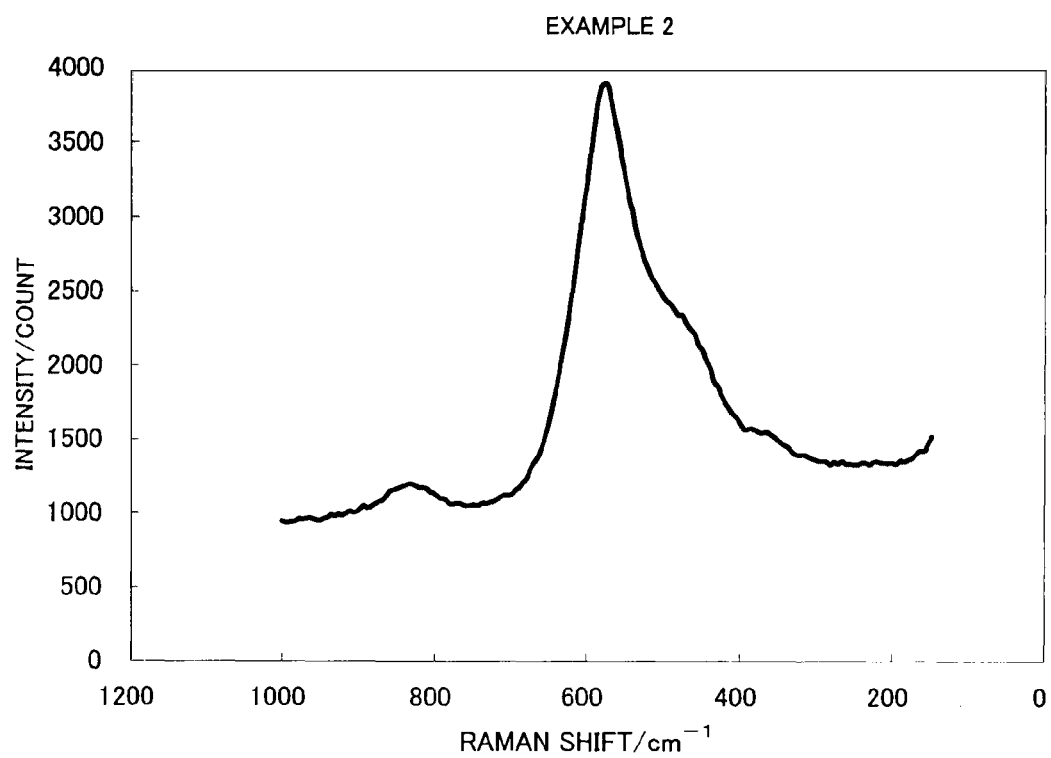
FIG. 11 is a graph showing a SERS pattern of a manufactured lithium nickel manganese cobalt-based composite oxide in Example 2.
Figure 12:
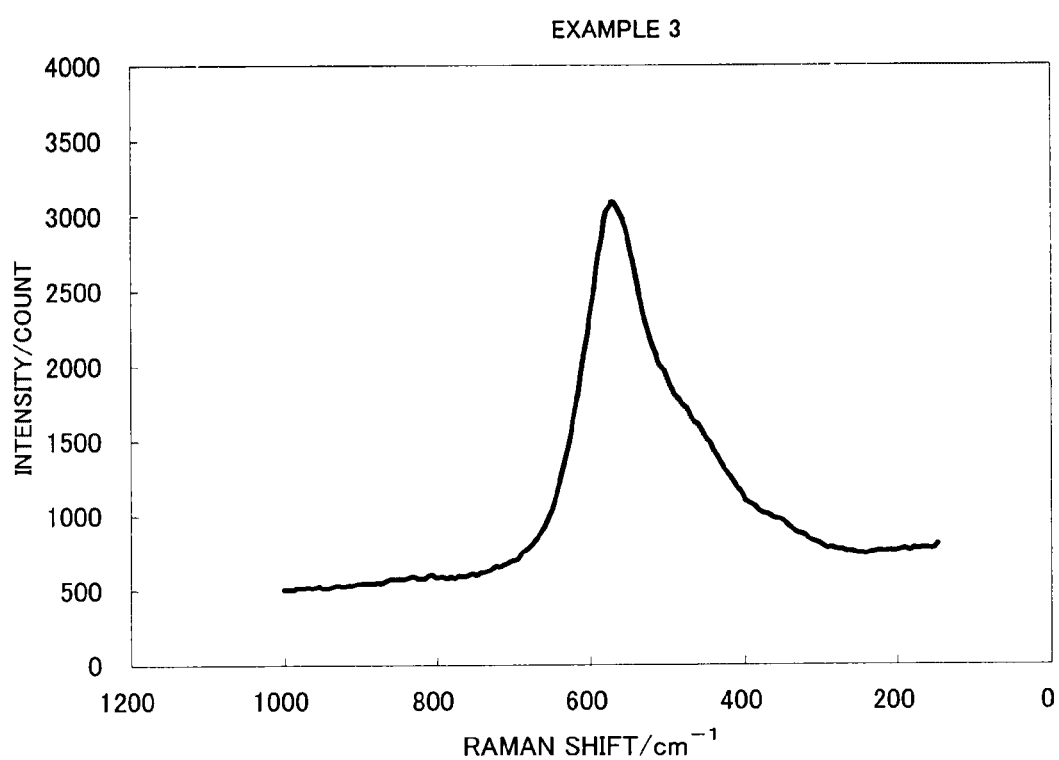
FIG. 12 is a graph showing a SERS pattern of a manufactured lithium nickel manganese cobalt-based composite oxide in Example 3.
Figure 13:
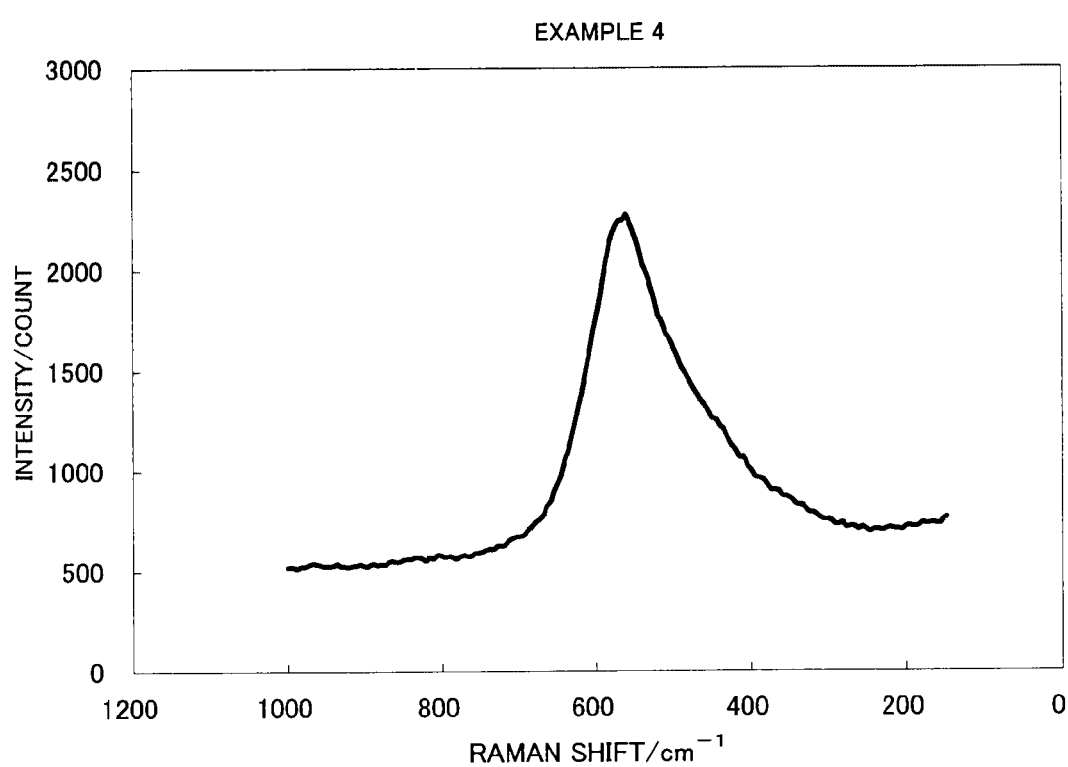
FIG. 13 is a graph showing a SERS pattern of a manufactured lithium nickel manganese cobalt-based composite oxide in Example 4.
Figure 14:
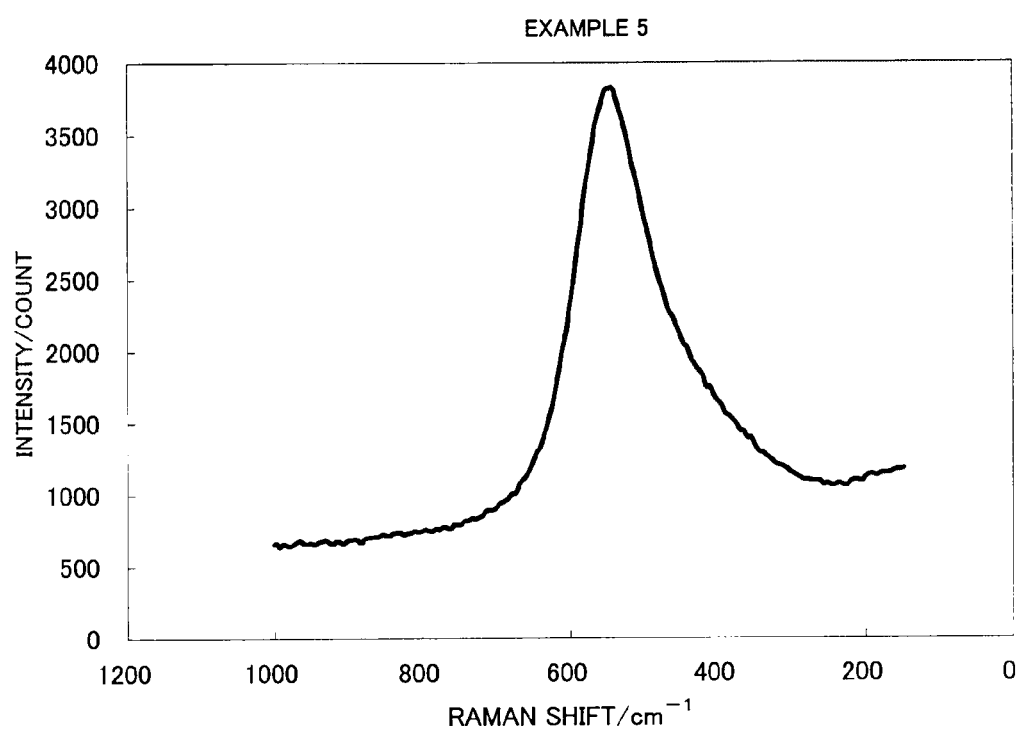
FIG. 14 is a graph showing a SERS pattern of a manufactured lithium nickel manganese cobalt-based composite oxide in Example 5.
Figure 15:
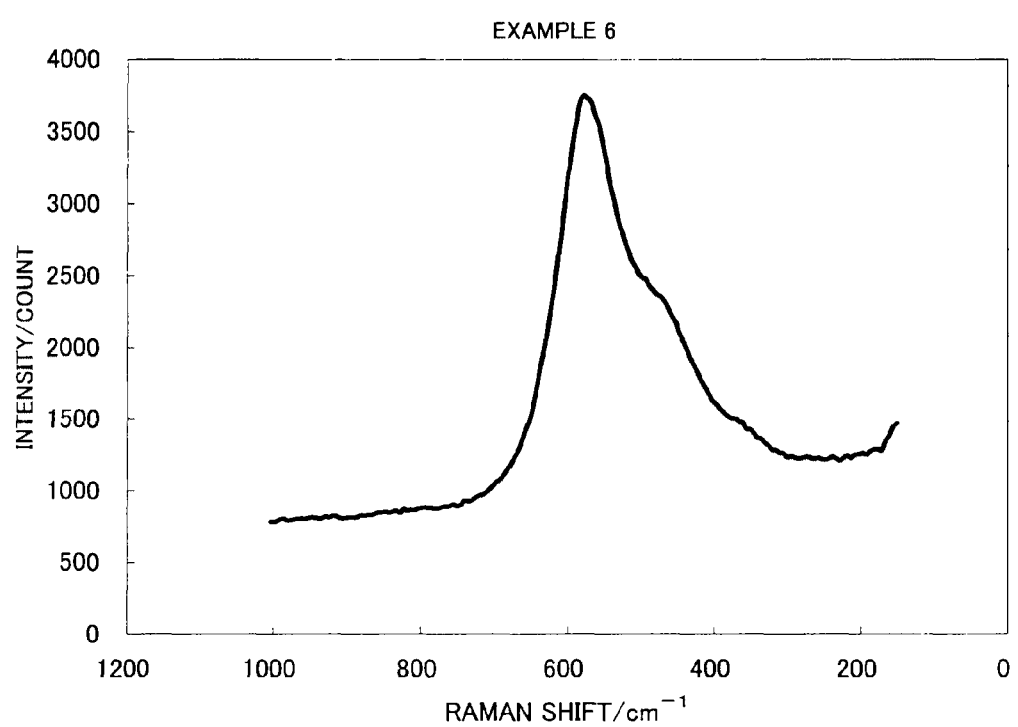
FIG. 15 is a graph showing a SERS pattern of a manufactured lithium nickel manganese cobalt-based composite oxide in Example 6.
Figure 16:
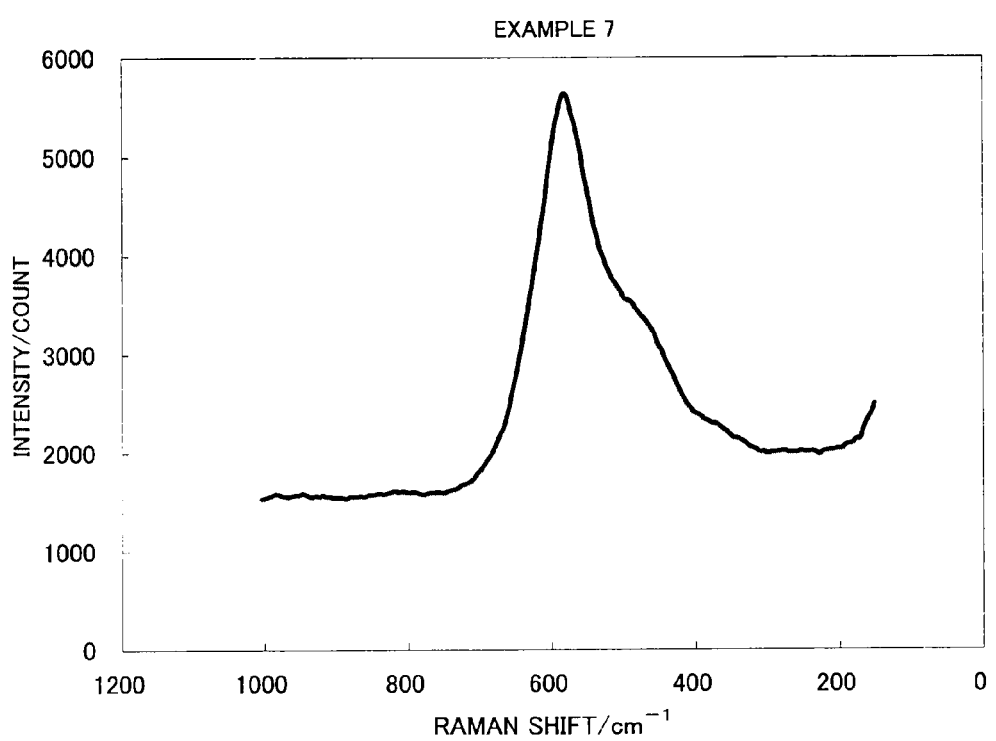
FIG. 16 is a graph showing a SERS pattern of a manufactured lithium nickel manganese cobalt-based composite oxide in Example 7.
Figure 17:
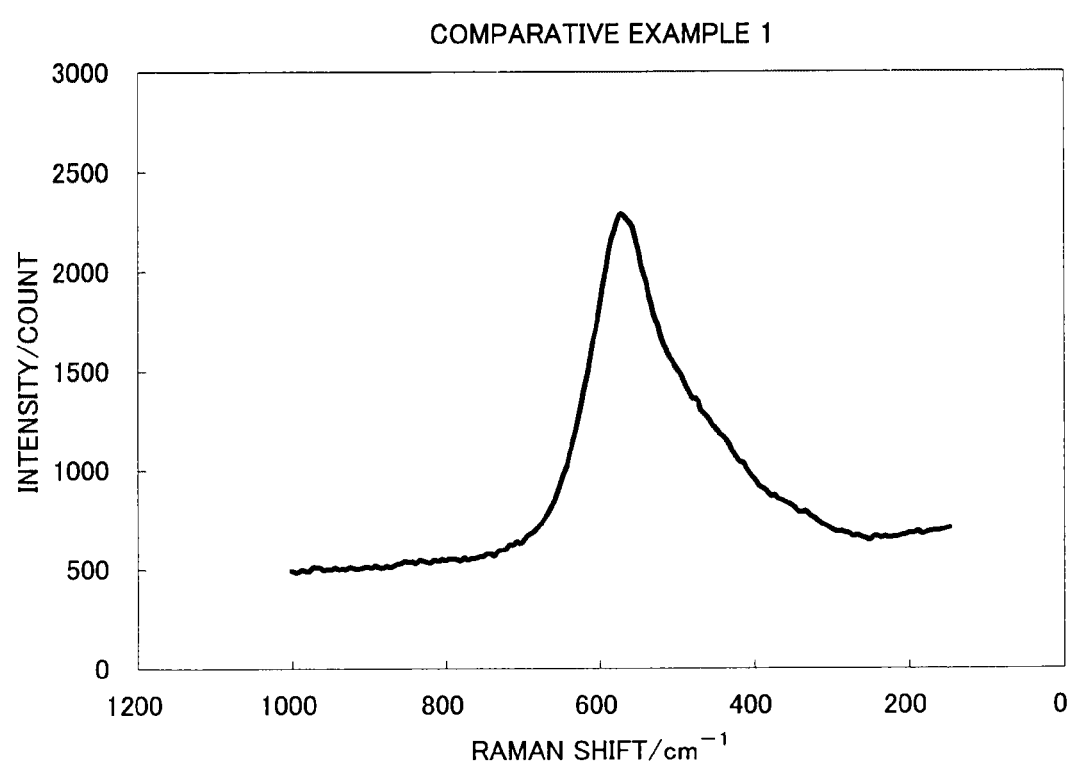
FIG. 17 is a graph showing a SERS pattern of a manufactured lithium nickel manganese cobalt-based composite oxide in Comparative Example 1.
Figure 18:
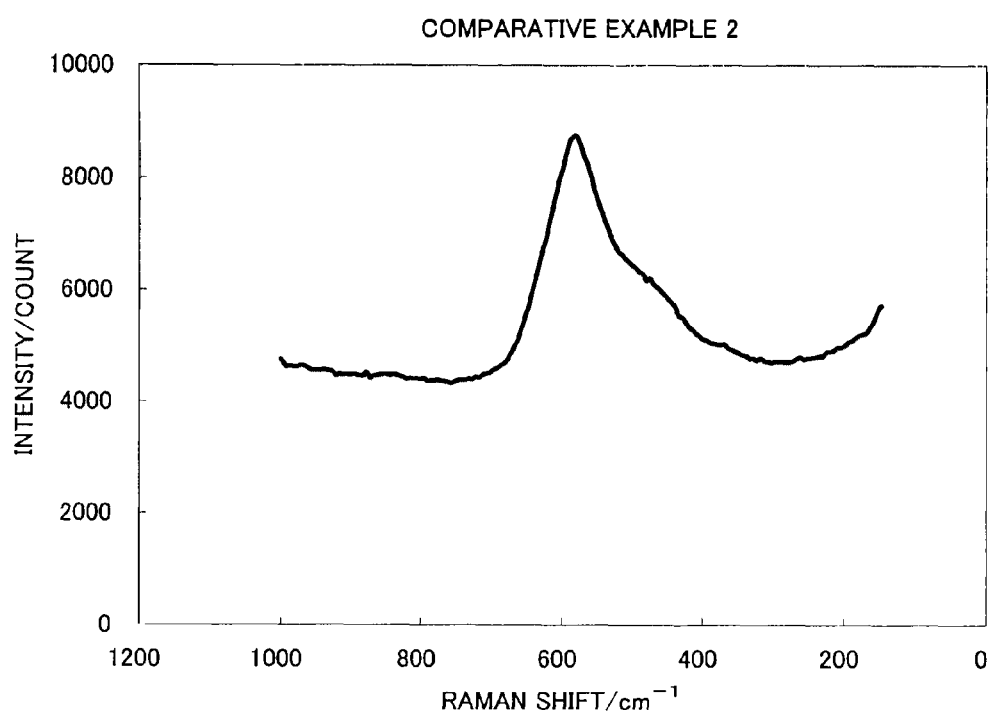
FIG. 18 is a graph showing a SERS pattern of a manufactured lithium nickel manganese cobalt-based composite oxide in Comparative Example 2.
Figure 19:
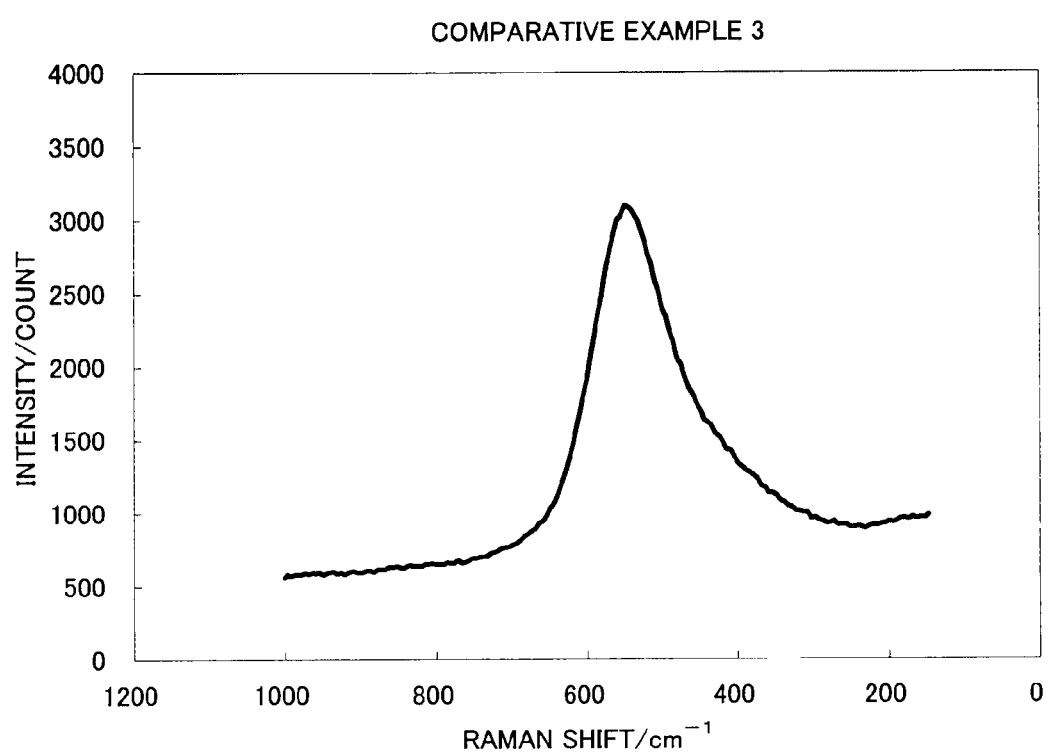
FIG. 19 is a graph showing a SERS pattern of a manufactured lithium nickel manganese cobalt-based composite oxide in Comparative Example 3.
Figure 20:
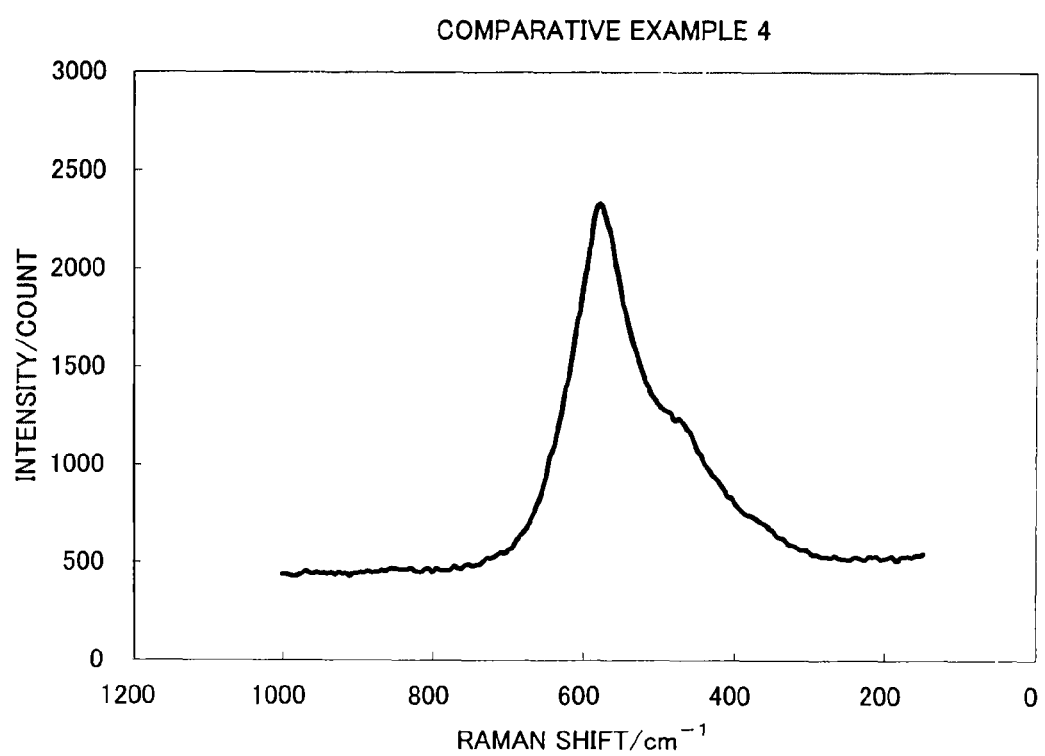
FIG. 20 is a graph showing a SERS pattern of a manufactured lithium nickel manganese cobalt-based composite oxide in Comparative Example 4.
Figure 21:
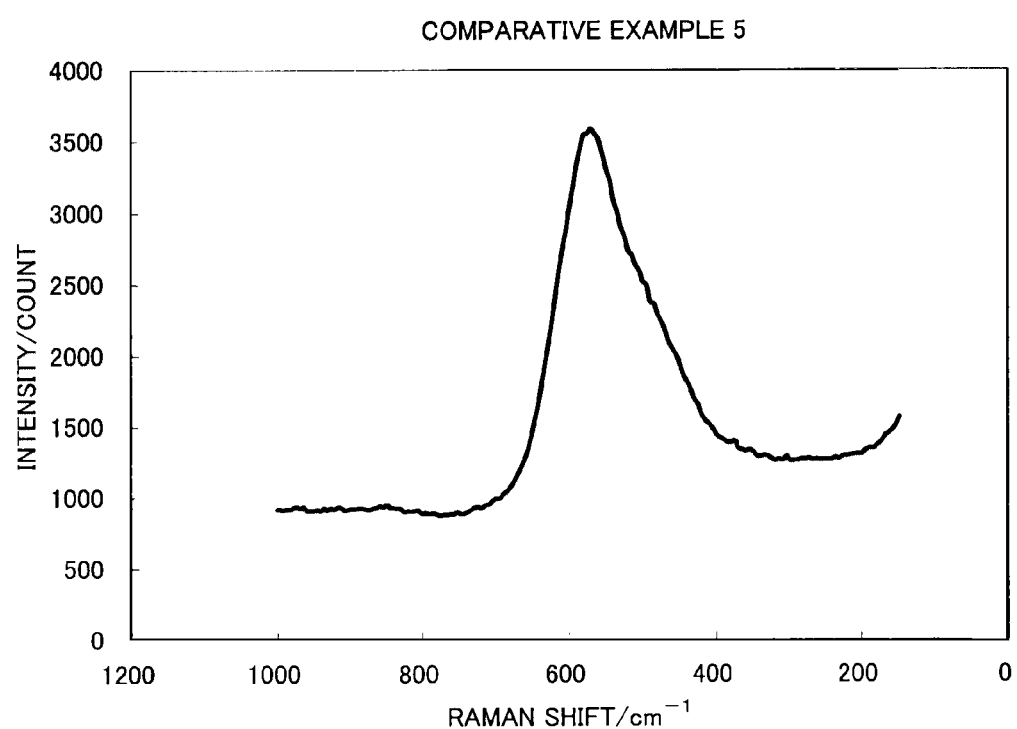
FIG. 21 is a graph showing a SERS pattern of a manufactured lithium nickel manganese cobalt-based composite oxide in Comparative Example 5.
Figure 22:
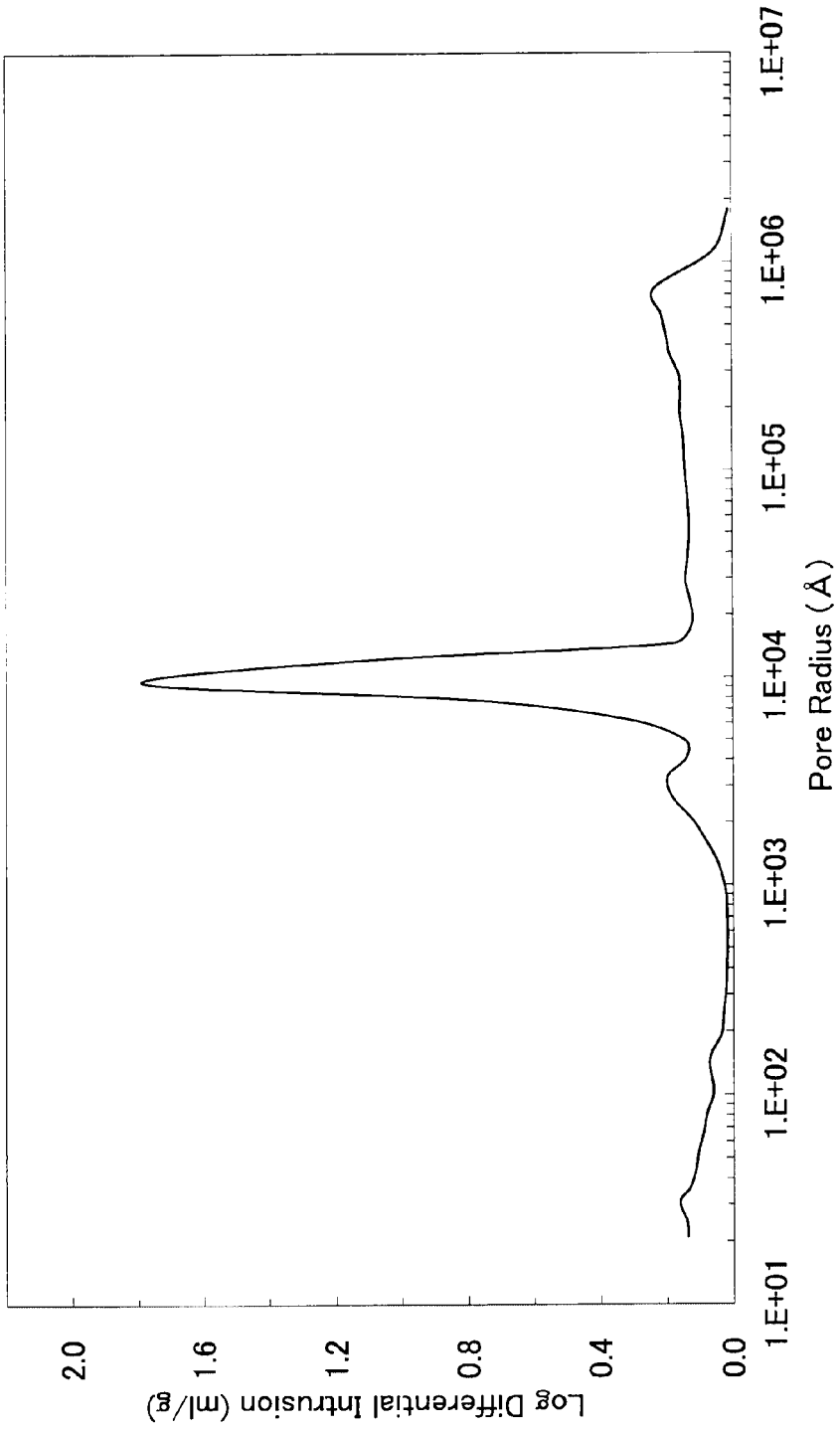
FIG. 22 is a graph showing a pore distribution curve of a manufactured lithium nickel manganese cobalt-based composite oxide powder in Example 1.
Figure 23:
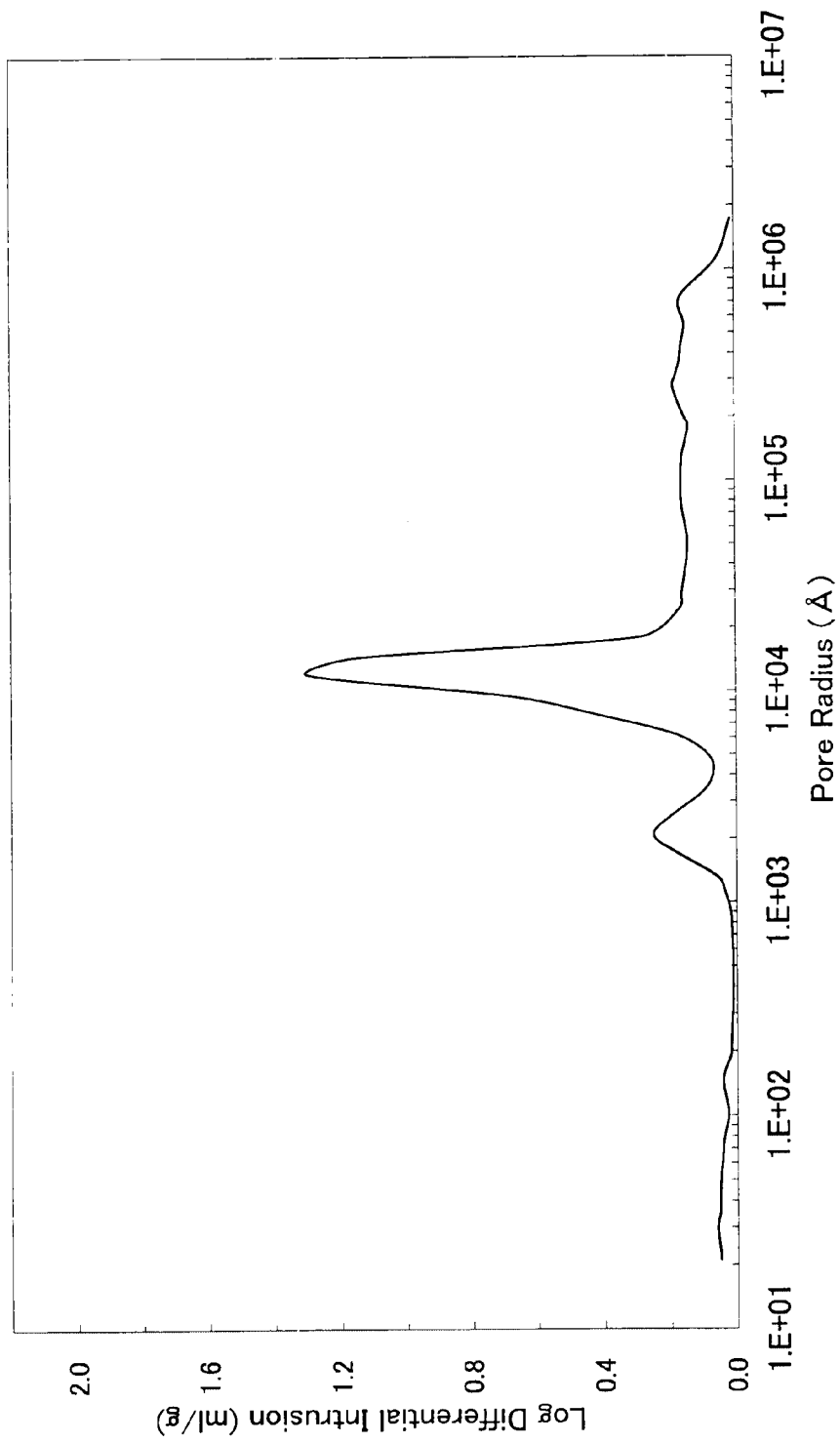
FIG. 23 is a graph showing a pore distribution curve of a manufactured lithium nickel manganese cobalt-based composite oxide powder in Example 2.
Figure 24:
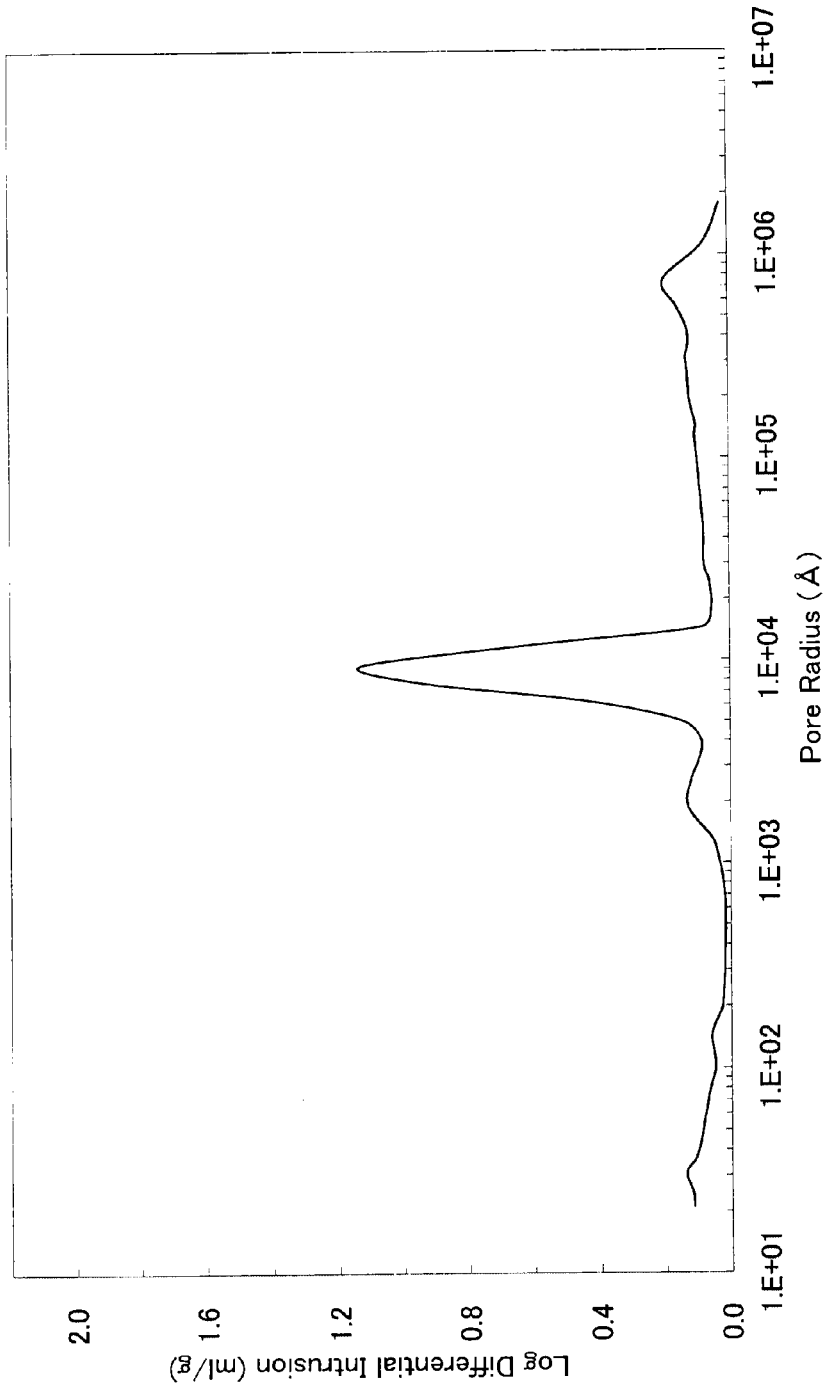
FIG. 24 is a graph showing a pore distribution curve of a manufactured lithium nickel manganese cobalt-based composite oxide powder in Example 3.
Figure 25:
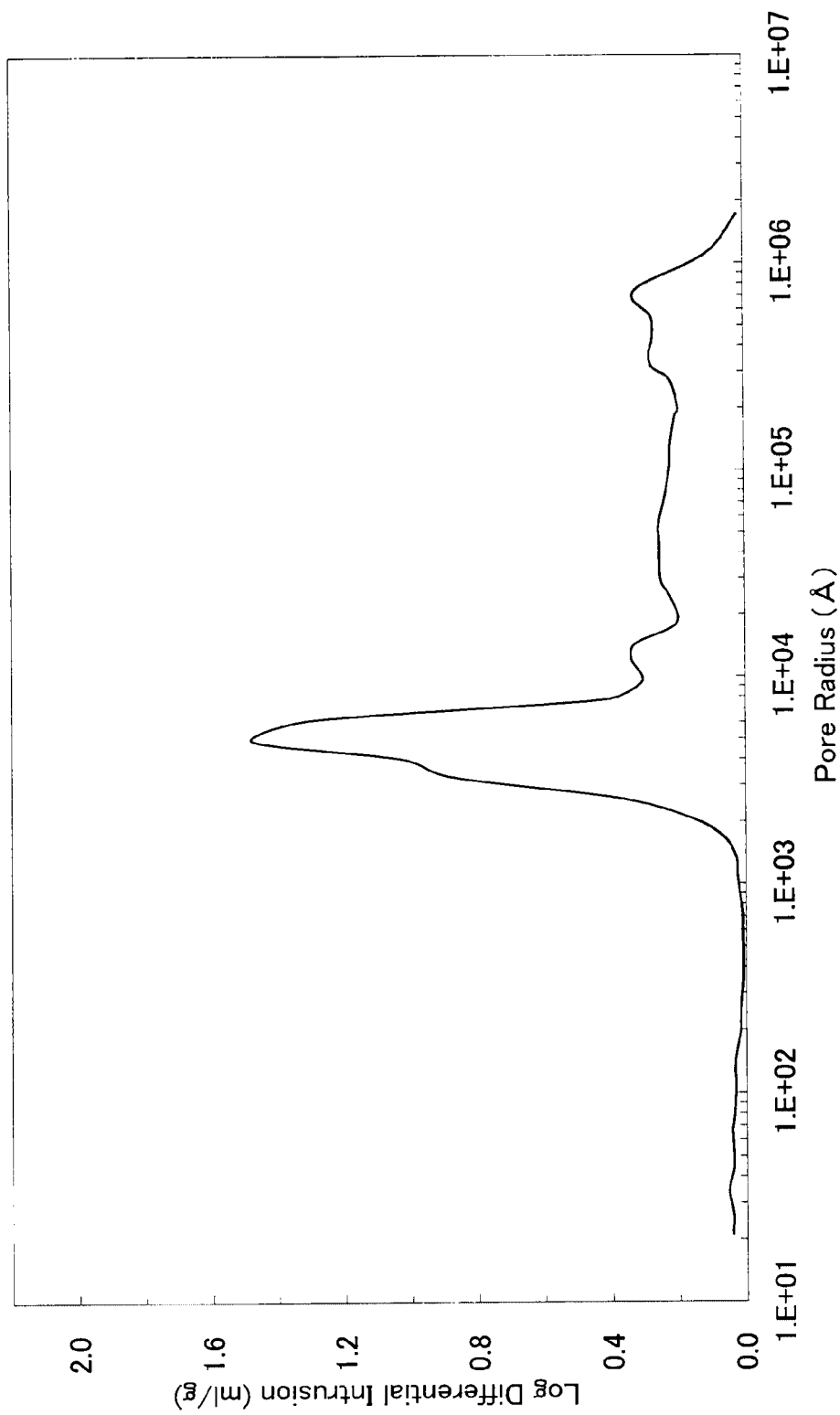
FIG. 25 is a graph showing a pore distribution curve of a manufactured lithium nickel manganese cobalt-based composite oxide powder in Example 4.
Figure 26:
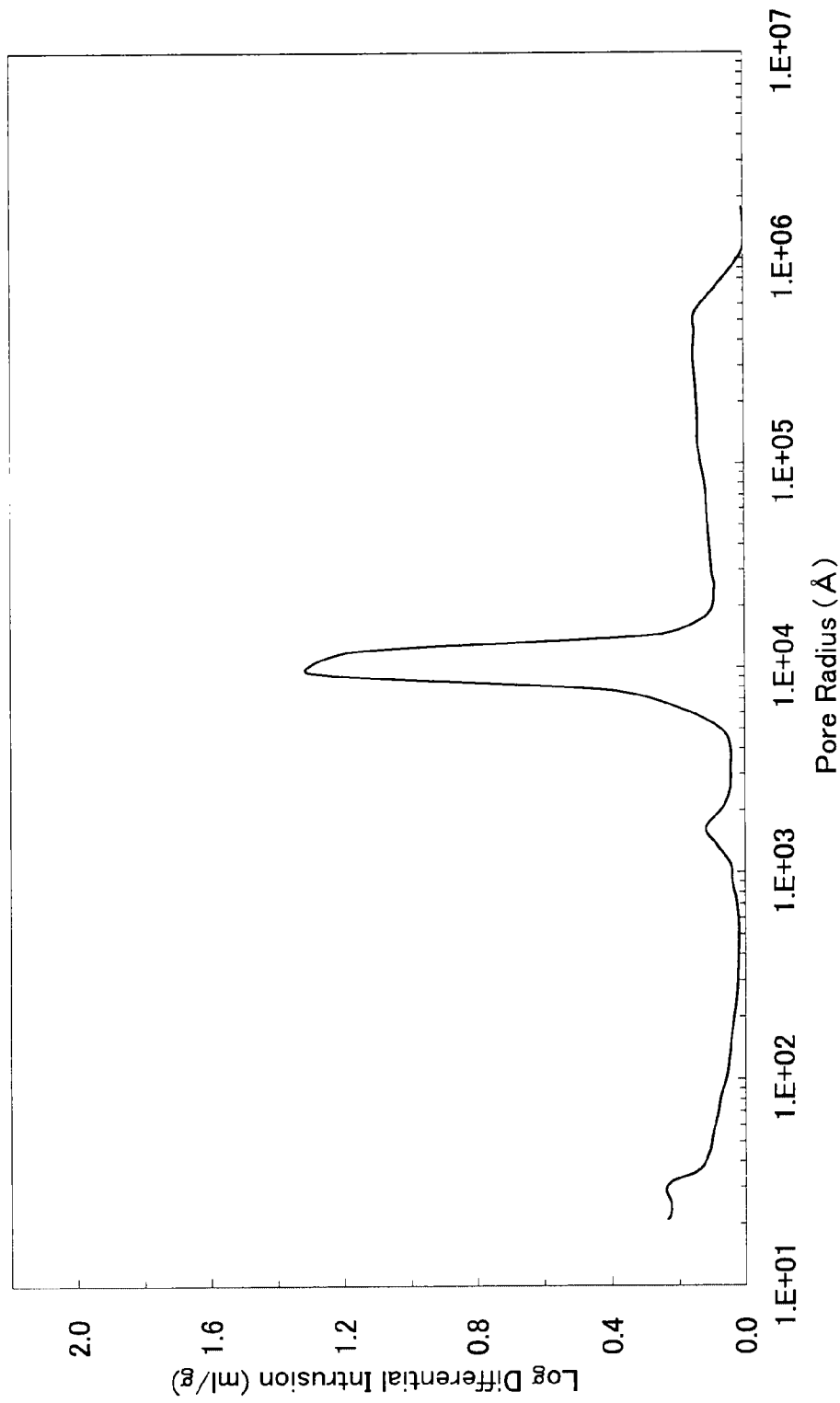
FIG. 26 is a graph showing a pore distribution curve of a manufactured lithium nickel manganese cobalt-based composite oxide powder in Example 5.
Figure 27:
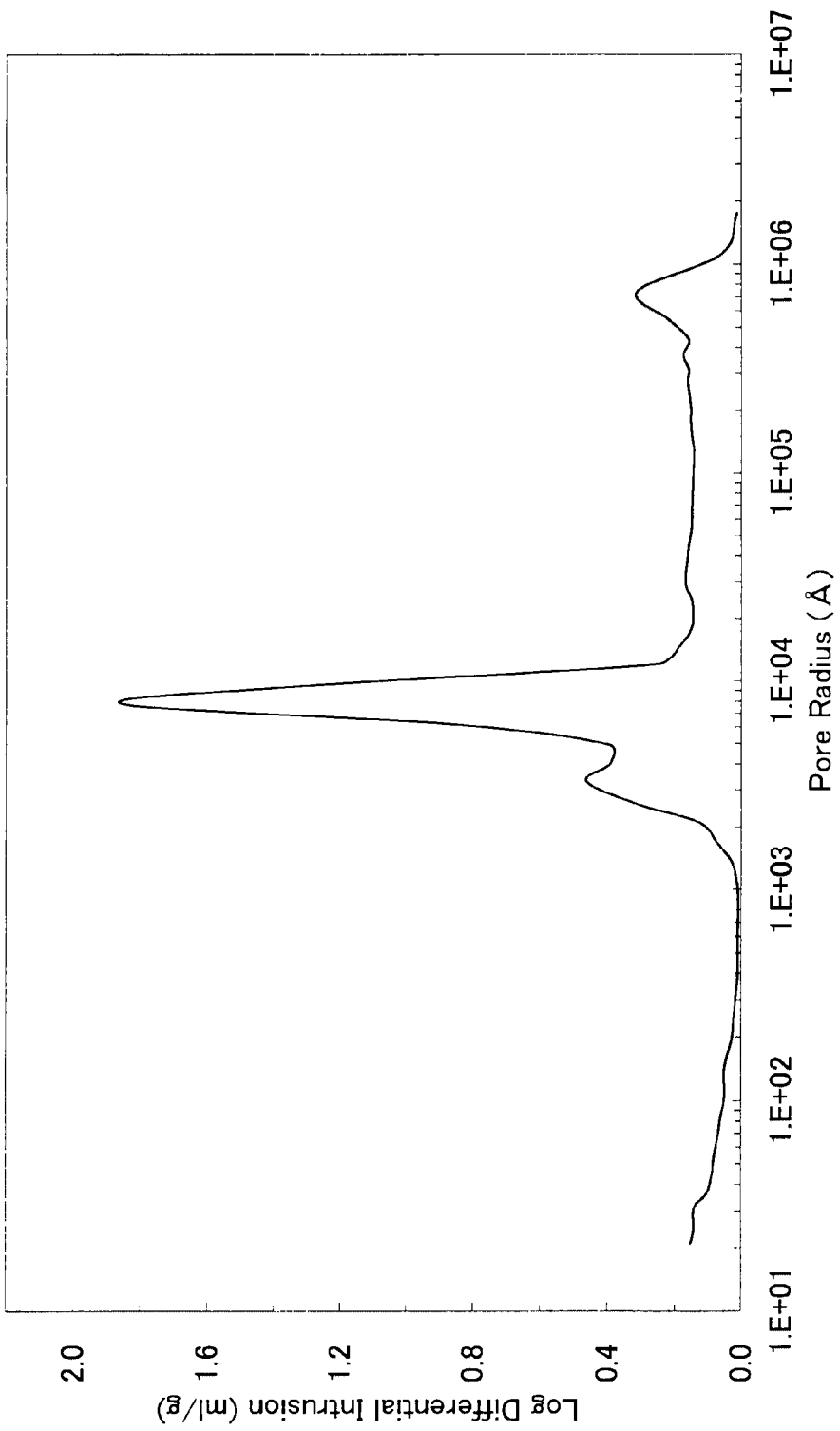
FIG. 27 is a graph showing a pore distribution curve of a manufactured lithium nickel manganese cobalt-based composite oxide powder in Example 6.
Figure 28:
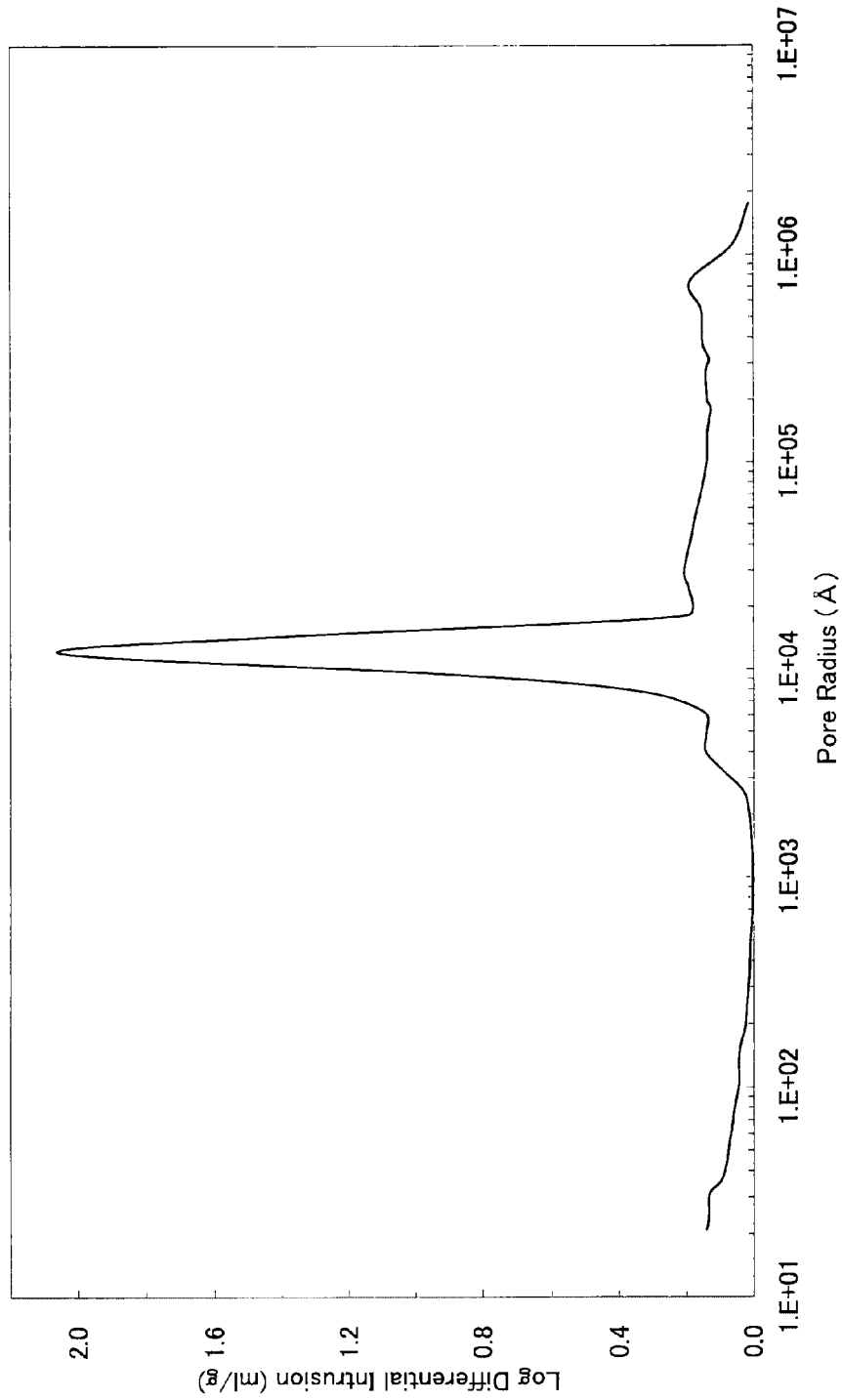
FIG. 28 is a graph showing a pore distribution curve of a manufactured lithium nickel manganese cobalt-based composite oxide powder in Example 7.
Figure 29:
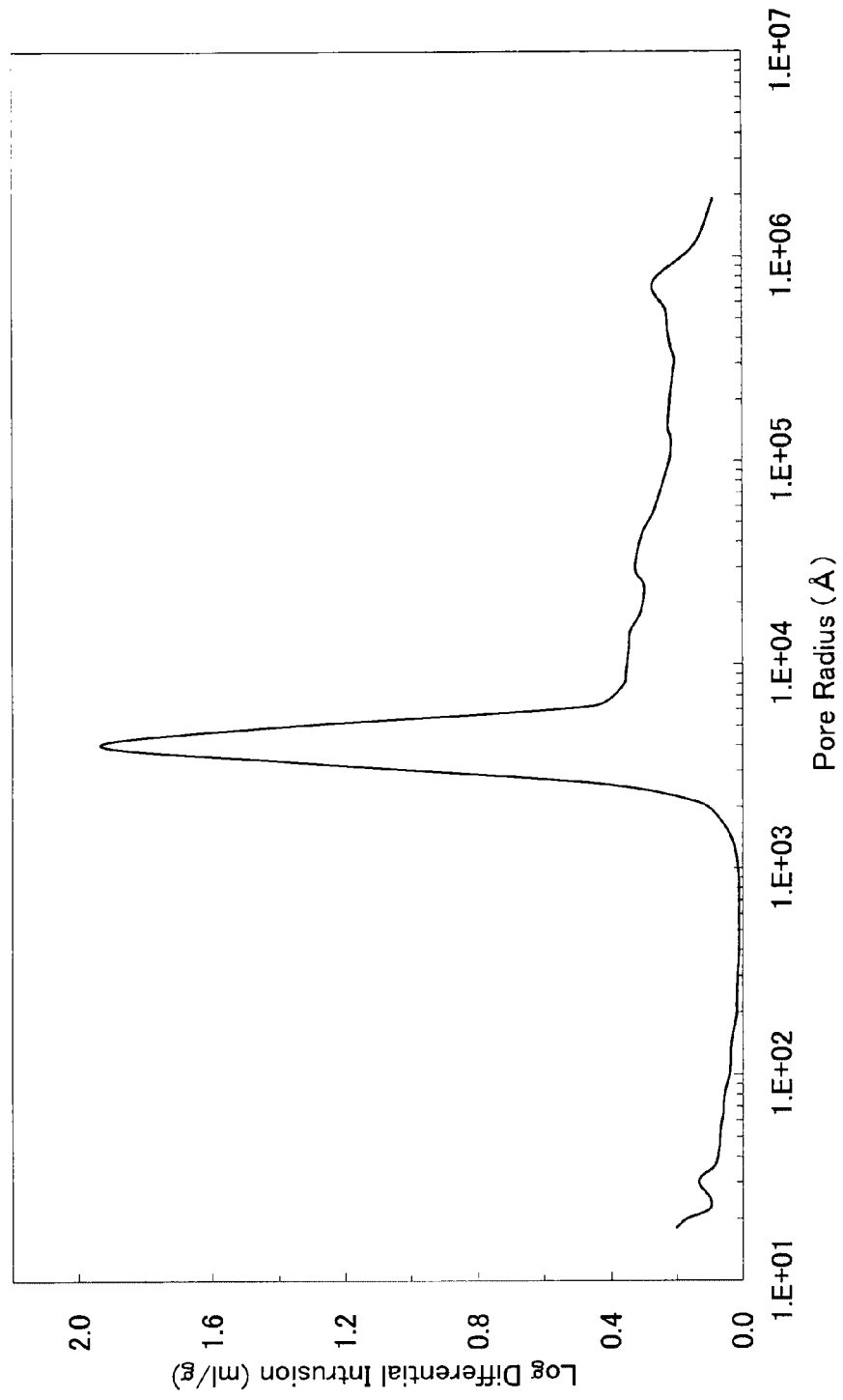
FIG. 29 is a graph showing a pore distribution curve of a manufactured lithium nickel manganese cobalt-based composite oxide powder in Comparative Example 1.
Figure 30:
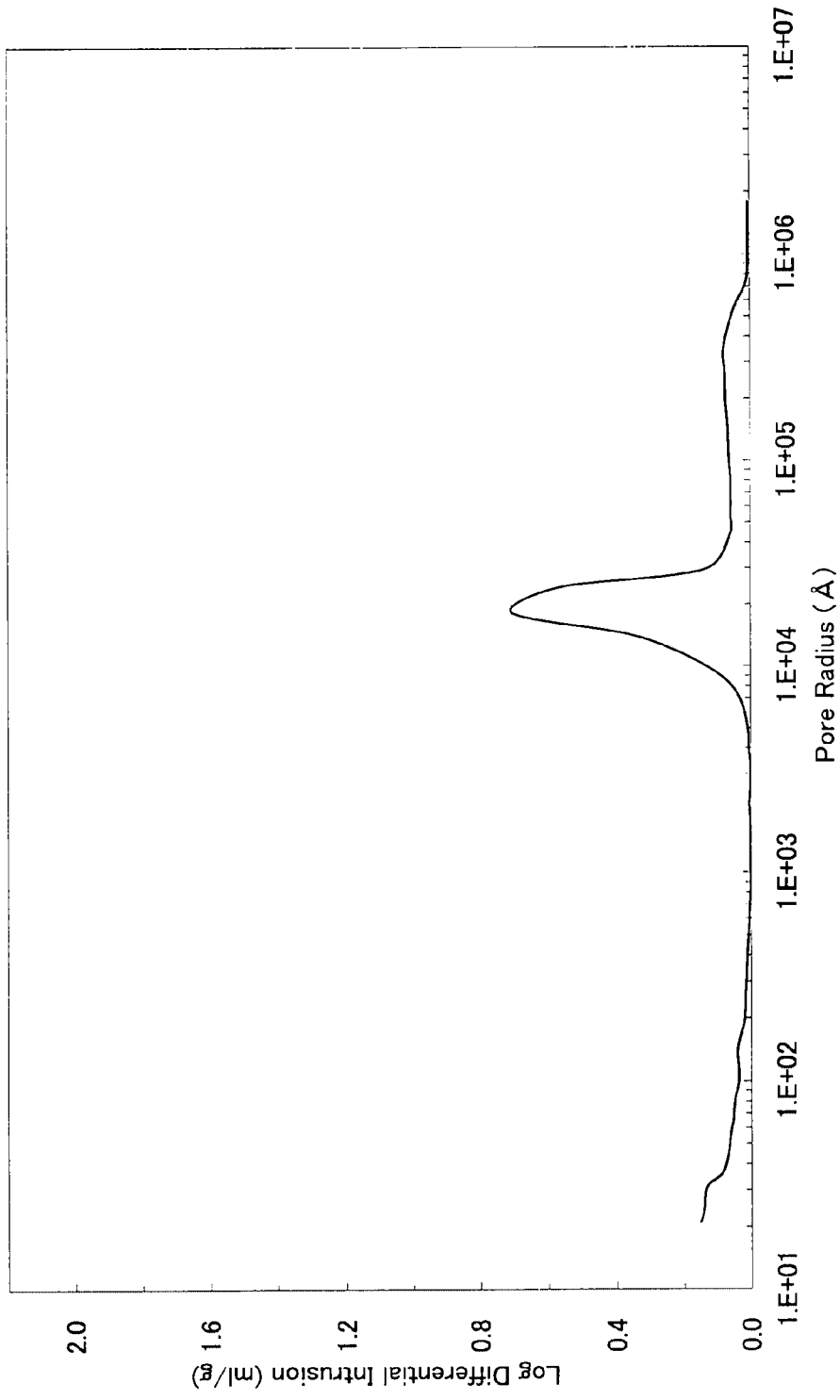
FIG. 30 is a graph showing a pore distribution curve of a manufactured lithium nickel manganese cobalt-based composite oxide powder in Comparative Example 2.
Figure 31:
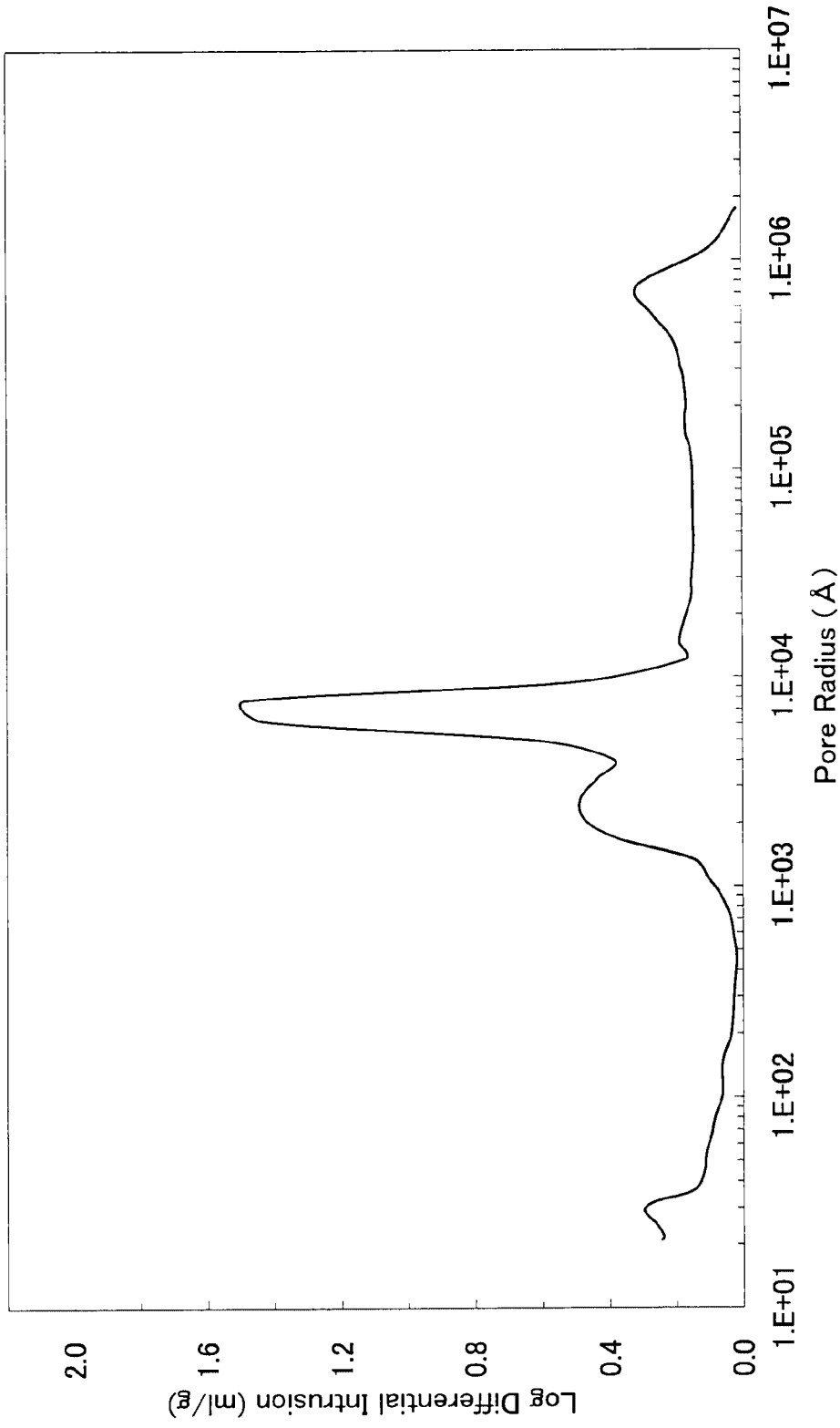
FIG. 31 is a graph showing a pore distribution curve of a manufactured lithium nickel manganese cobalt-based composite oxide powder in Comparative Example 3.
Figure 32:
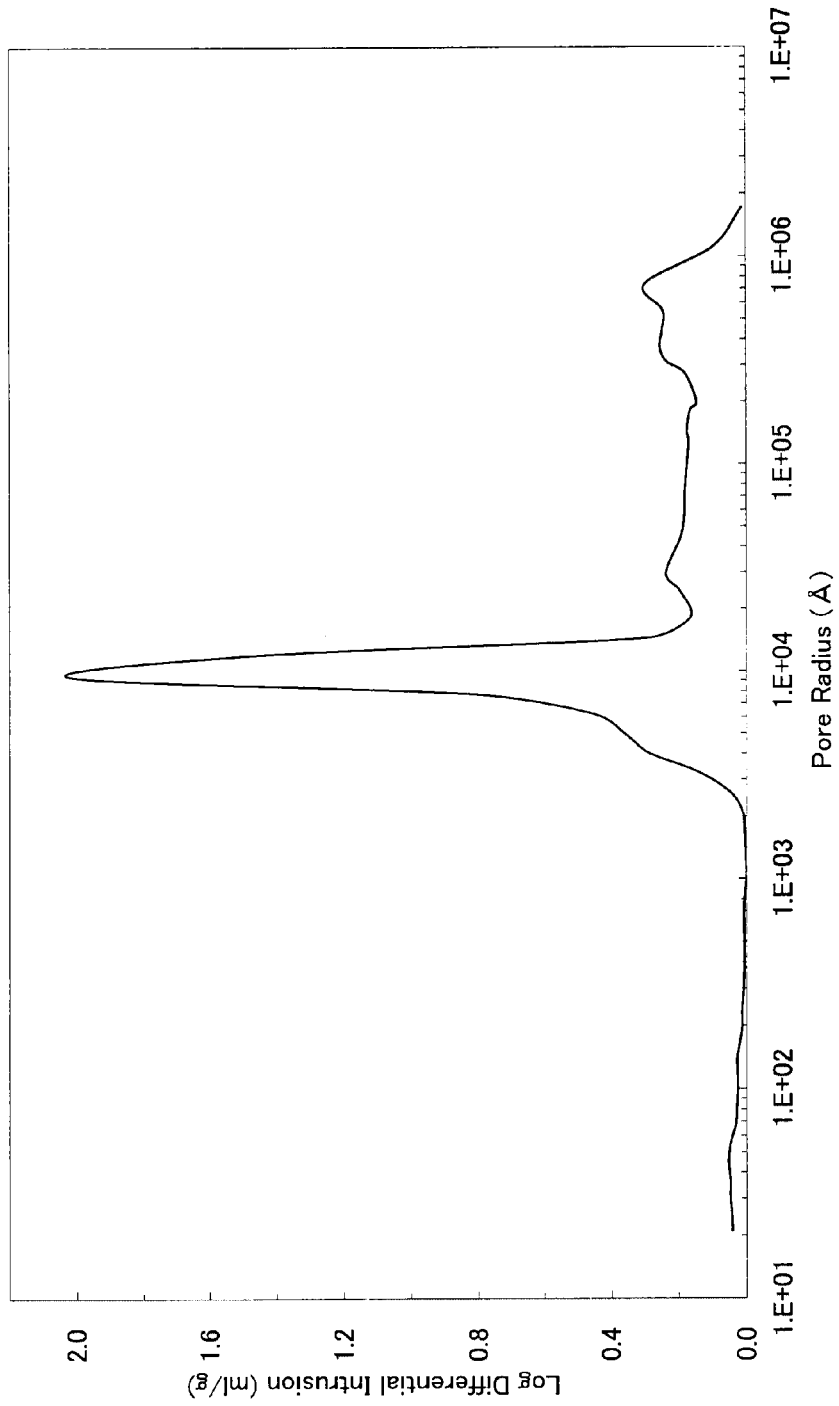
FIG. 32 is a graph showing a pore distribution curve of a manufactured lithium nickel manganese cobalt-based composite oxide powder in Comparative Example 4.
Figure 33:
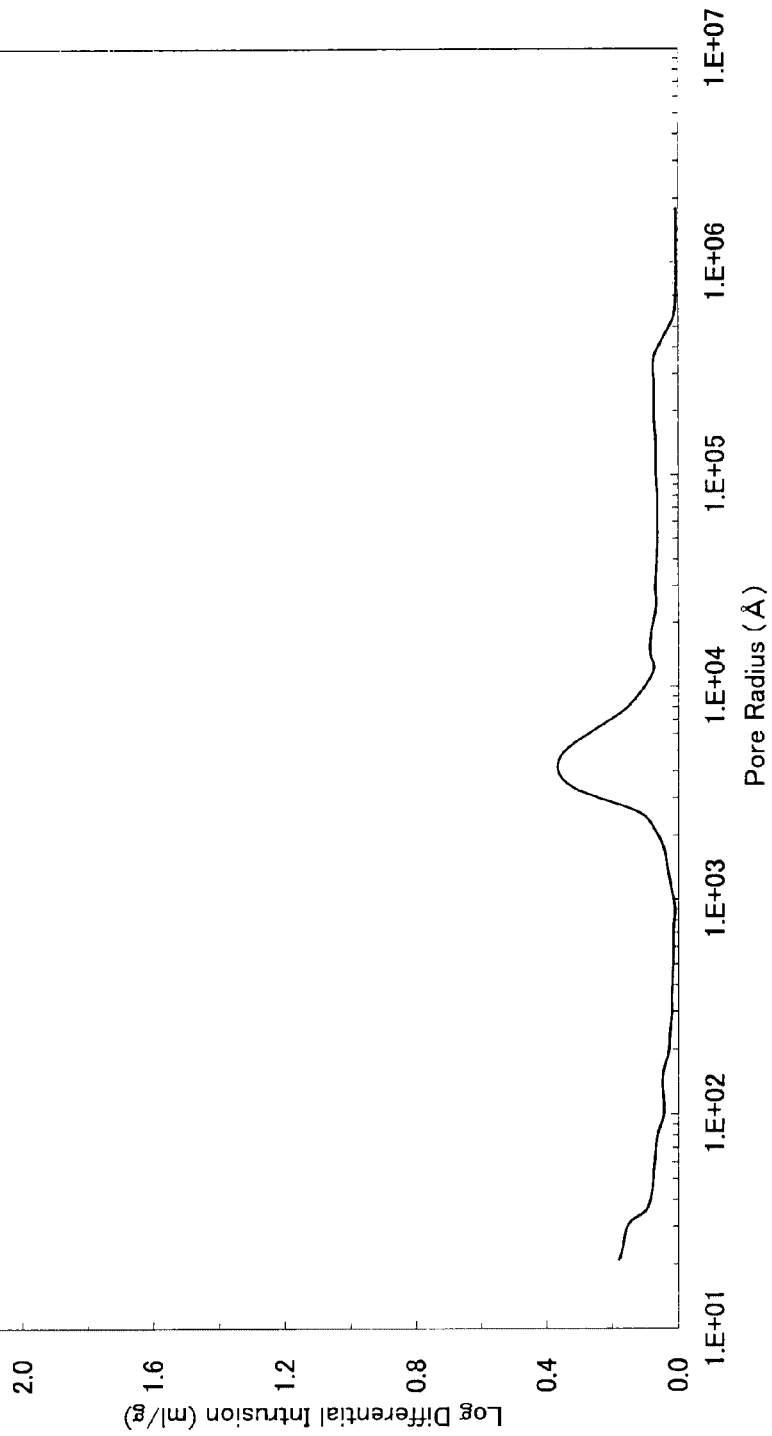
FIG. 33 is a graph showing a pore distribution curve of a manufactured lithium nickel manganese cobalt-based composite oxide powder in Comparative Example 5.
Figure 34:
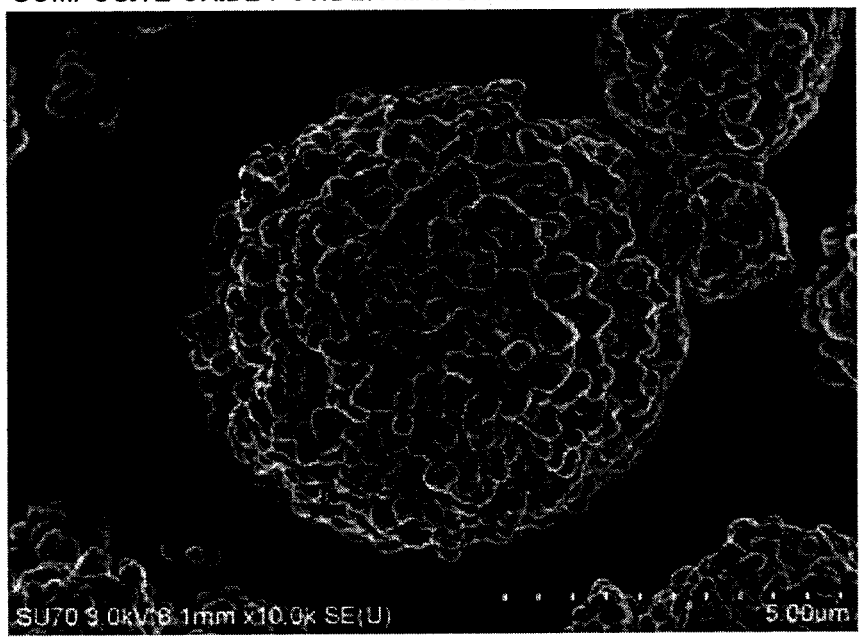
FIG. 34 is a SEM image (photograph) (acceleration voltage: 3 kV, magnification: 10,000×) of a manufactured lithium nickel manganese cobalt-based composite oxide in Example 1.
Figure 35:
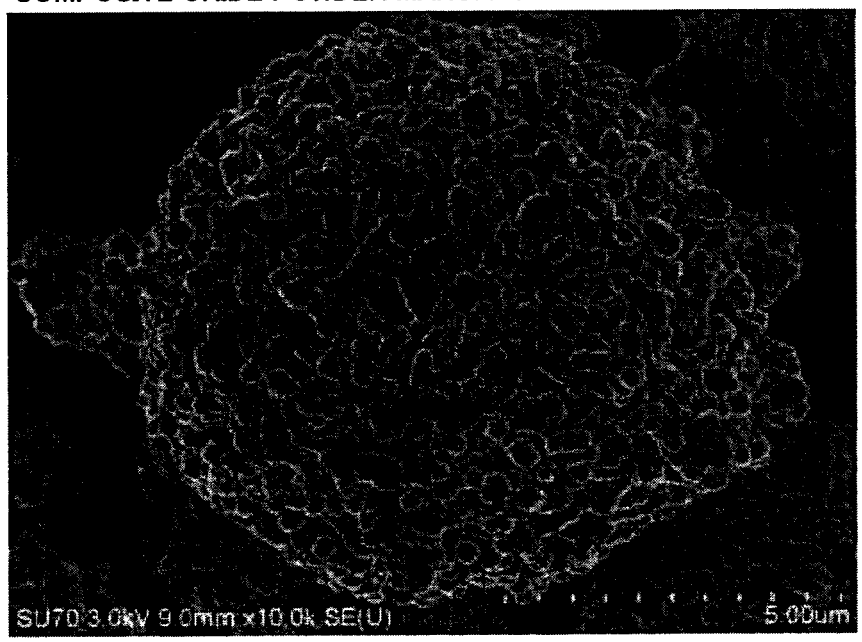
FIG. 35 is a SEM image (photograph) (acceleration voltage: 3 kV, magnification: 10,000×) of a manufactured lithium nickel manganese cobalt-based composite oxide in Example 2.
Figure 36:
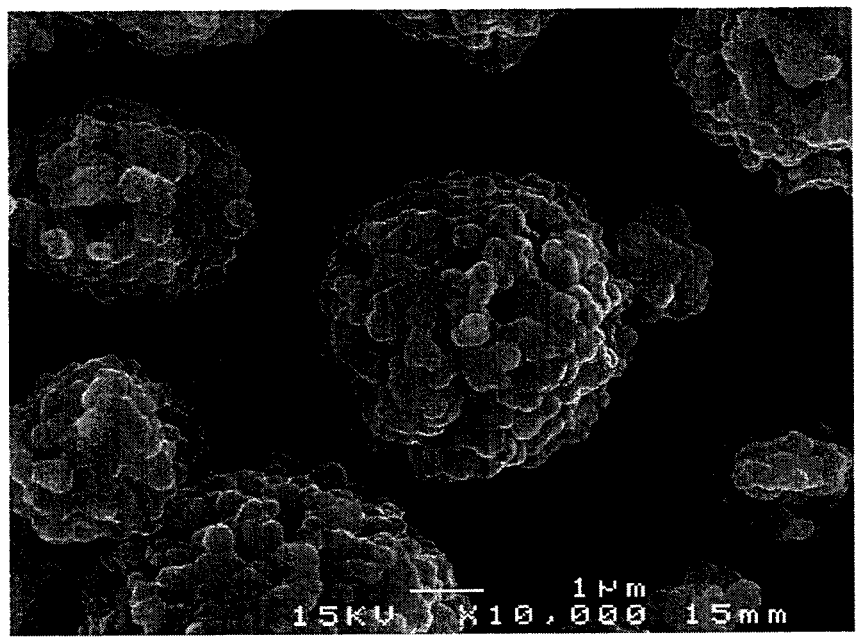
FIG. 36 is a SEM image (photograph) (acceleration voltage: 15 kV, magnification: 10,000×) of a manufactured lithium nickel manganese cobalt-based composite oxide in Example 3.
Figure 37:
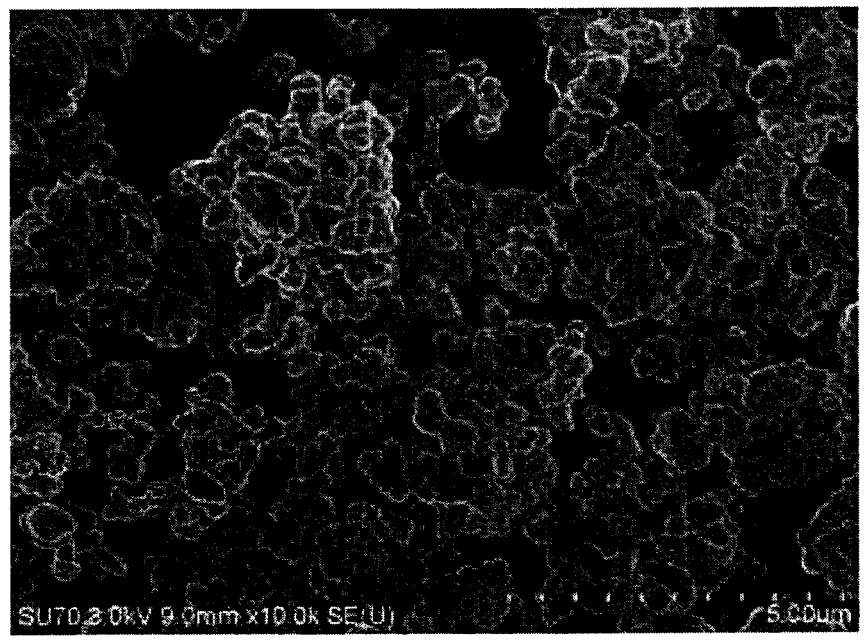
FIG. 37 is a SEM image (photograph) (acceleration voltage: 3 kV, magnification: 10,000×) of a manufactured lithium nickel manganese cobalt-based composite oxide in Example 4.
Figure 38:
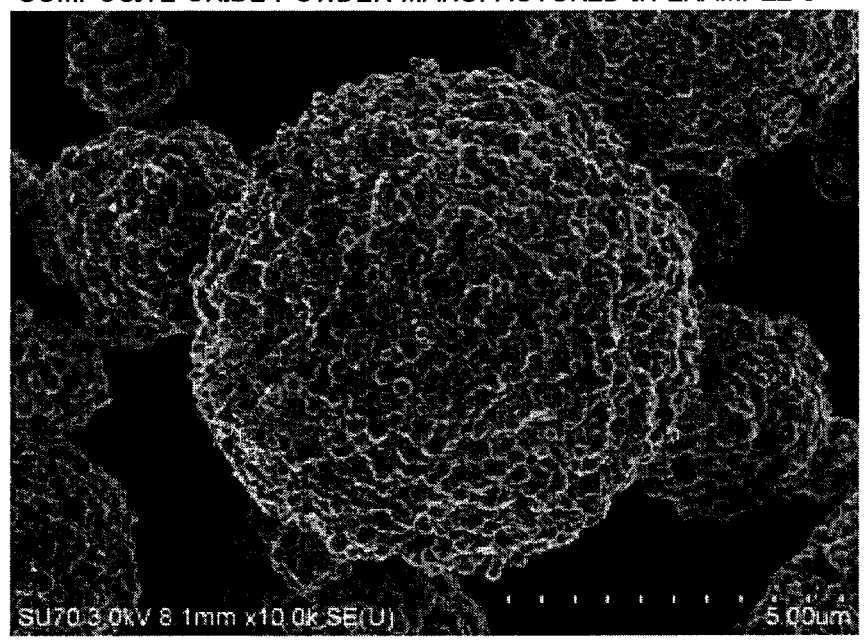
FIG. 38 is a SEM image (photograph) (acceleration voltage: 3 kV, magnification: 10,000×) of a manufactured lithium nickel manganese cobalt-based composite oxide in Example 5.
Figure 39:
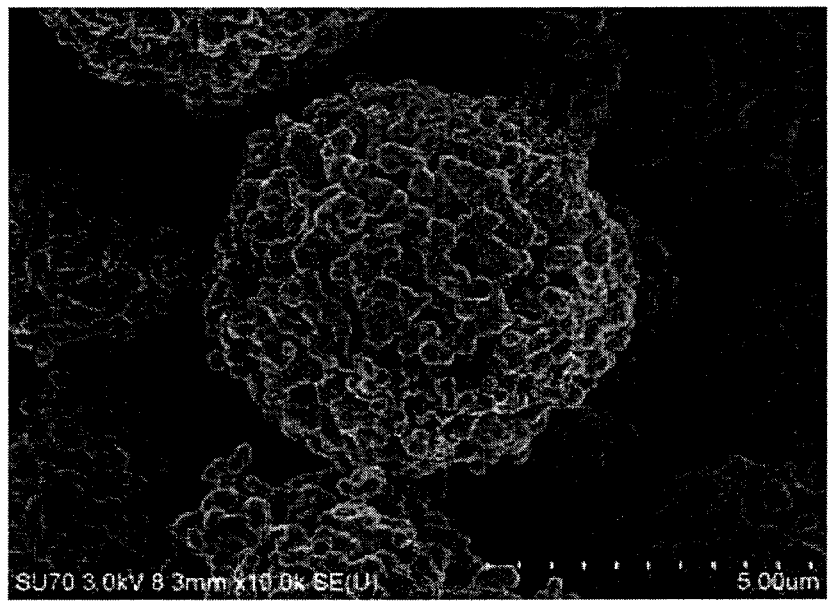
FIG. 39 is a SEM image (photograph) (acceleration voltage: 3 kV, magnification: 10,000×) of a manufactured lithium nickel manganese cobalt-based composite oxide in Example 6.
Figure 40:
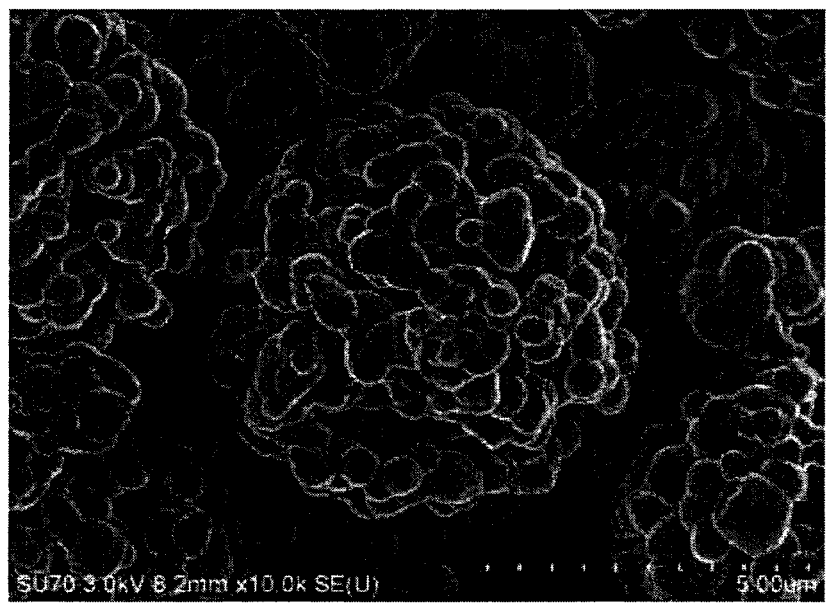
FIG. 40 is a SEM image (photograph) (acceleration voltage: 3 kV, magnification: 10,000×) of a manufactured lithium nickel manganese cobalt-based composite oxide in Example 7.
Figure 41:
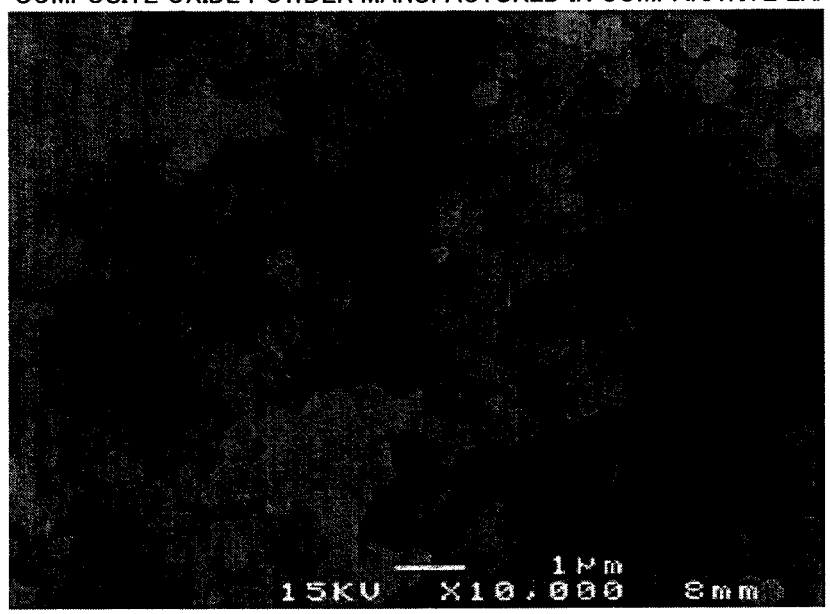
FIG. 41 is a SEM image (photograph) (acceleration voltage: 15 kV, magnification: 10,000×) of a manufactured lithium nickel manganese cobalt-based composite oxide in Comparative Example 1.
Figure 42:
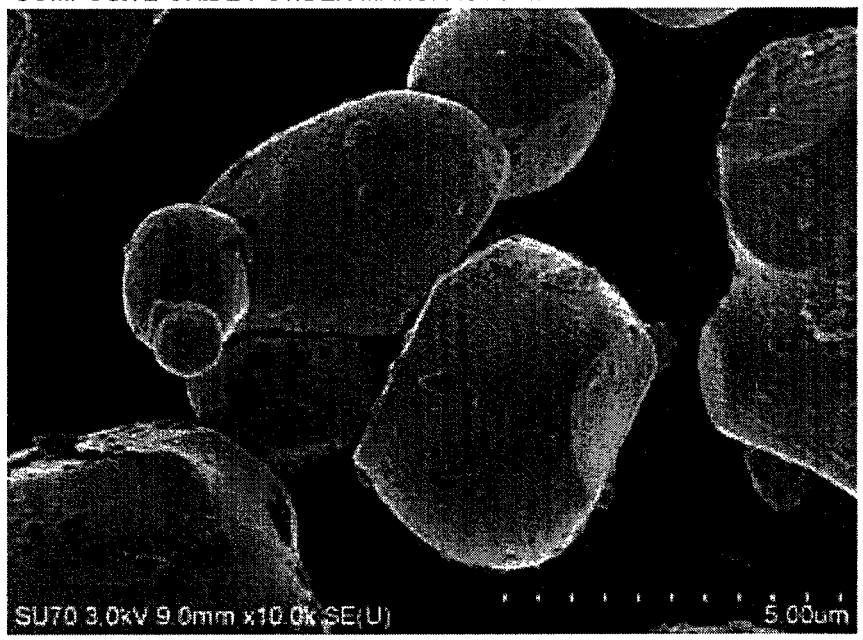
FIG. 42 is a SEM image (photograph) (acceleration voltage: 3 kV, magnification: 10,000×) of a manufactured lithium nickel manganese cobalt-based composite oxide in Comparative Example 2.
Figure 43:
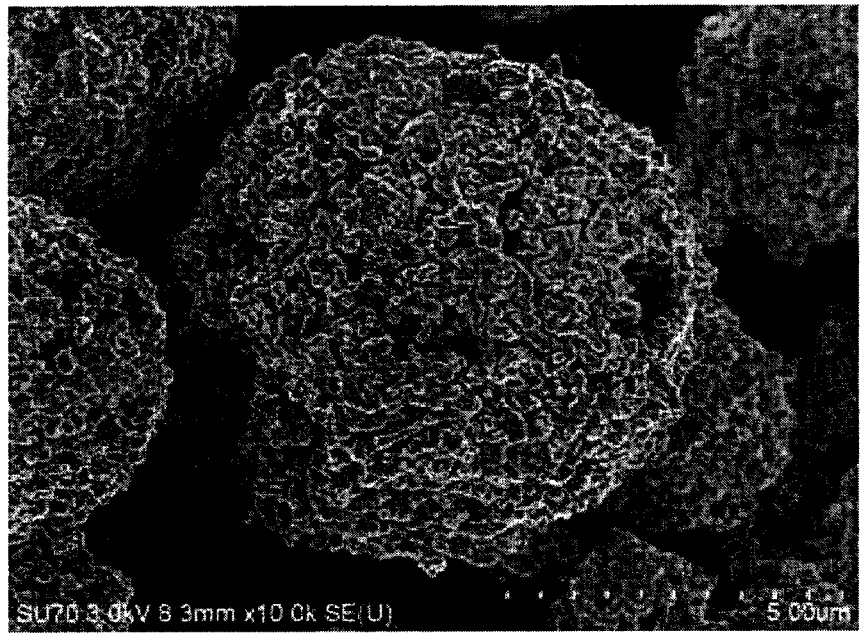
FIG. 43 is a SEM image (photograph) (acceleration voltage: 3 kV, magnification: 10,000×) of a manufactured lithium nickel manganese cobalt-based composite oxide in Comparative Example 3.
Figure 44:
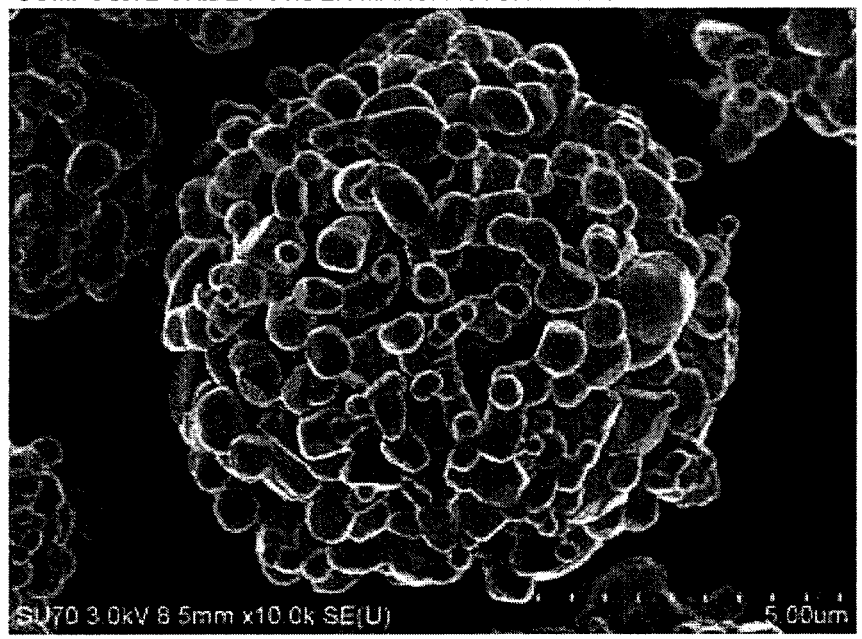
FIG. 44 is a SEM image (photograph) (acceleration voltage: 3 kV, magnification: 10,000×) of a manufactured lithium nickel manganese cobalt-based composite oxide in Comparative Example 4.
Figure 45:
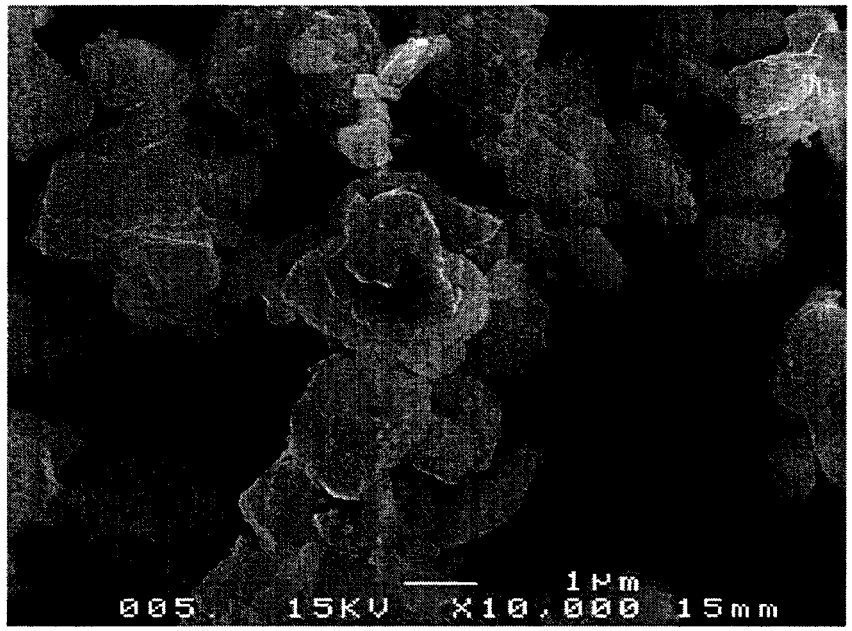
FIG. 45 is a SEM image (photograph) (acceleration voltage: 15 kV, magnification: 10,000×) of a manufactured lithium nickel manganese cobalt-based composite oxide in Comparative Example 5.
Figure 46:
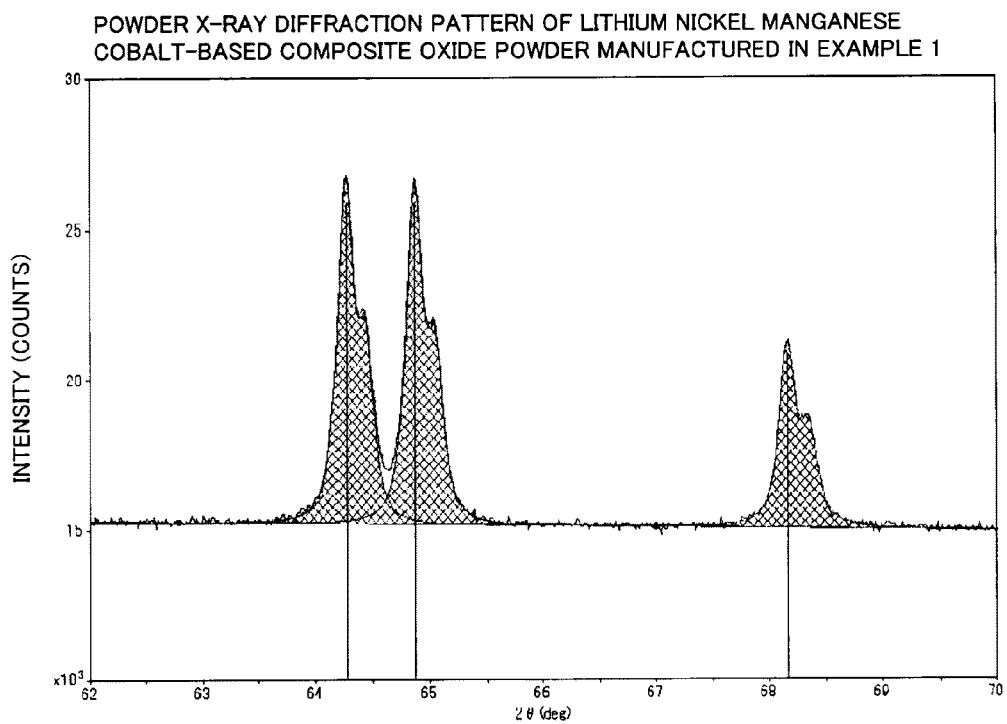
FIG. 46 is a graph showing an XRD pattern of manufactured lithium nickel manganese cobalt-based composite oxide in Example 1.
Figure 47:
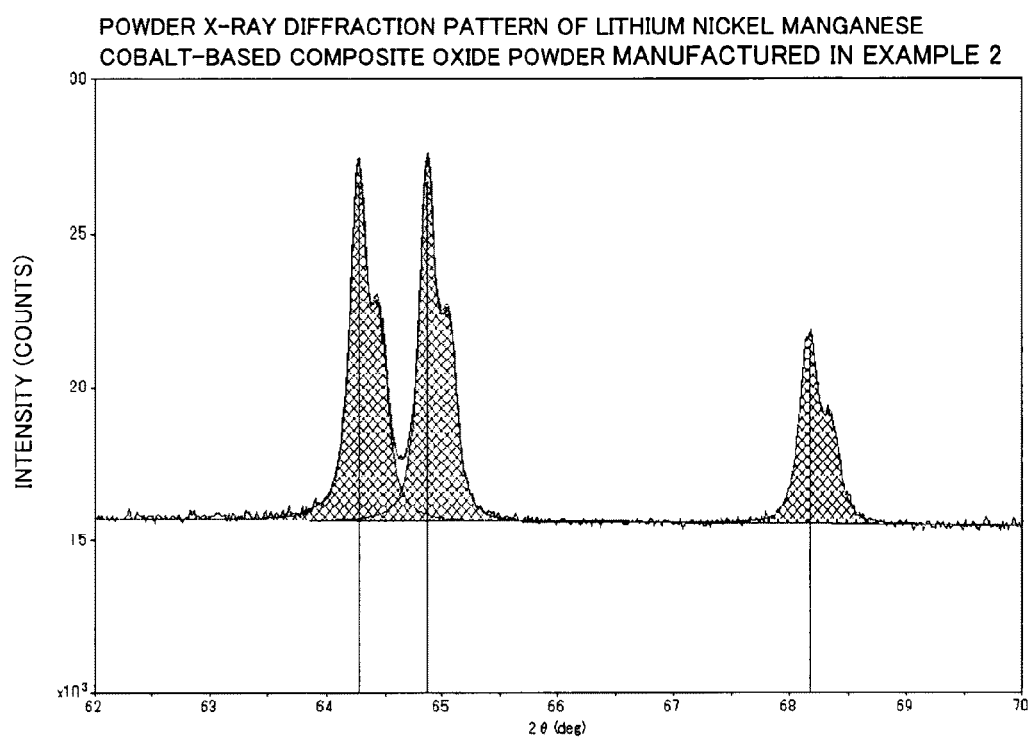
FIG. 47 is a graph showing an XRD pattern of manufactured lithium nickel manganese cobalt-based composite oxide in Example 2.
Figure 48:
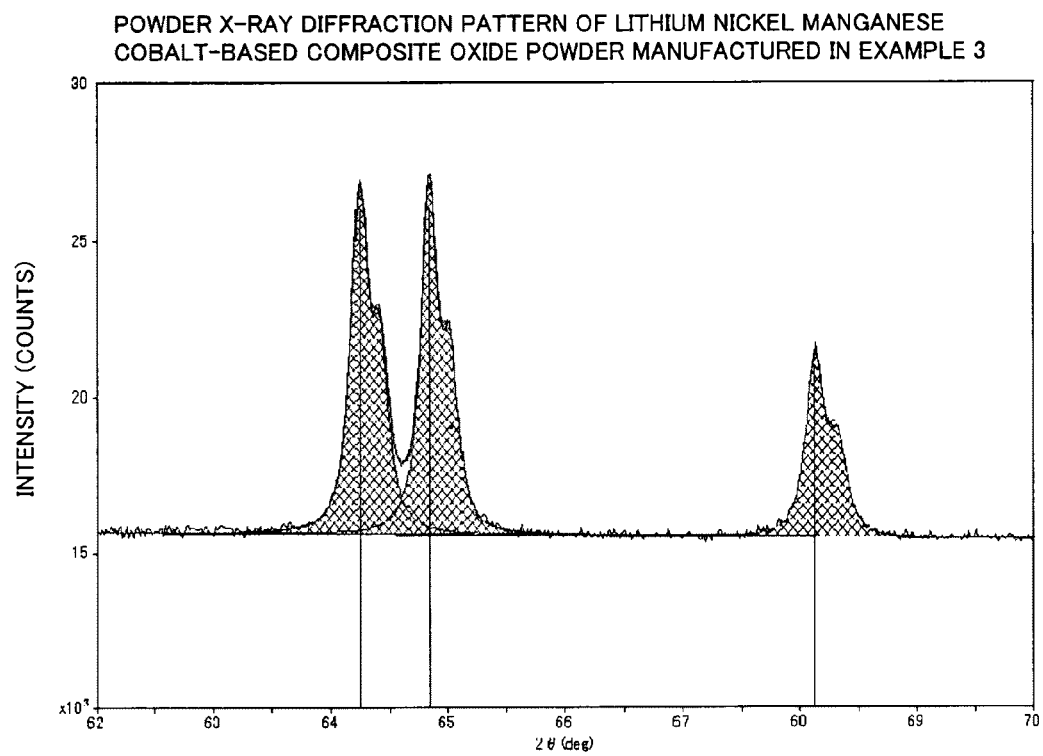
FIG. 48 is a graph showing an XRD pattern of manufactured lithium nickel manganese cobalt-based composite oxide in Example 3.
Figure 49:
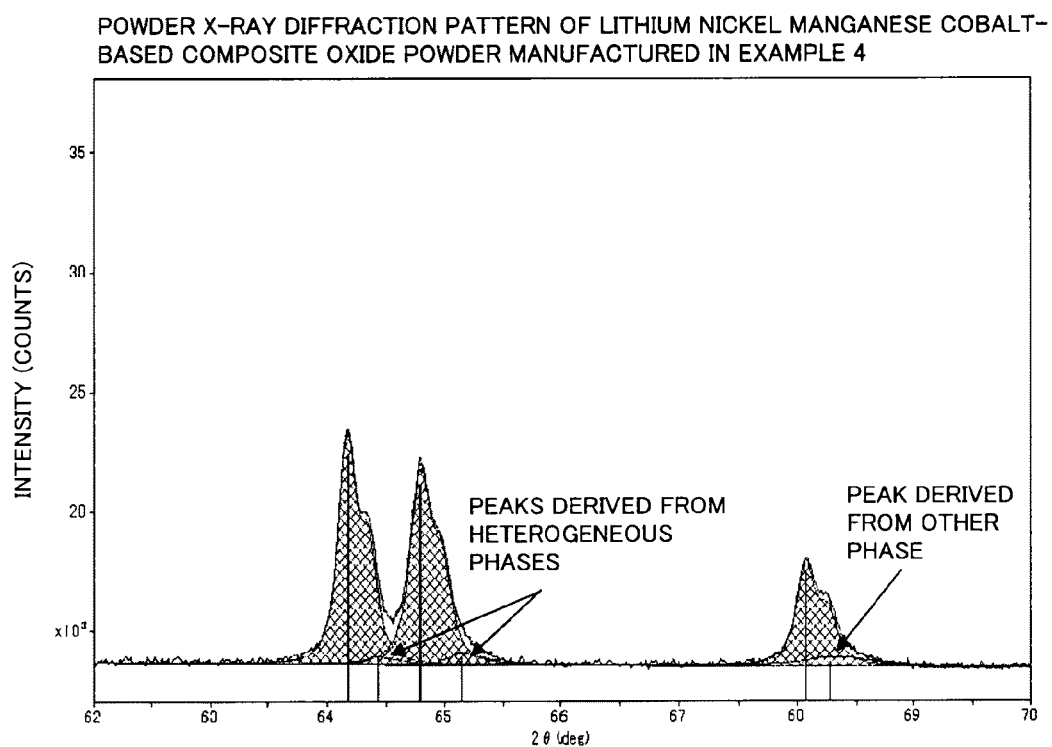
FIG. 49 is a graph showing an XRD pattern of manufactured lithium nickel manganese cobalt-based composite oxide in Example 4.
Figure 50:
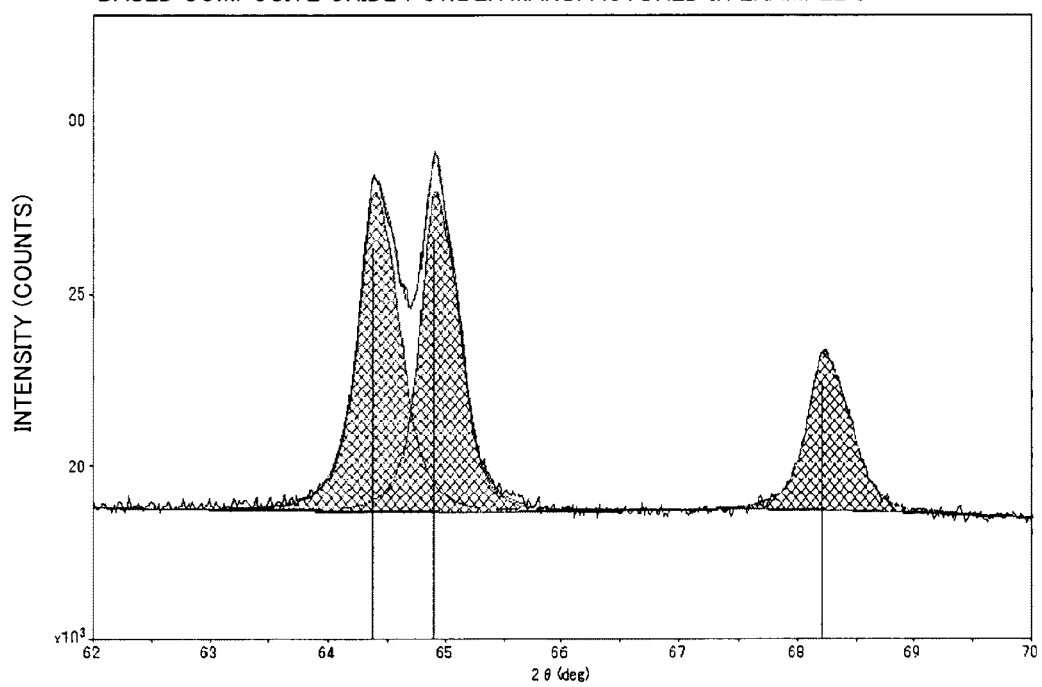
FIG. 50 is a graph showing an XRD pattern of manufactured lithium nickel manganese cobalt-based composite oxide in Example 5.
Figure 51:
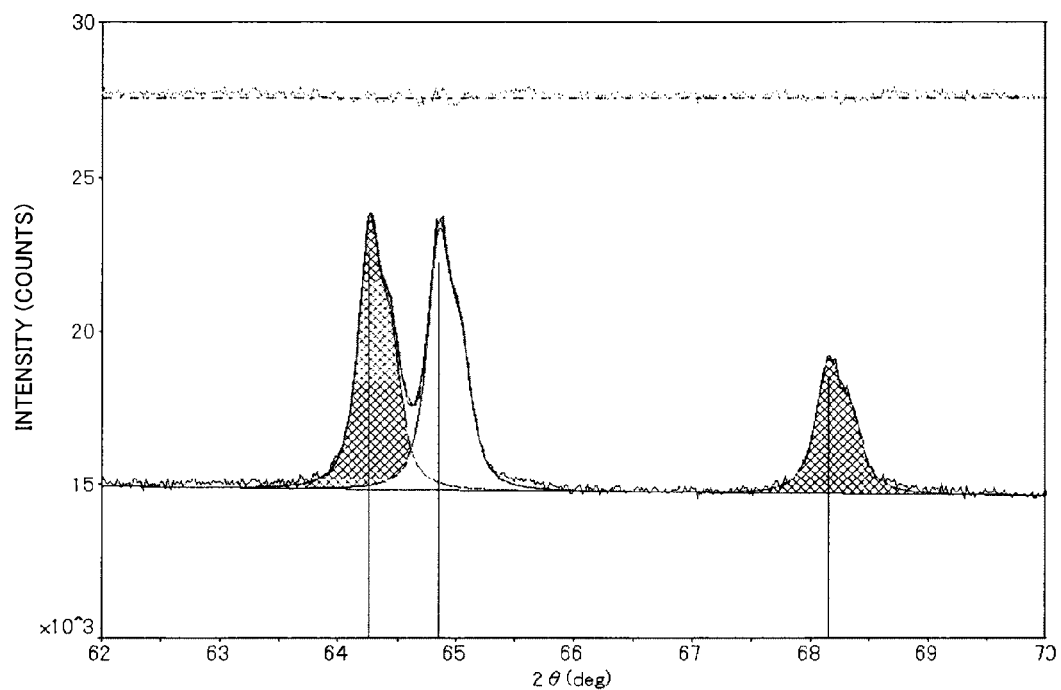
FIG. 51 is a graph showing an XRD pattern of manufactured lithium nickel manganese cobalt-based composite oxide in Example 6.
Figure 52:
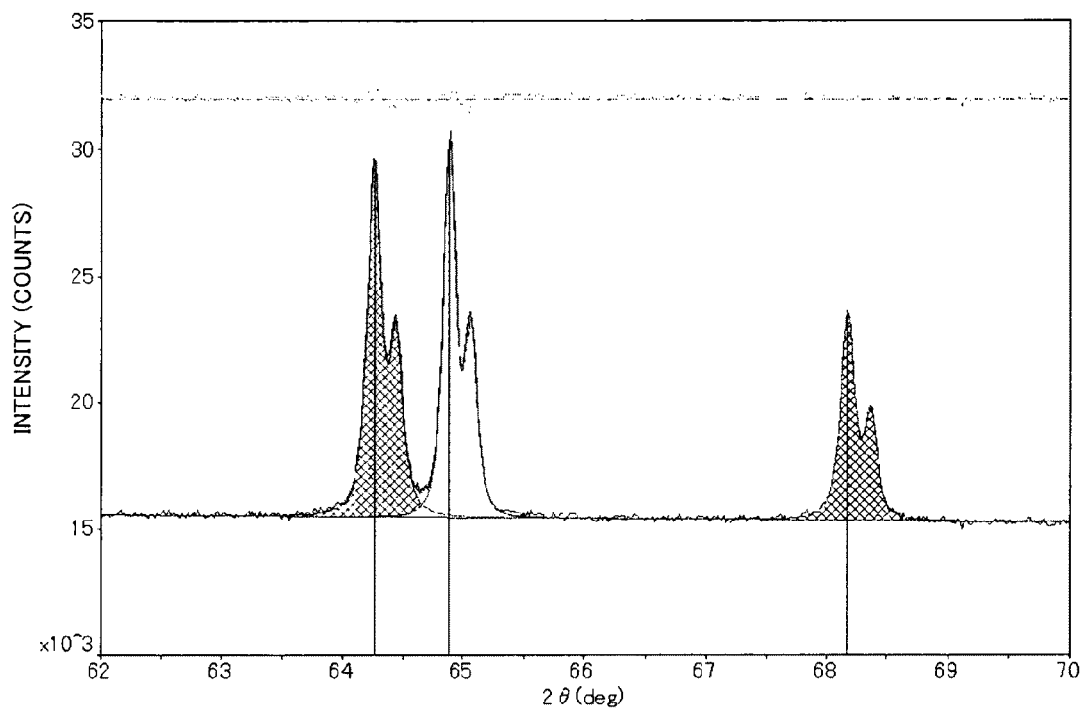
FIG. 52 is a graph showing an XRD pattern of manufactured lithium nickel manganese cobalt-based composite oxide in Example 7.
Figure 53:
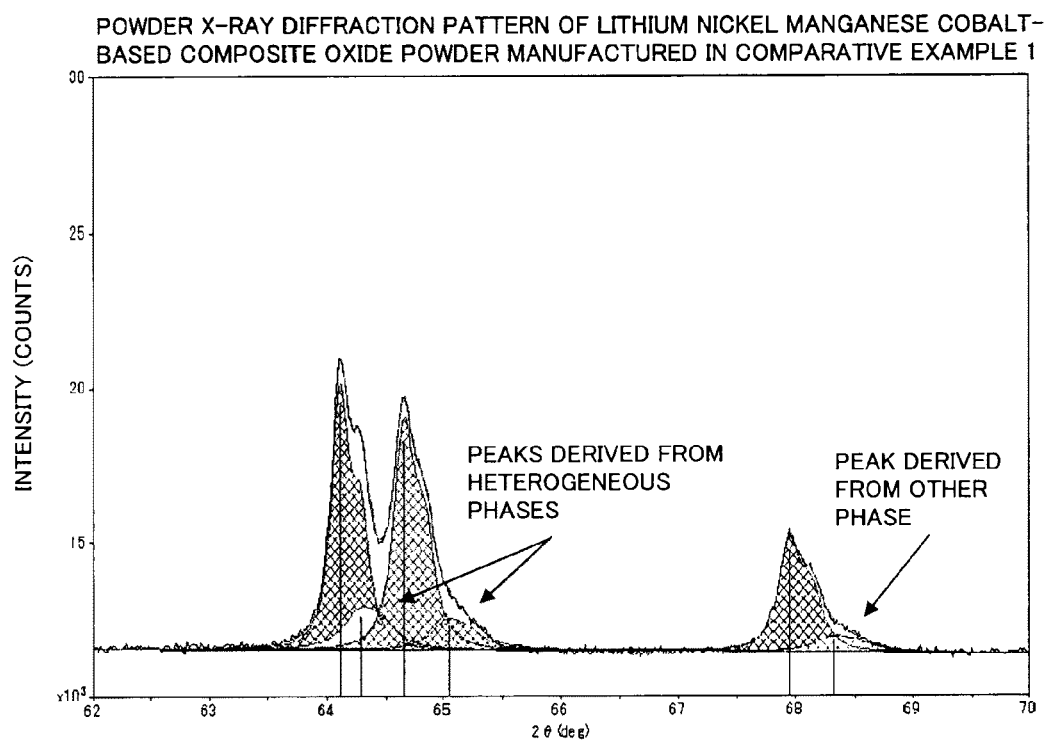
FIG. 53 is a graph showing an XRD pattern of manufactured lithium nickel manganese cobalt-based composite oxide in Comparative Example 1.
Figure 54:
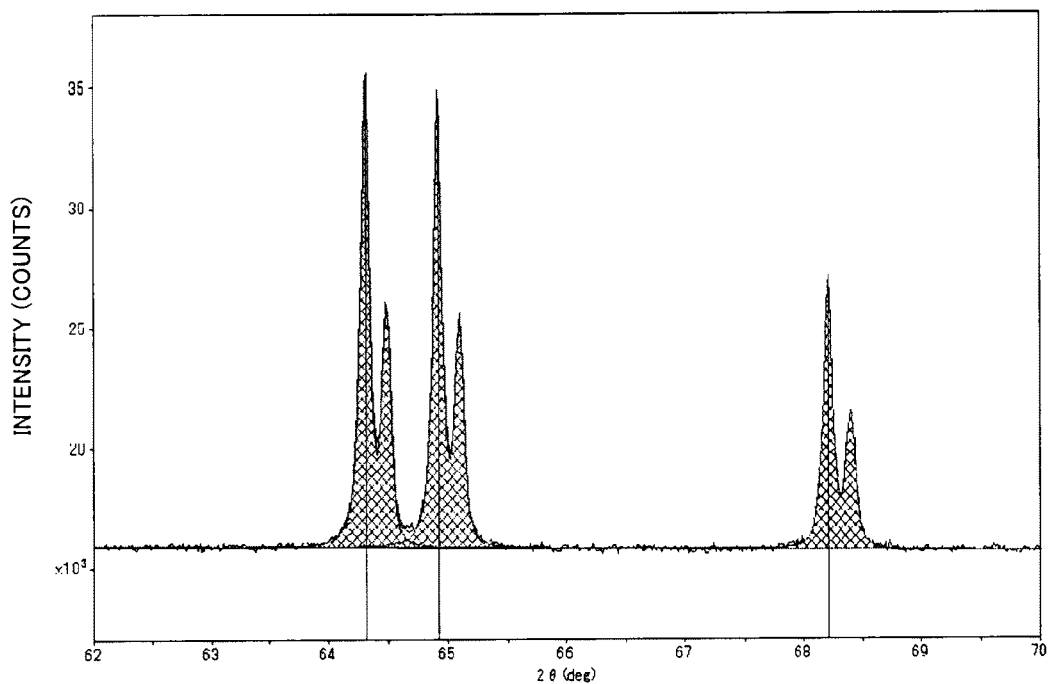
FIG. 54 is a graph showing an XRD pattern of manufactured lithium nickel manganese cobalt-based composite oxide in Comparative Example 2.
Figure 55:
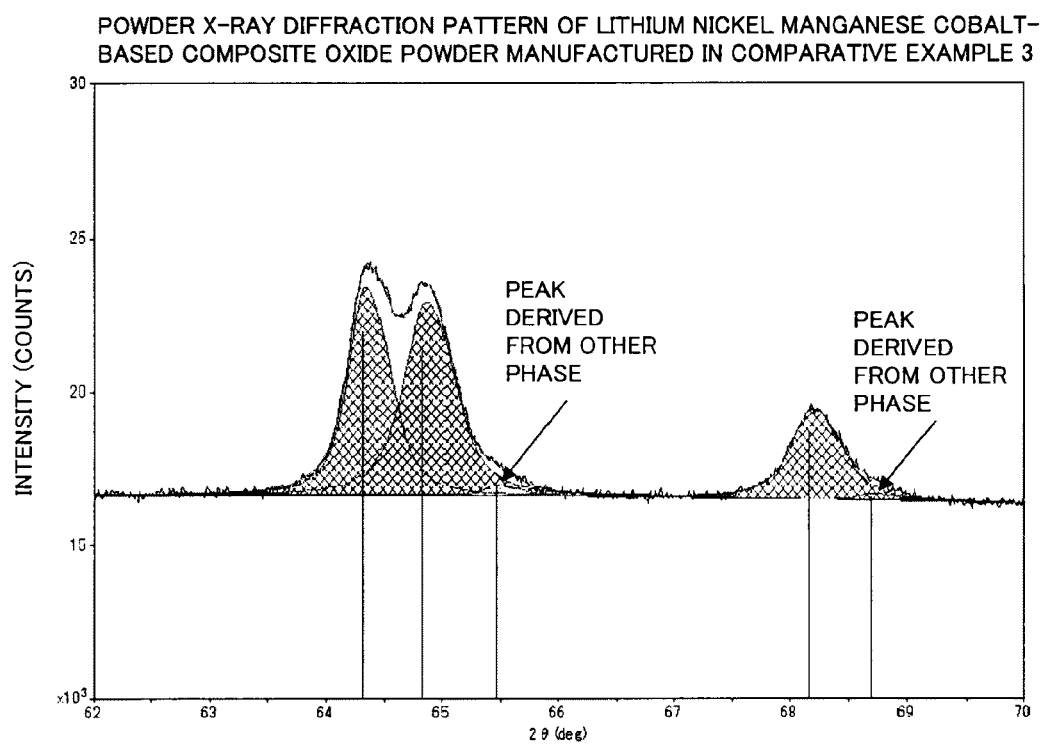
FIG. 55 is a graph showing an XRD pattern of manufactured lithium nickel manganese cobalt-based composite oxide in Comparative Example 3.
Figure 56:
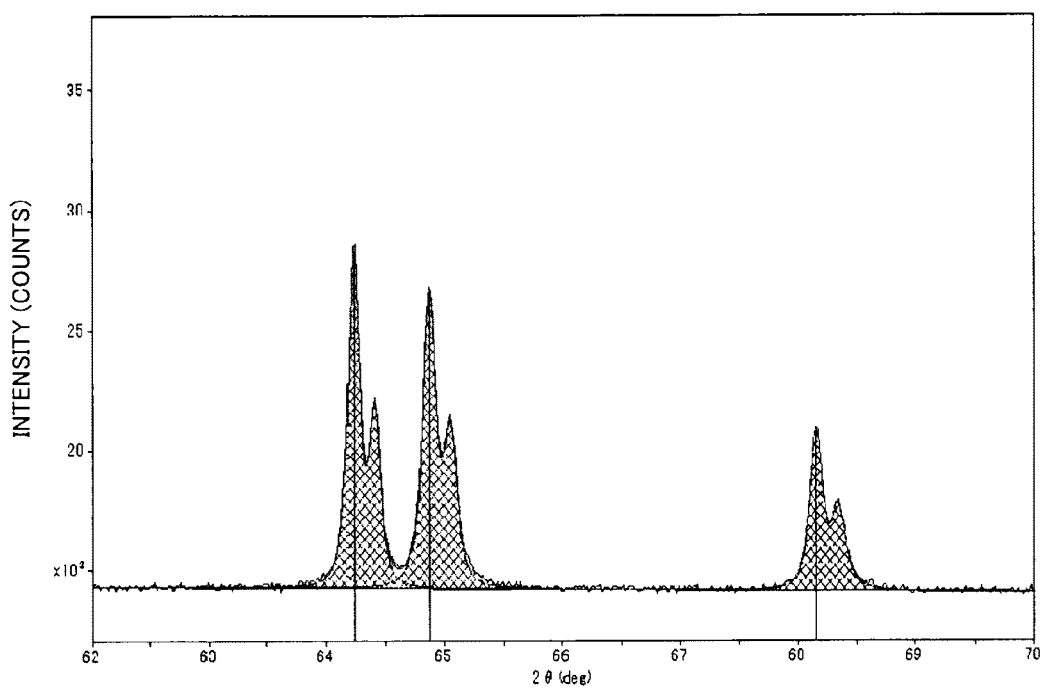
FIG. 56 is a graph showing an XRD pattern of manufactured lithium nickel manganese cobalt-based composite oxide in Comparative Example 4.
Figure 57:
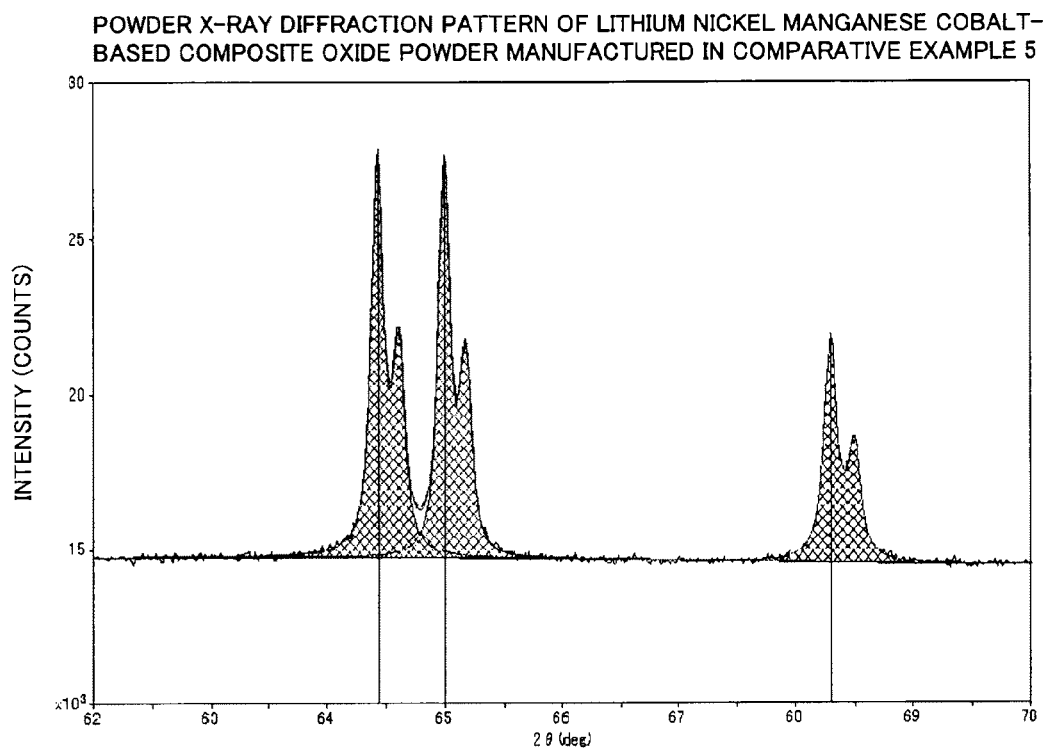
FIG. 57 is a graph showing an XRD pattern of manufactured lithium nickel manganese cobalt-based composite oxide in Comparative Example 5.

Embodiments of the present invention will now be described in detail below. The description of constitutional elements below is merely an example (representative example) of the embodiments of the present invention and the present invention is not limited by the contents as long as the spirit of the invention is not exceeded.

[Lithium Transition Metal-Based Compound Powder of First Invention]

A lithium transition metal-based compound powder for a lithium secondary battery positive electrode material according to a first invention is described below.

The lithium transition metal-based compound powder for a lithium secondary battery positive electrode active material (hereinafter also referred to as "positive electrode active substance") according to the first invention is either (1) or (2) below.

(1) A lithium transition metal-based compound powder for a lithium secondary battery positive electrode material, the lithium transition metal-based compound powder containing, as a main component, a lithium transition metal-based compound that has a function of allowing elimination and insertion of lithium ions, and including a crystal structure belonging to a layer structure, wherein primary particles are aggregated to form secondary particles, the ratio A/B of a median diameter A of the secondary particles to an average diameter (average primary particle diameter B) is in the range of 8 to 100, and $0.01 \leq FWHM(110) \leq 0.5$ where FWHM(110) is the half width of a (110) diffraction peak present near a diffraction angle $2\theta$ of 64.5° in a powder X-ray diffraction analysis using a CuK$\alpha$ line.

(2) A lithium transition metal-based compound powder for a lithium secondary battery positive electrode material, the lithium transition metal-based compound powder containing, as a main component, a lithium transition metal-based compound that has a function of allowing elimination and insertion of lithium ions, wherein a fine and homogeneous mixture of a raw material of the main component and an additive that suppresses particle growth and sintering during firing is fired, primary particle crystals having an average diameter (average primary particle diameter B) of 0.05 µm or more and 0.9 µm or less are aggregated to form spherical secondary particles, and the ratio A/B of a median diameter A of the secondary particles to the average primary particle diameter B is in the range of 8 to 100.

<Lithium Transition Metal-Based Compound>

In the first invention, the "lithium transition metal-based compound" is a compound that has a structure that enables elimination and insertion of Li ions and examples thereof include sulfides, phosphate compounds, and lithium transition metal composite oxides. Examples of the sulfides include compounds having a two-dimensional layer structure such as $TiS_2$ and $MoS_2$ and Chevrel compounds having a firm three-dimensional skeleton structure represented by general formula $Me_xMo_6S_8$ (Me represents any of various transition metals such as Pb, Ag, and Cu). Examples of the phosphate compounds include those that belong to the olivine structure and are generally represented by $LiMePO_4$ (Me is at least one transition metal), in particular, $LiFePO_4$, $LiCoPO_4$, $LiNiPO_4$, and $LiMnPO_4$. Examples of the lithium transition metal composite oxides include those that belong to a spinel structure capable of three-dimensional diffusion and a layer structure that enables two-dimensional diffusion of lithium ions. Those which have the spinel structure are generally represented by $LiMe_2O_4$ (Me is at least one transition metal) and are specifically $LiMn_2O_4$, $LiCoMnO_4$, $LiNi_{0.5}Mn_{1.5}O_4$, $CoLiVO_4$, and the like. Those which have the layer structure are generally represented by $LiMeO_2$ (Me is at least one transition metal) and are specifically $LiCoO_2$, $LiNiO_2$, $LiNi_{1-x}Co_xO_2$, $LiNi_{1-x-y}Co_xMn_yO_2$, $LiNi_{0.5}Mn_{0.5}O_2$, $Li_{1.2}Cr_{0.4}Mn_{0.4}O_2$, $Li_{1.2}Cr_{0.4}Ti_{0.4}O_2$, $LiMnO_2$, and the like.

From the point of lithium ion diffusion, the lithium transition metal-based compound powder of the first invention preferably contains a crystal structure that belongs to the olivine structure, the spinel structure, or the layer structure. Those which contain crystal structures that belong to the layer structure are particularly preferred.

<Average Primary Particle Diameter B>

As for the average diameter (average primary particle diameter B) of primary particles of the lithium transition metal-based compound powder of the first invention, the lower limit is usually 0.05 µm or more, preferably 0.1 µm or more, more preferably 0.15 µm or more, and most preferably 0.2 µm or more. The upper limit is usually 0.9 µm or less, preferably 0.7 µm or less, more preferably 0.6 µm or less, and most preferably 0.5 µm or less. When the average primary particle diameter B exceeds the above-described upper limit, battery performance such as rate characteristics and output characteristics may decrease due to the decrease in number of voids inside the secondary particles and the decrease in specific surface area. When the average primary particle diameter B is lower than the above-described lower limit, problems such as deteriorated charge/charge reversibility may arise due to insufficient development of crystals.

In the first invention, the average primary particle diameter B is the average diameter of primary particles observed with a scanning electron microscope (SEM) and can be determined as an average value of the particle diameters of about 10 to 30 primary particles in a SEM image taken at a 30,000 magnification.

<Shape of Secondary Particles>

In the lithium transition metal-based compound powder of the first invention, primary particle crystals are preferably aggregated to form spherical secondary particles. In particular, spherical secondary particles formed by random aggregation of primary particle crystals are preferred. Whether the primary particle crystals are aggregated at random or not can be observed by cross-sectional SEM. This morphology indicates that the secondary particles have no substantial crystal anisotropy. Accordingly, expansion and contraction of crystals caused by occlusion and release of lithium ions are moderated in the secondary particles, battery characteristics in terms of cycle reversibility improve, and compared to existing products, a higher density can be achieved by the combination of the effects brought about by the limitation of the substances of the first invention, resulting in improved performance with well-balanced battery characteristics.

Note that in the first invention, as shown in SEM photographs of lithium nickel manganese cobalt composite oxide powders obtained in Examples below, "spherical" means that the average value of the ratio [Lb/La] of the minor diameter [Lb(µm)] to the largest diameter [La(µm)] of secondary particles formed by aggregation of primary particle crystals is 0.8 or more where the minor diameter is the diameter that extends in a direction orthogonal to the largest diameter direction through the midpoint of the largest diameter.

<Ratio A/B of Median Diameter A of Secondary Particles to Average Primary Particle Diameter B>

The ratio A/B of the median diameter A of secondary particles of the lithium transition metal-based compound powder of the first invention to the average primary particle diameter B indicates the tendency of the secondary particle size and the primary particle size of the positive electrode active material powder. That this ratio A/B is 8 to 100 means that the powder characteristics such as bulk density and the battery characteristics such as rate are well balanced. When the ratio A/B is less than the lower limit, spherical secondary particles are not easily formed, resulting in lowering of powder filling property. When the ratio A/B exceeds the upper limit, the filling property of the primary particles forming the secondary particles becomes excessively high, resulting in degradation of battery characteristics. Thus, A/B is 8 or more, preferably 9 or more, and more preferably 10 or more and 100 or less, preferably 80 or less, and more preferably 50 or less.

<Median Diameter A and 90% Cumulative Diameter ($D_{90}$)>

The median diameter (median diameter A of secondary particles) of the lithium transition metal-based compound powder of the first invention is usually 3 μm or more, preferably 3.5 μm or more, more preferably 4 μm or more, yet more preferably 4.5 μm or more, and most preferably 5 μm or more and usually 20 μm or less, preferably 15 μm or less, more preferably 12 μm or less, yet more preferably 10 μm or less, and most preferably 8 μm or less. When the median diameter A is lower than this lower limit, the coatability may become problem during formation of the positive electrode active substance layer. When the median diameter A exceeds the upper limit, the battery performance may be lowered.

The 90% cumulative diameter ($D_{90}$) of the secondary particles of the lithium transition metal-based compound powder of the first invention is usually 25 μm or less, preferably 18 μm or less, more preferably 15 μm or less, yet more preferably 13 μm or less, and most preferably 10 μm or less and usually 4 μm or more, preferably 5 μm or more, more preferably 6 μm or more, and most preferably 7 μm or more. When the 90% cumulative diameter ($D_{90}$) exceeds the above-described upper limit, the battery performance may be lowered. When the 90% cumulative diameter ($D_{90}$) is lower than the lower limit, the coatability may become problem during formation of the positive electrode active substance layer.

In the first invention, the 90% cumulative diameter ($D_{90}$) and the median diameter A serving as the average particle diameter are measured with a known laser diffraction/scattering-type particle size distribution measuring instrument at a refractive index of 1.24 using the volume as the particle diameter basis. In the first invention, a 0.1 wt % aqueous sodium hexametaphosphate solution was used as the dispersion medium used for the measurement and measurement was conducted after 5 minutes of ultrasonic dispersion (output: 30 W, frequency: 22.5 kHz).

<Bulk Density>

The bulk density of the lithium transition metal-based compound powder of the first invention is usually 1.5 g/cm³ or more, preferably 1.6 g/cm³ or more, and most preferably 1.7 g/cm³ or more and usually 2.4 g/cm³ or less, preferably 2.2 g/cm³ or less, more preferably 2.0 g/cm³ or less, and most preferably 1.9 g/cm³ or less. A bulk density exceeding this upper limit is preferable for improving the powder filling property and the electrode density but the specific surface area may decrease and the number of voids in the particles may decrease excessively, possibly resulting in degradation of battery performance. When the bulk density is lower than the lower limit, the powder filling property and the electrode preparation may be adversely affected.

In the first invention, the bulk density is determined as the powder filling density (tap density) in terms of g/cm³ by placing 2 to 10 g of lithium transition metal-based compound powder in a 10 ml glass graduated cylinder and tapping 200 times at a stroke of about 20 mm.

<Additive Suppressing Particle Growth and Sintering During Firing>

In the first invention, the "additive that suppresses particle growth and sintering during firing" refers to an additive that suppresses growth of active substance particles during high-temperature firing and sintering between the primary particles or the secondary particles and thereby has an effect of producing secondary particles formed by aggregation of highly crystalline and fine primary particles.

For example, in order to produce a lithium nickel manganese cobalt-based composite oxide powder in the composition range defined by composition formula (I) preferred in the first invention described below, the crystallinity develops and a positive electrode active material having a crystal structure suited for battery performance can be obtained by firing a mixture of solid powder raw materials at a temperature of 900° C. or more. However, since this allows particle growth and sintering to proceed easily, powder properties not favorable for battery performance may result. In other words, it is extremely difficult to improve both at the same time. However, this trade-off relationship can be resolved by firing the powder while adding an "additive that suppresses particle growth and sintering during firing".

In the first invention, the mechanism by which specific compounds added as additives that suppress particle growth and sintering during firing exhibit effects of suppressing particle growth and sintering during firing is not clear. However, Examples below show that compounds constituted by metal elements that can have a valence of 5 or 6 exhibit the effect in common. These compounds can stably enter a high valence state such as a pentavalent to heptavalent state unlike cation elements constituting the lithium transition metal-based compound and rarely form solid solutions by a solid phase reaction. As a result, these compounds segregate in grain boundaries or surfaces of the lithium transition metal-based compound particles. Thus, presumably, movements of substances caused by contact between particles of the positive electrode active substance are inhibited and growth and sintering of particles are suppressed thereby.

The type of the additive is not particularly limited as long as the effects described above can be exhibited. Preferably a compound that contains an element selected from Mo, W, Nb, Ta, and Re having a stable high-valence state is used. Usually, an oxide material is used.

Example compounds of the additives that suppress particle growth and sintering during firing include $MoO$, $MoO_2$, $MoO_3$, $MoO_x$, $Mo_2O_3$, $Mo_2O_5$, $Li_2MoO_4$, $WO$, $WO_2$, $WO_3$, $WO_x$, $W_2O_3$, $W_2O_5$, $W_{18}O_{49}$, $W_{20}O_{58}$, $W_{24}O_{70}$, $W_{25}O_{73}$, $W_{40}O_{118}$, $Li_2WO_4$, $NbO$, $NbO_2$, $Nb_2O$, $Nb_2O_5$, $Nb_4O$, $Nb_6O$, $LiNbO_3$, $TaO$, $TaO_2$, $Ta_2O_5$, $LiTaO_3$, $ReO_2$, $ReO_3$, and $Re_2O_3$. $WO_3$, $Li_2WO_4$, $LiNbO_3$, $Ta_2O_5$, $LiTaO_3$, and $ReO_3$ are preferred. $NO_3$, $Li_2WO_4$, and $ReO_3$ are more preferred. $WO_3$ and $Li_2WO_4$ are particularly preferred. These additives may be used alone or in combination of two or more.

The range of the concentration of the metal element derived from the additive (referred to as "additive element" hereinafter) in the lithium transition metal-based compound powder of the first invention is usually 0.01 mol % or more, preferably 0.03 mol % or more, more preferably 0.04 mol % or more, and particularly preferably 0.05 mol % or more and usually less than 2 mol %, preferably 1.8 mol % or less, more preferably 1.5 mol % or less, and particularly preferably 1.3 mol % or less relative to the total molar amount of the constitutional metal elements other than the additive element and Li. When the additive element content is lower than the lower limit, the effects described above may not be obtained. When the additive element content exceeds the upper limit, degradation of the battery performance may result.

<Elements other than Constitutional Elements and Additive Element>

Elements (may be simply referred to as "other elements" hereinafter) other than the constitutional elements and the additive element may be introduced into the lithium transition metal-based compound powder of the first invention. Such other element is at least one element selected from B, Na, Mg, Al, Si, K, Ca, Ti, V, Cr, Mn, Fe, Ni, Co, Cu, Zn, Ga, Ge, Sr, Y, Zr, Ru, Rh, Pd, Ag, In, Sn, Sb, Te, Ba, Os, Ir, Pt, Au, Pb, Bi, La, Ce, Pr, Nd, Sm, Eu, Gd, Tb, Dy, Ho, Er, Tm, Yb, Lu, N, F, P, O, S, Cl, Br, and I and B is particularly preferably selected. These other elements may be incorporated inside the crystal structure of the lithium transition metal-based compound or may localize at particle surfaces or crystal grain boundaries by taking an elemental form or a compound form without being incorporated inside the crystal structure.

In the case where other elements are introduced, the content thereof is usually 0.001 mol % or more, preferably 0.01 mol % or more, more preferably 0.1 mol % or more, and most preferably 0.2 mol % or more and usually 20 mol % or less, preferably 15 mol % or less, more preferably 10 mol % or less, and most preferably 5 mol % or less relative to the total molar content of the constitutional metal elements other than the other elements and Li.

<Existence Form of Additive Element>

According to the lithium transition metal-based compound powder of the first invention, an additive element, that is, at least one element selected from Mo, W, Nb, Ta, and Re, is preferably concentrated in surface portions of the primary particles. In particular, the molar ratio of the total of the additive elements to the total of the metal elements other than Li and the additive elements (in other words, the metal elements other than Li and additive elements) in the surface portions of the primary particles is preferably usually 5 or more times that in the entire particles. The lower limit of this ratio is preferably 7 times or more, more preferably 8 times or more, and particularly preferably 9 times or more. The upper limit is usually not particularly limited but is preferably 150 times or less, more preferably 100 times or less, particularly preferably 50 times or less, and most preferably 30 times or less. When this ratio is excessively small, the effects of improving the battery performance may be small and when the ratio is excessively large, the battery performance may be degraded.

The analysis of the composition of the surface portions of the primary particles of the lithium transition metal-based compound powder is performed by X-ray photoelectron spectroscopy (XPS) using AlKα monochromatic light as the X-ray source under conditions 0.8 mm diameter analytic area and 65° take-off angle. The range (depth) that can be analyzed differs depending on the composition of the primary particles but usually the range is 10 nm or less. Accordingly, in the first invention, the surface portions of primary particles of the lithium transition metal-based compound powder refer to the ranges that can be measured under these conditions.

Furthermore, the lithium transition metal-based compound powder of the first invention preferably has a continuous composition slope structure in which the additive element exists by having a concentration gradient from the particle surface in the depth direction.

The composition from the particle surface of the lithium transition metal-based compound powder in the depth direction can be analyzed by alternately performing Ar ion gun sputtering and XPS analysis employed in analyzing the composition of the surface portions of primary particles of the lithium transition metal-based compound powder described above. Since atoms near the surfaces are removed by sputtering, the XPS analysis conducted thereafter reflects the composition of the inner portions of particles compared to one conducted before sputtering. Since it is difficult to accurately detect the thickness of the surface layer removed by the sputtering, the thickness of the $SiO_2$ surface layer removed by sputtering a $SiO_2$ thin film under the same conditions is used as a substitute. Accordingly, in the first invention, the depth from the particle surface of the lithium transition metal-based compound powder refers to the depth estimated by such a method.

The range of the ratio $R_0/R_{10}$ is usually 3 or more, preferably 3.2 or more, more preferably 3.5 or more, and most preferably 3.7 or more and usually 20 or less, preferably 10 or less, more preferably 8 or less, and most preferably 5 or less where $R_0$ is the atomic ratio of the total of the additive elements to the total of metal elements (in other words, the metal elements other than Li and the additive elements) other than the additive elements and Li on the primary particle outermost surfaces of the lithium transition metal-based compound powder of the first invention and $R_{10}$ is the atomic ratio of the total of the additive elements to the total of the metal elements (in other words, the metal elements other than Li and the additive elements) other than Li and the additive elements in a region extending from a particle surface to a depth of 10 nm.

<Pore Characteristics Measured by Mercury Intrusion Porosimetry>

The lithium transition metal-based compound powder for a lithium secondary battery positive electrode material of the first invention preferably satisfies particular conditions when measured by a mercury intrusion porosimetry.

The mercury intrusion porosimetry employed in evaluating the lithium transition metal-based compound powder of the first invention is described below.

The mercury intrusion porosimetry is a technique that involves forcing mercury to penetrate pores in a sample such as porous particles by applying a pressure and obtaining information such as a specific surface area and a pore radius distribution on the basis of the relationship between the pressure and the amount of penetrating mercury.

To be more specific, first, a container containing a sample is vacuum evacuated and filled with mercury. Mercury has a high surface tension and does not spontaneously penetrate pores in the sample surface. When a pressure is applied to mercury and gradually elevated, mercury starts to gradually penetrate pores with large radii first and then pores with smaller radii. A mercury intrusion curve representing the relationship between the pressure applied to mercury and the amount of penetrating mercury is obtained by detecting the changes in mercury liquid surface (in other words, the amount of mercury penetrating the pores) while continuously increasing the pressure.

If the shape of the pores is assumed to be cylindrical, the radius is represented by r, the surface tension of mercury is represented by δ, and the contact angle is represented by θ, then the magnitude in the direction of pressing mercury out of pores is represented by $-2r\pi\delta(\cos\theta)$ (this value will be positive if θ>90°). Since the magnitude of the force in the direction of pressing mercury into the pores under a pressure P is represented by $\pi r^2 P$, the following mathematical equations (1) and (2) are derived on the basis of the balance between these forces.

$$-2r\pi\delta(\cos\theta) = \pi r^2 P \quad (1)$$

$$Pr = -2\delta(\cos\theta) \quad (2)$$

For mercury, a surface tension δ=about 480 dyn/cm and a contact angle θ=about 140° are generally and frequently used. When these values are used, the radius of the pores into which mercury penetrates under a pressure P is represented by mathematical equation (3) below.

$$r(nm) = 7.5 \times 10^8 / P \text{ (Pa)} \quad (3)$$

In other words, since there is a correlation between the pressure P applied to mercury and the radius r of the pores into which mercury penetrates, a pore distribution curve representing the relationship between the radius of the pores of the sample and the volume thereof can be obtained on the basis of the obtained mercury intrusion curve. For example, when the pressure P is varied from 0.1 MPa to 100 MPa, pores in the range of about 7500 nm to about 7.5 nm can be analyzed.

The approximate analytical limits of the pore radius that can be measured by the mercury intrusion porosimetry are 2 nm or more as the lower limit and about 200 μm as the upper limit. Compared to a nitrogen adsorption method described below, the mercury intrusion porosimetry is suitable for analyzing the pore distribution in a relatively wide range of pore radii.

The analysis by the mercury intrusion porosimetry can be conducted by using an instrument such as a mercury porosimeter. Specific examples of the mercury porosimeter include AutoPore produced by Micromeritics and PoreMaster produced by Quantachrome.

The mercury intrusion volume of the lithium transition metal-based compound powder of the first invention is preferably 0.4 cm³/g or more and 1.0 cm³/g or less according to the mercury intrusion curve determined by the mercury intrusion porosimetry during pressure elevation from 3.86 kPa to 413 MPa. The mercury intrusion volume is more preferably 0.45 cm³/g or more, yet more preferably 0.5 cm³/g or more, and most preferably 0.55 cm³/g or more and more preferably 0.9 cm³/g or less, yet more preferably 0.8 cm³/g or less, and most preferably 0.7 cm³/g or less. When the volume exceeds the upper limit of this range, gaps become excessively large and the filling ratio of the positive electrode active substance into the positive electrode plate (positive electrode collector) becomes excessively low in the case where the lithium transition metal-based compound powder of the first invention is used as the positive electrode material, thereby limiting the battery capacity. On the other hand, when the volume is less than the lower limit of this range, the gaps between particles become excessively small and lithium diffusion among particles is inhibited and load characteristics deteriorate in the case where the lithium transition metal-based compound powder of the first invention is used as the positive electrode material in fabricating the battery.

When the pore distribution curve of the lithium transition metal-based compound powder of the first invention is determined by the mercury intrusion porosimetry described above, particular main peak and sub peaks described below usually appear.

Note that in this description, "pore distribution curve" is obtained by plotting the pore radius along the horizontal axis and plotting, along the vertical axis, the values obtained by differentiating the total pore volume per unit weight (usually 1 g) of the pores having a radius equal to or more than the radius on the horizontal axis with the logarithm of the pore radius. Usually, the curve is presented as a graph in which plotted points are connected. In particular, the pore distribution curve obtained by analyzing the lithium transition metal-based compound powder of the first invention by the mercury intrusion porosimetry is sometimes referred to as "pore distribution curve according to the first invention" in the description below.

In this description, "main peak" refers to the largest peak among peaks of the pore distribution curve and "sub peaks" refer to the peaks other than the main peak of the pore distribution curve.

In this description, "peak top" refers to a point at which the coordinate value of the vertical axis is the largest in each peak of the pore distribution curve.

<Main Peak>

The peak top of the main peak of the pore distribution curve according to the first invention lies in the pore radius range of usually 300 nm or more, preferably 350 nm or more, and most preferably 400 nm or more and usually 1500 nm or less, preferably 1200 nm or less, more preferably 1000 nm or less, yet more preferably 980 nm or less, and most preferably 950 nm or less. When the pore radius exceeds the upper limit of this range, lithium diffusion in the positive electrode material is inhibited in the case where a battery is fabricated by using the lithium transition metal-based compound powder of the first invention as the positive electrode material or deficiency of conduction paths occurs, possibly resulting in deterioration of load characteristics. On the other hand, when the pore radius is less than the lower limit of this range, the required amounts of the conductive materials and binders increase in the case where a positive electrode is fabricated by using the lithium, transition metal-based compound powder of the first invention and the filling ratio of the positive electrode active substance into the positive electrode plate (positive electrode collector) becomes limited, possibly resulting in a limitation of the battery capacity. Moreover, since particles are finer, when the particles are formed into a coating solution, coatings obtained therefrom become hard or brittle in terms of mechanical properties and separation of the coatings may easily occur in the step of winding during assembly of the battery.

The pore volume of the main peak having a peak top in the pore radius range of 300 nm or more and 1500 nm or less in the pore distribution curve according to the first invention is favorably usually 0.1 cm³/g or more, preferably 0.2 cm³/g or more, more preferably 0.24 cm³/g or more, and most preferably 0.28 cm³/g or more and usually 0.5 cm³/g or less, preferably 0.45 cm³/g or less, more preferably 0.4 cm³/g or less, and most preferably 0.35 cm³/g or less. When the pore volume exceeds the upper limit of this range, the gaps become excessively large and the filling ratio of the positive electrode active substance into the positive electrode plate becomes excessively low in the case where the lithium transition metal-based compound powder of the first invention is used as the positive electrode material, thereby possibly limiting the battery capacity. On the other hand, when the pore volume is less than the lower limit of this range, possibly, the gaps between particles become excessively small and lithium diffusion among secondary particles is inhibited and load characteristics deteriorate in the case where the lithium transition metal-based compound powder of the first invention is used as the positive electrode material in fabricating the battery.

<Sub Peaks>

The pore distribution curve according to the first invention may include a plurality of sub peaks in addition to the above-mentioned main peak, the sub peaks being characterized by being in the pore radius range of 80 nm or more and less than 300 nm.

The pore volumes of the sub peaks having peak tops at a pore radius of 80 nm or more and less than 300 nm of the pore distribution curve according to the first invention are preferably usually 0.01 cm$^3$/g or more, preferably 0.02 cm$^3$/g or more, more preferably 0.03 cm$^3$/g or more, and most preferably 0.04 cm$^3$/g or more and usually 0.2 cm$^3$/g or less, preferably 0.18 cm$^3$/g or less, more preferably 0.15 cm$^3$/g or less, and most preferably 0.13 cm$^3$/g or less. When the volume exceeds the upper limit of this range, gaps become excessively large and the filling ratio of the positive electrode active substance into the positive electrode plate becomes low in the case where the lithium transition metal-based compound powder of the first invention is used as the positive electrode material, thereby possibly limiting the battery capacity. On the other hand, when the volume is less than the lower limit of this range, the gaps between particles become excessively small and lithium diffusion among secondary particles is inhibited and load characteristics deteriorate in the case where the lithium transition metal-based compound powder of the first invention is used as the positive electrode material in fabricating the battery.

<BET Specific Surface Area>

The BET specific surface area of the lithium lithium transition metal-based compound powder of the first invention is usually 1 m$^2$/g or more, preferably 1.1 m$^2$/g or more, more preferably 1.2 m$^2$/g or more, and most preferably 1.3 m$^2$/g or more and usually 5 m$^2$/g or less, preferably 4 m$^2$/g or less, and most preferably 3.5 m$^2$/g or less. When the BET specific surface area is lower than this range, the battery performance is easily degraded. When the BET specific surface area is larger than this range, problems of the coatability during formation of the positive electrode active substance layer may easily arise.

The BET specific surface area can be measured by a known BET-type powder specific surface area measuring instrument. In the first invention, a full automatic powder specific surface area analyzer, AMS8000 produced by Ohkura Riken Inc., is used with nitrogen as the adsorption gas and helium as the carrier gas and a BET single-point analysis is conducted by a continuous flow method. In particular, a powder sample is heated and deaerated at a temperature of 150° C. using a mixed gas and cooled to a liquid nitrogen temperature to adsorb the mixed gas. Then the sample is warmed to room temperature using water so as to desorb the nitrogen gas adsorbed and the amount thereof is detected with a heat conduction detector to calculate the specific surface area of the sample.

<Volume Resistivity>

The lower limit of the volume resistivity of the lithium transition metal-based compound powder of the first invention compacted at a pressure of 40 MPa is preferably 1×10$^3$ Ω·cm or more, more preferably 5×10$^3$ Ω·cm or more, and yet more preferably 1×10$^4$ Ω·cm or more. The upper limit is preferably 1×10$^6$ Ω·cm or less, more preferably 5×10$^5$ Ω·cm or less, and yet more preferably 1×10$^5$ Ω·cm or less. If the volume resistivity exceeds the upper limit, the load characteristics may deteriorate when the battery is formed. On the other hand, if the volume resistivity is less than the lower limit, the safety may deteriorate when the battery is formed.

In the first invention, the volume resistivity of the lithium transition metal-based compound powder is a volume resistivity measured with a four-probe-ring electrode at an electrode spacing of 5.0 mm, an electrode radius of 1.0 mm, a sample radius of 12.5 mm, and an application voltage limiter of 90 V while the lithium transition metal-based compound powder is compacted under a pressure of 40 MPa. The volume resistivity of a powder under a particular pressure can be measured with a powder resistivity measuring instrument (e.g., Loresta GP powder resistivity measuring system produced by DIA Instruments Co., Ltd.) using a probe unit for powders.

<Crystal Structure>

The lithium transition metal-based compound powder of the first invention is preferably mainly composed of a lithium nickel manganese cobalt-based composite oxide containing a crystal structure that belongs to a layer structure.

The layer structure will now be described in further detail. The representative crystal systems that have layer structures include those that belong to an α-NaFeO$_2$-type such as LiCoO$_2$ and LiNiO$_2$. They are members of the hexagonal system and belong to a space group $$R\bar{3}m$$

(also written as "layer R(−3)m structure" hereinafter) due to their symmetry.

However, layer LiMeO$_2$ is not limited to the layer R(−3)m structure. For example, LiMnO$_2$ also known as layer Mn is a layer compound of the rhombic system and belongs to a space group Pm2M. Li$_2$MnO$_3$ also known as "213 phase" and represented by Li[Li$_{1/3}$Mn$_{2/3}$]O$_2$ belongs to a monoclinic system and has a space group C2/m structure but is a layer compound in which a Li layer, a [Li$_{1/3}$Mn$_{2/3}$] layer, and an oxygen layer are stacked.

<Composition>

The lithium transition metal-based compound powder of the first invention is preferably a lithium transition metal-based compound powder represented by composition formula (I) below:

$$LiMO_2 \qquad (I)$$

Here, M is an element constituted by Li, Ni, and Mn or Li, Ni, Mn, and Co. The Mn/Ni molar ratio is usually 0.8 or more, preferably 0.82 or more, more preferably 0.85 or more, and yet more preferably 0.88 or more, and most preferably 0.9 or more and usually 5 or less, preferably 4 or less, more preferably 3 or less, yet more preferably 2.5 or less, and most preferably 1.5 or less. The Co/(Mn+Ni+Co) molar ratio is usually 0 or more, preferably 0.01 or more, more preferably 0.02 or more, yet more preferably 0.03 or more, and most preferably 0.05 or more, and usually 0.35 or less, preferably 0.20 or less, more preferably 0.15 or less, yet more preferably 0.10 or less, and most preferably 0.099 or less. The Li molar ratio in M is 0.001 or more, preferably 0.01 or more, more preferably 0.02 or more, yet more preferably 0.03 or more, and most preferably 0.05 or more and usually 0.2 or less, preferably 0.19 or less, more preferably 0.18 or less, yet more preferably 0.17 or less, and most preferably 0.15 or less.

In composition formula (I) above, although the atomic ratio of the oxygen content is indicated 2 for the convenience sake, some degree of non-stoichiometry is permitted. When there is non-stoichiometry, the atomic ratio of oxygen is usually in the range of 2±0.2, preferably in the range of 2±0.15, more preferably in the range of 2±0.12, yet more preferably in the range of 2±0.10, and particularly preferably in the range of 2±0.05.

The lithium transition metal-based compound powder of the first invention is preferably fired by high-temperature firing in an oxygen-containing gas atmosphere to increase the crystallinity of the positive electrode active substance. In particular, for the lithium nickel manganese cobalt-based composite oxide having the composition represented by composition formula (I) above, the lower limit of the firing temperature is usually 900° C. or more, preferably 920° C. or more, more preferably 940° C. or more, yet more preferably 950° C. or more, and most preferably 960° C. or more and the upper limit is usually 1200° C. or less, preferably 1175° C. or less, yet more preferably 1150° C. or less, and most preferably 1125° C. or less. When the firing temperature is excessively low, heterogeneous phases will mix and the lattice strain will increase due to undeveloped crystal structures. Moreover, the specific surface area becomes excessively large. In contrast, when the firing temperature is excessively high, primary particles grow excessively, sintering between the particles proceeds excessively, and the specific surface area becomes excessively small.

<Carbon Concentration C>

The carbon concentration C (wt %) in the lithium transition metal-based compound powder of the first invention is usually 0.005 wt % or more, preferably 0.01 wt % or more, more preferably 0.015 wt % or more, and most preferably 0.02 wt % or more and usually 0.1 wt % or less, preferably 0.08 wt % or less, yet more preferably 0.07 wt % or less, and most preferably 0.06 wt % or less. If the concentration is less than the lower limit, the battery performance may be degraded and if the concentration exceeds the upper limit, swelling caused by generation of gas may increase and the battery performance may decrease when a battery is fabricated.

In the first invention, as described in the Example section below, the carbon concentration C in the lithium transition metal-based compound powder is determined by an infrared absorption technique involving firing in an oxygen stream (high-frequency heating furnace system).

Note that the carbon component of the lithium transition metal-based compound powder determined by the carbon analysis described below can be regarded as the indication of information about the amount of the deposition of carbonate compounds, in particular, lithium carbonate. This is because the figure obtained by assuming that the amount of carbon determined by carbon analysis is entirely derived from carbonate ions substantially equals the carbonate ion concentration analyzed by ion chromatography.

When a complexing treatment with electrically conductive carbon is performed as a technique to enhance the electron conductivity, a C content exceeding the above-described particular range is sometimes detected. The C value observed when such a treatment is conducted is not limited to the above-described definition range.

<Preferable Composition>

In the lithium transition metal-based compound powder for a lithium secondary battery positive electrode material of the first invention, the atomic composition in the M site in composition formula (I) is particularly preferably represented by formula (II) below:

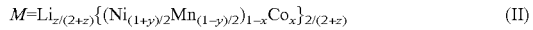

$$M = Li_{z/(2+z)}\{(Ni_{(1+y)/2}Mn_{(1-y)/2})_{1-x}Co_x\}_{2/(2+z)} \quad (II)$$

wherein, in formula (II),
$0 \leq x \leq 0.1$
$-0.1 \leq y \leq 0.1$
$(1-x)(0.05-0.98y) \leq z \leq (1-x)(0.20-0.88y)$.

In formula (II) above, the value of x is usually 0 or more, preferably 0.01 or more, more preferably 0.02 or more, yet more preferably 0.03 or more, and most preferably 0.04 or more and usually 0.1 or less, preferably 0.099 or less, and most preferably 0.098 or less.

The value of y is usually −0.1 or more, preferably −0.05 or more, more preferably −0.03 or more, and most preferably −0.02 or more and usually 0.1 or less, preferably 0.05 or less, more preferably 0.03 or less, and most preferably 0.02 or less.

The value of z is usually $(1-x)(0.05-0.98y)$ or more, preferably $(1-x)(0.06-0.98y)$ or more, more preferably $(1-x)(0.07-0.98y)$ or more, yet more preferably $(1-x)(0.08-0.98y)$ or more, and most preferably $(1-x)(0.10-0.98y)$ or more and usually $(1-x)(0.20-0.88y)$ or less, preferably $(1-x)(0.18-0.88y)$ or less, more preferably $(1-x)(0.17-0.88y)$ or less, and most preferably $(1-x)(0.16-0.88y)$ or less. When z is less than the lower limit, the electrical conductivity decreases, and when z exceeds the upper limit, performance of a secondary battery using the same may be degraded, e.g., the battery capacity may decrease, since the amount of substitution of the transition metal sites becomes excessively large. When z is excessively large, the active substance powder exhibits an increased carbonic acid gas absorbency and easily absorbs carbonic acid gas in the atmosphere. Presumably, the carbon concentration increases as a result.

Within the composition range of formula (II) above, the closer the z value to the lower limit which is the stoichiometric ratio, the more notable the tendency that the rate characteristics and output characteristics of a battery fabricated therewith are degraded. Conversely, the closer the z value to the upper limit, the higher the rate characteristics and the output characteristics of a battery fabricated therewith, but the capacity tends to decrease on the other hand. When the y value is close to the lower limit, i.e., when the manganese/nickel atomic ratio is small, the capacity is achieved with a low charge voltage but the cycle characteristics and the safety of a battery for which a high charge voltage has been set tend to decrease. Conversely, when the y value is close to the upper limit, the cycle characteristics and the safety of the battery for which a high charge voltage has been set improve on one hand but the discharge capacity, the rate characteristics, and the output characteristics tend to decrease on the other hand. When the x value is close to the lower limit, the load characteristics such as rate characteristics and output characteristics of a battery fabricated therewith tend to decrease. In contrast, when the x value is close to the upper limit, the cycle characteristics and the safety of a battery fabricated therewith improve. However, the cycle characteristics and the safety of the battery for which a high charge voltage has been set decrease and the costs for raw materials increase when the value exceeds the upper limit. Adjusting the composition parameters x, y, and z within the defined ranges described above is an important constitutional element of the first invention.

The chemical significance of the Li composition (z and x) in the lithium nickel manganese cobalt-based composite oxide, which is a preferable composition of the lithium transition metal-based compound powder of the first invention, will now be described in detail.

As previously mentioned, the layer structure is not necessarily limited to the R(−3)m structure but from the aspect of electrochemical performance, the layer structure is preferably capable of belonging to the R(−3)m structure.

In order to determine the x, y, and z of the composition formula of the lithium nickel manganese cobalt-based composite oxide, the respective transition metals and Li are analyzed with an inductively coupled plasma-atomic emission spectrometry (ICP-AES) analyzer to determine the Li/Ni/Mn/Co ratio.

From the structural viewpoint, Li associated with z is considered to lie in the same transition metal site by substitution. Here, Li associated with z increases the average valence of Ni to greater than 2 (trivalent Ni is generated) because of the principle of charge neutrality. Since z increases the average valence of Ni, it serves as an indicator of the Ni valence (the proportion of Ni(III)).

When the Ni valence (m) associated with changes in z is calculated on the basis of the composition formula above provided that the Co valence is 3 and the Mn valence is 4, the result is as follows:

$$m=2[2-(1-x-z)/(1-x)(1+y)]$$

This calculation result means that the Ni valence is not solely determined by z but is a function of x and y. If z=0 and y=0, then the Ni valence remains 2 irrespective of the value of x. That the value of z is negative means that the Li content in the active substance is short of the stoichiometric content. If the negative value is excessively large, the effects of the first invention may not be exhibited. On the other hand, this means that even when the z value is the same, the Ni valence will be higher for a composition that is rich in Ni (with a large y value) and/or rich in Co (with a large x value). When the powder is used in a battery, the rate characteristics and the output characteristics will be high but the capacity decreases easily. Hence, the upper limit and the lower limit of the z value are preferably defined as the function of x and y.

When the Co content is small, i.e., the x value is $0 \le x \le 0.1$, the cost is reduced and the charge/discharge capacity, the cycle characteristics, and the safety improve in the case where the powder is used in a lithium secondary battery designed to be charged at a high charge potential.

<Lattice Constant>

In the first invention, the lithium nickel manganese cobalt-based composite oxide powder having a composition satisfying composition formulae (I) and (II) preferably has a crystal structure that includes a layer R(-3)m structure and the lattice constants thereof are preferably in the ranges of 2.870 Å$\le$a$\le$2.890 Å and 14.250$\le$c$\le$14.310 Å. In the first invention, the crystal structure and the lattice constants can be obtained by powder X-ray diffraction analysis using a CuKα line.

In the first invention, the lattice constant a (Å) is usually 2.870 Å$\le$a$\le$2.890 Å, preferably 2.873 Å$\le$a$\le$2.888 Å, more preferably 2.875 Å$\le$a$\le$2.885 Å, and particularly preferably 2.877 Å$\le$a$\le$2.883 Å. The lattice constant c (Å) is usually 14.250$\le$c$\le$14.310 Å, preferably 14.260$\le$c$\le$14.305 Å, more preferably 14.265$\le$c$\le$14.300 Å, and particularly preferably 14.270$\le$c$\le$14.295 Å.

<Powder X-Ray Diffraction Peak>

In the first invention, the lithium nickel manganese cobalt-based composite oxide powder having a composition satisfying composition formulae (I) and (II) is preferably in the range of 0.01$\le$FWHM(110)$\le$0.5 where FWHM(110) is the half width of a (110) diffraction peak present near a diffraction angle 2θ of 64.5° in a powder X-ray diffraction pattern using a CuKα line.

In general, the half width of the X-ray diffraction peak is used as the measure of crystallinity. Due to the correlation between the crystallinity and the battery performance, when the value of the half width of the (110) diffraction peak present near a diffraction angle 2θ of 64.5° is within the particular range mentioned above, good battery performance is exhibited.

In the first invention, FWHM(110) is usually 0.01 or more, preferably 0.05 or more, more preferably 0.10 or more, yet more preferably 0.12 or more, and most preferably 0.14 or more and 0.5 or less, preferably 0.45 or less, and most preferably 0.4 or less.

In the first invention, the lithium nickel manganese cobalt-based composite oxide powder having a composition satisfying composition formulae (I) and (II) preferably has no diffraction peaks derived from heterogeneous phases at a higher angle side of the respective peak tops of the (018) diffraction peak present near a diffraction angle 2θ of 64°, the (110) diffraction peak present near 64.5°, and the (113) diffraction peak present near 68°. Alternatively, when the powder has diffraction peaks derived from the heterogeneous phases, the integrated intensity ratios of the heterogeneous phase peaks to the diffraction peaks of the original crystal phases preferably fall in the following respective ranges:

$$0 \le I_{018}*/I_{018} \le 0.20$$

$$0 \le I_{110}*/I_{110} \le 0.25$$

$$0 \le I_{113}*/I_{113} \le 0.50$$

where $I_{018}$, $I_{110}$, and $I_{113}$ respectively represent integrated intensities of the (018), (110), and (113) diffraction peaks and $I_{018}*$, $I_{110}*$, and $I_{113}*$ respectively represent integrated intensities of diffraction peaks that are derived from heterogeneous phases and appear at the higher angle side of the peak tops of the (018), (110), and (113) diffraction peaks.

Although the details of the substances that cause the diffraction peaks derived from heterogeneous phases are not clear, the capacity, the rate characteristics, the cycle characteristics, and the like of a battery fabricated therefrom will decrease when heterogeneous phases are contained. Thus, the diffraction peaks may exist as long as the diffraction peaks do not adversely affect the battery performance of the first invention but are preferably within the ranges mentioned above. The integrated intensity ratios of the diffraction peaks derived from the heterogeneous phases to the respective diffraction peaks are usually $I_{018}*/I_{118} \le 0.20$, $I_{110}*/I_{110} \le 0.25$, and $I_{113}*/I_{113} \le 0.50$, preferably $I_{018}*/I_{018} \le 0.18$, $I_{110}*/I_{110} \le 0.20$, and $I_{113}*/I_{113} \le 0.45$, more preferably $I_{018}*/I_{018} \le 0.16$, $I_{110}*/I_{110} \le 0.15$, and $I_{113}*/I_{113} \le 0.40$, and more preferably $I_{018}*/I_{018} \le 0.14$, $I_{110}*/I_{110} \le 0.13$, and $I_{113}*/I_{113} \le 0.38$. Most preferably, there are no diffraction peaks derived from heterogeneous phases.

<Composition of Lithium Transition Metal-Based Compound>

The lithium transition metal-based compound according to the first invention preferably has a composition represented by formula (III) below and Q in formula (III) is particularly preferably represented by formula (IV) below.

$$[L]_{3a}[Q]_{3b}[O_2]_{6c} \quad (III)$$

In the formula (III), L is an element containing at least Li, Q is an element containing at least Ni, Mn, and Co or Li, Ni, Mn, and Co, 0.4$\le$Ni/(Mn+Ni+Co) molar ratio<0.7

0.1<Mn/(Mn+Ni+Co) molar ratio$\le$0.4

0.1$\le$Co/(Mn+Ni+Co) molar ratio$\le$0.3, and the Li molar ratio in Q is 0 or more and 0.05 or less; and wherein the subscripts next to [ ] indicate the sites in the crystal structure, the 3a site is the Li site, the 3b site is the transition metal site, and the 6c site is the oxygen site.

$$Q = Li_{r/(2+r)}(Ni_{1-p-q}Mn_pCo_q)_{2/(2+r)} \quad (IV)$$

in formula (IV), 0.1<p$\le$0.4

0.15$\le$q$\le$0.25, and 0.001$\le$r$\le$0.1

In formula (III), L is an element containing at least Ni, Mn, and Co, or Li. Examples of the elements other than Li include metal elements such as Ni, Mn, and Co.

Q is an element constituted by at least Ni, Mn, and Co or Li, Ni, Mn, and Co. The Ni/(Mn+Ni+Co) molar ratio is 0.4 or more, preferably 0.42 or more, more preferably 0.45 or more, and most preferably 0.48 or more and usually less than 0.7, preferably 0.68 or less, more preferably 0.65 or less, and most preferably 0.62 or less.

The Mn/(Mn+Ni+Co) molar ratio is more than 0.1, preferably 0.12 or more, more preferably 0.15 or more, and most preferably 0.18 or more and usually 0.4 or less, preferably 0.38 or less, more preferably 0.35 or less, and most preferably 0.32 or less.

The Co/(Mn+Ni+Co) molar ratio is 0.1 or more, preferably 0.12 or more, more preferably 0.15 or more, and most preferably 0.18 or more and usually 0.3 or less, preferably 0.30, more preferably 0.28 or less, yet more preferably 0.25 or less, and most preferably 0.22 or less.

The Li molar ratio in Q is 0 or more, preferably 0.001 or more, more preferably 0.005 or more, yet more preferably 0.01 or more, and most preferably 0.02 or more and usually 0.05 or less, preferably 0.045 or less, more preferably 0.04 or less, yet more preferably 0.035 or less, and most preferably 0.03 or less.

When the composition is outside the above-mentioned ranges, the effects aimed by the present invention may not be easily obtained.

In formula (III), although the atomic ratio of the oxygen content is indicated 2 for the convenience sake, some degree of non-stoichiometry is permitted. When there is non-stoichiometry, the atomic ratio of oxygen is usually in the range of 2±0.2, preferably in the range of 2±0.15, more preferably in the range of 2±0.12, yet more preferably in the range of 2±0.10, and particularly preferably in the range of 2±0.05.

In formula (IV) above, the value of p is usually more than 0.1, preferably 0.15 or more, more preferably 0.2 or more, yet more preferably 0.25 or more, and most preferably 0.28 or more and usually 0.4 or less, preferably 0.38 or less, more preferably 0.36 or less, yet more preferably 0.34 or less, and most preferably 0.32 or less.

The value of q is usually 0.15 or more, preferably 0.16 or more, and most preferably 0.18 or more and usually 0.25 or less, preferably 0.24 or less, more preferably 0.23 or less, and most preferably 0.22 or less.

The value of r is usually 0.001 or more, preferably 0.01 or more, more preferably 0.02 or more, yet more preferably 0.03 or more, and most preferably 0.04 or more and usually 0.1 or less, preferably 0.09 or less, more preferably 0.08 or less, and most preferably 0.075 or less. When the value is less then this lower limit, the electrical conductivity decreases. When the value exceeds this upper limit, the amount of substitution of the transition metal sites becomes excessively large, possibly resulting in performance degradation of a lithium secondary battery using this powder, such as lowering of the battery capacity. When r is excessively large, the active substance powder exhibits an increased carbonic acid gas absorbency and easily absorbs carbonic acid gas in the atmosphere. Presumably, the carbon concentration increases as a result.

Within the composition range of formula (IV) above, the closer the r value to the lower limit which is the stoichiometric ratio, the more notable the tendency that the rate characteristics and output characteristics of a battery fabricated therewith are degraded. Conversely, the closer the r value to the upper limit, the higher the rate characteristics and the output characteristics of a battery fabricated therewith, but the capacity tends to decrease on the other hand. When the p value is close to the lower limit, a high capacity is exhibited but the chemical stability and safety tend to decrease. Conversely, when the p value is close to the upper limit, the chemical stability and safety improve but the capacity tends to decrease. When the q value is close to the lower limit, the rate characteristics and the output characteristics tend to decrease. When the q value is close to the upper limit, the rate characteristics and the output characteristics increase. However, when the upper limit is exceeded, the cycle characteristics and safety decrease and the costs for raw materials increase. Adjusting the composition parameters p, q, and r within the defined ranges described above is an important constitutional element of the first invention.

The chemical significance of excess Li (r) in the preferable composition of the lithium transition metal-based compound powder of the first invention will now be described in detail.

As previously mentioned, the layer structure is not necessarily limited to the R(−3)m structure but from the aspect of electrochemical performance, the layer structure is preferably capable of belonging to the R(−3)m structure.

In order to determine the p, q, and r of the composition formula of the lithium transition metal-based compound, the respective transition metals and Li are analyzed with an inductively coupled plasma-atomic emission spectrometry (ICP-AES) analyzer to determine the Li/Ni/Mn/Co ratio.

From the structural viewpoint, Li associated with r is considered to lie in the same transition metal site by substitution. Here, Li associated with r increases the average valence of Ni (trivalent Ni is generated) because of the principle of charge neutrality. Since r increases the average valence of Ni, it serves as an indicator of the Ni valence (the proportion of Ni(III)).

When the Ni valence (m) associated with changes in r is calculated on the basis of the composition formula above provided that the Co valence is 3 and the Mn valence is 4, the result is as follows:

$$m = [3 - (p-r)/(1-p-q)]$$

This calculation result means that the Ni valence is not solely determined by r but is a function of p and q. This suggests that if p=r, i.e., if the Mn content equals the excess Li content, then the Ni valence is 3 irrespective of the q value (Co content). It also shows that when the r value (excess Li content) is 0 and p (Mn content)=1−p−q (Ni content), then the Ni valence is 2. This means that even when the r value is the same, the Ni valence will be higher for a composition that is rich in Ni (with a large 1−p−q value) and/or rich in Mn (with a small p value). When the powder is used in a battery, the rate characteristics and the output characteristics will be high but the capacity will decrease easily. [0124]

When the Co content is within an appropriate range, i.e., the q value is 0.15≤q≤0.25, the charge/discharge capacity and the rate characteristics improve and a battery having well balanced battery performance is obtained, which is favorable in terms of cost performance.

<Reasons Why the Lithium Transition Metal-Based Compound Powder of the First Invention Achieves the Above-Described Effects>

Reasons why the lithium transition metal-based compound powder of the first invention achieves the above-described effects are presumably as follows.

That is, according to the lithium transition metal-based compound powder of the first invention, highly crystalline fine primary particles are aggregated to form spherical secondary particles. Thus, the bulk density is high and the interiors of the secondary particles have adequate gaps. When a battery is fabricated using this powder, not only the contact area between the positive electrode active substance surfaces and the electrolytic solution can increase, but also the additive element is concentrated in the particle surfaces and a specific continuous slope structure that has a concentration gradient in the depth direction is formed. Thus, presumably, the resistance at the active substance-electrolytic solution interface is reduced, the lithium diffusion inside particles improves, and the electrode density and the load characteristics improve to practical levels.

[Method for Manufacturing the Lithium Transition Metal-Based Compound Powder for the Lithium Secondary Battery Positive Electrode Material of the First Invention]

A method for manufacturing the lithium transition metal-based compound powder for the lithium secondary battery positive electrode material of the first invention is described below.

The method for manufacturing the lithium transition metal-based compound powder of the first invention is not limited to a particular manufacturing method. However, the lithium transition metal-based compound powder for the lithium secondary battery positive electrode material of the first invention is preferably manufactured by a method that includes a slurry preparation step of grinding an additive that suppresses particle growth and sintering during firing and at least one transition metal compound selected from V, Cr, Mn, Fe, Co, Ni, and Cu in a liquid medium to obtain a homogeneously dispersed slurry, a spray-drying step of spray-drying the resulting slurry, a mixed powder preparation step of mixing the resulting spray-dried substance (sometimes referred to as "spray-dried substance of the first invention" hereinafter) and a lithium compound, a firing step of firing the resulting mixed powder, and a step of classifying the resulting fired substance.

For example, a lithium nickel manganese cobalt-based composite oxide powder is used as an example in the description. This powder can be manufactured by grinding, in a liquid medium, a nickel compound, a manganese compound, a cobalt compound, and an additive that suppresses particle growth and sintering during firing, mixing a spray-dried substance obtained by spray-drying a slurry, which is a homogeneous mixture of these compounds and the additive, with a lithium compound, firing the resulting mixed powder fired in an oxygen-containing gas atmosphere, and classifying the fired powder.

The method for manufacturing the lithium transition metal-based compound powder of the first invention is described in detail below by using as an example the method for manufacturing a lithium nickel manganese cobalt-based composite oxide powder, which is a preferred embodiment of the first invention.

<Slurry Preparation Step>

Among the raw material compounds used in preparing the slurry in manufacturing the lithium nickel manganese cobalt-based composite oxide powder by the method of the first invention, the nickel compound is, for example, $Ni(OH)_2$, NiO, NiOOH, $NiCO_3$, $2NiCO_3 \cdot 3Ni(OH)_2 \cdot 4H_2O$, $NiC_2O_4 \cdot 2H_2O$, $Ni(NO_3)_2 \cdot 6H_2O$, $NiSO_4$, $NiSO_4 \cdot 6H_2O$, nickel fatty acid, nickel halide, or the like. Among these, nickel compounds that do not generate toxic substances such as $SO_x$, $NO_x$, and the like during the firing treatment are preferred. Examples of such nickel compounds are $Ni(OH)_2$, NiO, NiOOH, $NiCO_3$, $2NiCO_3 \cdot 3Ni(OH)_2 \cdot 4H_2O$, and $NiC_2O_4 \cdot 2H_2O$. From a viewpoint of availability at a low cost as the industrial raw materials and a viewpoint of high reactivity, $Ni(OH)_2$, NiO, NiOOH, and $NiCO_3$ are preferred. From a viewpoint that gaps can be easily formed in the secondary particles of the spray-dried powder due to generation of decomposition gas during firing, $Ni(OH)_2$, NiOOH, and $NiCO_3$ are particularly preferred. These nickel compounds may be used alone or in combination of two or more.

Examples of the manganese compound include manganese oxides such as $Mn_2O_3$, $MnO_2$, and $Mn_3O_4$, manganese salts such as $MnCO_3$, $Mn(NO_3)_2$, $MnSO_4$, manganese acetate, manganese dicarboxylate, manganese citrate, and manganese fatty acid salts, oxyhydroxide, and halides such as manganese chloride. Among these manganese compounds, $MnO_2$, $Mn_2O_3$, $Mn_3O_4$, and $MnCO_3$ are preferred since they do not generate gas such as $SO_x$, $NO_x$, and the like during firing and are available at a low cost as the industrial raw materials. These manganese compounds may be used alone or in combination of two or more.

Examples of the cobalt compound include $Co(OH)_2$, CoOOH, CoO, $Co_2O_3$, $Co_3O_4$, $Co(OCOCH_3)_2 \cdot 4H_2O$, $CoCl_2$, $Co(NO_3)_2 \cdot 6H_2O$, $Co(SO_4)_2 \cdot 7H_2O$, and $CoCO_3$. Among these, $Co(OH)_2$, CoOOH, CoO, $Co_2O_3$, $Co_3O_4$, and $CoCO_3$ are preferable because they do not generate toxic substances such as $SO_x$ and $NO_x$ during the firing step. $Co(OH)_2$ and CoOOH are more preferable from the viewpoints of industrial availability at a low cost and high reactivity. In addition, from the viewpoint of ease of forming gaps in the secondary particles of the spray-dried substance by generation of decomposition gas during firing or the like, $Co(OH)_2$, CoOOH, and $CoO_3$ are particularly preferable. These cobalt compounds may be used alone or in combination of two or more.

In addition to the Ni, Mn, and Co raw material compounds mentioned above, at least one compound group may be used to introduce the aforementioned other elements by substitution.

The type of the additive that suppresses the particle growth and sintering during firing is not particularly limited as long as the target effect is exhibited as described above. However, a compound that contains an element selected from Mo, W, Nb, Ta, and Re that can yield a stable high valence state is preferred and an oxide material is usually used.

Example compounds of the additive that suppresses particle growth and sintering during firing are MoO, $MoO_2$, $MoO_3$, $MoO_x$, $Mo_2O_3$, $Mo_2O_5$, $Li_2MoO_4$, WO, $WO_2$, $WO_3$, $WO_x$, $W_2O_3$, $W_2O_5$, $W_{18}O_{49}$, $W_{20}O_{58}$, $W_{24}O_{70}$, $W_{25}O_{73}$, $W_{40}O_{118}$, $Li_2WO_4$, NbO, $NbO_2$, $Nb_2O$, $Nb_2O_5$, $Nb_4O$, $Nb_6O$, $LiNbO_3$, TaO, $TaO_2$, $Ta_2O_5$, $LiTaO_3$, $ReO_2$, $ReO_3$, and $Re_2O_3$. $MoO_3$, $Li_2MO_4$, $WO_3$, $Li_2WO_4$, $LiNbO_3$, $Ta_2O_5$, $LiTaO_3$, and $ReO_3$ are preferred and $WO_3$, $Li_2WO_4$, and $ReO_3$ are particularly preferable. These additives may be used alone or in combination of two or more.

As for range of the amount of the additives added, the additive element content in the resulting lithium nickel manganese cobalt-based composite oxide powder is usually 0.01 mol % or more, preferably 0.03 mol % or more, more preferably 0.04 mol % or more, and particularly preferably 0.05 mol % or more and usually less than 2 mol %, preferably 1.8 mol % or less, more preferably 1.5 mol % or less, and particularly preferably 1.3 mol % or less relative to the total molar amount of the constitutional metal elements other than the additive element and Li. When the additive element content is lower than the lower limit, the effects described above may not be obtained. When the additive element content exceeds the upper limit, degradation of the battery performance may result.

The target Ni/Mn/Co/additive element/other element molar ratio can be controlled by adjusting the mixing ratio of the individual compounds in preparing a slurry in which the nickel compound, the manganese compound, the cobalt compound, the additive that suppresses particle growth and sintering during firing, and other elements used as occasion demands are dispersed in a liquid medium.

The method for mixing the raw materials is not particularly limited and may be of a wet type or a dry type. Examples of the method include methods that use devices such as a ball mill, a vibration mill, and a bead mill. Wet mixing according to which raw material compounds are mixed in a liquid medium such as water or alcohol is preferred since it can achieve more homogeneous mixing and increases the reactivity of the mixture in the firing step.

The mixing time differs depending on the mixing method and can be any as long as the raw materials are homogeneously mixed on a particle level. For example, the mixing time is usually about 1 hour to 2 days with a ball mill (wet or dry) and the residence time is usually about 0.1 hours to 6 hours for a bead mill (wet continuous method).

In the stage of mixing the raw materials, grinding of the raw materials is preferably simultaneously performed. The particle diameter of the raw material particles after grinding serves as the indicator of the extent of grinding. The average particle diameter (median diameter) is usually 0.4 μm or less, preferably 0.3 μm or less, more preferably 0.25 μm or less, and most preferably 0.2 μm or less. When the average particle diameter of the raw material particles after grinding is excessively large, not only the reactivity in the firing step will decrease but also it will become difficult to homogenize the composition. However, since excessive grinding leads to an increase in cost of grinding, it is sufficient to perform grinding so that the average particle diameter is usually 0.01 μm or more, preferably 0.02 μm or more, and more preferably 0.05 μm or more. The means for achieving such an extent of grinding is not particularly limited but a wet grinding method is preferred. A specific example is a DYNO mill or the like.

In the first invention, the median diameter of the ground particles in the slurry is measured with a known laser diffraction/scattering particle size distribution analyzer at a refractive index of 1.24 using the volume as the particle diameter basis. In the first invention, a 0.1 wt % aqueous sodium hexametaphosphate solution was used as the dispersion medium used for the measurement and measurement was conducted after 5 minutes of ultrasonic dispersion (output: 30 W, frequency: 22.5 kHz). As for the median diameter of the spray-dried powder described below, measurement was made under the same conditions except that the measurement was conducted after conducting ultrasonic dispersion for 0, 1, 3, and 5 minutes.

<Spray-Drying Step>

After the wet mixing, a drying step is usually performed. The drying method is not particularly limited but is preferably spray-drying from viewpoints of homogeneity and powder fluidity of the generated granular substance, powder handling performance, and efficient production of dry particles.

<Spray-Dried Powder>

According to the method for manufacturing the lithium transition metal-based compound powder such as a lithium nickel manganese cobalt-based composite oxide powder of the first invention, a slurry obtained by wet-grinding the raw material compounds and the additive is spray-dried to obtain a powder constituted by spherical secondary particles formed by aggregation of primary particles. The spray-dried powder in which primary particles are aggregated to form spherical secondary particles is the shape feature of the spray-dried powder of the first invention. Examples of the method for confirming the shape include SEM observation and cross-sectional SEM observation.

The median diameter of the spray-dried powder, i.e., a firing precursor of the lithium transition metal-based compound powder such as the lithium nickel manganese cobalt-based composite oxide powder of the first invention, is adjusted to usually 23 μm or less, preferably 18 μm or less, more preferably 13 μm or less, and most preferably 11 μm or less (the value here is measured without conducting ultrasonic dispersion). However, there is a tendency that excessively small particles are difficult to obtain. Thus, the median diameter is usually 3 μm or more, preferably 4 μm or more, and more preferably 5 μm or more. When a granular substance is manufactured by a spray-drying method, the particle diameter can be controlled by adequately selecting the type of spraying, the pressurized gas flow feed rate, the slurry feed rate, the drying temperature, etc. The upper limit of the median diameter of the spray-dried particles measured after 5 minutes of ultrasonic dispersion "Ultra Sonic" (output: 30 W, frequency: 22.5 kHz) is usually 20 μm or less, preferably 15 μm or less, more preferably 10 μm or less, and most preferably 8 μm or less. The lower limit is usually 3 μm or more, preferably 3.5 μm or more, more preferably 4 μm or more, and most preferably 4.5 μm or more. When granular substance is manufactured by a spray-drying method, the particle diameter can be controlled by adequately selecting the type of spraying, the pressurized gas flow feed rate, the slurry feed rate, the drying temperature, etc.

In other words, for example, after a slurry in which a nickel compound, a manganese compound, a cobalt compound, and an additive that suppresses particle growth and sintering during firing are dispersed in a liquid medium is spray-dried, the resulting powder and a lithium compound are mixed with each other, fired, and classified to manufacture a lithium transition metal-based compound powder such as a lithium nickel manganese cobalt-based composite oxide powder. Herein, the spray-drying is conducted under the conditions that the slurry viscosity V is 50 cp≤V≤4000 cp and the gas-liquid ratio G/S is 500≤G/S≤1000 where V (cp) is the slurry viscosity during spray-drying, S (L/min) is the slurry feed rate, and G (L/min) is the gas feed rate.

When the slurry viscosity V (cp) is excessively low, it may become difficult to obtain a powder containing secondary particles formed by aggregation of primary particles. When excessively high, the feed pumps may go down or nozzles may become clogged. Thus, the lower limit value of the slurry viscosity V (cp) is usually 50 cp or more, preferably 100 cp or more, more preferably 300 cp or more, and most preferably 500 cp or more and the upper limit value is usually 4000 pc or less, preferably 3500 cp or less, more preferably 3000 cp or less, and most preferably 2500 cp or less.

When the gas-liquid ratio G/S is lower than the above-mentioned lower limit, the size of secondary particles easily increases and the drying property may degrade. When higher than the upper limit, the productivity may decrease. Accordingly, the lower limit value of the gas-liquid ratio G/S is usually 500 or more, preferably 1000 or more, more preferably 1500 or more, and most preferably 1800 or more and the upper limit value is usually 10000 or less, preferably 9000 or less, more preferably 8000 or less, and most preferably 7500 or less.

The slurry feed rate S and the gas feed rate G are adequately set according to the viscosity of the slurry to be spray-dried, the specifications of the spray-drying apparatus used, etc.

In the method of the first invention, spray drying is sufficiently conducted as long as the gas-liquid ratio G/S described above is satisfied by satisfying the slurry viscosity V (cp) above and controlling the slurry feed rate and the gas feed rate according to the specifications of the spray-drying apparatus used. Other conditions are appropriately set according to the type of apparatuses and the like but preferably following conditions are selected.

That is, the slurry is spray dried at a temperature of usually 50° C. or more, preferably 70° C. or more, more preferably 120° C. or more, and most preferably 140° C. or more and usually 300° C. or less, preferably 250° C. or less, more preferably 200° C. or less, and most preferably 180° C. or less. When the temperature is excessively high, the resulting aggregated particles may contain many hollow structures and the filling density of the powder may decrease. When the temperature is excessively low, problems such as sticking of powder and clogging caused by dewing at the powder exit section may arise.

The spray-dried powder of the first invention features strong cohesion between primary particles and this can be confirmed by investigating the extent of changes in median diameter caused by ultrasonic dispersion of the spray-dried substance of the first invention. For example, when the difference between the median diameter (μm) measured without conducting ultrasonic dispersion and the median diameter (μm) measured after 5 minutes of ultrasonic dispersion is represented by $\Delta D_{50}$, the lower limit thereof is usually 0 μm or more and preferably 0.1 μm or more. The upper limit thereof is usually 3 μm or less, preferably 2.5 μm or less, and more preferably 2 μm or less. Lithium transition metal-based compound particles prepared by firing spray-dried particles having $\Delta D_{50}$ exceeding the above-mentioned value have weak cohesion between primary particles and break up easily. Thus, problems such as a decrease in bulk density and degradation of coating characteristics may easily arise.

The bulk density of the spray-dried powder of the first invention is usually 0.1 g/cm$^3$ or more, preferably 0.3 g/cm$^3$ or more, more preferably 0.5 g/cm$^3$ or more, and most preferably 0.7 g/cm$^3$ or more and usually 1.7 g/cm$^3$ or less, preferably 1.6 g/cm$^3$ or less, more preferably 1.5 g/cm$^3$ or less, and most preferably 1.4 g/cm$^3$ or less. When the bulk density is lower than this lower limit, the powder filling property and handling of the powder may be adversely affected. When the bulk density is higher than the upper limit, although the powder filling property and handling of the powder may improve, the specific surface area may become excessively small and the reactivity during the firing step may decrease.

When the specific surface area of the spray-dried substance of the first invention is small, the reactivity between the raw material compounds decreases in the subsequent firing step. Thus, as mentioned above, the specific surface area is preferably increased as much as possible by means such as grinding the starting materials before spray-drying. On the other hand, excessively increasing the specific surface area not only is industrially disadvantageous but also may lead to failure in obtaining a lithium transition metal-based compound such as a lithium nickel manganese cobalt-based composite oxide of the first invention. Thus, the BET specific surface area of the resulting spray-dried powder is usually 50 m$^2$/g or more, preferably 60 m$^2$/g or more, more preferably 70 m$^2$/g or more, and most preferably 80 m$^2$/g or more and usually 200 m$^2$/g or less, preferably 150 m$^2$/g or less, more preferably 120 m$^2$/g or less, and most preferably 100 m$^2$/g or less.

<Mixed Powder Preparation Step>

The spray-dried substance obtained in the spray-drying step is then subjected to a mixing treatment with a lithium compound raw material. Although the technique of mixing the lithium compound with the spray-dried particles is not particularly limited, an industrial powder mixing apparatus commonly used is preferably used. The atmosphere in the system to be mixed is preferably an inert gas atmosphere to prevent absorption of carbonic acid in the atmosphere.

Examples of the lithium compound mixed with the aggregated particles obtained by spray-drying include Li$_2$CO$_3$, LiNO$_3$, LiNO$_2$, LiOH, LiOH.H$_2$O, LiH, LiF, LiCl, LiBr, LiI, CH$_3$OOLi, Li$_2$O, Li$_2$SO$_4$, lithium dicarboxylate, lithium citrate, lithium fatty acid, and alkyl lithium. Of these lithium compounds, lithium compounds that are free of nitrogen atoms, sulfur atoms, and halogen atoms are preferred since they do not generate toxic substances such as SO$_x$ and NO$_x$ during firing and that relatively do not generate decomposition gas during firing are preferred. From these points, Li$_2$CO$_3$, LiOH, and LiOH.H$_2$O are preferred, and among these, Li$_2$CO$_3$ is preferred since it is easy to handle and relatively inexpensive. These lithium compounds may be used alone or in combination of two or more.

To improve the mixing property with the spray-dried substance obtained by spray-drying and to enhance the battery performance, the particle diameter of the lithium compound in terms of average particle diameter is usually 500 μm or less, preferably 100 μm or less, more preferably 50 μm or less, and most preferably 20 μm or less. On the other hand, when the particle diameter is excessively small, the stability in atmosphere is low; hence, the average particle diameter is usually 0.01 μm or more, preferably 0.1 μm or more, more preferably 0.2 μm or more, and most preferably 0.5 μm or more.

The average particle diameter of the lithium compound is measured with a known laser diffraction/scattering particle size distribution analyzer using the volume as the particle diameter basis. In the first invention, ethyl alcohol is used as the dispersion medium used in the measurement and the measurement was conducted after 5 minutes of ultrasonic dispersion (output: 30 W, frequency: 22.5 kHz).

In this mixed powder preparation step, during mixing of the lithium compound raw material with the spray-dried substance, the mixing ratio of Li to (Ni+Mn+Co) is adjusted to control the target Li/(Ni+Mn+Co) molar ratio.

<Firing Step>

The mixed powder obtained as such is then subjected to a firing treatment. In the first invention, "mixed powder" means the precursor of the lithium transition metal-based compound, such as a lithium nickel manganese cobalt-based composite oxide, obtained by mixing the spray-dried powder and the lithium compound raw material before firing.

The firing conditions depend upon the composition and the lithium compound raw material used. As a tendency, primary particles grow excessively, sintering between particles progresses excessively, and the specific surface area becomes excessively small when the firing temperature is excessively high. Conversely, when the firing temperature is excessively low, heterogeneous phases become mixed and the lattice strain increases due to non-development of crystal structures. Moreover, the specific surface area becomes excessively large. Thus, the firing temperature is usually 700° C. or more and 1300° C. or less. The firing temperature for manufacturing the lithium nickel manganese cobalt-based composite oxide powder having a composition represented by formula (I) above is usually 900° C. or more, preferably 920° C. or more, more preferably 940° C. or more, yet more preferably 950° C. or more, and most preferably 960° C. or more and usually 1200° C. or less, preferably 1175° C. or less, more preferably 1150° C. or less, and most preferably 1125° C. or less. In manufacturing the lithium nickel manganese cobalt-based composite oxide powder having a composition represented by formulae (I) and (II) above is usually 900° C. or more, more preferably 950° C. or more, yet more preferably 970° C. or more, and most preferably 990° C. or more and usually 1200° C. or less, preferably 1175° C. or less, more preferably 1150° C. or less, and most preferably 1125° C. or less.

For firing, a box furnace, a tubular furnace, a tunnel furnace, a rotary kiln, or the like can be used, for example. The firing step is usually divided into three portions: heating, retaining the maximum temperature, and cooling. The second portion involving retaining the maximum temperature is not necessarily conducted once and may include two or more stages depending on the purpose. The process of heating, retaining the maximum temperature, and cooling may be conducted twice or more with interruption of a pulverizing step of cancelling the aggregation to an extent that does not break the secondary particles or a grinding step of grinding down to the primary particles or finer powder.

In the heating step, the interior of the furnace is usually heated at a heating rate of 1° C./min or more and 10° C./min or less. An excessively low heating rate is industrially disadvantageous since the required time is longer, but the furnace temperature does not follow the set temperature if the heating rate is excessively high depending on the furnace. The heating rate is preferably 2° C./min or more and more preferably 3° C./min or more and preferably 7° C./min or less and more preferably 5° C./min or less.

The retention time in the maximum temperature-retaining step differs depending on the temperature but is usually 30 min or more, preferably 1 hour or more, more preferably 3 hours or more, and most preferably 5 hours or more and 50 hours or less, preferably 25 hours or less, more preferably 20 hours or less, and most preferably 15 hours or less in the above-described temperature range. When the firing time is excessively short, it becomes difficult to obtain a lithium transition metal-based compound powder having good crystallinity. An excessively long firing time is not practical. An excessively long firing time is disadvantageous since pulverization is required subsequently or becomes difficult.

In the cooling step, the interior of the furnace is cooled at a cooling rate of usually 0.1° C./min or more and 10° C./min or less. An excessively low cooling rate is industrially disadvantageous since the required time is longer, but the homogeneity of the target substance tends to be insufficient and the deterioration of the container tends to be accelerated if the cooling rate is excessively high. The cooling rate is preferably 1° C./min or more, more preferably 3° C./min or more and preferably 7° C./min or less and more preferably 5° C./min or less.

As for the atmosphere during firing, since the optimum oxygen partial pressure region depends on the composition of the lithium transition metal-based compound powder to be obtained, various suitable gas atmospheres that satisfy such a range are used. Examples of the gas atmosphere include oxygen, air, nitrogen, argon, hydrogen, carbon dioxide, and mixed gases thereof. An oxygen-containing gas atmosphere such as air can be used for the lithium nickel manganese cobalt-based composite oxide powder which is a specific embodiment of the first invention. The oxygen concentration in the atmosphere is usually 1 vol % or more, preferably 10 vol % or more, and more preferably 15 vol % or more and 100 vol % or less, preferably 50 vol % or less, and more preferably 25 vol % or less.

<Classifying Step>

The fired powder obtained as such is then subjected to a classification treatment. For the classification, for example, vibration classification using a sieve vibrator, centrifugal classification, suction classification, and the like may be used.

According to the lithium nickel manganese cobalt-based composite oxide powder of the first invention, such as a lithium nickel manganese cobalt-based composite oxide powder obtained as such, a lithium secondary battery positive electrode material that has a high bulk density, a high capacity, good load characteristics such as rate and output, and good performance balance is provided.

[Lithium Transition Metal-Based Compound Powder of Second Invention]

A lithium transition metal-based compound powder for a lithium secondary battery positive electrode material of a second invention is described below.

The lithium transition metal-based compound powder for a lithium secondary battery positive electrode material of the second invention (also referred to as "positive electrode active substance" hereinafter) has a composition represented by formula (III) below and is characterized in that at least one element selected from Mo, W, Nb, Ta, and Re is contained at a ratio of 0.1 mol % or more and 5 mol % or less relative to the total molar amount of Mn, Ni, and Co in formula (III).

$$[L]_{3a}[Q]_{3b}[O_2]_{6c} \quad (III)$$

in the formula (III), L is an element containing at least Li, Q is an element containing at least Ni, Mn, and Co or Li, Ni, Mn, and Co, $$0.4 \leq Ni/(Mn+Ni+Co) \text{ molar ratio} < 0.7$$

$$0.1 < Mn/(Mn+Ni+Co) \text{ molar ratio} \leq 0.4$$

$$0.1 \leq Co/(Mn+Ni+Co) \text{ molar ratio} \leq 0.3, \text{ and}$$

the Li molar ratio in Q is 0 or more and 0.05 or less; and
wherein the subscripts next to [ ] indicate the sites in the crystal structure, the 3a site is the Li site, the 3b site is the transition metal site, and the 6c site is the oxygen site.

<Composition>

The lithium transition metal-based compound powder of the second invention is a lithium transition metal-based composite oxide powder represented by formula (III) above.

L is an element containing at least Li. Examples of the elements other than Li include metal elements such as Ni, Mn, and Co.

Q is an element constituted by at least Ni, Mn, and Co or Li, Ni, Mn, and Co. The Ni/(Mn+Ni+Co) molar ratio is 0.4 or more, preferably 0.42 or more, more preferably 0.45 or more, and most preferably 0.48 or more and usually less than 0.7, preferably 0.68 or less, more preferably 0.65 or less, and most preferably 0.62 or less.

The Mn/(Mn+Ni+Co) molar ratio is more than 0.1, preferably 0.12 or more, more preferably 0.15 or more, and most preferably 0.18 or more and usually 0.4 or less, preferably 0.38 or less, more preferably 0.35 or less, and most preferably 0.32 or less.

The Co/(Mn+Ni+Co) molar ratio is 0.1 or more, preferably 0.12 or more, more preferably 0.15 or more, and most preferably 0.18 or more and usually 0.3 or less, preferably 0.30, more preferably 0.28 or less, yet more preferably 0.25 or less, and most preferably 0.22 or less.

The Li molar ratio in Q is 0 or more, preferably 0.001 or more, more preferably 0.005 or more, yet more preferably 0.01 or more, and most preferably 0.02 or more and usually 0.05 or less, preferably 0.045 or less, more preferably 0.04 or less, yet more preferably 0.035 or less, and most preferably 0.03 or less.

When the composition is outside the above-mentioned ranges, the effects aimed by the second invention may not be easily obtained.

In formula (III), although the atomic ratio of the oxygen content is indicated 2 for the convenience sake, some degree of non-stoichiometry is permitted. When there is non-stoichiometry, the atomic ratio of oxygen is usually in the range of 2±0.2, preferably in the range of 2±0.15, more preferably in the range of 2±0.12, yet more preferably in the range of 2±0.10, and particularly preferably in the range of 2±0.05.

The lithium transition metal-based compound powder of the second invention contains at least one element selected from Mo, W, Nb, Ta, and Re and may contain other element. This other element is at least one element selected from B, Na, Mg, Al, Si, K, Ca, Ti, V, Cr, Fe, Cu, Zn, Ga, Ge, Sr, Y, Zr, Ru, Rh, Pd, Ag, In, Sn, Sb, Te, Ba, Os, Ir, Pt, Au, Pb, Bi, La, Ce, Pr, Nd, Sm, Eu, Gd, Tb, Dy, Ho, Er, Tm, Yb, Lu, N, F, P, S, Cl, Br, and I. These other elements may be incorporated inside the crystal structure of the lithium nickel manganese cobalt-based composite oxide or may localize at particle surfaces or crystal grain boundaries by taking an elemental form or a compound form without being incorporated inside the crystal structure of the lithium nickel manganese cobalt-based composite oxide. In the invention of the present application, the element containing Mo, W, Nb, Ta, or Re is sometimes referred to as "additive element" or "additive".

<Preferable Composition>

In the lithium transition metal-based composite oxide powder for a lithium secondary battery positive electrode material of the second invention, the atomic composition in the Q site in composition formula (III) is particularly preferably represented by formula (IV) below.

$$Q=Li_{r/(2+r)}(Ni_{1-p-q}Mn_pCo_q)_{2/(2+r)} \quad (IV)$$

in formula (IV),
0.1<p≤0.4
0.15≤q≤0.25, and
0.001≤r≤0.1

In formula (IV) above, the value of p is usually more than 0.1, preferably 0.15 or more, more preferably 0.2 or more, yet more preferably 0.25 or more, and most preferably 0.28 or more and usually 0.4 or less, preferably 0.38 or less, more preferably 0.36 or less, yet more preferably 0.34 or less, and most preferably 0.32 or less.

The value of q is usually 0.15 or more, preferably 0.16 or more, and most preferably 0.18 or more and usually 0.25 or less, preferably 0.24 or less, more preferably 0.23 or less, and most preferably 0.22 or less.

The value of r is usually 0.001 or more, preferably 0.01 or more, more preferably 0.02 or more, yet more preferably 0.03 or more, and most preferably 0.04 or more and usually 0.1 or less, preferably 0.09 or less, more preferably 0.08 or less, and most preferably 0.075 or less. When the value is less then this lower limit, the electrical conductivity decreases. When the value exceeds this upper limit, the amount of substitution of the transition metal sites becomes excessively large, possibly resulting in performance degradation of a lithium secondary battery using this powder, such as lowering of the battery capacity. When r is excessively large, the active substance powder exhibits an increased carbonic acid gas absorbency and easily absorbs carbonic acid gas in the atmosphere. Presumably, the carbon concentration increases as a result.

Within the composition range of formula (IV) above, the closer the r value to the lower limit which is the stoichiometric ratio, the more notable the tendency that the rate characteristics and output characteristics of a battery fabricated therewith are degraded. Conversely, the closer the r value to the upper limit, the higher the rate characteristics and the output characteristics of a battery fabricated therewith, but the capacity tends to decrease on the other hand. When the p value is close to the lower limit, a high capacity is exhibited but the chemical stability and safety tend to decrease. Conversely, when the p value is close to the upper limit, the chemical stability and safety improve but the capacity tends to decrease. When the q value is close to the lower limit, the rate characteristics and the output characteristics tend to decrease. When the q value is close to the upper limit, the rate characteristics and the output characteristics increase. However, when the upper limit is exceeded, the cycle characteristics and safety decrease and the costs for raw materials increase. Adjusting the composition parameters p, q, and r within the defined ranges described above is an important constitutional element of the second invention.

The chemical significance of excess Li (r) in the preferable composition of the lithium transition metal-based compound powder of the second invention will now be described in detail.

As previously mentioned, the layer structure is not necessarily limited to the R(-3)m structure but from the aspect of electrochemical performance, the layer structure is preferably capable of belonging to the R(-3)m structure.

In order to determine the p, q, and r of the composition formula of the lithium transition metal-based compound, the respective transition metals and Li are analyzed with an inductively coupled plasma-atomic emission spectrometry (ICP-AES) analyzer to determine the Li/Ni/Mn/Co ratio.

From the structural viewpoint, Li associated with r is considered to lie in the same transition metal site by substitution. Here, Li associated with r increases the average valence of Ni (trivalent Ni is generated) because of the principle of charge neutrality. Since r increases the average valence of Ni, it serves as an indicator of the Ni valence (the proportion of Ni(III)).

When the Ni valence (m) associated with changes in r is calculated on the basis of the composition formula above provided that the Co valence is 3 and the Mn valence is 4, the result is as follows:

$$m=[3-(p-r)/(1-p-q)]$$

This calculation result means that the Ni valence is not solely determined by r but is a function of p and q. This suggests that if p=r, i.e., if the Mn content equals the excess Li content, then the Ni valence is 3 irrespective of the q value (Co content). It also shows that when the r value (excess Li content) is 0 and p (Mn content)=1-p-q (Ni content), then the Ni valence is 2. This means that even when the r value is the same, the Ni valence will be higher for a composition that is rich in Ni (with a large 1-p-q value) and/or poor in Mn (with a small p value). When the powder is used in a battery, the rate characteristics and the output characteristics are high but the capacity decreases easily.

When the Co content is within an appropriate range, i.e., the q value is 0.15≤q≤0.25, the charge/discharge capacity and the rate characteristics improve and a battery having well balanced battery performance is obtained, which is favorable in terms of cost performance.

The lithium transition metal-based compound powder for the lithium secondary battery positive electrode material of the second invention contains a particular amount of at least one element selected from Mo, W, Nb, Ta, and Re because compounds containing these elements are intentionally added. It has been found that when a compound containing such an element is finely and homogeneously added to the firing precursor of the lithium transition metal-based compound for the lithium secondary battery positive electrode material and then the resulting mixture is heated at a high temperature, the effect of suppressing particle growth and sintering during firing is exhibited. Furthermore, since the element is concentrated in the active substance particle surfaces and a continuous composition slope structure in which the element distributes by forming a nonlinear concentration gradient from the particle surface in the depth direction is formed, the effect of significantly improving the output characteristics is also exhibited.

The type of compounds containing the elements used for addition is not particularly limited but oxides are usually used. Examples of the compounds include MoO, $MoO_2$, $MoO_3$, $MoO_x$, $Mo_2O_3$, $Mo_2O_5$, $Li_2MoO_4$, WO, $WO_2$, $WO_3$, $WO_x$, $W_2O_3$, $W_2O_5$, $W_{18}O_{49}$, $W_{20}O_{58}$, $W_{24}O_{70}$, $W_{25}O_{73}$, $W_{40}O_{118}$, $Li_2WO_4$, NbO, $NbO_2$, $Nb_2O$, $Nb_2O_5$, $Nb_4O$, $Nb_6O$, $LiNbO_3$, TaO, $TaO_2$, $Ta_2O_5$, $LiTaO_3$, $ReO_2$, $ReO_3$, and $Re_2O_3$. $MoO_3$, $Li_2MoO_4$, $WO_3$, $Li_2WO_4$, $LiNbO_3$, $Ta_2O_5$, $LiTaO_3$, and $ReO_3$ are preferred. $WO_3$, $Li_2WO_4$, $Ta_2O_5$, and $ReO_3$ are particularly preferred.

The total content of these elements in the lithium transition metal-based compound powder for the lithium secondary battery positive electrode material of the second invention relative to the total molar amount of (Mn, Ni, Co) is usually 0.1 mol % or more, preferably 0.2 mol % or more, more preferably 0.4 mol % or more, yet more preferably 0.6 mol % or more, and most preferably 0.8 mol % or more and usually 5 mol % or less, preferably 4 mol % or less, more preferably 3 mol % or less, yet more preferably 2 mol % or less, and most preferably 1.5 mol % or less. If the total content is lower than the lower limit, the effects described above may not be obtained and if the total content exceeds the upper limit, the degradation of the battery performance may result.

The lithium transition metal-based compound powder of the second invention is characterized in that at least one element selected from Mo, W, Nb, Ta, and Re, is concentrated in surface portions of the primary particles. In particular, the molar ratio of the total of the above-described elements to the total of the metal elements other than Li and the above-described elements (in other words, the metal elements other than Li and the above-described elements) in the surface portions of the primary particles is usually 5 or more times that in the entire particles. The lower limit of this ratio is preferably 6 times or more, more preferably 7 times or more, and particularly preferably 8 times or more. The upper limit is usually not particularly limited but is preferably 100 times or less, more preferably 50 times or less, particularly preferably 30 times or less, and most preferably 20 times or less. When this ratio is excessively small, the effects of improving the battery performance may be small and when the ratio is excessively large, the battery performance may be degraded.

The analysis of the composition of the surface portions of the primary particles of the lithium transition metal-based compound powder is performed by X-ray photoelectron spectroscopy (XPS) using AlKα monochromatic light as the X-ray source under conditions 0.8 mm diameter analytic area and 65° take-off angle. The range (depth) that can be analyzed differs depending on the composition of the primary particles but is usually 0.1 nm or more and 50 nm or less. In particular, the range is usually 1 nm or more and 10 nm or less for the positive electrode active substance. Accordingly, in the second invention, the surface portions of primary particles of the lithium transition metal-based compound powder refer to the ranges that can be measured under these conditions.

The composition from the particle surface of the lithium transition metal-based compound powder in the depth direction can be analyzed by alternately performing Ar ion gun sputtering and the XPS analysis described above. Since atoms near the surfaces are removed by sputtering, the XPS analysis conducted thereafter reflects the composition of the inner portions of particles compared to one conducted before sputtering. Since it is difficult to accurately detect the thickness of the surface layer removed by the sputtering, the thickness of the $SiO_2$ surface layer removed by sputtering a $SiO_2$ thin film under the same conditions is used as a substitute. Accordingly, in the second invention, the depth from the particle surface of the lithium transition metal-based compound powder refers to the depth estimated by such a method.

The ratio $R_0/R_{10}$ is usually 3 or more and preferably 3.2 or more and usually 10 or less, preferably 8 or less, more preferably 7 or less, yet more preferably 6 or less, and most preferably 5 or less where $R_0$ is the atomic ratio of the total of the aforementioned elements to the total of the Li and the metal elements other than the aforementioned elements (in other words, the metal elements other than Li Mo, W, Nb, Ta, and Re) on the primary particle outermost surfaces of the lithium transition metal-based compound powder of the second invention and $R_{10}$ is that in a region extending from a particle surface to a depth of 10 nm.

<Existence Form of Additive Element>

The lithium transition metal-based compound powder of the second invention preferably has a continuous composition slope structure in which the additive element is present by having a concentration gradient from the particle surface in the depth direction.

In the lithium transition metal-based composite oxide powder for the lithium secondary battery positive electrode material of the second invention, the ratio at which the metal elements other than Li mix into the 3a sites and which is determined by refined Rietveld X-ray diffraction is preferably 6% or less, more preferably 5.5% or less, and particularly preferably 5% or less. When this range is exceeded, the effects of the second invention may not be fully achieved.

Furthermore, in the lithium transition metal-based composite oxide powder for the lithium secondary battery positive electrode material of the second invention, the distortion (ODP=Octahedral Distoration Parameter) of an oxygen octahedron having (Ni, Mn, Co) atoms at the center is determined from the atomic position coordinates obtained by the refined Rietveld X-ray diffraction, where ODP=do-o, intra/do-o, inter, with "do-o, intra" representing the distance between oxygen atoms in a plane defined by the a axis and the b axis and "do-o, inter" representing the distance between oxygen atoms outside the plane and sandwiching the (Ni, Mn, Co) atomic layer. In such a case, the lower limit of the ODP value is preferably 1.050 or more, more preferably 1.055 or more, and particularly preferably 1.057 or more. The upper limit is preferably 1.075 or less, more preferably 1.070 or less, and particularly preferably 1.065 or less. When the ODP value is outside the above-described range, the effects of the second invention may not be fully obtained.

When the lithium transition metal-based composite oxide powder for the lithium secondary battery positive electrode material of the second invention is subjected to infrared absorption spectrum (FT-IR) analysis, a peak A preferably appears near 560 to 610 $cm^{-1}$, a peak B appears near 515 to 540 $cm^{-1}$, and the difference A between the peak A and the peak B is preferably 40 $cm^{-1}$ or more and 80 $cm^{-1}$ or less. The lower limit of the difference Δ is more preferably 45 $cm^{-1}$ or more, yet more preferably 50 $cm^{-1}$ or more, and most preferably 55 $cm^{-1}$ or more. The upper limit is more preferably 75 $cm^{-1}$ or less, more preferably 70 $cm^{-1}$ or less, and most preferably 65 $cm^{-1}$ or less. When the Δ value is outside the defined value, the effects of the second invention may not be fully obtained.

According to the second invention, the surface-enhanced Raman spectrum has a peak A at 530 $cm^{-1}$ or more and 630 $cm^{-1}$ or less. The position of the peak A is usually 530 $cm^{-1}$ or more, preferably 540 $cm^{-1}$ or more, more preferably 550

$cm^{-1}$ or more, yet more preferably 560 $cm^{-1}$ or more, and most preferably 570 $cm^{-1}$ or more and usually 630 $cm^{-1}$ or less, preferably 600 $cm^{-1}$ or less, more preferably 590 $cm^{-1}$ or less, and most preferably 580 $cm^{-1}$ or less. When the position is outside this range, the effects of the second invention may not be fully obtained.

The surface enhanced Raman spectroscopy (abbreviated as SERS hereinafter) is a method for selectively amplifying a Raman spectrum derived from molecular vibrations at the sample outermost surface by depositing a noble metal such a silver on a sample surface to form a very thin film having a sea-island pattern. The detection depth in a regular Raman spectroscopy is said to be about 0.1 to 1 µm; however, according to SERS, signals from surface layer portions in contact with noble metal particles account for the majority.

In the second invention, the SERS spectrum preferably has a peak B at 800 $cm^{-1}$ or more and 900 $cm^{-1}$ or less. The position of the peak B is usually 800 $am^{-1}$ or more, preferably 810 $cm^{-1}$ or more, more preferably 820 $cm^{-1}$ or more, yet more preferably 825 $cm^{-1}$ or more, and most preferably 830 $cm^{-1}$ or more and usually 900 $cm^{-1}$ or less, preferably 860 $cm^1$ or less, more preferably 850 $cm^{-1}$ or less, and most preferably 840 $cm^{-1}$ or less. When this range is exceeded, the effects of the second invention may not be fully achieved.

According to the SERS of the positive electrode active substance of the second invention, the intensity of the peak A relative to the intensity of the peak B at 600±50 $cm^{-1}$ is preferably more than 0.04 and more preferably 0.05 or more as mentioned above. Here, the peak B at 600±50 $cm^{-1}$ is a peak derived from stretching vibrations of $M'O_6$ (M' is a metal element in the active electrode active substance). When the intensity of the peak A is smaller than that of the peak B, the effects of the second invention may not be fully achieved.

<Volume Resistivity>

The lower limit of the volume resistivity of the lithium transition metal-based compound powder of the second invention compacted at a pressure of 40 MPa is preferably $1\times10^1$ Ω·cm or more, more preferably $5\times10^1$ Ω·cm or more, yet more preferably $1\times10^2$ Ω·cm or more, and most preferably $5\times10^2$ Ω·cm or more. The upper limit is preferably $5\times10^6$ Ω·cm or less, more preferably $1\times10^6$ Ω·cm or less, yet more preferably $8\times10^5$ Ω·cm or less, and most preferably $5\times10^5$ Ω·cm or less. If the volume resistivity exceeds the upper limit, the load characteristics may deteriorate when the battery is formed. On the other hand, if the volume resistivity is less than the lower limit, the safety may deteriorate when the battery is formed.

In the second invention, the volume resistivity of the lithium transition metal-based compound powder is a volume resistivity measured with a four-probe-ring electrode at an electrode spacing of 5.0 mm, an electrode radius of 1.0 mm, a sample radius of 12.5 mm, and an application voltage limiter of 90 V while the lithium transition metal-based compound powder is compacted under a pressure of 40 MPa. The volume resistivity of a powder under a particular pressure can be measured with a powder resistivity measuring instrument (e.g., Loresta GP powder resistivity measuring system produced by DIA Instruments Co., Ltd.) using a probe unit for powders.

<Carbon Concentration C>

The carbon concentration C (wt %) in the lithium transition metal-based compound powder of the second invention is usually 0.005 wt % or more, preferably 0.01 wt % or more, more preferably 0.03 wt % or more, and most preferably 0.06 wt % or more and usually 0.25 wt % or less, preferably 0.2 wt % or less, more preferably 0.18 wt % or less, yet more preferably 0.15 wt % or less, and most preferably 0.12 wt % or less. If the concentration is less than the lower limit, the battery performance may be degraded and if the concentration exceeds the upper limit, swelling caused by generation of gas may increase and the battery performance may decrease when a battery is fabricated.

In the second invention, as described in the Example section below, the carbon concentration C in the lithium nickel manganese cobalt-based composite oxide powder is determined by an infrared absorption technique involving firing in an oxygen stream (high-frequency heating furnace system).

Note that the carbon component of the lithium nickel manganese cobalt-based composite oxide powder determined by the carbon analysis described below can be regarded as the indication of information about the amount of the deposition of carbonate compounds, in particular, lithium carbonate. This is because the figure obtained by assuming that the amount of carbon determined by carbon analysis is entirely derived from carbonate ions substantially equals the carbonate ion concentration analyzed by ion chromatography.

When a complexing treatment with electrically conductive carbon is performed as a technique to enhance the electron conductivity, a C content exceeding the above-described particular range is sometimes detected. The C value observed when such a treatment is conducted is not limited to the above-described particular range.

<Shape of Secondary Particles>

In the lithium transition metal-based compound powder of the second invention, primary particle crystals are preferably aggregated to form spherical secondary particles. In particular, spherical secondary particles formed by random aggregation of primary particle crystals are preferred. Whether the primary particle crystals are aggregated at random or not can be observed by cross-sectional SEM. This morphology indicates that the secondary particles have no substantial crystal anisotropy.

Accordingly, expansion and contraction of crystals caused by occlusion and release of lithium ions are moderated in the secondary particles and battery characteristics in terms of cycle reversibility improve. Compared to existing products, a higher density can be achieved by the combination with the effects brought about by the limitation of the substances of the first invention and various battery characteristics improve in a well-balanced fashion.

Note that in the second invention, as shown in SEM photographs of lithium nickel manganese cobalt composite oxide powders obtained in Examples below, "spherical" means that the average value of the ratio [Lb/La] of the minor diameter [Lb (µm)] to the largest diameter [La (µm)] of secondary particles formed by aggregation of primary particle crystals is 0.8 or more where the minor diameter is the diameter that extends in a direction orthogonal to the largest diameter direction through the midpoint of the largest diameter.

<Average Primary Particle Diameter B>

The average diameter (average primary particle diameter B) of primary particles of the lithium transition metal-based compound powder of the second invention is not particularly limited. However, the lower limit is preferably 0.1 µm or more, more preferably 0.2 µm or more, yet more preferably 0.3 µm or more, and most preferably 0.4 µm or more. The upper limit is preferably 1 µm or less, more preferably 0.9 µm or less, yet more preferably 0.7 µm or less, and most preferably 0.5 µm or less. When the average primary particle diameter exceeds the above-described upper limit, battery performance such as rate characteristics and output characteristics may decrease due to adverse effects on the powder filling property and the decrease in specific surface area. When the average primary particle diameter is lower than the above-described lower limit, problems such as deteriorated charge/charge reversibility may arise due to insufficient development of crystals.

In the second invention, the average primary particle diameter is the average diameter observed with a scanning electron microscope (SEM) and can be determined as an average value of the particle diameters of about 10 to 30 primary particles in a SEM image taken at a magnification of 3,000, 10,000, or 30,000 according to the particle size.

<Ratio A/B of Median Diameter A of Secondary Particles to Average Primary Particle Diameter B>

The ratio A/B of the median diameter A of secondary particles of the lithium transition metal-based compound powder of the second invention to the average primary particle diameter B indicates the tendency of the secondary particle size and the primary particle size of the positive electrode active substance powder. That this ratio A/B is 8 to 100 means that the powder characteristics such as bulk density and the battery characteristics such as rate are well balanced. When the ratio A/B is below the lower limit, spherical secondary particles are not easily formed, resulting in lowering of the powder filling property. When the ratio A/B exceeds the upper limit, the filling property of the primary particles forming the secondary particles becomes excessively high, resulting in degradation of battery characteristics. Thus, A/B is 8 or more, preferably 9 or more, and more preferably 10 or more and 100 or less, preferably 80 or less, and more preferably 50 or less.

<Median Diameter A and 90% Cumulative Diameter ($D_{90}$)>

The median diameter (median diameter A of secondary particles) of the lithium transition metal-based compound powder of the second invention is usually 1 μm or more, preferably 1.5 μm or more, more preferably 2 μm or more, yet more preferably 2.5 μm or more, and most preferably 3 μm or more and usually 20 μm or less, preferably 15 μm or less, more preferably 10 μm or less, yet more preferably 9 μm or less, and most preferably 8 μm or less. When the median diameter A is lower than this lower limit, the coatability may become problem during formation of the positive electrode active substance layer. When the median diameter A exceeds the upper limit, the battery performance may be lowered.

The 90% cumulative diameter ($D_{90}$) of the lithium transition metal-based compound powder of the second invention is usually 30 μm or less, preferably 25 μm or less, more preferably 20 μm or less, and most preferably 15 μm or less and usually 2 μm or more, preferably 3 μm or more, more preferably 4 μm or more, and most preferably 4.5 μm or more. When the 90% cumulative diameter ($D_{90}$) exceeds the above-described upper limit, the battery performance may be lowered. When the 90% cumulative diameter ($D_{90}$) is lower than the lower limit, the coatability may become problem during formation of the positive electrode active substance layer.

In the second invention, the median diameter the 90% cumulative diameter ($D_{90}$) and the median diameter serving as the average particle diameter are measured with a known laser diffraction/scattering-type particle size distribution measuring instrument at a refractive index of 1.24 using the volume as the particle diameter basis. In the second invention, a 0.1 wt % aqueous sodium hexametaphosphate solution was used as the dispersion medium used for the measurement and measurement was conducted after 5 minutes of ultrasonic dispersion (output: 30 W, frequency: 22.5 kHz).

<BET Specific Surface Area>

The BET specific surface area of the lithium lithium transition metal-based compound powder of the second invention is usually 0.5 $m^2/g$ or more, preferably 0.8 $m^2/g$ or more, more preferably 1.0 $m^2/g$ or more, and most preferably 1.5 $m^2/g$ or more and usually 3 $m^2/g$ or less, preferably 2.8 $m^2/g$ or less, more preferably 2.5 $m^2/g$ or less, and most preferably 2.0 $m^2/g$ or less. When the BET specific surface area is lower than this range, the battery performance is easily degraded. When the BET specific surface area is larger than this range, problems of the coatability during formation of the positive electrode active substance layer may easily arise.

The BET specific surface area can be measured by a known BET-type powder specific surface area measuring instrument. In the second invention, a full automatic powder specific surface area analyzer, AMS8000 produced by Ohkura Riken Inc., is used with nitrogen as the adsorption gas and helium as the carrier gas and a BET single-point analysis is conducted by a continuous flow method. In particular, a powder sample is heated and deaerated at a temperature of 150° C. using a mixed gas and cooled to a liquid nitrogen temperature to adsorb the mixed gas. Then the sample is warmed to room temperature using water so as to desorb the nitrogen gas adsorbed and the amount thereof is detected with a heat conduction detector to calculate the specific surface area of the sample.

<Mercury Intrusion Porosimetry>

The lithium lithium transition metal-based compound powder of the second invention is characterized by satisfying particular conditions when measured by a mercury intrusion porosimetry. Thus, the mercury intrusion porosimetry is briefly described before description of the particles of the second invention.

A mercury intrusion porosimetry is a technique that involves allowing mercury to penetrate pores in a sample such as porous particles by applying a pressure and obtaining information such as a specific surface area and a pore radius distribution on the basis of the relationship between the pressure and the amount of penetrating mercury.

To be more specific, first, a container containing a sample is vacuum evacuated and filled with mercury. Mercury has a high surface tension and does not spontaneously penetrate pores in the sample surface. When a pressure is applied to mercury and gradually elevated, mercury starts to gradually penetrate pores with large radii first and then pores with smaller radii. A mercury intrusion curve representing the relationship between the pressure applied to mercury and the amount of penetrating mercury is obtained by detecting the changes in mercury liquid surface (in other words, the amount of mercury penetrating the pores) while continuously increasing the pressure.

If the shape of the pores is assumed to be cylindrical, the radius is represented by r, the surface tension of mercury is represented by δ, and the contact angle is represented by θ, then the magnitude in the direction of pressing mercury out of pores is represented by $-2r\pi\delta(\cos\theta)$ (this value will be positive if θ>90°). Since the magnitude of the force in the direction of pressing mercury into the pores under a pressure P is represented by $\pi r^2 P$, the following mathematical equations (1) and (2) are derived on the basis of the balance between these forces.

$$-2r\pi\delta(\cos\theta)=\pi r^2 P \qquad (1)$$

$$Pr=-2\delta(\cos\theta) \qquad (2)$$

For mercury, a surface tension δ=about 480 dyn/cm and a contact angle θ=about 140° are generally and frequently used. When these values are used, the radius of the pores into which mercury penetrates under a pressure P is represented by mathematical equation (3) below.

$$r\ (nm)=7.5\times10^8/P\ (Pa) \qquad (3)$$

In other words, since there is a correlation between the pressure P applied to mercury and the radius r of the pores into which mercury penetrates, a pore distribution curve representing the relationship between the radius of the pores of the sample and the volume thereof can be obtained on the basis of the obtained mercury intrusion curve. For example, when the pressure P is varied from 0.1 MPa to 100 MPa, pores in the range of about 7500 nm to about 7.5 nm can be analyzed.

The approximate analytical limits of the pore radius that can be measured by the mercury intrusion porosimetry are 2 nm or more as the lower limit and about 200 μm as the upper limit. Compared to a nitrogen adsorption method described below, the mercury intrusion porosimetry is suitable for analyzing the pore distribution in a relatively wide range of pore radii.

The analysis by the mercury intrusion porosimetry can be conducted by using an instrument such as a mercury porosimeter. Specific examples of the mercury porosimeter include AutoPore produced by Micromeritics and PoreMaster produced by Quantachrome.

The mercury intrusion volume of the lithium transition metal-based compound powder of the second invention is preferably 0.4 cm$^3$/g or more and 1.2 cm$^3$/g or less according to the mercury intrusion curve determined by the mercury intrusion porosimetry during pressure elevation from 3.86 kPa to 413 MPa.

The mercury intrusion volume is usually 0.4 cm$^3$/g or more, preferably 0.45 cm$^3$/g or more, more preferably 0.5 cm$^3$/g or more, yet more preferably 0.55 cm$^3$/g or more, and most preferably 0.6 cm$^3$/g or more and usually 1.2 cm$^3$/g or less, preferably 1.1 cm$^3$/g or less, yet more preferably 1.0 cm$^3$/g or less, and most preferably 0.9 cm$^3$/g or less. When the volume exceeds the upper limit of this range, gaps become excessively large and the filling ratio of the positive electrode active substance into the positive electrode plate becomes low in the case where the particles of the second invention are used as the positive electrode material, thereby limiting the battery capacity. On the other hand, when the volume is less than the lower limit of this range, the gaps between particles become excessively small and lithium diffusion among particles is inhibited and load characteristics deteriorate in the case where the particles of the second invention is used as the positive electrode material in fabricating the battery.

When the pore distribution curve of the particles of the second invention is determined by the mercury intrusion porosimetry described below, particular main peaks described below usually appear.

Note that in this description, "pore distribution curve" is obtained by plotting the pore radius along the horizontal axis and plotting, along the vertical axis, the values obtained by differentiating the total pore volume per unit weight (usually 1 g) of the pores having a radius equal to or more than the radius on the horizontal axis with the logarithm of the pore radius. Usually, the curve is presented as a graph in which plotted points are connected. In particular, the pore distribution curve obtained by analyzing the particles of the second invention by the mercury intrusion porosimetry is sometimes referred to as "pore distribution curve according to the second invention" in the description below.

In this description, "main peak" refers to the largest peak among peaks of the pore distribution curve and "sub peaks" refer to the peaks other than the main peak of the pore distribution curve.

In this description, "peak top" refers to a point at which the coordinate value of the vertical axis is the largest in each peak of the pore distribution curve.

<Main Peak>

The peak top of the main peak of the pore distribution curve according to the second invention lies in the pore radius range of usually 400 nm or more, preferably 600 nm or more, more preferably 700 nm or more, yet more preferably 800 nm or more, and most preferably 900 nm or more and usually 1500 nm or less, preferably 1200 nm or less, more preferably 1000 nm or less, yet more preferably 980 nm or less, and most preferably 950 nm or less. When the pore radius exceeds the upper limit of this range, lithium diffusion in the positive electrode material is inhibited in the case where a battery is fabricated by using the porous particles of the second invention as the positive electrode material or deficiency of conduction paths occurs, possibly resulting in deterioration of load characteristics.

On the other hand, when the pore radius is less than the lower limit of this range, the required amounts of the conductive materials and binders increase in the case where a positive electrode is fabricated by using the porous particles of the second invention and the filling ratio of the active substance into the positive electrode plate (positive electrode collector) becomes limited, possibly resulting in a limitation of the battery capacity. Moreover, since particles are finer, when the particles are formed into a coating solution, coatings obtained therefrom become hard or brittle in terms of mechanical properties and separation of the coatings may easily occur in the step of winding during assembly of the battery.

The pore volume of the main peak of the pore distribution curve according to the second invention is favorably usually 0.2 cm$^3$/g or more, preferably 0.25 cm$^3$/g or more, more preferably 0.3 cm$^3$/g or more, and most preferably 0.32 cm$^3$/g or more and usually 0.8 cm$^3$/g or less, preferably 0.7 cm$^3$/g or less, more preferably 0.6 cm$^3$/g or less, and most preferably 0.5 cm$^3$/g or less. When the pore volume exceeds the upper limit of this range, the gaps become excessively large and the filling ratio of the positive electrode active substance into the positive electrode plate becomes excessively low in the case where the particles of the second invention are used as the positive electrode material, thereby possibly limiting the battery capacity. On the other hand, when the pore volume is less than the lower limit of this range, possibly, the gaps between particles become excessively small and lithium diffusion among secondary particles is inhibited and load characteristics deteriorate in the case where the particles of the second invention are used as the positive electrode material in fabricating the battery.

<Sub Peaks>

The pore distribution curve according to the second invention may include a plurality of sub peaks in addition to the above-mentioned main peak, the sub peaks being characterized by being in the pore radius range of 80 nm or more and less than 400 nm.

The pore volumes of the sub peaks of the pore distribution curve according to the second invention are preferably usually 0.01 cm$^3$/g or more, preferably 0.02 cm$^3$/g or more, more preferably 0.03 cm$^3$/g or more, and most preferably 0.04 cm$^3$/g or more and usually 0.2 cm$^3$/g or less, preferably 0.18 cm$^3$/g or less, more preferably 0.15 cm$^3$/g or less, and most preferably 0.1 cm$^3$/g or less. When the volume exceeds the upper limit of this range, gaps become excessively large and the filling ratio of the positive electrode active substance into the positive electrode plate becomes low in the case where the particles of the second invention are used as the positive electrode material, thereby possibly limiting the battery capacity. On the other hand, when the volume is less than the lower limit of this range, the gaps between particles become excessively small and lithium diffusion among secondary particles is inhibited and load characteristics deteriorate in the case where the particles of the second invention are used as the positive electrode material in fabricating the battery.
<Bulk Density>

The bulk density of the lithium transition metal-based compound powder of the second invention is usually 1.0 g/cm³ or more, preferably 1.1 g/cm³ or more, more preferably 1.3 g/cm³ or more, and most preferably 1.5 g/cm³ or more. When the bulk density is lower than the lower limit, the powder filling property and the electrode preparation may be adversely affected. The positive electrode using this as the active substance is usually 2.5 g/cm³ or less, preferably 2.4 g/cm³ or less, more preferably 2.2 g/cm³ or less, and most preferably 2.0 g/cm³ or less. A bulk density exceeding this upper limit is preferable for improving the powder filling property and the electrode density but the specific surface area may decrease excessively, possibly resulting in degradation of battery performance.

In the second invention, the bulk density was determined as the powder filling density (tap density) in terms of g/cm³ by placing 5 to 10 g of a lithium nickel manganese cobalt-based composite oxide powder serving as the lithium transition metal-based compound powder in a 10 ml glass graduated cylinder and tapping 200 times at a stroke of about 20 mm.
<Crystal Structure>

The lithium transition metal-based compound powder of the second invention is preferably mainly composed of a lithium nickel manganese cobalt-based composite oxide containing a crystal structure that belongs to a layer structure.

The layer structure will now be described in further detail. The representative crystal systems that have layer structures include those that belong to an $\alpha$-NaFeO$_2$-type such as LiCoO$_2$ and LiNiO$_2$. They are members of the hexagonal system and belong to a space group $$R\bar{3}m$$

(also written as "layer R(−3)m structure" hereinafter) due to their symmetry.

However, layer LiMeO$_2$ is not limited to the layer R(−3)m structure. For example, LiMnO$_2$ also known as layer Mn is a layer compound of the rhombic system and belongs to a space group Pm2M. Li$_2$MnO$_3$ also known as "213 phase" and represented by Li [Li$_{1/3}$Mn$_{2/3}$]$_2$ belongs to a monoclinic system and has a space group C2/m structure but is a layer compound in which a Li layer, a [Li$_{1/3}$Mn$_{2/3}$] layer, and an oxygen layer are stacked.
<Powder X-ray Diffraction Peak>

In the second invention, the lithium nickel manganese cobalt-based composite oxide powder having a composition satisfying composition formulae (III) and (IV) is preferably in the range of 0.1≤FWHM(110)≤0.3 where FWHM(110) is the half width derived from a CuKα1 line of a (110) diffraction peak present near a diffraction angle 2θ of 64.5° to 65° in a powder X-ray diffraction pattern using a CuKα line. Since the half width of the X-ray diffraction peak is generally used as the measure of crystallinity, the correlation between the crystallinity and the battery performance was extensively studied. As a result, it has been found that good battery performance is exhibited when the FWHM(110) is within the defined range.

In the second invention, the FWHM(110) is usually 0.01 or more, preferably 0.05 or more, more preferably 0.10 or more, yet more preferably 0.12 or more, and most preferably 0.14 or more and usually 0.3 or less, preferably 0.28 or less, more preferably 0.25 or less, yet more preferably 0.23 or less, and most preferably 0.2 or less.

In the second invention, the lithium nickel manganese cobalt-based composite oxide powder having a composition satisfying composition formulae (III) and (IV) preferably has no diffraction peaks derived from heterogeneous phases at a higher angle side of the respective peak tops of the (018) diffraction peak present near a diffraction angle 2θ of 64° to 64.5°, the (110) diffraction peak present near a diffraction angle 2θ of 64.5° to 65°, and the (113) diffraction peak present near a diffraction angle 2θ of 68° to 68.5°. Alternatively, when the powder has diffraction peaks derived from the heterogeneous phases, the integrated intensity ratios of the heterogeneous phase peaks to the diffraction peaks of the original crystal phases preferably fall in the following respective ranges:

$$0 \leq I_{018}*/I_{018} \leq 0.10$$

$$0 \leq I_{110}*/I_{110} \leq 0.15$$

$$0 \leq I_{113}*/I_{113} \leq 0.30$$

where $I_{018}$, $I_{110}$, and $I_{113}$ respectively represent integrated intensities of the (018), (110), and (113) diffraction peaks and $I_{018}*$, $I_{110}*$, and $I_{113}*$ respectively represent integrated intensities of diffraction peaks that are derived from heterogeneous phases and appear at the higher angle side of the peak tops of the (018), (110), and (113) diffraction peaks.

Although the details of the substances that cause the diffraction peaks derived from heterogeneous phases are not clear, the capacity, the rate characteristics, the cycle characteristics, and the like of a battery fabricated therefrom will decrease when heterogeneous phases are contained. Thus, the diffraction peaks may exist as long as the diffraction peaks do not adversely affect the battery performance of the first invention but are preferably within the ranges mentioned above. The integrated intensity ratios of the diffraction peaks derived from the heterogeneous phases to the respective diffraction peaks are usually $I_{018}*/I_{018} \leq 0.10$, $I_{110}*/I_{110} \leq 0.15$, and $I_{113}*/I_{113} \leq 0.30$, preferably $I_{118}*/I_{018} \leq 0.08$, $I_{110}*/I_{110} \leq 0.13$, and $I_{113}*/I_{113} \leq 0.25$, more preferably $I_{018}*/I_{018} \leq 0.06$, $I_{110}*/I_{110} \leq 0.10$, and $I_{113}*/I_{113} \leq 0.23$, and more preferably $I_{018}*/I_{018} \leq 0.04$, $I_{110}*/I_{110} \leq 0.08$, and $I_{113}*/I_{113} \leq 0.20$. Most preferably, there are no diffraction peaks derived from heterogeneous phases.
<Lattice Constant>

The lithium transition metal-based compound powder of the second invention preferably has a crystal structure containing a layer R(−3)m structure and lattice constants in the ranges of 2.860 Å≤a≤2.890 Å and 14.200≤c≤14.280 Å. The crystal structure and the lattice constants can be obtained by powder X-ray diffraction analysis using a CuKα line.

In the second invention, the lattice constant a (Å) is usually 2.860 Å≤a≤2.890 Å, preferably 2.863 Å≤a≤2.885 Å, more preferably 2.865 Å≤a≤2.880 Å, and particularly preferably 2.870 Å≤a≤2.878 Å. The lattice constant c (Å) is usually 14.200 Å≤c≤14.280 Å, preferably 14.205 Å≤c≤14.278 Å, more preferably 14.210 Å≤c≤14.275 Å, and particularly preferably 14.212 Å≤c≤14.272 Å.

The lithium transition metal-based compound powder of the second invention is preferably fired at a high temperature in an oxygen-containing gas atmosphere to increase the crystallinity of the positive electrode active substance, in particular, at a firing temperature of 1150−500(1−p−q) (wherein the definitions of p and q are the same as p and q in formula (IV), 0.1≤p≤0.4, and 0.15≤q≤0.25) or higher in terms of ° C. The specific lower limit of the firing temperature for the lithium nickel manganese cobalt-based composite oxide having a composition represented by formula (III) is usually 800° C. or more, preferably 850° C. or more, more preferably 900° C. or more, yet more preferably 950° C. or more, and most preferably 975° C. or more and the upper limit is 1200° C. or less, preferably 1175° C. or less, more preferably 1150° C. or less, and most preferably 1125° C. or less. When the firing temperature is excessively low, heterogeneous phases become mixed and the lattice strain increases due to non-development of crystal structures. Moreover, the specific surface area becomes excessively large. In contrast, when the firing temperature is excessively high, primary particles grow excessively, sintering between the particles proceeds excessively, and the specific surface area becomes excessively small.

<Reasons Why the Lithium Transition Metal-Based Compound Powder of the Second Invention Achieves the Above-Described Effects>

Reasons why the lithium transition metal-based compound powder of the second invention achieves the above-described effects are presumably as follows.

That is, according to the lithium transition metal-based compound powder of the second invention, a layer lithium nickel manganese cobalt-based composite oxide in a particular composition region is fired at a particular temperature or higher after a compound containing an element such as W is added. Thus, sintering is suppressed and, when a battery is made therewith, a surface state in which the interfacial resistance with the electrolytic solution is significantly reduced is formed. Thus, presumably, the battery fabricated using the powder can achieve a good balance between characteristics.

[Method for Manufacturing the Lithium Transition Metal-Based Compound Powder for the Lithium Secondary battery Positive Electrode Material of the Second Invention]

A method for manufacturing the lithium transition metal-based compound powder for the lithium secondary battery positive electrode material of the second invention is described below.

The method for manufacturing the lithium transition metal-based compound powder of the second invention is not limited to a particular manufacturing method. However, the lithium transition metal-based compound powder for the lithium secondary battery positive electrode material of the second invention is preferably manufactured by a method that includes a slurry preparation step of grinding lithium carbonate, a Ni compound, a Mn compound, a Co compound, and a metal compound containing at least one element selected from Mo, W, Nb, Ta, and Re in a liquid medium to obtain a homogeneously dispersed slurry, a spray-drying step of spray-drying the resulting slurry, and a firing step of firing the resulting spray-dried substance.

<Slurry Preparation Step>

Among the raw material compounds used in preparing the slurry in manufacturing the lithium nickel manganese cobalt-based composite oxide by the method of the second invention, $Li_2CO_3$ is mainly used as the lithium compound. $Li_2CO_3$ may be used alone or in combination with at least one different lithium compound. Examples of the different lithium compound include $LiNO_3$, $LiNO_2$, LiOH, $LiOH.H_2O$, LiH, LiF, LiCl, LiBr, LiI, $CH_3OOLi$, $Li_2O$, $Li_2SO_4$, lithium dicarboxylate, lithium citrate, lithium fatty acid, and alkyl lithium.

Examples of the nickel compound include $Ni(OH)_2$, NiO, NiOOH, $NiCO_3$, $2NiCO_3.3Ni(OH)_2.4H_2O$, $NiC_2O_4.2H_2O$, $Ni(NO_3)_2.6H_2O$, $NiSO_4$, $NiSO_4.6H_2O$, nickel fatty acid, and nickel halide. Among these, nickel compounds such as $Ni(OH)_2$, NiO, NiOOH, $NiCO_3$, $2NiCO_3.3Ni(OH)_2.4H_2O$, and $NiC_2O_4.2H_2O$ are preferred since they do not generate toxic substances such as $SO_x$, $NO_x$, and the like during the firing treatment. From a viewpoint of availability at a low cost as the industrial raw materials and a viewpoint of high reactivity, $Ni(OH)_2$, NiO, NiOOH, and $NiCO_3$ are preferred. From a viewpoint that gaps can be easily formed in the secondary particles of the spray-dried powder due to generation of decomposition gas during firing or the like, $Ni(OH)_2$, NiOOH, and $NiCO_3$ are particularly preferred. These nickel compounds may be used alone or in combination of two or more.

Examples of the manganese compound include manganese oxides such as $Mn_2O_3$, $MnO_2$, and $Mn_3O_4$, manganese salts such as $MnCO_3$, $Mn(NO_3)_2$, $MnSO_4$, manganese acetate, manganese dicarboxylate, manganese citrate, and manganese fatty acid, oxyhydroxide, and halides such as manganese chloride. Among these manganese compounds, $MnO_2$, $Mn_2O_3$, $Mn_3O_4$, and $MnCO_3$ are preferred since they do not generate gas such as $SO_x$, $NO_x$, and the like during firing and are available at a low cost as the industrial raw materials. These manganese compounds may be used alone or in combination of two or more.

Examples of the cobalt compound include $Co(OH)_2$, CoOOH, CoO, $Co_2O_3$, $Co_3O_4$, $Co(OCOCH_3)_2.4H_2O$, $CoCl_2$, $Co(NO_3)_2.6H_2O$, $Co(SO_4)_2.7H_2O$, and $CoCO_3$. Among these, $Co(OH)_2$, CoOOH, CoO, $Co_2O_3$, $Co_3O_4$, and $CoCO_3$ are preferable because they do not generate toxic substances such as $SO_x$ and $NO_x$ during the firing step. $Co(OH)_2$ and CoOOH are more preferable from the viewpoints of industrial availability at a low cost and high reactivity. In addition, from the viewpoint of ease of forming gaps in the secondary particles of the spray-dried substance by generation of decomposition gas during firing or the like, $Co(OH)_2$, CoOOH, and $CoCO_3$ are particularly preferable. These cobalt compounds may be used alone or in combination of two or more.

The types of the Mo, W, Nb, Ta, and Re compounds are not particularly limited but oxides are usually used. Examples of the compounds include MoO, $MoO_2$, $MoO_3$, $MoO_x$, $MO_2O_3$, $Mo_2O_5$, $Li_2MoO_4$, WO, $WO_2$, $WO_3$, $WO_x$, $W_2O_3$, $W_2O_5$, $W_{18}O_{49}$, $W_{20}O_{58}$, $W_{24}O_{70}$, $W_{25}O_{73}$, $W_{40}O_{118}$, $Li_2WO_4$, NbO, $NbO_2$, $Nb_2O$, $Nb_2O_5$, $Nb_4O$, $Nb_6O$, $LiNbO_3$, TaO, $TaO_2$, $Ta_2O_5$, $LiTaO_3$, $ReO_2$, $ReO_3$, and $Re_2O_3$. $MoO_3$, $Li_2MO_4$, $WO_3$, $Li_2WO_4$, $LiNbO_3$, $Ta_2O_5$, $LiTaO_3$, and $ReO_3$ are preferred and $WO_3$, $Li_2WO_4$, $Ta_2O_5$, and $ReO_3$ are particularly preferred. These compounds may be used alone or in combination of two or more.

In addition to the Li, Ni, Mn, and Co raw material compounds mentioned above, a compound group targeted to introduce the above-described other elements by substitution can be used.

The method for mixing the raw materials is not particularly limited as long as a highly homogeneous mixing is accomplished and may be of a wet type or a dry type. Examples of the method include methods that use devices such as a ball mill, a vibration mill, and a bead mill. Wet mixing according to which raw material compounds are mixed in a liquid medium such as water or alcohol is preferred since it can achieve a more homogeneous mixing and increases the reactivity of the mixture in the firing step. Furthermore, in the second invention, it is important that wet grinding and mixing of the raw material compounds and other elements such as MO, W, Nb, Ta, Re, and the like be performed so that they can be mixed finely and highly homogeneously.

The mixing time differs depending on the mixing method and can be any as long as the raw materials are homogeneously mixed on a particle level. For example, the mixing time is usually about 1 hour to 2 days with a ball mill (wet or dry) and the residence time is usually about 0.1 hours to 6 hours for a bead mill (wet continuous method).

In the stage of mixing the raw materials, grinding of the raw materials is preferably simultaneously performed. The particle diameter of the raw material particles after grinding serves as the indicator of the extent of grinding. The average particle diameter (median diameter) is usually 0.5 μm or less, preferably 0.4 μm or less, more preferably 0.35 μm or less, and most preferably 0.3 μm or less. When the average particle diameter of the raw material particles after grinding is excessively large, not only the reactivity in the firing step will decrease but also it will become difficult to homogenize the composition. However, since excessive grinding leads to an increase in cost of grinding, it is sufficient to perform grinding so that the average particle diameter is usually 0.01 μm or more, preferably 0.1 μm or more, and more preferably 0.2 μm or more. The means for achieving such an extent of grinding is not particularly limited but a wet grinding method is preferred. A specific example is a DYNO mill.

In the second invention, the median diameter of the ground particles in the slurry is measured with a known laser diffraction/scattering particle size distribution analyzer at a refractive index of 1.24 using the volume as the particle diameter basis. In the second invention, a 0.1 wt % aqueous sodium hexametaphosphate solution was used as the dispersion medium used for the measurement and measurement was conducted after 5 minutes of ultrasonic dispersion (output: 30 W, frequency: 22.5 kHz). As for the median diameter of the spray-dried powder described below, measurement is made under the same conditions except that the measurement was conducted after conducting ultrasonic dispersion for 0, 1, 3, and 5 minutes.

<Spray-Drying Step>

After the wet mixing, a drying step is usually performed. The drying method is not particularly limited but is preferably spray-drying from viewpoints of homogeneity and powder fluidity of the generated granular substance, powder handling performance, and efficient production of dry particles.

<Spray-Dried Powder>

According to the method for manufacturing the lithium transition metal-based compound powder such as lithium nickel manganese cobalt-based composite oxide powder of the second invention, a slurry obtained by wet-grinding the raw material compounds and the additive is spray-dried to obtain a powder constituted by spherical secondary particles formed by aggregation of primary particles. The spray-dried powder in which primary particles are aggregated to form spherical secondary particles is the shape feature of the spray-dried powder of the second invention. Examples of the method for confirming the shape include SEM observation and cross-sectional SEM observation.

The median diameter of the spray-dried powder, i.e., a firing precursor of the lithium transition metal-based compound powder such as the lithium nickel manganese cobalt-based composite oxide powder of the second invention, is adjusted to usually 22 μm or less, preferably 17 μm or less, more preferably 12 μm or less, yet more preferably 11 μm or less, and most preferably 10 μm or less (the value here is measured without conducting ultrasonic dispersion). However, there is a tendency that excessively small particles are difficult to obtain. Thus, the median diameter is usually 3 μm or more, preferably 4 μm or more, and more preferably 5 μm or more. When a granular substance is manufactured by a spray-drying method, the particle diameter can be controlled by adequately selecting the type of spraying, the pressurized gas flow feed rate, the slurry feed rate, the drying temperature, etc.

In other words, for example, after a slurry in which lithium carbonate, a nickel compound, a manganese compound, a cobalt compound, and a metal compound containing at least one element selected from W, Nb, Ta, and Re are ground and mixed until the median diameter is 0.5 μm or less and homogeneously dispersed in a liquid medium is spray-dried, the resulting powder is fired to manufacture a lithium nickel manganese cobalt-based composite oxide powder. Herein, the spray-drying is conducted under the conditions that the slurry viscosity V is 50 cp≤V≤4000 cp and the gas-liquid ratio G/S is 500≤G/S≤10000 where V (cp) is the slurry viscosity during spray-drying, S (L/min) is the slurry feed rate, and G (L/min) is the gas feed rate.

When the slurry viscosity V (cp) is excessively low, it may become difficult to obtain powder containing secondary particles formed by aggregation of primary particles. When excessively high, the feed pumps may go down or nozzles may become clogged. Thus, the lower limit value of the slurry viscosity V (cp) is usually 50 cp or more, preferably 100 cp or more, more preferably 300 cp or more, and most preferably 500 cp or more and the upper limit value is usually 4000 pc or less, preferably 3500 cp or less, more preferably 3000 cp or less, and most preferably 2500 cp or less.

When the gas-liquid ratio G/S is lower than the above-mentioned lower limit, the drying property may decrease and when higher than the upper limit, the production efficiency may decrease. Accordingly, the lower limit value of the gas-liquid ratio G/S is usually 500 or more, preferably 800 or more, more preferably 1000 or more, and most preferably 1500 or more and the upper limit value is usually 10000 or less, preferably 9000 or less, more preferably 8000 or less, and most preferably 7500 or less.

The slurry feed rate S and the gas feed rate G are adequately set according to the viscosity of the slurry to be spray-dried, the specifications of the spray-drying apparatus used, etc.

In the method of the second invention, spray drying is sufficiently conducted as long as the gas-liquid ratio G/S described above is satisfied by satisfying the slurry viscosity V (cp) above and controlling the slurry feed rate and the gas feed rate according to the specifications of the spray-drying apparatus used. Other conditions are appropriately set according to the type of apparatuses and the like but preferably following conditions are selected.

That is, the slurry is spray dried at a temperature of usually 50° C. or more, preferably 70° C. or more, more preferably 120° C. or more, and most preferably 140° C. or more and usually 300° C. or less, preferably 250° C. or less, more preferably 230° C. or less, and most preferably 200° C. or less. When the temperature is excessively high, the resulting aggregated particles may contain many hollow structures and the filling density of the powder may decrease. When the temperature is excessively low, problems such as sticking of powder and clogging caused by dewing at the powder exit section may arise.

The spray-dried powder of the lithium transition metal-based compound powder such as a lithium nickel manganese cobalt-based composite oxide powder of the second invention features strong cohesion between primary particles and this can be confirmed by investigating the extent of changes in median diameter caused by ultrasonic dispersion. For example, when the median diameter measured without ultrasonic dispersion is represented by $D_{50}$ [US 0 min] (μm) and the median diameter measured after 5 minutes of ultrasonic dispersion is represented by $D_{50}$ [US 5 min] (μm), the lower limit of the ratio of $D_{50}$ [US 5 min] to $D_{50}$ [US 0 min] indicated as $D_{50}$ [US 5]/$D_{50}$ [US 0] is usually 0.03 or more, preferably 0.05 or more, and more preferably 0.07 or more and the upper limit is 0.7 or less, preferably 0.6 or less, and more preferably 0.5 or less. Lithium transition metal-based compound particles obtained by firing spray-dried particles having $D_{50}$ [US 5]/$D_{50}$ [US 0] larger than the above-described value may have degraded output characteristics due to excessively small gaps in the secondary particles. In contrast, lithium nickel manganese cobalt-based composite oxide particles obtained by firing spray-dried particles having $D_{50}$ [US 5]/$D_{50}$ [US 0] smaller than the above-described value may exhibit a lower bulk density and degraded coating characteristics due to excessively large gaps between particles.

When the specific surface area of the powder obtained by spray-drying is small, the reactivity decreases in the firing reaction. Thus, as mentioned above, the specific surface area is preferably increased as much as possible by means such as grinding the starting materials before spray-drying. On the other hand, excessively increasing the specific surface area not only is industrially disadvantageous but also may lead to failure of obtaining a lithium transition metal-based compound of the second invention. Thus, the BET specific surface area of the resulting spray-dried particles is usually 10 $m^2$/g or more, preferably 30 $m^2$/g or more, more preferably 50 $m^2$/g or more, and most preferably 60 $m^2$/g or more and usually 100 $m^2$/g or less, preferably 90 $m^2$/g or less, more preferably 80 $m^2$/g or less, and most preferably 75 $m^2$/g or less.

<Firing Step>

The firing precursor obtained as such is then subjected to a firing treatment.

In the second invention, "firing precursor" refers to a precursor of a lithium transition metal-based compound, such as a lithium nickel manganese cobalt-based composite oxide, before firing, the precursor being obtained by processing a spray-dried powder. For example, the above-mentioned compound that generates gaps in secondary particles by generation of decomposition gas or sublimation during firing may be added to the spray-dried powder to prepare a firing precursor.

The firing conditions depend upon the composition and the types of raw material compounds used. As a tendency, primary particles grow excessively, sintering between particles progresses excessively, and the specific surface area becomes excessively small when the firing temperature is excessively high. Conversely, when the firing temperature is excessively low, heterogeneous phases become mixed and the lattice strain increases due to non-development of crystal structures. Moreover, the specific surface area becomes excessively large. The firing temperature for the composition represented by formula (III) above is usually 800° C. or more, preferably 850° C. or more, more preferably 900° C. or more, yet more preferably 950° C. or more, and most preferably 975° C. or more and usually 1200° C. or less, preferably 1175° C. or less, more preferably 1150° C. or less, and most preferably 1125° C. or less.

For firing, a box furnace, a tubular furnace, a tunnel furnace, a rotary hearth furnace, a rotary kiln, or the like can be used, for example. The firing step is usually divided into three portions: heating, retaining the maximum temperature, and cooling. The second portion involving retaining the maximum temperature is not necessarily conducted once and may include two or more stages depending on the purpose. The process of heating, retaining maximum temperature, and cooling may be conducted twice or more with interruption of a pulverizing step of cancelling the aggregation to an extent that does not break the secondary particles or a grinding step of grinding down to the primary particles or finer powder.

In the heating step, the interior of the furnace is usually heated at a heating rate of 0.1° C./min or more and 10° C./min or less. An excessively low heating rate is industrially disadvantageous since the required time is longer, but the furnace temperature does not follow the set temperature if the heating rate is excessively high depending on the furnace. The heating rate is preferably 0.5° C./min or more, more preferably 1° C./min or more and yet more preferably 1.5° C./min or more and preferably 8° C./min or less, more preferably 6° C./min or less, and yet more preferably 4° C./min or less.

The retention time in the maximum temperature-retaining step differs depending on the temperature but is usually 30 min or more, preferably 1 hour or more, more preferably 2 hours or more, yet more preferably 3 hours or more, and most preferably 5 hours or more and 50 hours or less, preferably 25 hours or less, more preferably 20 hours or less, yet more preferably 15 hours or less, still more preferably 10 hours or less, and most preferably 8 hours or less in the above-described temperature range. When the firing time is excessively short, it becomes difficult to obtain a lithium nickel manganese cobalt-based composite oxide powder having good crystallinity. An excessively long firing time is not practical. An excessively long firing time is disadvantageous since pulverization is required subsequently or becomes difficult.

In the cooling step, the interior of the furnace is cooled at a cooling rate of usually 0.1° C./min or more and 10° C./min or less. An excessively low cooling rate is industrially disadvantageous since the required time is longer, but the homogeneity of the target substance tends to be insufficient and the deterioration of the container tends to be accelerated if the cooling rate is excessively high. The cooling rate is preferably 1° C./min or more and more preferably 3° C./min or more and preferably 7° C./min or less and more preferably 5° C./min or less.

The atmosphere during firing is an oxygen-containing gas atmosphere. However since there is the optimum oxygen partial pressure region for the composition of the lithium transition metal-based compound powder to be obtained, various suitable gas atmospheres that satisfy such a region are used. Examples of the gas atmosphere include oxygen, air, and a mixed gas containing oxygen or air and an inert gas such as nitrogen or argon at a particular ratio. The oxygen concentration in the atmosphere is usually 1 vol % or more, preferably 10 vol % or more, and more preferably 15 vol % or more and 100 vol % or less, preferably 50 vol % or less, and more preferably 25 vol % or less.

In order to manufacture the lithium transition metal-based compound powder of the second invention by such a manufacturing method under set manufacturing conditions, the target molar ratio can be controlled by adjusting the mixing ratio of the respective compounds in preparing the slurry in which lithium carbonate, the nickel compound, the manganese compound, the cobalt compound, and the metal compound containing at least one selected from Mo, W, Nb, Ta, and Re are dispersed in a liquid medium.

<Classifying Step>

The fired powder obtained by firing is then classified to be pulverized, to adjust the particle distribution state to a state favorable for electrode preparation, or to remove coarse foreign matters and the like. The classifying method is not particularly limited as long as its purpose can be fulfilled but the examples thereof include sieve classification (vibration sieve and centrifugal sieve) and aerodynamic classification. Examples of the specific apparatus used include, but are not limited to, "Ultrasonic vibrating sieve" produced by Dalton Co., Ltd., "Powsifter" produced by Tsukasa Industry, Co., Ltd., "Turbo Screener" produced by Turbo Kogyo Co., Ltd., and "Turboplex" produced by Hosokawa Micron Group.

According to the thus-obtained lithium transition metal-based compound powder of the second invention, a lithium secondary battery positive electrode material that has a high capacity, good output characteristics and lifetime characteristics, and good performance balance is provided.

[Lithium Secondary Battery Positive Electrode]

A lithium secondary battery positive electrode according to the present invention is produced by forming a positive electrode active substance layer that contains a lithium transition metal-based compound powder for a lithium secondary battery positive material of the present invention (that is, the lithium transition metal-based compound powder for the lithium secondary battery positive electrode material of the first invention and/or the lithium transition metal-based compound powder for the lithium secondary battery positive electrode material of the second invention) and a binder on a collector. As for the positive electrode material, only one of the lithium transition metal-based compound powders of the present invention may be used or two or more of the powders may be mixed and used. Alternatively, a mixture of one or more lithium transition metal-based compound powders of the present invention and one or more other positive electrode active substance powders may be used. When the lithium transition metal-based compound powders of the present invention are used in combination with other positive electrode active substances, the ratio of the lithium transition metal-based compound powders of the present invention to the total of the lithium transition metal-based compound powders of the present invention and other positive electrode active substances is preferably set to 15 wt % or more, more preferably 30 wt % or more, and most preferably 50 wt % or more in order to obtain sufficient effects from the lithium transition metal-based compound powders of the present invention.

The positive electrode active substance layer is usually prepared by press-bonding onto a positive electrode collector a sheet prepared by dry-mixing a positive electrode material and a binder as well as an electrically conductive material, a thickner, and the like used as needed or by applying on a positive electrode collector a slurry prepared by dissolving or dispersing these materials in a liquid medium and drying the applied slurry.

Usually, metal materials such as aluminum, stainless steel, nickel plating, titanium, and tantalum or carbon materials such as carbon cloth and carbon paper are used as the material for the positive electrode collector. Among these, metal materials are preferred and aluminum is particularly preferred. In the case of metal materials, examples of the shape include a metal foil, a metal column, a metal coil, a metal plate, a metal thin film, an expanded metal, a punched metal, and a foamed metal. In the case of carbon materials, examples of the shape include a carbon plate, a carbon thin film, and a carbon column. Among these, a metal thin film is preferred since it is currently used in industrialized products. The thin film may be formed into a mesh if needed.

When a thin film is used as a positive electrode collector, the thickness thereof may be any but is in the range of usually 1 μm or more, preferably 3 μm or more, and more preferably 5 μm or more and usually 100 mm or less, preferably 1 mm or less, and more preferably 50 μm or less. When the thickness is smaller than the above-mentioned range, the strength necessary for the collector may become insufficient and when the thickness is larger than the above-mentioned range, the handling property may be impaired.

The binder used for manufacturing the positive electrode active substance layer is not particularly limited. In the case where a coating method is employed, the binder may be a material that is stable against the liquid medium used for electrode fabrication. Examples thereof include resin polymers such as polyethylene, polypropylene, polyethylene terephthalate, polymethyl methacrylate, aromatic polyamide, cellulose, and nitrocellulose, rubbery polymers such as SBR (styrene-butadiene rubber), NBR (acrylonitrile-butadiene rubber), fluorine rubber, isoprene rubber, butadiene rubber, and ethylene-propylene rubber, thermoplastic elastomer polymers such as styrene-butadiene-styrene block copolymers and hydrogenated products thereof, EPDM (ethylene-propylene-diene ternary copolymer), styrene-ethylene-butadiene-ethylene copolymers, and styrene-isoprene-styrene block copolymers and hydrogenated products thereof, soft resin polymers such as syndiotactic-1,2-polybutadiene, polyvinyl acetate, ethylene-vinyl acetate copolymers, and propylene-α-olefin copolymers, fluoric polymers such as polyvinylidene fluoride, polytetrafluoroethylene, fluorinated polyvinylidene fluoride, and polytetrafluoroethylene-ethylene copolymers, and polymer compositions having ion-conductivity for alkali metal ions (in particular, lithium ions). These substances may be used alone or in any combination of two or more at any ratio.

The proportion of the binder in the positive electrode active substance layer is usually 0.1 wt % or more, preferably 1 wt % or more, and more preferably 5 wt % or more and usually 80 wt % or less, preferably 60 wt % or less, more preferably 40 wt % or less, and most preferably 10 wt % or less. When the proportion of the binder is excessively low, the positive electrode active substance cannot be retained sufficiently, the mechanical strength of the positive electrode may become insufficient, and the battery performance such as cycle characteristics may be degraded. When the proportion is excessively high, a decrease in battery capacity and electrical conductivity may result.

An electrically conductive material is usually incorporated in the positive electrode active substance layer to enhance the electrical conductivity. The type thereof is not particularly limited. Specific examples thereof include metal materials such as copper and nickel and carbon materials such as graphite, e.g., natural graphite and synthetic graphite, carbon black, e.g., acetylene black, and amorphous carbon, e.g., needle coke. These substances may be used alone or in any combination of two or more at any ratio. The proportion of the electrically conductive material in the positive electrode active substance layer is usually 0.01 wt % or more, preferably 0.1 wt % or more, and more preferably 1 wt % or more and usually 50 wt % or less, preferably 30 wt % or less, and more preferably 20 wt % or less. When the proportion of the electrically conductive material is excessively low, the electrical conductivity may be insufficient. When it is excessively high, the battery capacity may decrease.

The type of the liquid medium for forming the slurry is not particularly limited as long as the medium can dissolve or disperse the lithium transition metal-based compound powder serving as the positive electrode material and the binder, and the electrically conductive material and the thickner used as needed. Both water-based solvents and organic solvents may be used. Examples of the water-based solvent include water and alcohol. Examples of the organic solvents include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, ethylene oxide, tetrahydrofuran (THF), toluene, acetone, dimethyl ether, dimethyl acetamide, hexamethylphosphoramide, dimethyl sulfoxide, benzene, xylene, quinoline, pyridine, methyl naphthalene, and hexane. In particular, when a water-based solvent is used, a dispersant is added in addition to the thickner to prepare a slurry using a latex such as SBR. These solvents may be used alone or in any combination of two or more at any ratio.

The content of the lithium transition metal-based compound powder of the present invention serving as the positive electrode material in the positive electrode active substance layer is usually 10 wt % or more, preferably 30 wt % or more, and more preferably 50 wt % or more and usually 99.9 wt % or less and preferably 99 wt % or less. When the proportion of the lithium transition metal-based compound powder in the positive electrode active substance layer is excessively large, the strength of the positive electrode tends to be insufficient. When the proportion is excessively small, the capacity may be insufficient.

The thickness of the positive electrode active substance layer is usually about 10 to 200 μm.

The positive electrode active substance layer obtained by coating and drying is preferably compacted using a roller press or the like to increase the filling density of the positive electrode active substance.

Thus, the lithium secondary battery positive electrode of the present invention is made.

[Lithium Secondary Battery]

A lithium secondary battery of the present invention includes a lithium secondary battery positive electrode of the present invention that can occlude and release lithium, a negative electrode that can occlude and release lithium, and a nonaqueous electrolyte containing a lithium salt as an electrolytic salt. A separator that retains the nonaqueous electrolyte may be provided between the positive electrode and the negative electrode. In order to effectively prevent shorting caused by contact between the positive electrode and the negative electrode, it is preferable to provide the separator therebetween.

<Negative Electrode>

As with the positive electrode, the negative electrode is usually formed by forming a negative electrode active substance layer on a negative electrode collector.

Usually, metal materials such as copper, nickel, stainless steel, and nickel-plated steel or carbon materials such as carbon cloth and carbon paper are used as the material for the negative electrode collector. In particular, in the case of metal materials, a metal foil, a metal column, a metal coil, a metal plate, and a metal thin film are used, and in the case of carbon materials, a carbon plate, a carbon thin film, and a carbon column are used. Among these, a metal thin film is preferred since it is currently used in industrialized products. The thin film may be formed into a mesh if needed. When a metal thin film is used as the negative electrode collector, the preferable range of thickness is the same as that for the positive electrode collector described above.

The negative electrode active substance layer contains a negative electrode active substance. The type of the negative material active substance is not particularly limited as long as the substance can electrochemically occlude and release lithium ions. Usually, a carbon material that can occlude and release lithium is used due to its high safety.

The type of the carbon material is not particularly limited. Examples thereof include graphite such as synthetic graphite and natural graphite and pyrolyzed products obtained by pyrolyzing organic matters under various pyrolytic conditions. Examples of the pyrolyzed products of organic matters include coal-based coke, petroleum-based coke, and carbides of coal-based pitch, carbides of petroleum-based pitch, carbides of oxidized products obtained by oxidation of these pitches, needle coke, pitch coke, carbides of phenolic resins, crystalline cellulose, etc., carbonaceous materials obtained by partial graphitization of these, furnace black, acetylene black, and pitch-based carbon fibers. Among these, graphite is preferred. Particularly preferably, synthetic graphite obtained by high-temperature heat treatment of easily graphitizable pitch obtained from various raw materials, purified natural graphite, a graphite material containing such a graphite and pitch, and the like that have been subjected to various surface treatments are mainly used. These carbon materials may be used alone or in combination of two or more.

When a graphite material is used as the negative electrode active substance, a d value (interlayer distance: $d_{002}$) of the lattice face (002 face) determined by X-ray diffraction in accordance with Gakushin method is usually 0.335 nm or more and usually 0.34 nm or less and more preferably 0.337 nm or less.

The ash content in the graphite material is usually 1 wt % or less, preferably 0.5 wt % or less, and particularly 0.1 wt % or less relative to the weight of the graphite material.

The crystallite size ($L_c$) of the graphite material determined by X-ray diffraction in accordance with Gakushin method is usually 30 nm or more, preferably 50 nm or more, and particularly preferably 100 nm or more.

The median diameter of the graphite material determined by a laser diffraction/scattering method is usually 1 μm or more, preferably 3 μm or more, more preferably 5 μm or more, and particularly preferably 7 μm or more and usually 100 μm or less, preferably 50 μm or less, more preferably 40 μm or less, and particularly preferably 30 μm or less.

The BET specific surface area of the graphite material is usually 0.5 m$^2$/g or more, preferably 0.7 m$^2$/g or more, more preferably 1.0 m$^2$/g or more, and yet more preferably 1.5 m$^2$/g or more and usually 25.0 m$^2$/g or less, preferably 20.0 m$^2$/g or less, more preferably 15.0 m$^2$/g or less, and yet more preferably 10.0 m$^2$/g or less.

When the graphite material is subjected to Raman spectroscopy using argon laser light, the intensity ratio $I_A/I_B$ of the intensity $I_A$ of a peak PA detected in the range of 1580 to 1620 cm$^{-1}$ to the intensity $I_B$ of a peak $P_B$ detected in the range of 1350 to 1370 cm$^{-1}$ is preferably 0 or more and 0.5 or less. The half width of the peak $P_A$ is preferably 26 cm$^{-1}$ or less and more preferably 25 cm$^{-1}$ or less.

In addition to the various carbon materials described above, other materials that can occlude and release lithium can be used as the negative electrode active substance. Specific examples of the negative electrode active substances other than the carbon materials include metal oxides such as tin oxide and silicon oxide, nitrides such as $Li_{2.6}Co_{0.4}N$, elemental lithium, and lithium alloys such as lithium aluminum alloys. These materials other than the carbon materials may be used alone or in combination of two or more. They may be used in combination with the carbon materials described above.

As with the positive electrode active substance layer, the negative electrode active substance layer can be usually manufactured by applying, on a negative electrode collector, a slurry prepared from the negative electrode active substance described above, a binder, and, if necessary, an electrically conductive material and a thickner, and a liquid medium and drying the applied slurry. The liquid medium, binder, thickner, electrically conductive material, etc., for forming the slurry may be the same as those described for the positive electrode active substance layer.

<Nonaqueous Electrolyte>

Common organic electrolytic solutions, polymer solid electrolytes, gel electrolytes, inorganic solid electrolytes, and the like can be used as the nonaqueous electrolyte. Among these, organic electrolytic solutions are preferred. Organic electrolytic solutions are prepared by dissolving solutes (electrolytes) in organic solvents.

The type of the organic solvent is not particularly limited. For example, carbonates, ethers, ketones, sulfolane compounds, lactones, nitriles, chlorinated hydrocarbons, ethers, amines, esters, amides, and phosphoric acid ester compounds can be used. Representative examples thereof include dimethyl carbonate, diethyl carbonate, ethyl methyl carbonate, propylene carbonate, ethylene carbonate, vinylene carbonate, vinyl ethylene carbonate, tetrahydrofuran, 2-methyltetrahydrofuran, 1,4-dioxane, 4-methyl-2-pentanone, 1,2-dimethoxyethane, 1,2-diethoxyethane, γ-butyrolactone, 1,3-dioxolane, 4-methyl-1,3-dioxolane, diethyl ether, sulfolane, methylsulfolane, acetonitrile, propionitrile, benzonitrile, butyronitrile, valeronitrile, 1,2-dichloroethane, dimethylformamide, dimethyl sulfoxide, trimethyl phosphate, and triethyl phosphate. Hydrogen atoms of these compounds may be partially substituted with halogen atoms. These solvents may be used alone or as a mixed solvent containing two or more of these solvents.

In order to dissociate the electrolytic salt, the organic solvent described above preferably contains a high-dielectric-constant solvent. A high-dielectric-constant solvent here means a compound having a specific dielectric constant of 20 or more at 25° C. Among the high-dielectric-constant solvents, ethylene carbonate, propylene carbonate, and a compound obtained by substituting hydrogen atoms of ethylene carbonate or propylene carbonate with a different element such as halogen or an alkyl group or the like are preferably contained in the electrolytic solution. The proportion of the high-dielectric-constant solvent in the electrolytic solution is preferably 20 wt % or more, more preferably 25 wt % or more, and most preferably 30 wt % or more. When the content of the high-dielectric-constant solvent is lower than the above-described range, desired battery characteristics may not be obtained.

A desired proportion of an additive, such as gas, e.g., $CO_2$, $N_2O$, CO, or $SO_2$, vinylene carbonate, polysulfide $S_x^{2-}$ or the like that forms on a surface of the negative electrode a good coating that enables highly efficient charge/discharge operation of lithium ions may be added to the organic electrolytic solution. Among these, vinylene carbonate is preferable as such an additive.

A desired proportion of an additive, such as lithium difluorophosphate, that improves cycle lifetime and output characteristics may be added to the organic electrolytic solution.

The type of the electrolytic salt is not particularly limited and any commonly known solute may be used. Specific examples thereof include $LiClO_4$, $LiAsF_6$, $LiPF_6$, $LiBF_4$, $LiB(C_6H_5)_4$, LiBOB, LiCl, LiBr, $CH_3SO_3Li$, $CF_3SO_3Li$, $LiN(SO_2CF_3)_2$, $LiN(SO_2C_2F_5)_2$, $LiC(SO_2CF_3)_3$, and $LiN(SO_3CF_3)_2$. These electrolytic salts may be used alone or in any combination of two or more at any ratio.

Usually, 0.5 mol/L or more and 1.5 mol/L or less of a lithium salt serving as the electrolytic salt is contained in the electrolytic solution. The electrical conductivity may decrease and the battery characteristics may be adversely affected when the lithium salt concentration in the electrolytic solution is less than 0.5 mol/L or more than 1.5 mol/L. The lower limit of the concentration is preferably 0.75 mol/L or more and the upper limit is preferably 1.25 mol/L or more.

In the case where a polymer solid electrolyte is used, the type thereof is not particularly limited. Any known crystalline or amorphous inorganic matters may be used as the solid electrolyte. Examples of the crystalline inorganic solid electrolyte include LiI, $Li_3N$, $Li_{1+x}J_xTi_{2-x}(PO_4)_3$ (J=Al, Sc, Y, La), and $Li_{0.5-3x}RE_{0.5+x}TiO_3$ (RE=La, Pr, Nd, Sm). Examples of amorphous inorganic solid electrolytes include oxide glasses such as 4.9 LiI-34.1 $Li_2O$-61 $B_2O_5$ and 33.3 $Li_2O$-66.7 $SiO_2$. These may be used alone or in combination of two or more at any ratio.

<Separator>

When the above-mentioned organic electrolytic solution is used as the electrolyte, a separator is interposed between the positive electrode and the negative electrode to prevent shorting between the electrodes. The material and shape of the separator are not particularly limited but the separator is preferably stable against the organic electrolytic solution used, has a good liquid-retaining property, and securely prevents shoring between the electrodes. Preferable examples thereof include microporous films, sheets, unwoven clothes, etc., composed of various polymer materials. Specific examples of the polymer material include nylon, cellulose acetate, nitrocellulose, polysulfone, polyacrylonitrile, polyvinylidene fluoride, and polyolefin polymers such as polypropylene, polyethylene, and polybutene. In particular, from the viewpoints of chemical and electrochemical stability which is an important factor for the separator, polyolefin polymers are preferred. From the viewpoint of self occlusion temperature, which is one of the purposes of using the separator in the battery, polyethylene is particularly preferred.

When a separator composed of polyethylene is used, an ultra high molecular weight polyethylene is preferably used from the viewpoint of the high-temperature shape retention property. The lower limit of the molecular weight is preferably 500,000, more preferably 1,000,000, and most preferably 1,500,000. The upper limit of the molecular weight is preferably 5,000,000, more preferably 4,000,000, and most preferably 3,000,000. When the molecular weight is excessively high, the flowability decreases excessively and the pores in the separator may not close when heated.

<Battery Shape>

The lithium secondary battery of the present invention is manufactured by assembling the lithium secondary battery positive electrode of the present invention mentioned above, the negative electrode, the electrolyte, and, if needed, the separator into an appropriate shape. Moreover, other constitutional elements such as an outer package casing can be used depending on the need.

The shape of the lithium secondary battery of the present invention is not particularly limited and the selection may be made from various commonly employed shapes according to the usage. Examples of the commonly employed shapes include a cylinder type in which sheet electrodes and a separator are spirally arranged, an inside-out cylinder type in which pellet electrodes and a separator are combined, and a coin type in which pellet electrodes and a separator are stacked. The method for assembling the battery is also not particularly limited and the selection may be made from various commonly employed methods according to the desired battery shape.

Although general embodiments of the lithium secondary battery of the present invention are described above, the lithium secondary battery of the present invention is not limited to the above-mentioned embodiments and implementation with various modifications are possible without exceeding the spirit of the invention.

EXAMPLES

The present invention will now be described in further detail using Examples. However, the present invention is not limited to these examples in any way as long as the spirit of the invention is not exceeded.

[Methods for Measuring Physical Properties]

The physical properties and the like of lithium transition metal-based compound powders manufactured in Examples and Comparative Examples below were respectively measured as follows.

<Average Primary Particle Diameter>

Determination was conducted from SEM images taken at a 3,000× magnification for Comparative Example 2, 10,000× magnification for Comparative Example 5, and 30,000× magnification for other examples.

<Secondary Particle Diameter>

The median diameter serving as the average particle diameter and the 90% cumulative diameter ($D_{90}$) in Examples 8 to 12 and Comparative Examples 6 to 8 were measured with a known laser diffraction/scattering-type particle size distribution measuring instrument (LA-920 produced by Horiba Ltd.) at a refractive index of 1.24 using the volume as the particle diameter basis. A 0.1 wt % aqueous sodium hexametaphosphate solution was used as the dispersion medium and measurement was conducted after conducting ultrasonic dispersion (output: 30 W, frequency: 22.5 kHz) for 0 and 5 minutes.

The median diameter of the secondary particles in Examples 1 to 7 and Comparative Examples 1 to 5 was measured after 5 minutes of ultrasonic dispersion.

<Bulk Density>

A sample powder in an amount of 4 to 10 g was placed in a 10-ml glass graduated cylinder and the powder filling density after 200 times of tapping at a stroke of about 20 mm was determined as the bulk density.

<Measurement of Various Physical Properties by Mercury Intrusion Porosimetry>

AutoPore III 9420 produced by Micromeritics was used as the measuring instrument used in the mercury intrusion porosimetry. As for the measurement conditions of the mercury intrusion porosimetry, measurement was conducted at room temperature by elevating the pressure from 3.86 kPa to 413 MPa. The surface tension of the mercury was 480 dyn/cm and the contact angle was 141.3°.

<Specific Surface Area>

BET method was used for determination.

<Volume Resistivity>

The volume resistivity [Ω·cm] of various powders under pressure was measured with a powder resistivity measuring instrument (Loresta GP powder resistivity measuring system PD-41 produced by DIA Instruments Co., Ltd.) using a probe unit for powders (four-probe-ring electrode, electrode spacing: 5.0 mm, electrode radius: 1.0 mm, sample radius: 12.5 mm) at an application voltage limiter of 90 V and a sample weight of 2 g. The values of the volume resistivity under a pressure of 40 MPa were compared.

<Composition (Li/Ni/Mn/Co)>

ICP-AES analysis was used for determination.

<Quantitative Analysis of Additive Elements (W, Ta) and Other Element (B)>

ICP-AES analysis was used for determination.

<SERS Measurement>

Instrument: Nicoret Almega XR produced by Thermo Fisher Scientific

Pre-treatment: silver deposition (10 nm)

Excitation wavelength: 532 nm

Excitation output: 0.5 mW or less at sample positions

Analysis method: Height and half width of each peak excluding the linear background were measured.

Spectrum resolution: 10 $cm^{-1}$

<IR Spectroscopy>

Instrument: Nicoret Magna 560

Measurement method: transmission method (KBr)

Resolution: 4 $cm^{-1}$

Number of acquisitions: 100

Sample preparation method: A sample in an amount of 0.5 mg and 0.2 g KBr were weighed and quickly mixed in a mortar. All of the resulting mixed powder was placed in a pressing jig having a diameter of 10 mm and shaped at a pressure of 8 ton.

<Composition Analysis of Primary Particle Surfaces by X-Ray Photoelectron Spectroscopy (XPS)>

<XPS Analysis>

An X-ray photoelectron spectrometer "ESCA-5700" produced by Physical Electronics Inc., was used under the following conditions.

X-ray source: monochromatic AlKα

Analysis area: 0.8 mm diameter

Take-off angle: 65°

Quantitative method: B1s, $Mn2p_{1/2}$, $Co2p_{3/2}$, $Ni2p_{3/2}$, W4f, Ta4f

The area of each peak was corrected with a sensitivity coefficient.

<Surface Sputtering>

Ion species: Ar

Acceleration voltage: 3 kV

Ion current: 4.7 nA (Examples 1 to 5 and Comparative Example 3)

6.9 nA (Examples 6 and 7)

6.6 nA (Examples 8 to 12 and Comparative Examples 1 and 6 to 8)

Sputtering rate:

2.91 nm/min (on a $SiO_2$ basis) (Examples 1 to 5 and Comparative Example 3)

2.31 nm/min (on a $SiO_2$ basis) (Examples 6 and 7)

2.29 nm/min (on a $SiO_2$ basis) (Examples 8 to 12 and Comparative Examples 1 and 6 to 8)

<Carbon Concentration C>

EMIA-520 carbon/sulfur analyzer produced by Horiba Ltd. was used. A sample in an amount of several ten to 100 mg was weighed and placed in a preburned magnetic crucible, a combustion improver was added thereto, and carbon was combustion-extracted in a high-frequency heating furnace in an oxygen stream. $CO_2$ in the combustion gas was quantitatively determined by non-dispersive infrared absorption spectroscopy. A 150-15 low-alloy steel No. 1 (guaranteed C value: 0.469 wt %) produced by The Japan Iron and Steel Federation was used for sensitivity calibration.

<Confirmation of Crystal Phases (Layer Structures), Measurement of Half Value Width FWHM (110), Confirmation of Presence of Heterogeneous Phase Peaks in (018), (110), and (113) Diffraction Peaks, and Calculation of the Integrated Intensity Ratio of the Integrated Intensity of Heterogeneous Phase Peaks to the Integrated Intensity of Original Crystal Phase Peaks in Examples 1 to 7 and Comparative Examples 1 to 5>

Powder X-ray diffraction analysis below was conducted using a CuKα line. The analysis was conducted in a variable slit mode, and the observed intensity was converted into the intensity observed by using a fixed slit from the equation, intensity (fix)=intensity (variable)/sin θ. The (018), (110), and (113) diffraction peaks derived from the hexagonal system R–3 m (No. 166) detected for each sample were subjected to profile fitting to calculate the peak half width FWHM (110) derived from CuKα1, the integrated intensity, and the integrated intensity ratio.

<Specifications of Powder X-Ray Diffraction Analyzer>
Name of analyzer: X'Pert Pro MPD produced by PANalytical B. V., Netherland
Optical system: Focusing optical system
<Analytical Conditions>
X-ray output (CuKα): 40 kV, 30 mA, scan axis: θ/2θ
Scan range (2θ): 10.0 to 155.0°
<Calculation of Lattice Constant, Atom Coordinates, ODP, and Site Occupation Ratio in Examples 1 to 7 and Comparative Examples 1 to 5>

The X-ray diffractogram was analyzed with a Rietveld analysis program RIETAN-FP. The space group of the crystal structure model was R(−3)m [166]. A hypothetical atom Q=(1−p−q)Ni+pMn+qCo, where Q has an electron density equal to the sum of those of the transition metal elements (Ni, Mn, and C) at a composition ratio. The sum of the occupation ratio of the $3a$ (Li) sites and the sum of the occupation ratio of the $3b$ (Q) sites were set to 1 ($Li_{3a}+Q_{3a}=1$, $Q_{3b}+Li_{3b}=1$). The distortion ODP of the oxygen octahedron having (Ni, Mn, Co) atoms at the center was determined from the following equation:

$$ODP = do\text{-}o, intra / do\text{-}o, inter$$

where:
$do\text{-}o, intra = a$ $$do\text{-}o, inter = \sqrt{(a^2/3 + [(c/6) - 2c|0.25 - z_o|]^2)}$$

Here, $z_0$ represents the z axis coordinate of the oxygen atom determined by Rietveld analysis, and the displacement of the oxygen atom is the displacement from 0.25. The percentage (%) at which metal elements other than Li are mixed in the $3a$ sites, the lattice constant, the oxygen atom coordinate $z_0$, and the ODP value are summarized in Table 3.

<Confirmation of Crystal Phases (Layer Structures), Measurement of Half Value Width FWHM (110), Confirmation of Presence of Heterogeneous Phase Peaks in (018), (110), and (113) Diffraction Peaks, and Calculation of the Integrated Intensity Ratio of the Integrated Intensity of Heterogeneous Phase Peaks to the Integrated Intensity of Original Crystal Phase Peaks in Examples 8 to 12 and Comparative Examples 6 to 8>

Powder X-ray diffraction analysis below was conducted using a CuKα line. The (018), (110), and (113) diffraction peaks derived from the hexagonal system R−3 m (No. 166) detected for each sample were subjected to profile fitting to calculate the integrated intensity, the integrated intensity ratio, and the like.

The half width and area were calculated by using a diffraction pattern obtained by a focusing method in a fixed slit mode. Actual XRD analysis (Examples and Comparative Examples) was performed in a variable slit mode and the data conversion from variable to fixed was performed.

The conversion from variable to fixed was done using the equation, intensity (fix)=intensity (variable)/sin θ. (Specifications of powder X-ray diffraction analyzer)
Name of analyzer: X'Pert Pro MPD produced by PANalytical B. V., Netherland
Optical system: Focusing optical system (Specification of optical system)
Incident side: enclosed X-ray tube (CuKα)
Soller Slit (0.04 rad)
Divergence Slit (Variable Slit)
Sample table: rotating sample table (Spinner)
Reception side: semiconductor array detector (X'Celerator), Ni-filter
Radius of goniometer: 243 mm
<Measurement Conditions>
X-ray output (CuKα): 40 kV, 30 mA
Scan axis: θ/2θ
Scan range (2θ): 10.0 to 75.0°
Measurement mode: continuous
Read width: 0.015°
Gate time: 99.7 sec
Automatic variable slit (Automatic-DS: 10 mm (irradiation width))
Horizontal diversion mask: 10 nm (irradiation width)
<Lattice Constants in Examples 8 to 12 and Comparative Examples 6 to 8>

Lattice constant refining calculation was conducted on the basis of the diffraction analysis results. The peak positions were calculated by a profile fitting method (Peason-VII function). As the initial values, the crystal system·space group was hexagonal system·R(−3)m [166] and the parameters of $LiNiO_2$ [PDF: 9-63] were used as the lattice constants. The lattice constants and the sample eccentricity parameters were refined but the zero shift parameter was not refined. JADE (v. 7.5.2, Japanese edition) produced by Materials Data Inc. was used as the analysis software.

<Median Diameter of Ground Particles in the Slurry>
Measurement was performed using a known laser diffraction/scattering-type particle size distribution measuring instrument at a refractive index of 1.24 using the volume as the particle diameter basis. A 0.1 wt % aqueous sodium hexametaphosphate solution was used as the dispersion medium and the measurement was conducted after 5 minutes of ultrasonic dispersion (output: 30 W, frequency: 22.5 kHz).

<Median Diameter Serving as the Average Particle Diameter of Raw Material $Li_2CO_3$ Powder>
Measurement was performed using a known laser diffraction/scattering-type particle size distribution measuring instrument (LA-920 produced by Horiba Ltd.) at a refractive index of 1.24 using the volume as the particle diameter basis. Ethyl alcohol was used as the dispersion medium and the measurement was conducted after 5 minutes of ultrasonic dispersion (output: 30 W, frequency: 22.5 kHz)

<Physical Properties of the Granular Powder Obtained by Spray Drying>
The morphology was confirmed through SEM observation and cross-sectional SEM observation. The median diameter as the average particle diameter and the 90% cumulative diameter ($D_{90}$) were measured with a known laser diffraction/scattering-type particle size distribution measuring instrument (LA-920 produced by Horiba Ltd.) at a refractive index of 1.24 using the volume as the particle diameter basis. A 0.1 wt % aqueous sodium hexametaphosphate solution was used as the dispersion medium and the measurement was conducted after conducting ultrasonic dispersion (output: 30 W, frequency: 22.5 kHz) for 0, 1, 3, and 5 minutes. The specific surface area was determined by the BET method. The bulk density was determined as the powder filling density determined by placing 4 to 10 g of a sample powder in a 10 ml glass graduated cylinder and tapping 200 times at a stroke of about 20 mm.

[Fabrication and Evaluation of Battery]
Each of the lithium nickel manganese cobalt-based composite oxide powders manufactured in Examples and Comparative Examples below was used as the positive electrode material (positive electrode active substance) and a lithium secondary battery was fabricated and evaluated by the following methods.

(1) Rate Test:

In a mortar, 75 wt % of the obtained lithium nickel manganese cobalt-based composite oxide powder, 20 wt % of acetylene black, and 5 wt % of polytetrafluoroethylene powder that had been weighed were thoroughly mixed and formed into a thin sheet. The thin sheet was punched out using a punch having a diameter of 9 mm. During this process, the total weight was adjusted to about 8 mg. The resulting product was press-bonded onto an aluminum expanded metal to form a positive electrode having a diameter of 9 mm.

A coin-type cell was assembled by using this positive electrode having a diameter of 9 mm as the test electrode, a lithium metal plate as the counter electrode, an electrolytic solution prepared by dissolving 1 mol/L of $LiPF_6$ in a solvent having EC (ethylene carbonate):DMC (dimethyl carbonate): EMC (ethyl methyl carbonate)=3:3:4 (volume ratio), and a 25 µm-thick porous polyethylene film as the separator.

In the first cycle, the obtained coin-type cell was subjected to a test involving constant-current/constant-voltage charging at 0.2 mA/cm² and an upper limit voltage of 4.2 V and constant-current discharging at 0.2 mA/cm² and a lower limit voltage of 3.0 V. In the second cycle, the cell was subjected to a test involving constant-current/constant-voltage charging at 0.5 mA/cm² and an upper limit voltage of 4.2 V and constant-current discharging at 0.2 mA/cm² and an upper limit voltage of 3.0 V. Subsequently, in the third cycle, the cell was subjected to a test involving constant-current charging at 0.5 mA/cm² and constant-current discharging at 11 mA/cm².

The 0.1 C discharge capacity (mAh/g) (initial discharge capacity) of the first cycle and the 0.1 C discharge capacity (mAh/g) (third cycle discharge capacity) of the third cycle were examined.

(2) Low Temperature Load Characteristics Test and High Temperature Cycle Test:

In a mortar, 75 wt % of the obtained lithium nickel manganese cobalt-based composite oxide powder, 20 wt % of acetylene black, and 5 wt % of polytetrafluoroethylene powder that had been weighed were thoroughly mixed and formed into a thin sheet. The thin sheet was punched out using a punch having a diameter of 12 mm. During this process, the total weight was adjusted to about 18 mg. The resulting product was press-bonded onto an aluminum expanded metal to form a positive electrode having a diameter of 12 mm.

Using the results of the charge/discharge operation of the first cycle in the rate test of (1), the initial charge capacity per positive electrode active substance unit weight was given as Qs (C) [mAh/g] and the initial discharge capacity was given as Qs (D) [mAh/g].

A graphite powder ($d_{002}$=3.35 Å) having an average particle diameter of 8 to 10 µm used as the negative electrode active substance and polyvinylidene fluoride used as the binder were weighed so that the weight ratio was 92.5:7.5 and mixed in a N-methylpyrrolidone solution to prepare a negative electrode mix slurry. The slurry was applied on one side of a copper foil having a thickness of 20 µm and dried to evaporate the solvent. The resulting copper foil with the slurry was punched out to have a diameter of 12 mm and subjected to a press treatment at 0.5 ton/cm² (49 MPa) to prepare a negative electrode. In Examples 1 to 7 and Comparative Examples 1 to 5, the amount of the negative electrode active substance on the electrode was adjusted to about 7 to 8 mg. In Examples 8 to 12 and Comparative Examples 6 to 8, the amount of the negative electrode active substance on the electrode was adjusted to about 5 to 12 mg.

A battery cell was assembled by using this negative electrode as the test electrode and subjected to a test of causing the negative electrode to occlude lithium ions by a 0.2 mA/cm²-3 mV constant-current/constant-voltage method (cut current: 0.05 mA) with a lower limit of 0 V. The initial occlusion capacity per negative electrode active substance unit weight determined thereby was given as $Q_f$ [mAh/g].

A test battery was assembled using the combination of the positive electrode and the negative electrode described above and the coin cell and the battery performance thereof was evaluated. That is, the obtained positive electrode described above was placed on a positive electrode can of the coin cell, a 25 µm-thick porous polyethylene film serving as the separator was placed on the positive electrode, and the positive electrode and the porous polyethylene film were held down by a polypropylene gasket. Then an electrolytic solution prepared by dissolving 1 mol/L of $LiPF_6$ in a solvent having EC (ethylene carbonate):DMC (dimethyl carbonate):EMC (ethyl methyl carbonate)=3:3:4 (volume ratio) was used as the non-aqueous electrolytic solution and added to the can to sufficiently impregnate the separator. Subsequently, the above-described negative electrode was placed and a negative electrode can was placed to provide seal to thereby fabricate a coin-type lithium secondary battery. The balance between the weight of the positive electrode active substance and the weight of the negative electrode active substance was adjusted to substantially satisfy the following equation:

$$\text{Weight of the positive electrode active substance [g]}/\text{weight of the negative electrode active substance [g]}=(Q_f[\text{mAh/g}]/1.2)Qs(C)[\text{mAh/g}]$$

In order to measure the low temperature load characteristics of the thus obtained battery, 1 C, i.e., the hour rate current value, of the battery was set in accordance to the following equation and the test below was conducted:

$$1\ C\ [\text{mA}]=Qs(D)\times\text{positive electrode active substance weight [g]/time [h]}$$

First, two cycles of constant current 0.2 C charge/discharge operation and one cycle of constant current 1 C charge/discharge operation were conducted at room temperature. The charge upper limit was set to 4.1 V and the lower limit voltage was set to 3.0 V. Next, ⅓ C constant-current charge/discharge operation was conducted to adjust the charge depth of the coin cell to 40%, and the coin cell was retained in a low temperature atmosphere of −30° C. for 1 hour or longer. Subsequently, the low temperature resistance R [Ω] was determined from the following formula:

$$R[\Omega]=\Delta V[\text{mV}]/0.5\ C\ [\text{mA}]$$

where $\Delta V=V-V_0$, V [mV] is the voltage after 10 seconds of discharging operation at a constant current of 0.5 C [mA], and $V_0$ is the voltage before the discharge operation.

Next, a test of performing one cycle of constant-current 0.2 C charge/discharge operation and then 100 cycles of constant-current 1 C charge/discharge operation at a high temperature of 60° C. was performed. The charge upper limit was set to 4.1 V and the lower limit voltage was set to 3.0 V.

The ratio of the discharge capacity Qh (100) of the 100th cycle of the 1 C charge/discharge operation at 60° C. was calculated as the high-temperature cycle capacity retention rate P by using the equation below, and the high temperature characteristics of the batteries were compared using this value.

$$P[\%]=\{Qh(100)/Qh(1)\}\times 100$$

Then as described above, the resistance R [Ω] after the high temperature cycle test was calculated.

The smaller the low temperature resistance of the battery, the better the low temperature load characteristics. The higher the high-temperature cycle capacity retention rate, the better the high-temperature cycle characteristics.

[Manufacture of Lithium Transition Metal-based Compound Powder of Second Invention (Examples and Comparative Examples)]

Example 1

$Li_2CO_3$, $Ni(OH)_2$, $Mn_3O_4$, CoOOH, and $WO_3$ were weighed in a molar ratio of Li:Ni:Mn:Co:W=1.05:0.50:0.30: 0.20:0.010 and mixed. Pure water was added thereto to prepare a slurry. The solid components in the slurry were ground using a circulating medium agitation-type grinder while agitating the slurry so that the median diameter of the solid components was 0.30 μm.

The slurry (solid content: 15 wt %, viscosity: 1290 cp) was then spray-dried with a twin fluid nozzle-type spray dryer (LT-8 type produced by Ohkawara Kakohki Co., Ltd.). Air was used as the drying gas at this time, the drying gas introduction rate G was 45 L/min, and the slurry introduction rate S was $7 \times 10^{-3}$ mL/min (gas-liquid ratio G/S=6429). The dryer entrance temperature was set to 150° C. About 15 g of granular powder obtained by spray drying using the spray dryer was placed in an alumina crucible, fired at 1000° C. for 6 hours in an air atmosphere (heating and cooling rate: 3.33° C./min), and classified (45 μm) to obtain a lithium nickel manganese cobalt-based composite oxide (p=0.302, q=0.198, r=0.061) having a composition represented by $Li(Li_{0.030}Ni_{0.485}Mn_{0.293}Co_{0.192})O_2$, a volume resistivity of $6.7 \times 10^3$ Ω·cm, and a carbon concentration of 0.042 wt %. When the total molar ratio of (Ni, Mn, Co) was 1, the molar ratio of W was 0.96 mol %. The average primary particle diameter was 0.4 μm, the median diameter was 6.0 μm, the 90% cumulative diameter ($D_{90}$) was 9.4 μm, the bulk density was 1.5 g/cm$^3$, and the BET specific surface area was 1.7 m$^2$/g. The atomic ratio of W on the primary particle surfaces was 17.0 times the atomic ratio (W/(Ni+Mn+Co)) of W (tungsten) in the entire particles. The ratio $R_0/R_{10}$ of the atomic ratio $R_0$ of W relative to the total of (Ni, Mn, Co) on the particle outermost surfaces to the atomic ratio $R_{10}$ of the total of W relative to the total of (Ni, Mn, Co) that exist in the region from the particle surfaces to a depth of 10 nm was 4.5.

Example 2

$Li_2CO_3$, $Ni(OH)_2$, $Mn_3O_4$, CoOOH, and $WO_3$ were weighed in a molar ratio of Li:Ni:Mn:Co:W=1.05:0.50:0.30: 0.20:0.010 and mixed. Pure water was added thereto to prepare a slurry. The solid components in the slurry were ground using a circulating medium agitation-type grinder (DM45 type) while agitating the slurry so that the median diameter of the solid components was 0.32 μm.

The slurry (solid content: 18 wt %, viscosity: 1330 cp) was then spray-dried with a quadruple fluid nozzle-type spray dryer (MDP-050 type produced by Fujisaki Electric Co., Ltd.). Air was used as the drying gas at this time, the drying gas introduction rate G was 1600 L/min, and the slurry introduction rate S was 780 mL/min (gas-liquid ratio G/S=2051). The dryer entrance temperature was set to 200° C. About 500 g of granular powder obtained by spray drying using the spray dryer was placed in an alumina square bowl, fired at 1000° C. for 4.75 hours in an air atmosphere (heating rate: 1.85° C./min, cooling rate: about 3.33° C./min), and classified (45 μm) to obtain a lithium nickel manganese cobalt-based composite oxide (p=0.299, q=0.197, r=0.045) having a composition represented by $Li(Li_{0.022}Ni_{0.493}Mn_{0.292}Co_{0.193})O_2$, a volume resistivity of $8.8 \times 10^3$ Ω·cm, and a carbon concentration of 0.054 wt %. When the total molar ratio of (Ni, Mn, Co) was 1, the molar ratio of W was 0.96 mol %. The average primary particle diameter was 0.3 μm, the median diameter was 7.1 μm, the 90% cumulative diameter ($D_{90}$) was 11.4 μm, the bulk density was 1.6 g/cm$^3$, and the BET specific surface area was 1.7 m$^2$/g. The atomic ratio of W on the primary particle surfaces was 16.3 times the atomic ratio (W/(Ni+ Mn+Co)) of W (tungsten) in the entire particles. The ratio $R_0/R_{10}$ of the atomic ratio $R_0$ of W relative to the total of (Ni, Mn, Co) on the particle outermost surfaces to the atomic ratio $R_{10}$ of the total of W relative to the total of (Ni, Mn, Co) that exist in the region from the particle surfaces to a depth of 10 nm was 4.4.

Example 3

$Li_2CO_3$, $Ni(OH)_2$, $Mn_3O_4$, CoOOH, $H_3BO_3$, and $WO_3$ were weighed in a molar ratio of Li:Ni:Mn:Co:B:W=1.05: 0.50:0.30:0.20:0.0025:0.010 and mixed. Pure water was added thereto to prepare a slurry. The solid components in the slurry were ground using a circulating medium agitation-type grinder while agitating the slurry so that the median diameter of the solid components was 0.28 μm.

The slurry (solid content: 15 wt %, viscosity: 1160 cp) was then spray-dried with a twin fluid nozzle-type spray dryer (LT-8 type produced by Ohkawara Kakohki Co., Ltd.). Air was used as the drying gas at this time, the drying gas introduction rate G was 45 L/min, and the slurry introduction rate S was $6 \times 10^{-3}$ mL/min (gas-liquid ratio G/S=7500). The dryer entrance temperature was set to 150° C. About 15 g of granular powder obtained by spray drying using the spray dryer was placed in an alumina crucible, fired at 975° C. for 6 hours in an air atmosphere (heating and cooling rate: 3.33° C./min), and ground to obtain a lithium nickel manganese cobalt-based composite oxide (p=0.301, q=0.199, r=0.049) having a composition represented by $Li(Li_{0.024}Ni_{0.489}Mn_{0.293}Co_{0.194})O_2$, a volume resistivity of $4.9 \times 10^4$ Ω·cm, and a carbon concentration of 0.055 wt %. When the total molar ratio of (Ni, Mn, Co) was 1, the molar ratio of B was 0.96 mol % and that of W was 0.24 mol %. The average primary particle diameter was 0.4 μm, the median diameter was 4.6 μm, the 90% cumulative diameter ($D_{90}$) was 6.9 μm, the bulk density was 1.8 g/cm$^3$, and the BET specific surface area was 1.7 m$^2$/g. The atomic ratio of B on the primary particle surfaces was 32.0 times the atomic ratio (B/(Ni+Mn+Co)) of B (boron) in the entire particles. The atomic ratio of W on the primary particle surfaces was 13.5 times the atomic ratio (W/(Ni+Mn+Co)) of W (tungsten) in the entire particles. The ratio $R_0/R_{10}$ of the atomic ratio $R_0$ of B or W relative to the total of (Ni, Mn, Co) on the particle outermost surfaces to the atomic ratio $R_{10}$ of the total of B or W relative to the total of (Ni, Mn, Co) that exist in the region from the particle surfaces to a depth of 10 nm was 3.3 for B and 4.0 for W.

Example 4

$Li_2CO_3$, $Ni(OH)_2$, $Mn_3O_4$, CoOOH, and $WO_3$ were weighed in a molar ratio of Li:Ni:Mn:Co:W=1.05:0.40:0.40: 0.20:0.010 and mixed. Pure water was added thereto to prepare a slurry. The solid components in the slurry were ground using a circulating medium agitation-type grinder while agitating the slurry so that the median diameter of the solid components was 0.25 μm.

The slurry (solid content: 15 wt %, viscosity: 980 cp) was then spray-dried with a twin fluid nozzle-type spray dryer (LT-8 type produced by Ohkawara Kakohki Co., Ltd.). Air was used as the drying gas at this time, the drying gas introduction rate G was 45 L/min, and the slurry introduction rate S was 6×10⁻³ mL/min (gas-liquid ratio G/S=7500). The dryer entrance temperature was set to 150° C. About 15 g of granular powder obtained by spray drying using the spray dryer was placed in an alumina crucible, fired at 1000° C. for 6 hours in an air atmosphere (heating and cooling rate: 3.33° C./min), and classified (45 μm) to obtain a lithium nickel manganese cobalt-based composite oxide (p=0.404, q=0.197, r=0.073) having a composition represented by $Li(Li_{0.035}Ni_{0.386}Mn_{0.389}Co_{0.190})O_2$, a volume resistivity of $4.8\times10^5$ Ω·cm, and a carbon concentration of 0.025 wt %. When the total molar ratio of (Ni, Mn, Co) was 1, the molar ratio of W was 0.95 mol %. The average primary particle diameter was 0.3 μm, the median diameter was 2.5 μm, the 90% cumulative diameter ($D_{90}$) was 4.6 μm, the bulk density was 1.1 g/cm³, and the BET specific surface area was 2.7 m²/g. The atomic ratio of W on the primary particle surfaces was 10.1 times the atomic ratio (W/(Ni+Mn+Co)) of W (tungsten) in the entire particles. The ratio $R_0/R_{10}$ of the atomic ratio $R_0$ of W relative to the total of (Ni, Mn, Co) on the particle outermost surfaces to the atomic ratio $R_{10}$ of the total of W relative to the total of (Ni, Mn, Co) that exist in the region from the particle surfaces to a depth of 10 nm was 4.0.

Example 5

$Li_2CO_3$, $Ni(OH)_2$, $Mn_3O_4$, CoOOH, and $WO_3$ were weighed in a molar ratio of Li:Ni:Mn:Co:W=1.05:0.60:0.20:0.20:0.010 and mixed. Pure water was added thereto to prepare a slurry. The solid components in the slurry were ground using a circulating medium agitation-type grinder while agitating the slurry so that the median diameter of the solid components was 0.30 μm.

The slurry (solid content: 15 wt %, viscosity: 1480 cp) was then spray-dried with a twin fluid nozzle-type spray dryer (LT-8 type produced by Ohkawara Kakohki Co., Ltd.). Air was used as the drying gas at this time, the drying gas introduction rate G was 45 L/min, and the slurry introduction rate S was 6.7×10⁻³ mL/min (gas-liquid ratio G/S=6716). The dryer entrance temperature was set to 150° C. About 15 g of granular powder obtained by spray drying using the spray dryer was placed in an alumina crucible, fired at 850° C. for 6 hours in an air atmosphere (heating and cooling rate: 3.33° C./min), and classified (45 μm) to obtain a lithium nickel manganese cobalt-based composite oxide p=0.199, q=0.197, r=0.058) having a composition represented by $Li(Li_{0.028}Ni_{0.587}Mn_{0.193}Co_{0.192})O_2$, a volume resistivity of $5.3\times10^2$ Ω·cm, and a carbon concentration of 0.119 wt %. When the total molar ratio of (Ni, Mn, Co) was 1, the molar ratio of W was 0.95 mol %. The average primary particle diameter was 0.2 μm, the median diameter was 5.0 μm, the 90% cumulative diameter ($D_{90}$) was 7.5 μm, the bulk density was 1.9 g/cm³, and the BET specific surface area was 1.6 m²/g. The atomic ratio of W on the primary particle surfaces was 8.6 times the atomic ratio (W/(Ni+Mn+Co)) of W (tungsten) in the entire particles. The ratio $R_0/R_{10}$ of the atomic ratio $R_0$ of W relative to the total of (Ni, Mn, Co) on the particle outermost surfaces to the atomic ratio $R_{10}$ of the total of W relative to the total of (Ni, Mn, Co) that exist in the region from the particle surfaces to a depth of 10 nm was 3.4.

Example 6

$Li_2CO_3$, $Ni(OH)_2$, $Mn_3O_4$, CoOOH, and $Ta_2O_5$ were weighed in a molar ratio of Li:Ni:Mn:Co:Ta=1.05:0.50:0.30:0.20:0.010 and mixed. Pure water was added thereto to prepare a slurry. The solid components in the slurry were ground using a circulating medium agitation-type grinder while agitating the slurry so that the median diameter of the solid components was 0.29 μm.

The slurry (solid content: 15 wt %, viscosity: 1670 cp) was then spray-dried with a twin fluid nozzle-type spray dryer (LT-8 type produced by Ohkawara Kakohki Co., Ltd.). Air was used as the drying gas at this time, the drying gas introduction rate G was 45 L/min, and the slurry introduction rate S was 7×10⁻³ mL/min (gas-liquid ratio G/S=6429). The dryer entrance temperature was set to 150° C. About 15 g of granular powder obtained by spray drying using the spray dryer was placed in an alumina crucible, fired at 900° C. for 6 hours in an air atmosphere (heating and cooling rate: 3.33° C./min), and classified (45 μm) to obtain a lithium nickel manganese cobalt-based composite oxide (p=0.308, q=0.198, r=0.091) having a composition represented by $Li(Li_{0.044}Ni_{0.472}Mn_{0.295}Co_{0.189})O_2$, a volume resistivity of $2.5\times10^3$ Ω·cm, and a carbon concentration of 0.054 wt %. When the total molar ratio of (Ni, Mn, Co) was 1, the molar ratio of Ta was 0.92 mol %. The average primary particle diameter was 0.3 μm, the median diameter was 3.7 μm, the 90% cumulative diameter ($D_{90}$) was 6.1 μm, the bulk density was 1.3 g/cm³, and the BET specific surface area was 2.2 m²/g. The atomic ratio of Ta on the primary particle surfaces was 7.6 times the atomic ratio (Ta/(Ni+Mn+Co)) of Ta (tantalum) in the entire particles. The ratio $R_0/R_{10}$ of the atomic ratio $R_0$ of Ta relative to the total of (Ni, Mn, Co) on the particle outermost surfaces to the atomic ratio $R_{10}$ of the total of Ta relative to the total of (Ni, Mn, Co) that exist in the region from the particle surfaces to a depth of 10 nm was 4.3. The specific surface area was 0.7 m²/g Example 7

A lithium nickel manganese cobalt-based composite oxide (p=0.307, q=0.197, r=0.097) having a composition represented by $Li(Li_{0.046}Ni_{0.473}Mn_{0.293}Co_{0.188})O_2$, a volume resistivity of $6.1\times10^3$ Ω·cm, and a carbon concentration of 0.033 wt % was obtained as in Example 6 except that the firing temperature was changed to 950° C. When the total molar ratio of (Ni, Mn, Co) was 1, the molar ratio of Ta was 0.98 mol %. The average primary particle diameter was 0.6 μm, the median diameter was 5.0 μm, the 90% cumulative diameter ($D_{90}$) was 7.3 μm, the bulk density was 1.4 g/cm³, and the BET specific surface area was 1.0 m²/g. The atomic ratio of Ta on the primary particle surfaces was 8.7 times the atomic ratio (Ta/(Ni+Mn+Co)) of Ta (tantalum) in the entire particles. The ratio $R_0/R_{10}$ of the atomic ratio $R_0$ of Ta relative to the total of (Ni, Mn, Co) on the particle outermost surfaces to the atomic ratio $R_{10}$ of the total of Ta relative to the total of (Ni, Mn, Co) that exist in the region from the particle surfaces to a depth of 10 nm was 5.1.

Comparative Example 1

$Li_2CO_3$, $Ni(OH)_2$, $Mn_3O_4$, CoOOH, and $WO_3$ were weighed in a molar ratio of Li:Ni:Mn:Co:W=1.12:0.45:0.45:0.10:0.010 and mixed. Pure water was added thereto to prepare a slurry. The solid components in the slurry were ground using a circulating medium agitation-type grinder (DM 45 type) while agitating the slurry so that the median diameter of the solid components was 0.23

The slurry (solid content: 16.5 wt %, viscosity: 1650 cp) was then spray-dried with a quadruple fluid nozzle-type spray dryer (MDP-050 type produced by Fujisaki Electric Co., Ltd.). Air was used as the drying gas at this time, the drying gas introduction rate G was 1600 L/min, and the slurry introduction rate S was 780 mL/min (gas-liquid ratio G/S=2051). The dryer entrance temperature was set to 200° C. About 370 g of granular powder obtained by spray drying using the spray dryer was placed in an alumina square bowl, fired at 1000° C. for 2 hours in an air atmosphere (heating rate: 1.7° C./min, cooling rate: about 3.3° C./min), and classified through a 45 μm-mesh Powsifter (produced by Tsukasa Industry, Co., Ltd.) to obtain a lithium nickel manganese cobalt-based composite oxide (p=0.451, q=0.100, r=0.111) having a composition represented by $Li(Li_{0.053}Ni_{0.425}Mn_{0.427}Co_{0.95})O_2$, a volume resistivity of $6.3×10^4$ Ω·cm, and a carbon concentration of 0.031 wt %. When the total molar ratio of (Ni, Mn, Co) was 1, the molar ratio of W was 1.01 mol %. The average primary particle diameter was 0.2 μm, the median diameter was 2.7 μm, the 90% cumulative diameter ($D_{90}$) was 4.9 μm, the bulk density was 1.0 g/cm$^3$, and the BET specific surface area was 2.8 m$^2$/g. The atomic ratio of W on the primary particle surfaces was 7.8 times the atomic ratio (W/(Ni+Mn+Co)) of W (tungsten) in the entire particles. The ratio $R_0/R_{10}$ of the atomic ratio $R_0$ of W relative to the total of (Ni, Mn, Co) on the particle outermost surfaces to the atomic ratio $R_{10}$ of the total of W relative to the total of (Ni, Mn, Co) that exist in the region from the particle surfaces to a depth of 10 nm was 4.5.

Comparative Example 2

$Li_2CO_3$, $Ni(OH)_2$, $Mn_3O_4$, and CoOOH were weighed in a molar ratio of Li:Ni:Mn:Co=1.05:0.50:0.30:0.20 and mixed. Pure water was added thereto to prepare a slurry. The solid components in the slurry were ground using a circulating medium agitation-type grinder while agitating the slurry so that the median diameter of the solid components was 0.26 μm.

The slurry (solid content: 15 wt %, viscosity: 1690 cp) was then spray-dried with a twin fluid nozzle-type spray dryer (LT-8 type produced by Ohkawara Kakohki Co., Ltd.). Air was used as the drying gas at this time, the drying gas introduction rate G was 45 L/min, and the slurry introduction rate S was 7.0×10$^{-3}$ mL/min (gas-liquid ratio G/S=6429). The dryer entrance temperature was set to 150° C. About 15 g of granular powder obtained by spray drying using the spray dryer was placed in an alumina crucible, fired at 1000° C. for 6 hours in an air atmosphere (heating and cooling rate: 3.33° C./min), and classified (45 μm) to obtain a lithium nickel manganese cobalt-based composite oxide (p=0.303, q=0.198, r=0.068) having a composition represented by $Li(Li_{0.033}Ni_{0.483}Mn_{0.293}Co_{0.191})O_2$, a volume resistivity of 1.0×10$^3$ Ω·cm, and a carbon concentration of 0.024 wt %. The average primary particle diameter was 5.1 μm, the median diameter was 8.9 the 90% cumulative diameter ($D_{90}$) was 13.5 μm, the bulk density was 2.7 g/cm$^3$, and the BET specific surface area was 0.7 m$^2$/g.

Comparative Example 3

A lithium nickel manganese cobalt-based composite oxide (p=0.307, q=0.199, r=0.091) having a composition represented by $Li(Li_{0.043}Ni_{0.472}Mn_{0.294}Co_{0.191})O_2$, a volume resistivity of 1.3×10$^3$ Ω·cm, and a carbon concentration of 0.088 wt % was obtained as in Example 1 except that the firing temperature was changed to 850° C. When the total molar ratio of (Ni, Mn, Co) was 1, the molar ratio of W was 0.94 mol %. The average primary particle diameter was 0.2 μm, the median diameter was 3.9 μm, the 90% cumulative diameter ($D_{90}$) was 6.4 μm, the bulk density was 1.4 g/cm$^3$, and the BET specific surface area was 4.0 m$^2$/g. The atomic ratio of W on the primary particle surfaces was 6.1 times the atomic ratio (W/(Ni+Mn+Co)) of W (tungsten) in the entire particles. The ratio $R_0/R_{10}$ of the atomic ratio $R_0$ of W relative to the total of (Ni, Mn, Co) on the particle outermost surfaces to the atomic ratio $R_{10}$ of the total of W relative to the total of (Ni, Mn, Co) that exist in the region from the particle surfaces to a depth of 10 nm was 3.2.

Comparative Example 4

$Li_2CO_3$, $Ni(OH)_2$, $Mn_3O_4$, and CoOOH were weighed in a molar ratio of Li:Ni:Mn:Co=1.05:0.40:0.40:0.20 and mixed. Pure water was added thereto to prepare a slurry. The solid components in the slurry were ground using a circulating medium agitation-type grinder while agitating the slurry so that the median diameter of the solid components was 0.27 μm.

The slurry (solid content: 15 wt %, viscosity: 1260 cp) was then spray-dried with a twin fluid nozzle-type spray dryer (LT-8 type produced by Ohkawara Kakohki Co., Ltd.). Air was used as the drying gas at this time, the drying gas introduction rate G was 45 L/min, and the slurry introduction rate S was 6.7×10$^{-3}$ mL/min (gas-liquid ratio G/S=6716). The dryer entrance temperature was set to 150° C. About 15 g of granular powder obtained by spray drying using the spray dryer was placed in an alumina crucible, fired at 1000° C. for 6 hours in an air atmosphere (heating and cooling rate: 3.33° C./min), and classified (45 μm) to obtain a lithium nickel manganese cobalt-based composite oxide (p=0.404, q=0.197, r=0.076) having a composition represented by $Li(Li_{0.037}Ni_{0.384}Mn_{0.389}Co_{0.190})O_2$, a volume resistivity of 5.1×10$^4$ Ω·cm, and a carbon concentration of 0.027 wt %. The average primary particle diameter was 0.6 μm, the median diameter was 4.2 μm, the 90% cumulative diameter ($D_{90}$) was 6.5 μm, the bulk density was 1.3 g/cm$^3$, and the BET specific surface area was 2.7 m$^2$/g.

Comparative Example 5

$Li_2CO_3$, $Ni(OH)_2$, $Mn_3O_4$, and CoOOH were weighed in a molar ratio of Li:Ni:Mn:Co=1.05:0.60:0.20:0.20 and mixed. Pure water was added thereto to prepare a slurry. The solid components in the slurry were ground using a circulating medium agitation-type grinder while agitating the slurry so that the median diameter of the solid components was 0.29 μm.

The slurry (solid content: 14 wt %, viscosity: 1610 cp) was then spray-dried with a twin fluid nozzle-type spray dryer (LT-8 type produced by Ohkawara Kakohki Co., Ltd.). Air was used as the drying gas at this time, the drying gas introduction rate G was 45 L/min, and the slurry introduction rate S was 6.7×10$^{-3}$ mL/min (gas-liquid ratio G/S=6716). The dryer entrance temperature was set to 150° C. About 15 g of granular powder obtained by spray drying using the spray dryer was placed in an alumina crucible, fired at 900° C. for 6 hours in an air atmosphere (heating and cooling rate: 3.33° C./min), and classified (45 μm) to obtain a lithium nickel manganese cobalt-based composite oxide (p=0.202, q=0.198, r=0.078) having a composition represented by $Li(Li_{0.038}Ni_{0.577}Mn_{0.194}Co_{0.191})O_2$, a volume resistivity of 2.7×10$^3$ Ω·cm, and a carbon concentration of 0.270 wt %. The average primary particle diameter was 1.5 μm, the median diameter was 4.0 μm, the 90% cumulative diameter ($D_{90}$) was 12.9 μm, the bulk density was 2.6 g/cm$^3$, and the BET specific surface area was 1.4 m$^2$/g.

The compositions and physical property values of the lithium nickel manganese cobalt-based composite oxide powders manufactured in Examples 1 to 7 and Comparative Examples 1 to 5 above are shown in Tables 1 to 7. The powder properties of the spray-dried substances, which are firing precursors, are shown in Table 8.

The concentration distribution curves (XPS analysis) of the additive elements in the lithium nickel manganese cobalt-based composite oxides manufactured in Examples 1 to 7 and Comparative Examples 1 and 3 from the surface in the depth direction are respectively shown in FIGS. 1 to 9. The SERS patterns of the lithium nickel manganese cobalt-based composite oxide powders manufactured in Examples 1 to 7 and Comparative Examples 1 to 5 are respectively shown in FIGS. 10 to 21. The pore distribution curves are respectively shown in FIGS. 22 to 33. The SEM images (photographs) (10,000× magnification) are respectively shown FIGS. 34 to 45. The powder X-ray diffraction patterns are respectively shown in FIGS. 46 to 57.

TABLE 1

| Positive electrode material | | Composition p | q | r | Carbon content C (wt %) | Volume resistivity ($\Omega \cdot cm$) |
|---|---|---|---|---|---|---|
| Examples | 1 | 0.302 | 0.198 | 0.061 | 0.042 | $6.7 \times 10^3$ |
|  | 2 | 0.299 | 0.197 | 0.045 | 0.054 | $8.8 \times 10^3$ |
|  | 3 | 0.301 | 0.199 | 0.049 | 0.055 | $4.9 \times 10^4$ |
|  | 4 | 0.404 | 0.197 | 0.073 | 0.025 | $4.8 \times 10^5$ |
|  | 5 | 0.199 | 0.197 | 0.058 | 0.119 | $5.3 \times 10^2$ |
|  | 6 | 0.308 | 0.198 | 0.091 | 0.054 | $2.5 \times 10^3$ |
|  | 7 | 0.307 | 0.197 | 0.097 | 0.033 | $6.1 \times 10^3$ |
| Comparative Examples | 1 | 0.451 | 0.100 | 0.111 | 0.031 | $6.3 \times 10^4$ |
|  | 2 | 0.303 | 0.198 | 0.068 | 0.024 | $1.0 \times 10^3$ |
|  | 3 | 0.307 | 0.199 | 0.091 | 0.088 | $1.3 \times 10^3$ |
|  | 4 | 0.404 | 0.197 | 0.076 | 0.027 | $5.1 \times 10^4$ |
|  | 5 | 0.202 | 0.198 | 0.078 | 0.270 | $2.7 \times 10^3$ |

TABLE 2

| Positive electrode material | | Additive element | Additive element molar ratio (mol %) Feed value | Analytic value | *1 | $R_0/R_{10}$ | Other element | Other element molar ratio (mol %) Feed value | Analytic value | *1 | $R_0/R_{10}$ |
|---|---|---|---|---|---|---|---|---|---|---|---|
| Examples | 1 | W | 1.0 | 0.96 | 17.0 | 4.5 | B | — | 0.02 | — | — |
|  | 2 | W | 1.0 | 0.96 | 16.3 | 4.4 | B | — | <0.01 | — | — |
|  | 3 | W | 1.0 | 0.96 | 13.5 | 4.0 | B | 0.25 | 0.24 | 32.0 | 3.3 |
|  | 4 | W | 1.0 | 0.95 | 10.1 | 4.0 | B | — | <0.01 | — | — |
|  | 5 | W | 1.0 | 0.95 | 8.6 | 3.4 | B | — | 0.01 | — | — |
|  | 6 | Ta | 1.0 | 0.92 | 7.6 | 4.3 | B | — | <0.1 | — | — |
|  | 7 | Ta | 1.0 | 0.98 | 8.7 | 5.1 | B | — | <0.1 | — | — |
| Comparative Examples | 1 | W | 1.0 | 1.01 | 7.8 | 4.5 | B | — | — | — | — |
|  | 2 | W | — | <0.01 | — | — | B | — | <0.01 | — | — |
|  | 3 | W | 1.0 | 0.94 | 6.1 | 3.2 | B | — | <0.01 | — | — |
|  | 4 | W | — | <0.01 | — | — | B | — | <0.01 | — | — |
|  | 5 | W | — | <0.01 | — | — | B | — | <0.01 | — | — |

*1 The ratio of the atomic ratio of the total of the additive metal element relative to the total of the metal elements other than lithium and the additive metal element in the surface of the primary particles to that in the entire primary particles.

TABLE 3

| Positive electrode material | | Mixed ratio of metals other than Li in 3a sites (%) | Lattice constant (Å) a | c | Oxygen atom coordinate z | do-o, inter (Å) | ODP |
|---|---|---|---|---|---|---|---|
| Examples | 1 | 2.9 | 2.872 | 14.247 | 0.2584 | 2.703 | 1.063 |
|  | 2 | 3.5 | 2.873 | 14.249 | 0.2578 | 2.719 | 1.057 |
|  | 3 | 3.6 | 2.873 | 14.250 | 0.2583 | 2.707 | 1.061 |
|  | 4 | 4.9 | 2.876 | 14.271 | 0.2583 | 2.709 | 1.061 |
|  | 5 | 3.9 | 2.870 | 14.211 | 0.2587 | 2.692 | 1.066 |
|  | 6 | 4.1 | 2.873 | 14.248 | 0.2588 | 2.695 | 1.066 |
|  | 7 | 2.7 | 2.872 | 14.251 | 0.2587 | 2.698 | 1.064 |
| Comparative Examples | 1 | 6.6 | 2.883 | 14.290 | 0.2578 | 2.726 | 1.058 |
|  | 2 | 2.2 | 2.870 | 14.240 | 0.2581 | 2.709 | 1.060 |
|  | 3 | 5.9 | 2.874 | 14.236 | 0.2584 | 2.703 | 1.063 |
|  | 4 | 3.4 | 2.873 | 14.263 | 0.2584 | 2.705 | 1.062 |
|  | 5 | 0.8 | 2.869 | 14.219 | 0.2598 | 2.668 | 1.075 |

TABLE 4

Infrared absorption spectrum measurement values

| | | Peak 1 Position (cm$^{-1}$) | Peak 2 Position (cm$^{-1}$) | Peak-to-peak distance (cm$^{-1}$) |
|---|---|---|---|---|
| Examples | 1 | 585.4 | 528.3 | 57.1 |
|  | 2 | 584.3 | 525.0 | 59.3 |
|  | 3 | 584.3 | 525.6 | 58.7 |
|  | 4 | 602.7 | 531.0 | 71.7 |
|  | 5 | 574.3 | 526.6 | 47.7 |
|  | 6 | 585.9 | 529.1 | 56.8 |
|  | 7 | 586.2 | 526.3 | 59.9 |
| Comparative Examples | 1 | 600.3 | 534.5 | 65.8 |
|  | 2 | 584.3 | 526.3 | 58.0 |
|  | 3 | 584.3 | 525.6 | 58.7 |
|  | 4 | 598.2 | 525.8 | 72.4 |
|  | 5 | 566.4 | 535.5 | 30.9 |

TABLE 5

Surface-enhanced Raman spectrum measurement values

| | | Peak A Position (cm$^{-1}$) | Peak B Position (cm$^{-1}$) |
|---|---|---|---|
| Examples | 1 | 576 | 835 |
| | 2 | 577 | 833 |
| | 3 | 570 | — |
| | 4 | 561 | — |
| | 5 | 542 | — |
| | 6 | 577 | — |
| | 7 | 582 | — |
| Comparative Examples | 1 | 572 | — |
| | 2 | 582 | — |
| | 3 | 548 | — |
| | 4 | 580 | — |
| | 5 | 570 | — |

TABLE 6

| Positive electrode material | | Mercury intrusion volume[2] (ml/g) | Pore radius (nm) Peak top 1[3] | Pore radius (nm) Peak top 2[4] | Partial pore volume (ml/g) Peak top 1 | Partial pore volume (ml/g) Peak top 2 | Average primary particle diameter B (μm) | Median diameter A (μm) | A/B | 90% cumulative diameter (D$_{90}$) (μm) | Bulk density (g/cm$^3$) | BET specific surface area (m$^2$/g) |
|---|---|---|---|---|---|---|---|---|---|---|---|---|
| Examples | 1 | 0.90 | 329 | 945 | 0.08 | 0.43 | 0.4 | 6.0 | 15.9 | 9.4 | 1.5 | 1.7 |
| | 2 | 0.78 | 208 | 1202 | 0.08 | 0.38 | 0.3 | 7.1 | 22.4 | 11.4 | 1.6 | 1.7 |
| | 3 | 0.68 | 202 | 942 | 0.05 | 0.32 | 0.4 | 4.6 | 13.0 | 6.9 | 1.8 | 1.7 |
| | 4 | 1.13 | 329 | 493 | 0.19 | 0.36 | 0.3 | 2.5 | 9.3 | 4.6 | 1.1 | 2.7 |
| | 5 | 0.70 | 136 | 943 | 0.04 | 0.33 | 0.2 | 5.0 | 27.3 | 7.5 | 1.9 | 1.6 |
| | 6 | 0.98 | 330 | 778 | 0.12 | 0.45 | 0.3 | 3.7 | 12.7 | 6.1 | 1.3 | 2.2 |
| | 7 | 0.85 | 401 | 1212 | 0.03 | 0.44 | 0.6 | 5.0 | 7.9 | 7.3 | 1.4 | 1.0 |
| Comparative Examples | 1 | 1.23 | — | 403 | — | 0.55 | 0.2 | 2.7 | 13.5 | 4.9 | 1.0 | 2.8 |
| | 2 | 0.39 | — | 1822 | — | 0.24 | 5.1 | 8.9 | 1.7 | 13.5 | 2.7 | 0.7 |
| | 3 | 1.12 | 259 | 621 | 0.22 | 0.41 | 0.2 | 3.9 | 23.1 | 6.4 | 1.4 | 4.0 |
| | 4 | 0.98 | — | 943 | — | 0.57 | 0.6 | 4.2 | 7.3 | 6.5 | 1.3 | 1.6 |
| | 5 | 0.38 | 399 | 1440 | 0.18 | 0.02 | 1.5 | 4.0 | 2.8 | 12.9 | 2.6 | 1.4 |

[2] Mercury intrusion volume when pressure was elevated from 3.86 kPa to 413 MPa in a measurement by a mercury intrusion porosimetry.
[3] Related to sub peaks appearing at 80 nm or more and less than 400 nm (pore radius) in a pore distribution curve.
[4] Related to main peaks appearing at 400 nm or more (pore radius) in a pore distribution curve.

TABLE 7

| Positive electrode material | | FWHM (110) | Integrated intensity $I_{018}$ ($I_{018}$*) | Integrated intensity $I_{110}$ ($I_{110}$*) | Integrated intensity $I_{113}$ ($I_{113}$*) | Integrated intensity ratio $I_{018}$*/$I_{018}$ | Integrated intensity ratio $I_{110}$*/$I_{110}$ | Integrated intensity ratio $I_{113}$*/$I_{113}$ |
|---|---|---|---|---|---|---|---|---|
| Examples | 1 | 0.164 | 2341 (No heterogeneous phases were detected.) | 2325 (No heterogeneous phases were detected.) | 1373 (No heterogeneous phases were detected.) | 0 | 0 | 0 |
| | 2 | 0.164 | 2493 (No heterogeneous phases were detected.) | 2356 (No heterogeneous phases were detected.) | 1321 (No heterogeneous phases were detected.) | 0 | 0 | 0 |
| | 3 | 0.169 | 2455 (No heterogeneous phases were detected.) | 2401 (No heterogeneous phases were detected.) | 1332 (No heterogeneous phases were detected.) | 0 | 0 | 0 |
| | 4 | 0.199 | 2057 (72) | 1946 (138) | 992 (195) | 0.035 | 0.071 | 0.197 |
| | 5 | 0.277 | 3035 (No heterogeneous phases were detected.) | 2836 (No heterogeneous phases were detected.) | 1519 (No heterogeneous phases were detected.) | 0 | 0 | 0 |
| | 6 | 0.230 | 2262 (No heterogeneous phases were detected.) | 2265 (No heterogeneous phases were detected.) | 1280 (No heterogeneous phases were detected.) | 0 | 0 | 0 |
| | 7 | 0.122 | 2377 (No heterogeneous phases were detected.) | 2277 (No heterogeneous phases were detected.) | 1368 (No heterogeneous phases were detected.) | 0 | 0 | 0 |
| Comparative Examples | 1 | 0.213 | 1899 (505) | 1871 (339) | 967 (191) | 0.266 | 0.181 | 0.198 |

TABLE 7-continued

| Positive electrode material | | FWHM (110) | Integrated intensity | | | Integrated intensity ratio | | |
|---|---|---|---|---|---|---|---|---|
| | | | $I_{018}$ ($I_{018}$*) | $I_{110}$ ($I_{110}$*) | $I_{113}$ ($I_{113}$*) | $I_{018}$*/$I_{018}$ | $I_{110}$*/$I_{110}$ | $I_{113}$*/$I_{113}$ |
| | 2 | 0.086 | 2298 (No heterogeneous phases were detected.) | 2159 (No heterogeneous phases were detected.) | 1330 (No heterogeneous phases were detected.) | 0 | 0 | 0 |
| | 3 | 0.431 | 2362 (No heterogeneous phases were detected.) | 2661 (79) | 1226 (69) | 0 | 0.030 | 0.056 |
| | 4 | 0.131 | 2083 (No heterogeneous phases were detected.) | 2087 (No heterogeneous phases were detected.) | 1151 (No heterogeneous phases were detected.) | 0 | 0 | 0 |
| | 5 | 0.121 | 2190 (No heterogeneous phases were detected.) | 2026 (No heterogeneous phases were detected.) | 1290 (No heterogeneous phases were detected.) | 0 | 0 | 0 |

TABLE 8

Powder properties of spray-dried substances

| Positive electrode material | | Median diameter (μm) | | | | Bulk density (g/cm³) | BET specific surface area (m²/g) |
|---|---|---|---|---|---|---|---|
| | | US 0 min. | US 1 min. | US 3 min. | US 5 min. | | |
| Examples | 1 | 5.6 | 4.1 | 0.8 | 0.5 | 0.9 | 67.8 |
| | 2 | 8.0 | 7.0 | 5.5 | 3.5 | 1.0 | 73.1 |
| | 3 | 5.4 | 4.0 | 0.7 | 0.4 | 0.9 | 70.0 |
| | 4 | 5.6 | 3.7 | 0.6 | 0.5 | 1.0 | 60.7 |
| | 5 | 6.4 | 5.3 | 3.2 | 0.7 | 1.0 | 74.3 |
| | 6 | 6.0 | 4.8 | 3.0 | 1.1 | 0.9 | 69.4 |
| | 7 | 6.0 | 4.8 | 3.0 | 1.1 | 0.9 | 69.4 |
| Comparative Examples | 1 | 6.9 | 6.1 | 4.6 | 3.2 | 1.0 | 53.2 |
| | 2 | 6.4 | 5.1 | 3.1 | 1.0 | 0.9 | 69.4 |
| | 3 | 5.6 | 4.1 | 0.8 | 0.5 | 0.9 | 67.8 |
| | 4 | 6.2 | 5.0 | 2.7 | 0.9 | 0.9 | 62.8 |
| | 5 | 6.7 | 5.9 | 5.1 | 4.3 | 1.0 | 58.6 |

5) US stands for ultra sonic dispersion

<Fabrication and Evaluation of Battery>

Lithium secondary batteries were fabricated using the lithium nickel manganese cobalt-based composite oxide powders manufactured in Examples 1 to 7 and Comparative Examples 1 to 5 as the positive electrode materials (positive electrode active substances) according to the above-mentioned method and evaluated. The results are shown in Table 9.

The following should be noted: (1) The acceptance standard set for the rate test in Examples is that the initial discharge capacity of the first cycle described above is 150 mAh/g or more and that the high-rate discharge capacity of the third cycle at 11 mA/cm² is 115 mAh/g or more; and (2) The acceptance standard set for the low-temperature load characteristics test and high-temperature cycle test in Examples is that the low-temperature resistance before the cycle is 350Ω or less, the low-temperature resistance after the cycle is 550Ω or less, and that the 60° C. cycle retention ratio is 85% or more.

TABLE 9

| Positive electrode material | | Initial discharge capacity (mAh/g)/ 3.0-4.2 V, 0.2 mA/cm² | Third cycle discharge capacity (mAh/g)/ 3.0-4.2 V, 11 mA/cm² | Low-temperature resistance (Ω) | | Cycle capacity retention ratio (%) | Evaluation result |
|---|---|---|---|---|---|---|---|
| | | | | Before cycle | After cycle | | |
| Examples | 1 | 161 | 132 | 218 | 332 | 87 | ○ |
| | 2 | 163 | 131 | 232 | 364 | 88 | ○ |
| | 3 | 155 | 122 | 256 | 356 | 85 | ○ |
| | 4 | 151 | 118 | 221 | 336 | 87 | ○ |
| | 5 | 163 | 124 | 264 | 549 | 88 | ○ |
| | 6 | 155 | 123 | 332 | 434 | 86 | ○ |
| | 7 | 158 | 125 | 294 (342) | 392 (384) | 77 (95) | ○ |

TABLE 9-continued

| Positive electrode material | | Initial discharge capacity (mAh/g)/ 3.0-4.2 V, 0.2 mA/cm$^2$ | Third cycle discharge capacity (mAh/g)/ 3.0-4.2 V, 11 mA/cm$^2$ | Low-temperature resistance (Ω) | | Cycle capacity retention ratio (%) | Evaluation result |
|---|---|---|---|---|---|---|---|
| | | | | Before cycle | After cycle | | |
| Comparative Examples | 1 | 145 | 107 | 380 | 454 | 86 | X |
| | 2 | 147 | 98 | 648 | 751 | 72 | X |
| | 3 | 141 | 111 | 267 | 476 | 88 | X |
| | 4 | 153 | 112 | 476 | 491 | 84 | X |
| | 5 | 163 | 128 | 501 | 622 | 82 | X |

Table 9 shows that lithium secondary batteries with excellent load characteristics can be realized with the lithium nickel manganese cobalt-based composite oxide powder for the lithium secondary battery positive electrode material of the second invention.

[Manufacture of a Lithium Transition Metal-based Compound Powder of the First Invention (Examples and Comparative Examples)]

Example 8

Ni(OH)$_2$, Mn$_3$O$_4$, CoOOH, and WO$_3$ were weighed in a molar ratio of Ni:Mn:Co:W=0.45:0.45:0.10:0.01 and mixed. Pure water was added thereto to prepare a slurry. The solid components in the slurry were ground using a circulating medium agitation-type grinder (Shinmaru Enterprises Corporation: DYNO mill KDLA type) while agitating the slurry so that the median diameter of the solid components was 0.21 µm.

The slurry (solid content: 13 wt %, viscosity: 1640 cp) was then spray-dried with a twin fluid nozzle-type spray dryer (LT-8 type produced by Ohkawara Kakohki Co., Ltd.). Air was used as the drying gas at this time, the drying gas introduction rate G was 45 L/min, and the slurry introduction rate S was 11×10$^{-3}$ mL/min (gas-liquid ratio G/S=4091). The dryer entrance temperature was set to 150° C. A Li$_2$CO$_3$ powder having a median diameter of 9 µm was added to the granular powder obtained by spray drying using the spray dryer so that the molar ratio Li/(Ni+Mn+Co) was 1.12, and the resulting mixture was thoroughly mixed to be homogenized. About 15 g of this mixed powder was placed in an alumina crucible, fired at 900° C. for 6 hours (heating and cooling rate: 3.33° C./min) under an air flow of 1 L/min, and subjected to vibration classification with a 45 µm-mesh sieve to obtain a lithium nickel manganese cobalt-based composite oxide (x=0.099, y=−0.003, z=0.118) having a layer structure and a composition represented by Li(Li$_{0.056}$Ni$_{0.424}$Mn$_{0.427}$Co$_{0.093}$)O$_2$. When the total molar ratio of (Ni, Mn, Co) was 1, the molar ratio of W in this lithium nickel manganese cobalt-based composite oxide powder was 1.05 mol %. The atomic ratio (W/(Ni+Mn+Co)) of W on the primary particle surfaces was 6.7 times the atomic ratio (W/(Ni+Mn+Co)) of W (tungsten) in the entire particles. The lithium nickel manganese cobalt-based composite oxide powder had an average primary particle diameter of 0.2 µm, a median diameter of 5.0 µm, a 90% cumulative diameter (D$_{90}$) of 7.4 µm, a bulk density of 1.7 g/cm$^3$, a BET specific surface area of 3.3 m$^2$/g, a volume resistivity of 6.3×10$^4$ Ω·cm, and a carbon content C of 0.054 wt %.

Example 9

A lithium nickel manganese cobalt-based composite oxide powder (x=0.099, y=−0.003, z=0.134) having a layer structure and a composition represented by Li(Li$_{0.063}$Ni$_{0.421}$Mn$_{0.423}$Co$_{0.093}$)O$_2$ was obtained as in Example 8 except that the firing temperature was changed to 950° C. When the total molar ratio of (Ni, Mn, Co) was 1, the molar ratio of W in this lithium nickel manganese cobalt-based composite oxide powder was 1.04 mol %. The atomic ratio (W/(Ni+Mn+Co)) of W on the primary particle surfaces was 6.5 times the atomic ratio (W/(Ni+Mn+Co)) of W (tungsten) in the entire particles. The lithium nickel manganese cobalt-based composite oxide powder had an average primary particle diameter of 0.2 µm, a median diameter of 5.1 µm, a 90% cumulative diameter (D$_{90}$) of 7.6 µm, a bulk density of 1.7 g/cm$^3$, a BET specific surface area of 2.2 m$^2$/g, a volume resistivity of 4.8×10$^4$ Ω·cm, and a carbon content C of 0.040 wt %.

Example 10

A lithium nickel manganese cobalt-based composite oxide powder (x=0.099, y=−0.003, z=0.133) having a layer structure and a composition represented by Li(Li$_{0.062}$Ni$_{0.421}$Mn$_{0.424}$Co$_{0.93}$)O$_2$ was obtained as in Example 8 except that the firing temperature was changed to 1000° C. When the total molar ratio of (Ni, Mn, Co) was 1, the molar ratio of W in this lithium nickel manganese cobalt-based composite oxide powder was 1.03 mol %. The atomic ratio (W/(Ni+Mn+Co)) of W on the primary particle surfaces was 8.8 times the atomic ratio (W/(Ni+Mn+Co)) of W (tungsten) in the entire particles. The ratio R$_0$/R$_{10}$ of the atomic ratio R$_0$ of W relative to the total of (Ni, Mn, Co) on the particle outermost surfaces to the atomic ratio R$_{10}$ of the total of W relative to the total of (Ni, Mn, Co) that exist in the region from the particle surfaces to a depth of 10 nm was 4.3. The lithium nickel manganese cobalt-based composite oxide powder had an average primary particle diameter of 0.3 µm, a median diameter of 5.0 µm, a 90% cumulative diameter (D$_{90}$) of 7.5 µm, a bulk density of 1.7 g/cm$^3$, a BET specific surface area of 1.7 m$^2$/g, a volume resistivity of 9.7×10$^4$ Ω·cm, and a carbon content C of 0.037 wt %.

Example 11

A lithium nickel manganese cobalt-based composite oxide powder (x=0.099, y=−0.003, z=0.100) having a layer structure and a composition represented by Li(Li$_{0.48}$Ni$_{0.428}$Mn$_{0.430}$Co$_{0.094}$)O$_2$ was obtained as in Example 8 except that the firing temperature was changed to 1050° C. When the total molar ratio of (Ni, Mn, Co) was 1, the molar ratio of W in this lithium nickel manganese cobalt-based composite oxide powder was 1.03 mol %. The atomic ratio (W/(Ni+Mn+Co)) of W on the primary particle surfaces was 13 times the atomic ratio (W/(Ni+Mn+Co)) of W (tungsten) in the entire particles. The lithium nickel manganese cobalt-based composite oxide powder had an average primary particle diameter of 0.5 μm, a median diameter of 5.1 μm, a 90% cumulative diameter ($D_{90}$) of 7.5 μm, a bulk density of 1.7 g/cm$^3$, a BET specific surface area of 1.3 m$^2$/g, a volume resistivity of 8.0×10$^4$ Ω·cm, and a carbon content C of 0.033 wt %.

Example 12

Ni(OH)$_2$, Mn$_3$O$_4$, CoOOH, H$_3$BO$_3$, and WO$_3$ were weighed in a molar ratio of Ni:Mn:Co:B:W=0.45:0.45:0.10: 0.0025:0.01 and mixed. Pure water was added thereto to prepare a slurry. The solid components in the slurry were ground using a circulating medium agitation-type grinder (Shinmaru Enterprises Corporation: DYNO mill KDLA type) while agitating the slurry so that the median diameter of the solid components was 0.23 μm.

The slurry (solid content: 14 wt %, viscosity: 2090 cp) was then spray-dried with a twin fluid nozzle-type spray dryer (LT-8 type produced by Ohkawara Kakohki Co., Ltd.). Air was used as the drying gas at this time, the drying gas introduction rate G was 45 L/min, and the slurry introduction rate S was 11×10$^{-3}$ mL/min (gas-liquid ratio G/S=4091). The dryer entrance temperature was set to 150° C. A Li$_2$CO$_3$ powder having a median diameter of 9 μm was added to the granular powder obtained by spray drying using the spray dryer so that the molar ratio Li/(Ni+Mn+Co) was 1.12, and the resulting mixture was thoroughly mixed to be homogenized. About 15 g of this mixed powder was placed in an alumina crucible, fired at 900° C. for 6 hours (heating and cooling rate: 3.33° C./min) under an air flow of 1 L/min, and subjected to vibration classification with a 45 μm-mesh sieve to obtain a lithium nickel manganese cobalt-based composite oxide (x=0.098, y=−0.004, z=0.122) having a layer structure and a composition represented by Li(Li$_{0.058}$Ni$_{0.423}$Mn$_{0.427}$Co$_{0.092}$)O$_2$. When the total molar ratio of (Ni, Mn, Co) was 1, the molar ratios of B and W in this lithium nickel manganese cobalt-based composite oxide powder were 0.22 mol % and 1.03 mol %, respectively. The atomic ratio (B/(Ni+Mn+Co)) of B on primary particle surfaces was 24 times the atomic ratio (B/(Ni+Mn+Co)) of B (boron) in the entire particles and the atomic ratio (W/(Ni+Mn+Co)) of W on primary particle surfaces was 7.0 times the atomic ratio (W/(Ni+Mn+Co)) of W (tungsten) in the entire particles. The ratio $R_0/R_{10}$ of the atomic ratio $R_0$ of W relative to the total of (Ni, Mn, Co) on the particle outermost surfaces to the atomic ratio $R_{10}$ of the total of W relative to the total of (Ni, Mn, Co) that exist in the region from the particle surfaces to a depth of 10 nm was 3.8. The lithium nickel manganese cobalt-based composite oxide powder had an average primary particle diameter of 0.2 μm, a median diameter of 5.2 μm, a 90% cumulative diameter ($D_{90}$) of 7.9 μm, a bulk density of 1.6 g/cm$^3$, a BET specific surface area of 2.8 m$^2$/g, a volume resistivity of 1.5×10$^5$ Ω·cm, and a carbon content C of 0.054 wt %.

Comparative Example 6

Li$_2$CO$_3$, Ni(OH)$_2$, Mn$_3$O$_4$, CoOOH, and WO$_3$ were weighed in a molar ratio of Li:Ni:Mn:Co:W=1.12:0.45:0.45: 0.10:0.01 and mixed. Pure water was added thereto to prepare a slurry. The solid components in the slurry were ground using a circulating medium agitation-type grinder while agitating the slurry so that the median diameter of the solid components was 0.23 μm.

The slurry (solid content: 16.5 wt %, viscosity: 1650 cp) was then spray-dried with a quadruple fluid nozzle-type spray dryer (MDP-50 type produced by Fujisaki Electric Co., Ltd.). Air was used as the drying gas at this time, the drying gas introduction rate G was 1600 L/min, and the slurry introduction rate S was 780 mL/min (gas-liquid ratio G/S=2051). The dryer entrance temperature was set to 200° C. About 370 g of granular powder obtained by spray drying using the spray dryer was placed in an alumina square bowl, fired at 1000° C. for 2 hours in an air atmosphere (heating rate: 1.7° C./min, cooling rate: about 3.3° C./min), and classified with a 45 μm-mesh Powsifter (produced by Tsukasa Industry, Co., Ltd.) to obtain a lithium nickel manganese cobalt-based composite oxide (x=0.100, y=−0.002, z=0.111) having a layer structure and a composition represented by Li(Li$_{0.053}$Ni$_{0.425}$Mn$_{0.427}$Co$_{0.095}$)O$_2$. When the total molar ratio of (Ni, Mn, Co) was 1, the molar ratio of W was 1.01 mol %. The atomic ratio of W (W/(Ni+Mn+Co)) on the primary particle surfaces was 7.8 times the atomic ratio (W/(Ni+Mn+Co)) of W (tungsten) in the entire particles. The ratio $R_0/R_{10}$ of the atomic ratio $R_0$ of W relative to the total of (Ni, Mn, Co) on the particle outermost surfaces to the atomic ratio $R_{10}$ of the total of W relative to the total of (Ni, Mn, Co) that exist in the region from the particle surfaces to a depth of 10 nm was 4.5.

The lithium nickel manganese cobalt-based composite oxide powder had an average primary particle diameter of 0.2 μm, a median diameter of 2.7 μm, a 90% cumulative diameter ($D_{90}$) of 4.9 μm, a bulk density of 1.0 g/cm$^3$, a BET specific surface area of 2.8 m$^2$/g, a volume resistivity of 6.3×10$^4$ Ω·cm, and a carbon content C of 0.031 wt %.

Comparative Example 7

Li$_2$CO$_3$, Ni(OH)$_2$, Mn$_3$O$_4$, CoOOH, H$_3$BO$_3$, and WO$_3$ were weighed in a molar ratio of Li:Ni:Mn:Co:B:W=1.12: 0.45:0.45:0.10:0.0025:0.010 and mixed. Pure water was added thereto to prepare a slurry. The solid components in the slurry were ground using a circulating medium agitation-type grinder while agitating the slurry so that the median diameter of the solid components was 0.27 μm.

The slurry (solid content: 15 wt %, viscosity: 1020 cp) was then spray-dried with a twin fluid nozzle-type spray dryer (LT-8 type produced by Ohkawara Kakohki Co., Ltd.). Air was used as the drying gas at this time, the drying gas introduction rate G was 45 L/min, and the slurry introduction rate S was 11×10$^{-3}$ mL/min (gas-liquid ratio G/S=4091). The dryer entrance temperature was set to 150° C. About 15 g of the granular powder obtained by spray drying using a spray dryer was placed in an alumina crucible, fired at 1000° C. for 6 hours (heating and cooling rate: 3.33° C./min) in an air atmosphere, and subjected to vibration classification with a 45 μm-mesh sieve to obtain a lithium nickel manganese cobalt-based composite oxide (x=0.098, y=−0.004, z=0.134) having a composition represented by Li(Li$_{0.063}$Ni$_{0.421}$Mn$_{0.424}$Co$_{0.092}$)O$_2$. When the total molar ratio of (Ni, Mn, Co) was 1, the molar ratios of B and W in this lithium nickel manganese cobalt-based composite oxide powder were 0.23 mol % and 1.00 mol %, respectively. The atomic ratio (B/(Ni+Mn+Co)) of B on the primary particle surfaces was 53 times the atomic ratio (B/(Ni+Mn+Co)) of B (boron) in the entire particles. The atomic ratio (W/(Ni+Mn+Co)) of W on the primary particle surfaces was 9.4 times the atomic ratio (W/(Ni+Mn+Co)) of W (tungsten) in the entire particles. The lithium nickel manganese cobalt-based composite oxide powder had an average primary particle diameter of 0.5 μm, a median diameter of 2.1 μm, a 90% cumulative diameter ($D_{90}$) of 3.9 μm, a bulk density of 1.2 g/cm$^3$, a BET specific surface area of 1.5 m²/g, a volume resistivity of 3.0×10⁶ Ω·cm, and a carbon content C of 0.047 wt %.

Comparative Example 8

Ni(OH)$_2$, Mn$_3$O$_4$, and Co(OH)$_2$ were weighed in a molar ratio of Ni:Mn:Co=0.45:0.45:0.10 and mixed. Pure water was added thereto to prepare a slurry. The solid components in the slurry were ground using a circulating medium agitation-type grinder while agitating the slurry so that the median diameter of the solid components was 0.13 µm.

The slurry (solid content: 11 wt %, viscosity: 1490 cp) was then spray-dried with a twin fluid nozzle-type spray dryer (LT-8 type produced by Ohkawara Kakohki Co., Ltd.). Air was used as the drying gas at this time, the drying gas introduction rate G was 45 L/min, and the slurry introduction rate S was 11×10⁻³ mL/min (gas-liquid ratio G/S=4091). The dryer entrance temperature was set to 150° C.

A LiOH powder ground to a median diameter of 20 µm or less was added to the granular powder obtained by spray drying. About 13.1 g of this mixed powder was placed in an alumina crucible, fired at 1000° C. for 6 hours (heating and cooling rate: 3.33° C./min) under an air flow, and subjected to vibration classification with a 45 µm-mesh sieve to obtain a lithium nickel manganese cobalt-based composite oxide (x=0.098, y=0.013, z=0.113) having a layer structure a composition represented by Li(Li$_{0.053}$Ni$_{0.433}$Mn$_{0.421}$CO$_{0.93}$)O$_2$. The lithium nickel manganese cobalt-based composite oxide powder had an average primary particle diameter of 0.7 µm, a median diameter of 4.8 µm, a 90% cumulative diameter (D$_{90}$) of 7.0 µm, a bulk density of 1.6 g/cm³, a BET specific surface area of 1.2 m²/g, a volume resistivity of 1.7×10⁴ Ω·cm, and a carbon content C of 0.028 wt %.

The compositions and physical property values of the lithium transition metal-based compound powders manufactured in Examples 8 to 12 and Comparative Examples 6 to 8 are shown in Tables 10 to 13. The powder properties of the spray-dried substances, which are firing precursors, are shown in Table 14.

Figure 58:
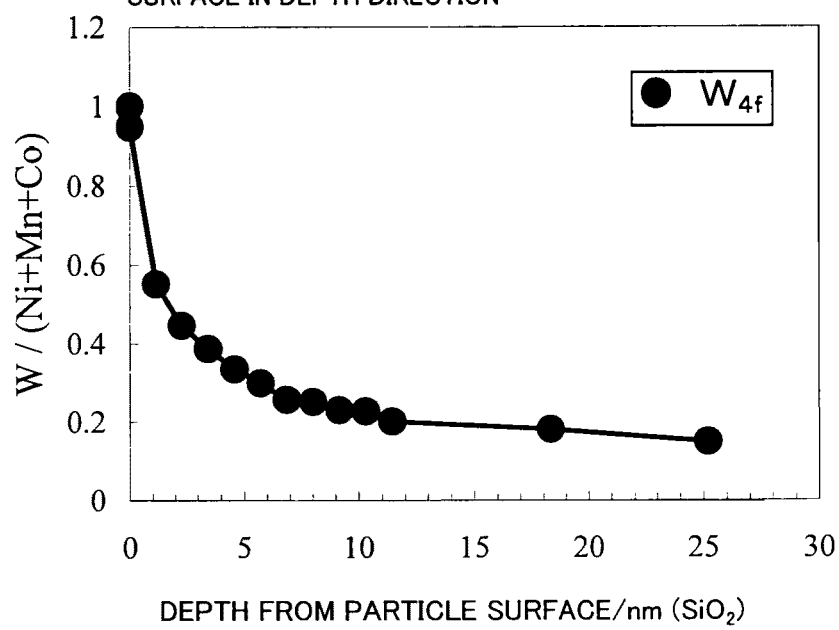
FIG. 58 is a graph showing a W concentration distribution curve in a depth direction from surfaces of particles of manufactured lithium nickel manganese cobalt-based composite oxide in Example 10.
Figure 59:
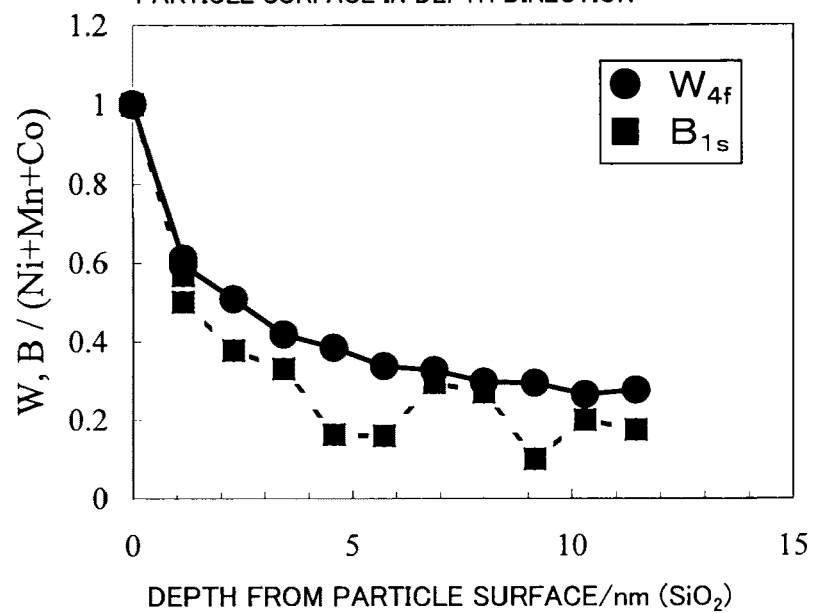
FIG. 59 is a graph showing W and B concentration distribution curves in a depth direction from surfaces of particles of manufactured lithium nickel manganese cobalt-based composite oxide in Example 12.
Figure 60:
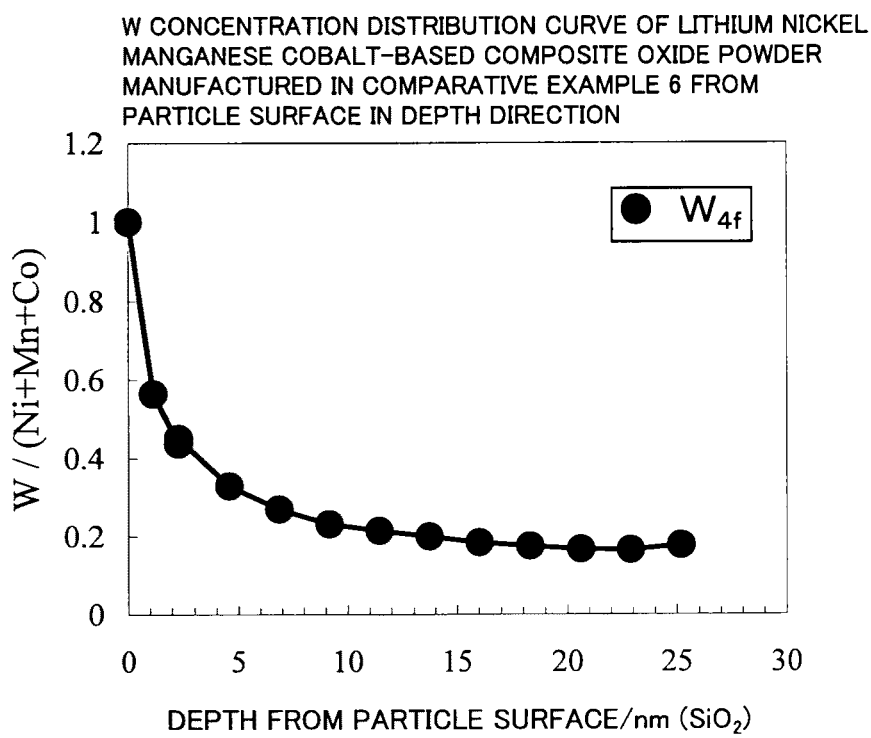
FIG. 60 is a graph showing a W concentration distribution curve in a depth direction from surfaces of particles of manufactured lithium nickel manganese cobalt-based composite oxide in Comparative Example 6.
Figure 61:
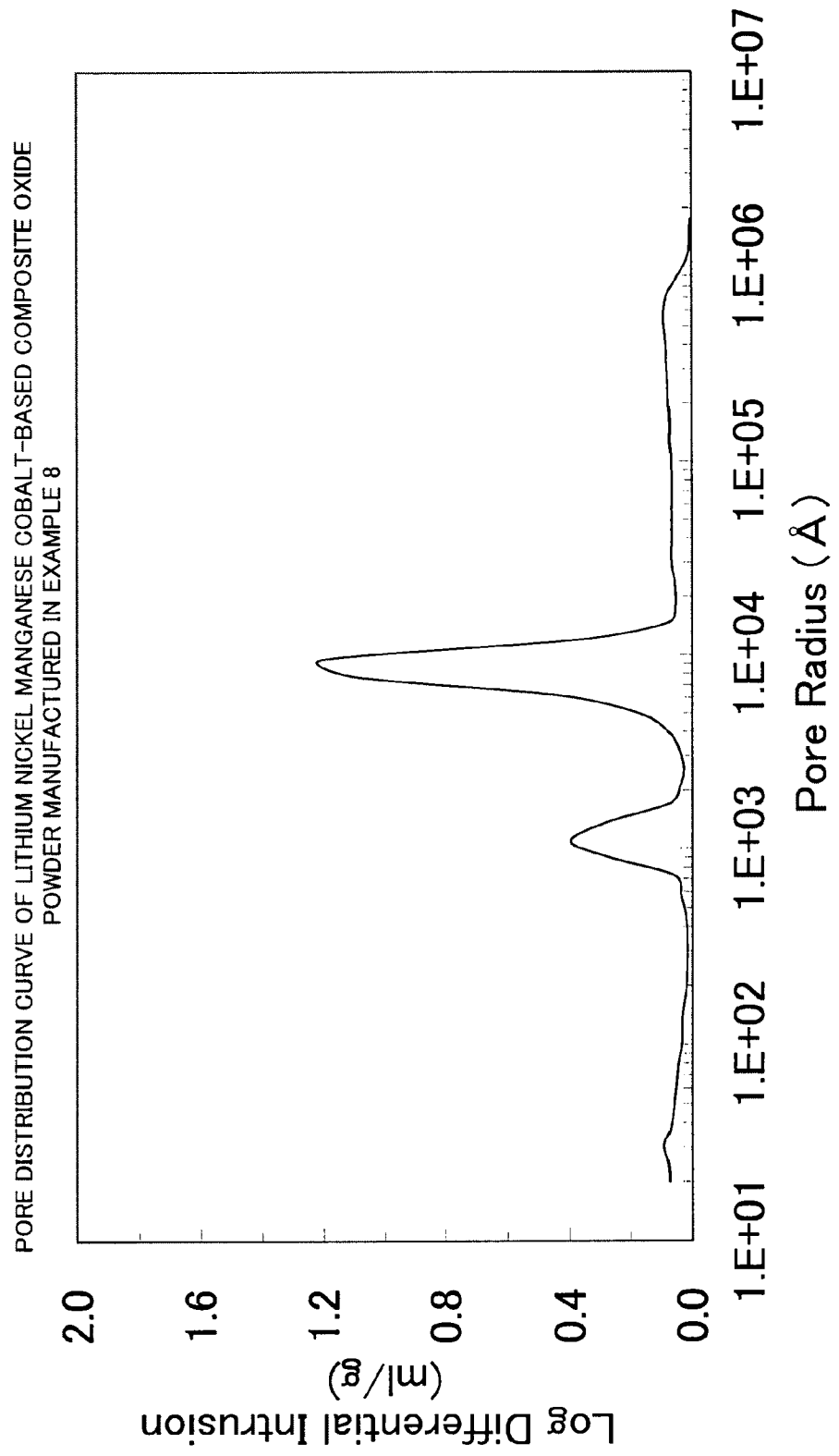
FIG. 61 is a graph showing a pore distribution curve of a manufactured lithium nickel manganese cobalt-based composite oxide powder in Example 8.
Figure 62:
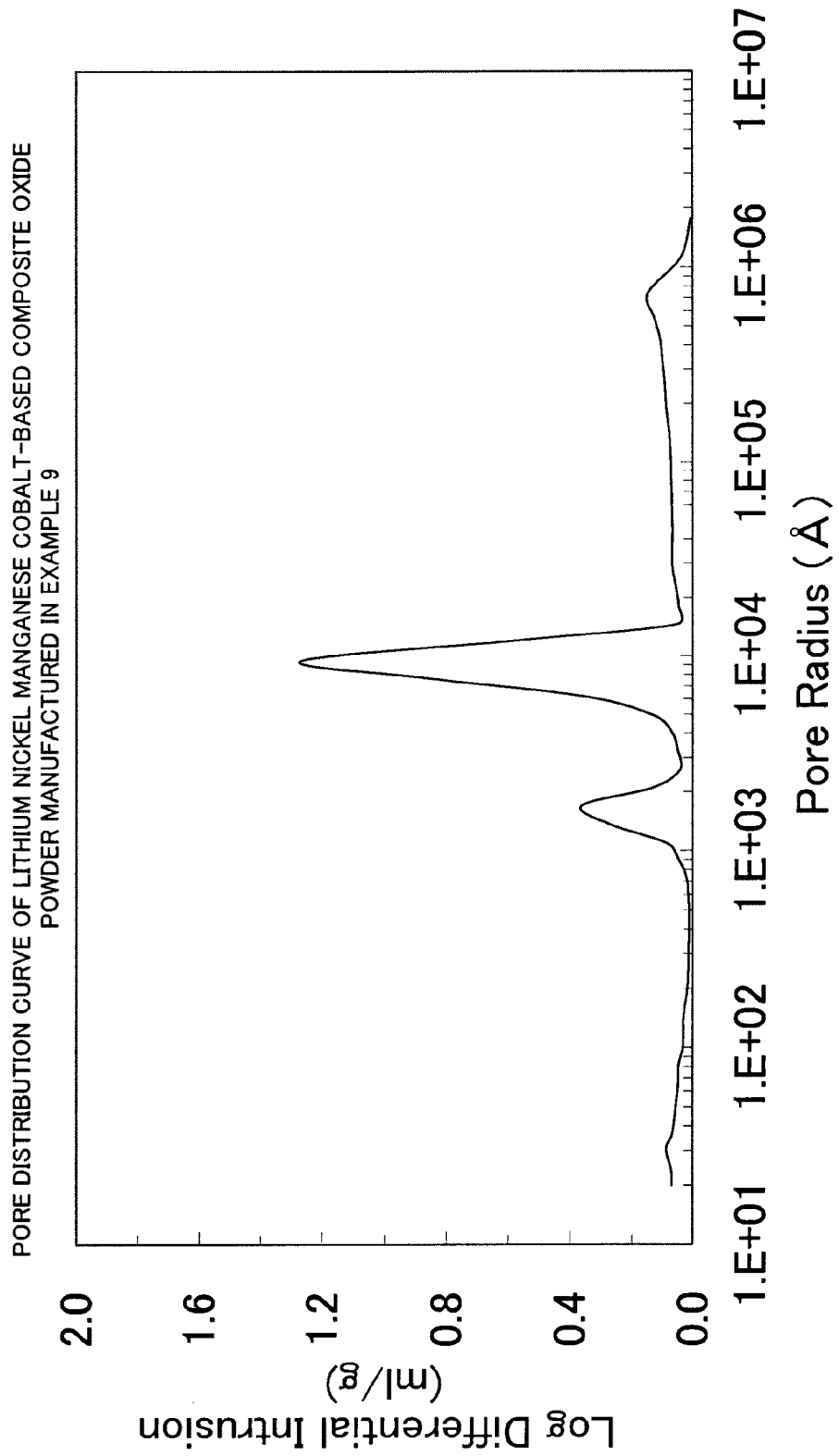
FIG. 62 is a graph showing a pore distribution curve of a manufactured lithium nickel manganese cobalt-based composite oxide powder in Example 9.
Figure 63:
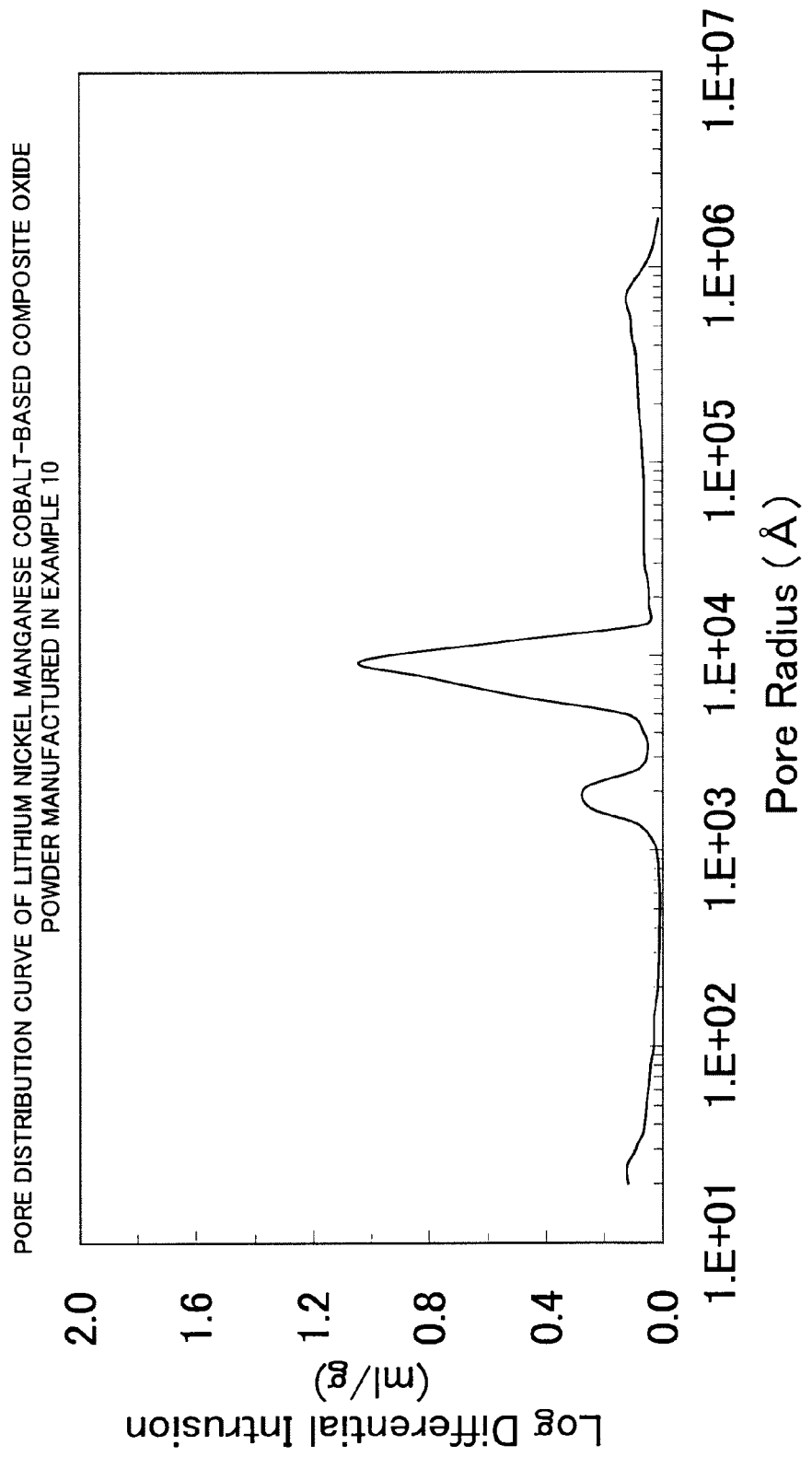
FIG. 63 is a graph showing a pore distribution curve of a manufactured lithium nickel manganese cobalt-based composite oxide powder in Example 10.
Figure 64:
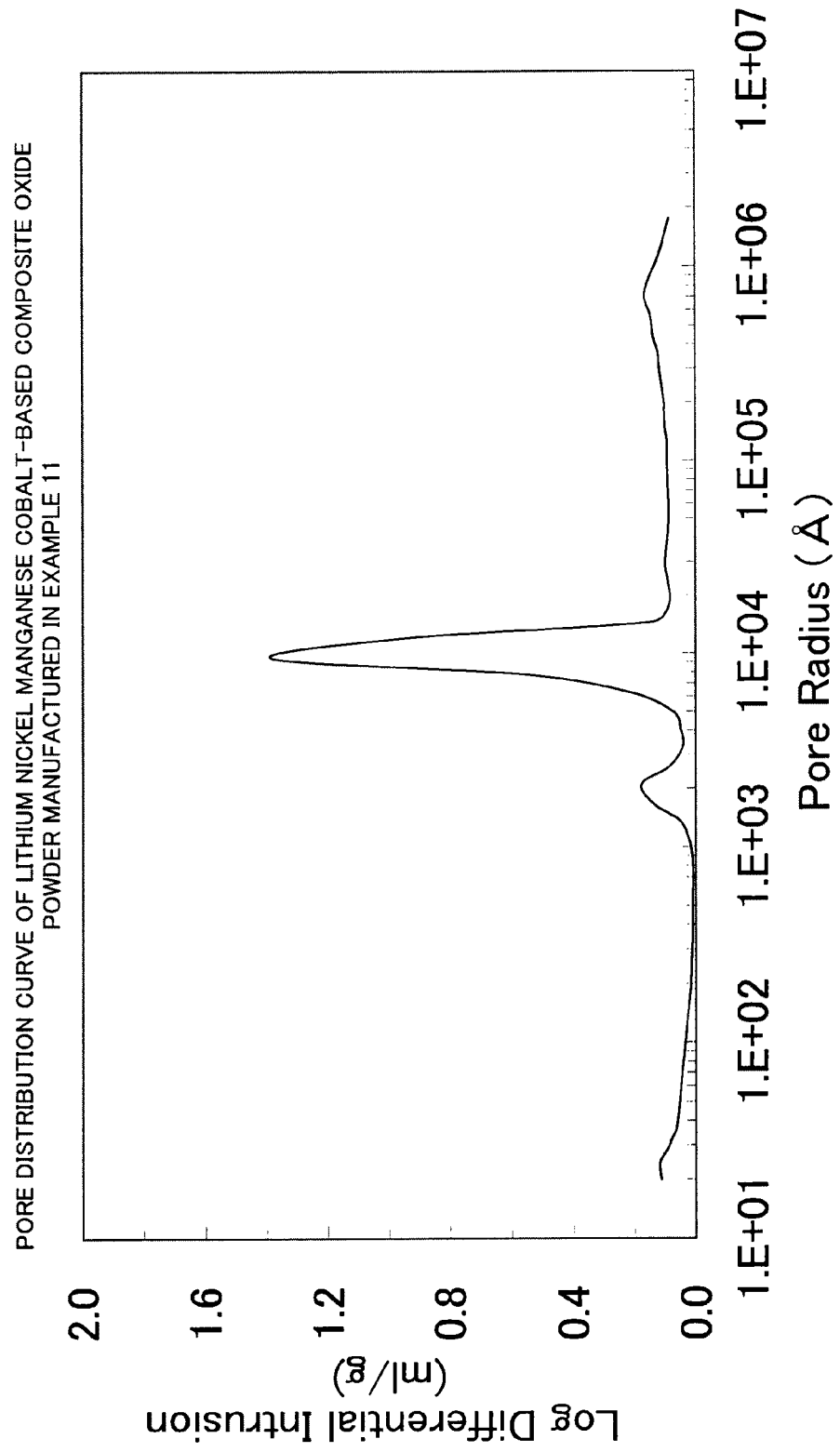
FIG. 64 is a graph showing a pore distribution curve of a manufactured lithium nickel manganese cobalt-based composite oxide powder in Example 11.
Figure 65:
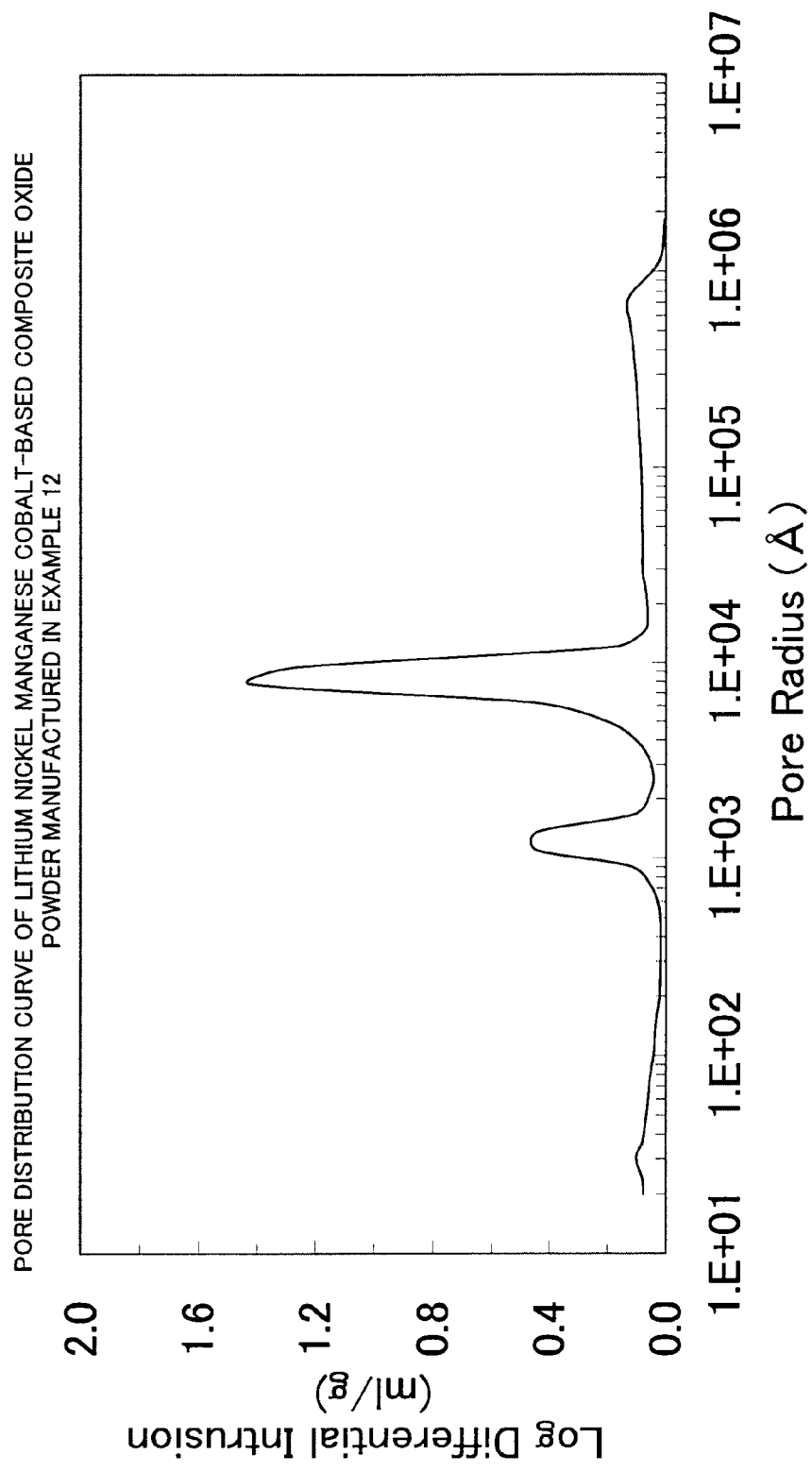
FIG. 65 is a graph showing a pore distribution curve of a manufactured lithium nickel manganese cobalt-based composite oxide powder in Example 12.
Figure 66:
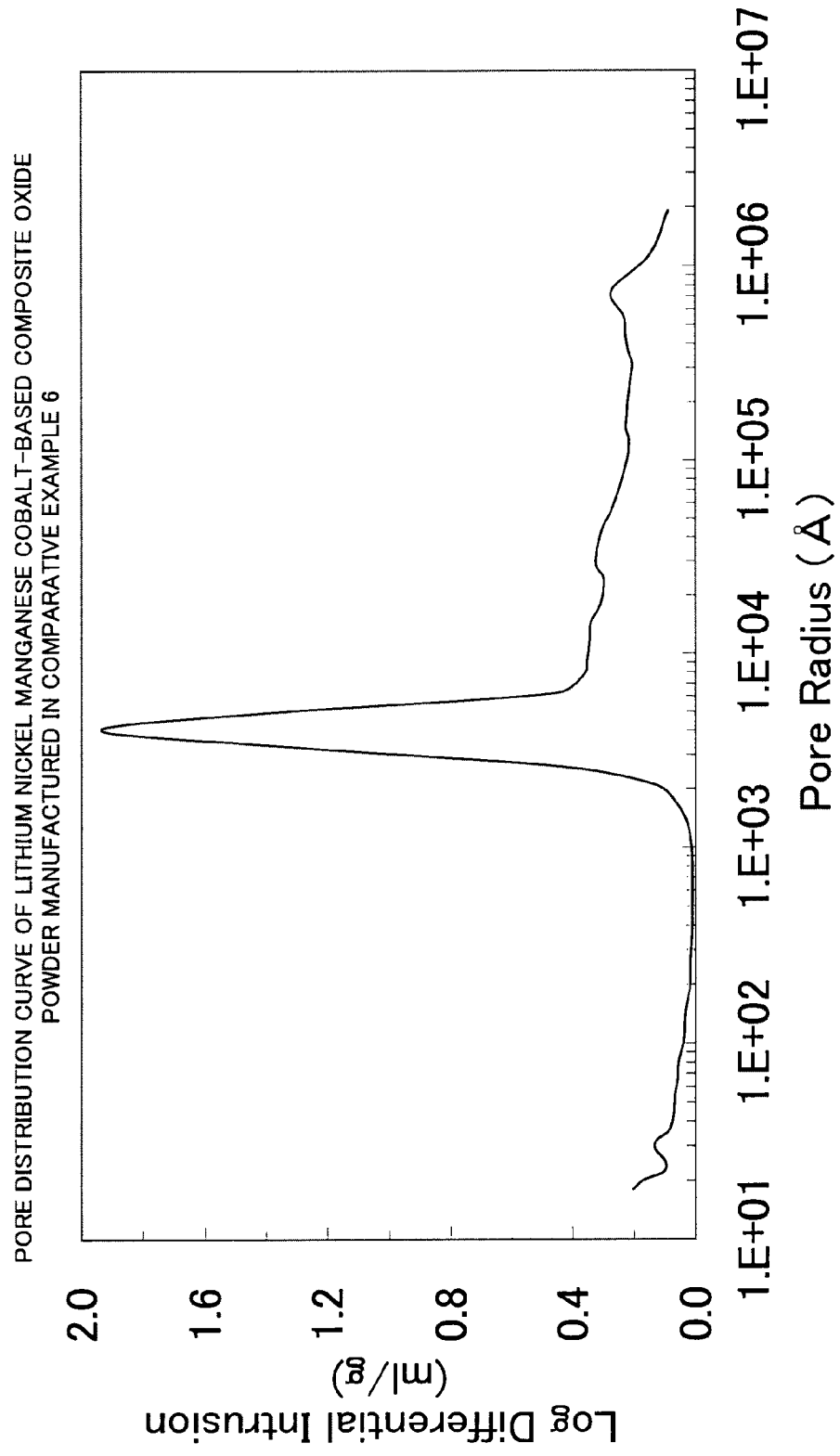
FIG. 66 is a graph showing a pore distribution curve of a manufactured lithium nickel manganese cobalt-based composite oxide powder in Comparative Example 6.
Figure 67:
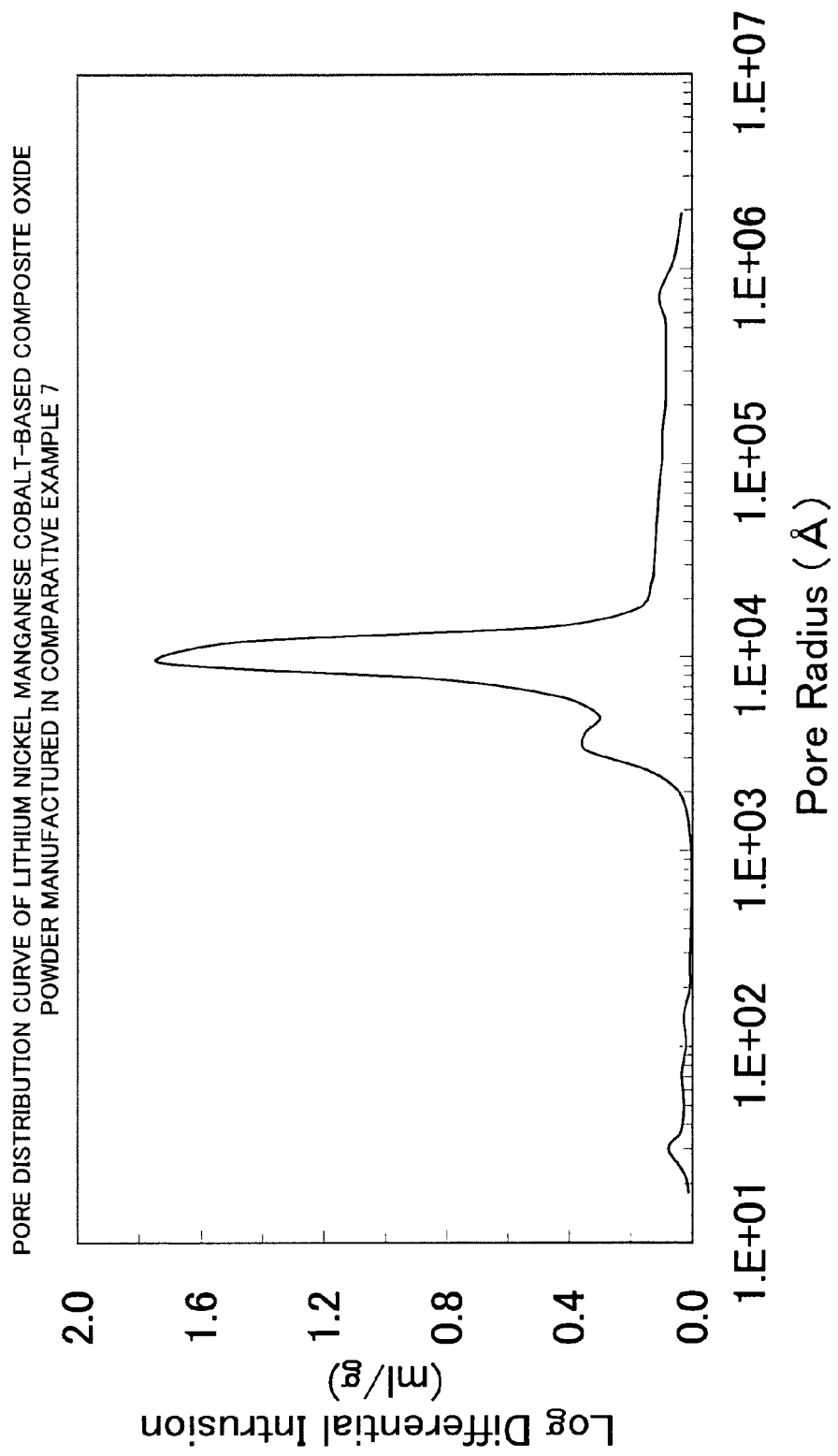
FIG. 67 is a graph showing a pore distribution curve of a manufactured lithium nickel manganese cobalt-based composite oxide powder in Comparative Example 7.
Figure 68:
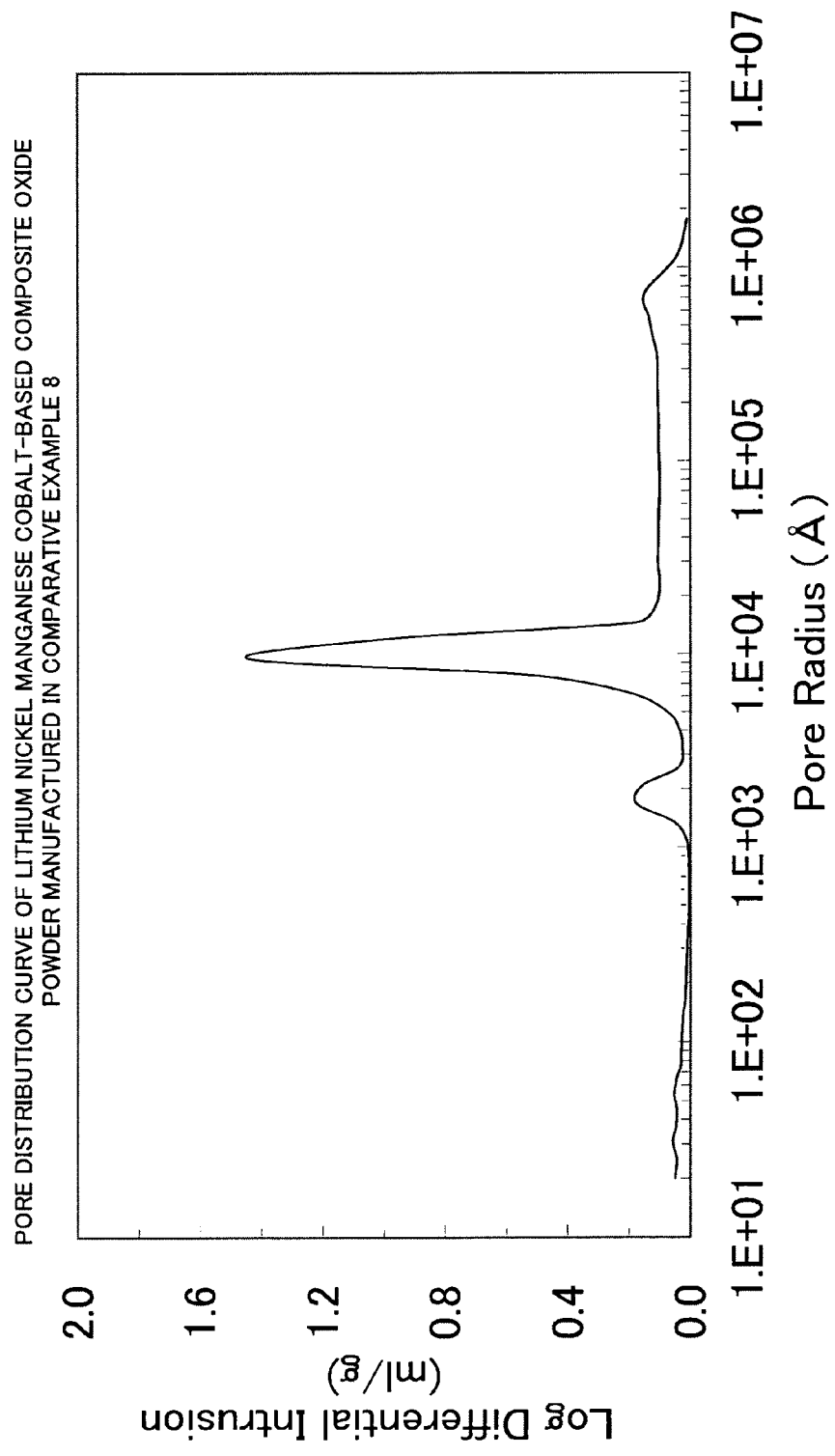
FIG. 68 is a graph showing a pore distribution curve of a manufactured lithium nickel manganese cobalt-based composite oxide powder in Comparative Example 8.
Figure 69:
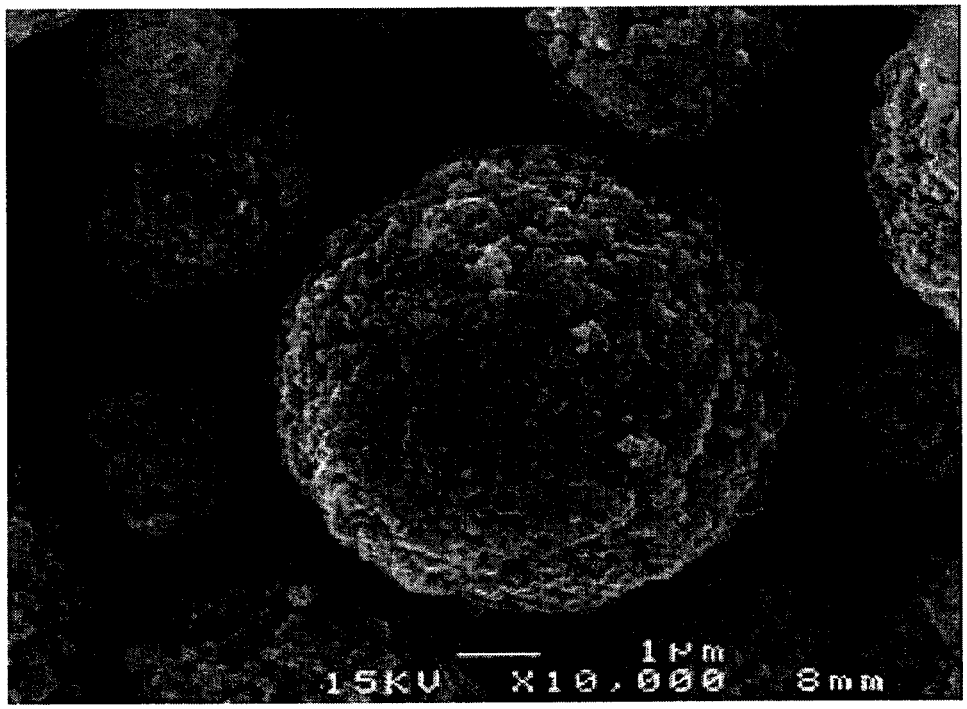
FIG. 69 is a SEM image (photograph) (magnification: 10,000×) of a manufactured lithium nickel manganese cobalt-based composite oxide in Example 8.
Figure 70:
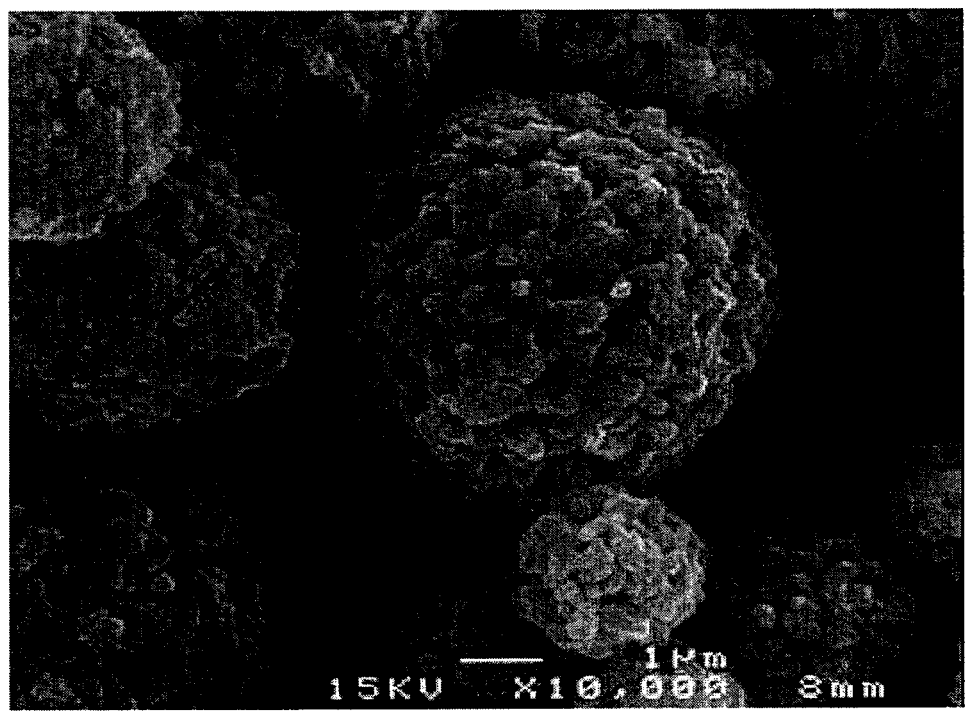
FIG. 70 is a SEM image (photograph) (magnification: 10,000×) of a manufactured lithium nickel manganese cobalt-based composite oxide in Example 9.
Figure 71:
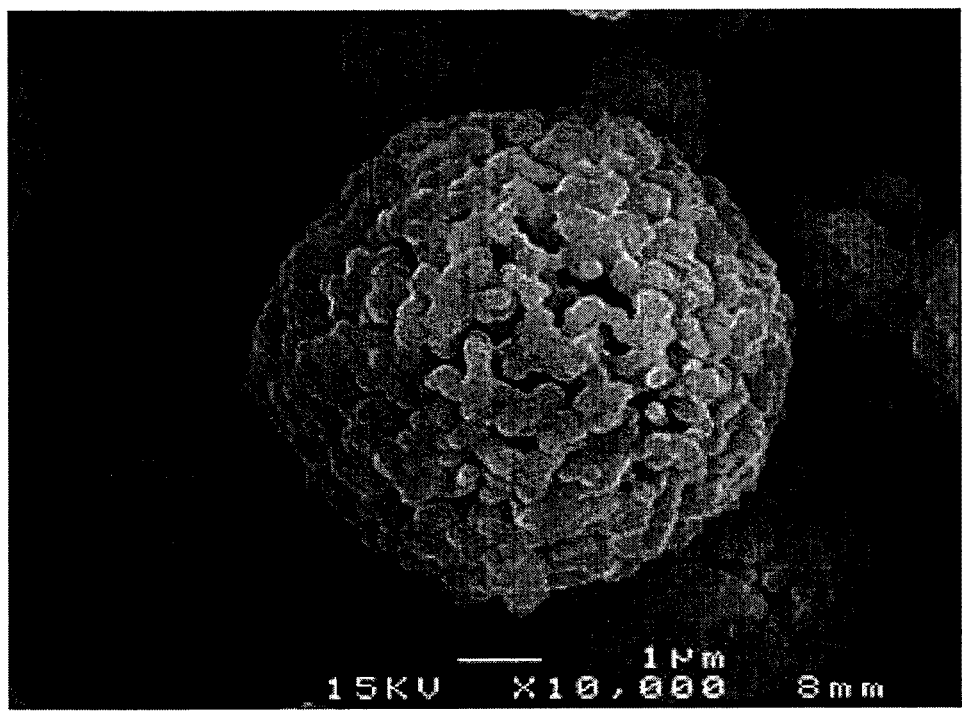
FIG. 71 is a SEM image (photograph) (magnification: 10,000×) of a manufactured lithium nickel manganese cobalt-based composite oxide in Example 10.
Figure 72:
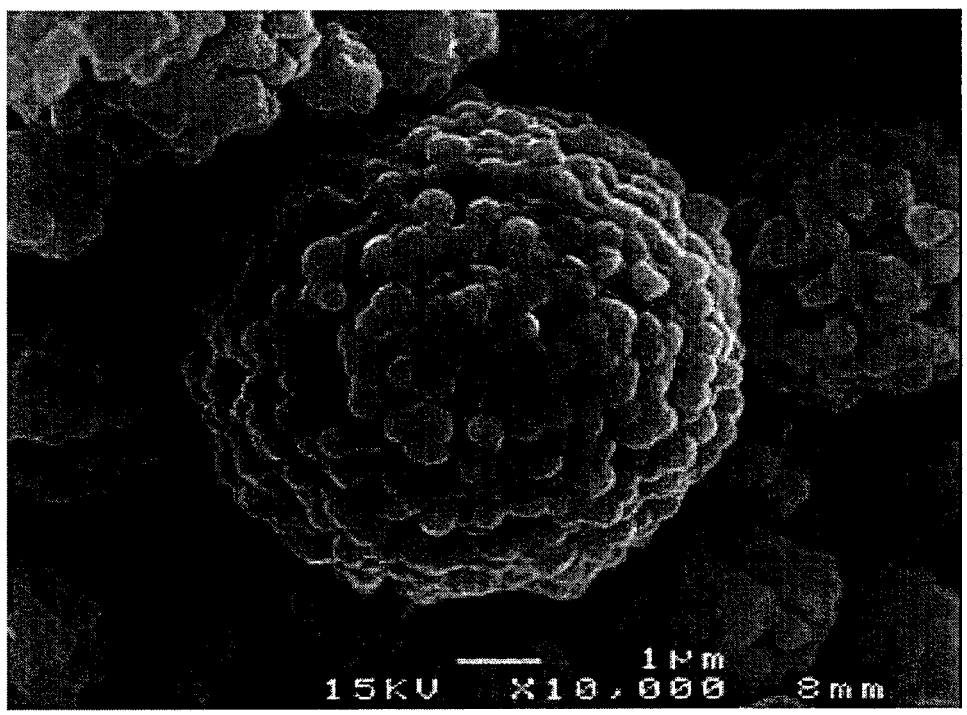
FIG. 72 is a SEM image (photograph) (magnification: 10,000×) of a manufactured lithium nickel manganese cobalt-based composite oxide in Example 11.
Figure 73:
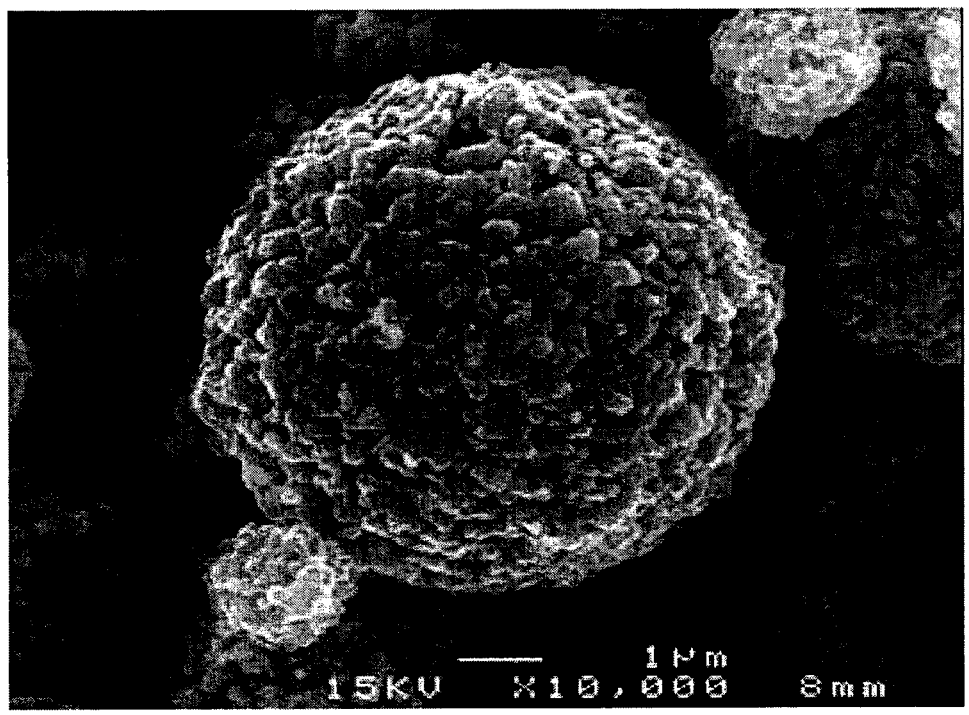
FIG. 73 is a SEM image (photograph) (magnification: 10,000×) of a manufactured lithium nickel manganese cobalt-based composite oxide in Example 12.
Figure 74:
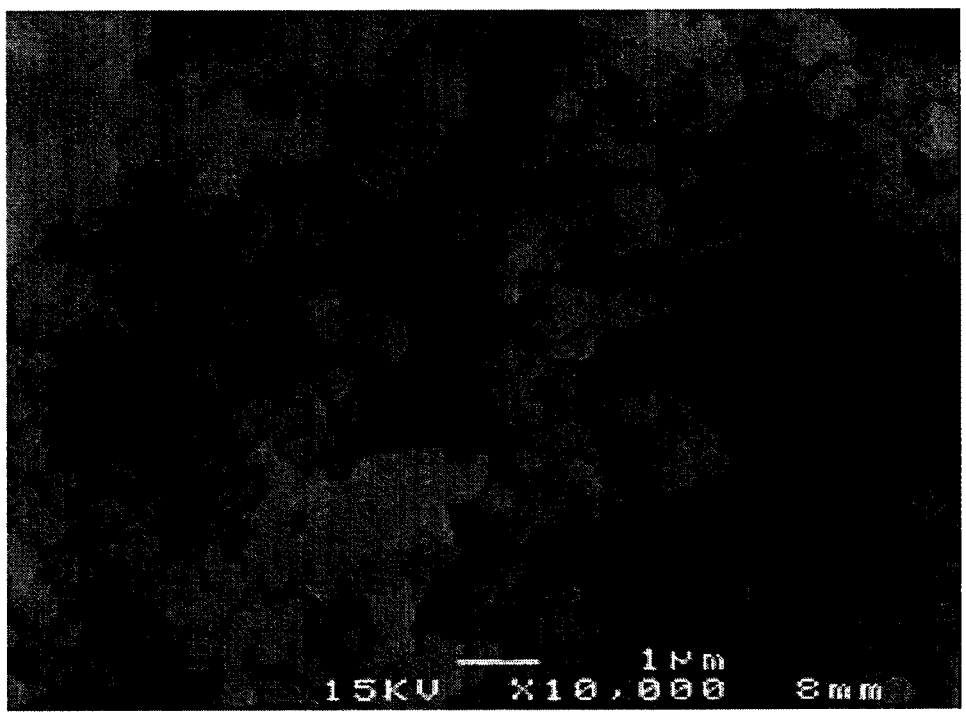
FIG. 74 is a SEM image (photograph) (magnification: 10,000×) of a manufactured lithium nickel manganese cobalt-based composite oxide in Comparative Example 6.
Figure 75:
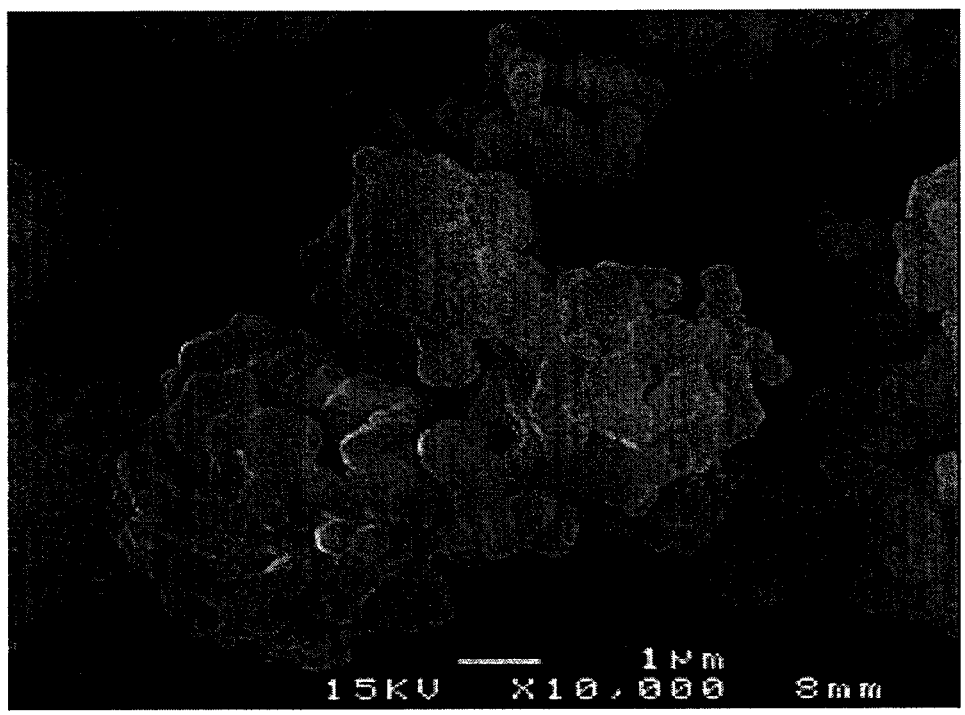
FIG. 75 is a SEM image (photograph) (magnification: 10,000×) of a manufactured lithium nickel manganese cobalt-based composite oxide in Comparative Example 7.
Figure 76:
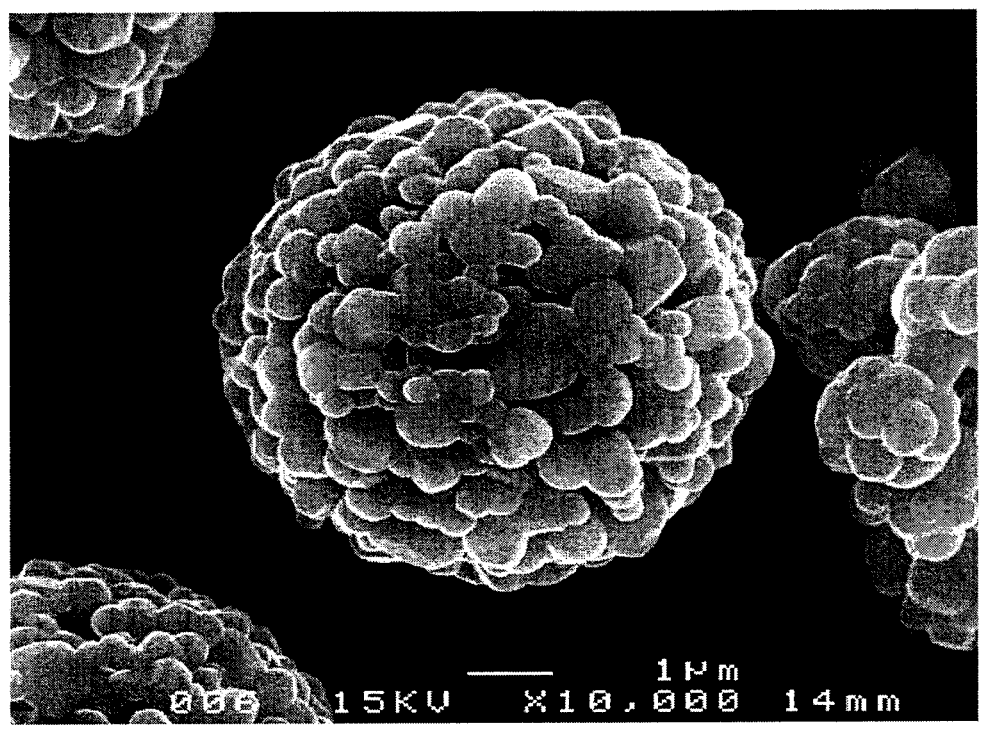
FIG. 76 is a SEM image (photograph) (magnification: 10,000×) of a manufactured lithium nickel manganese cobalt-based composite oxide in Comparative Example 8.
Figure 77:
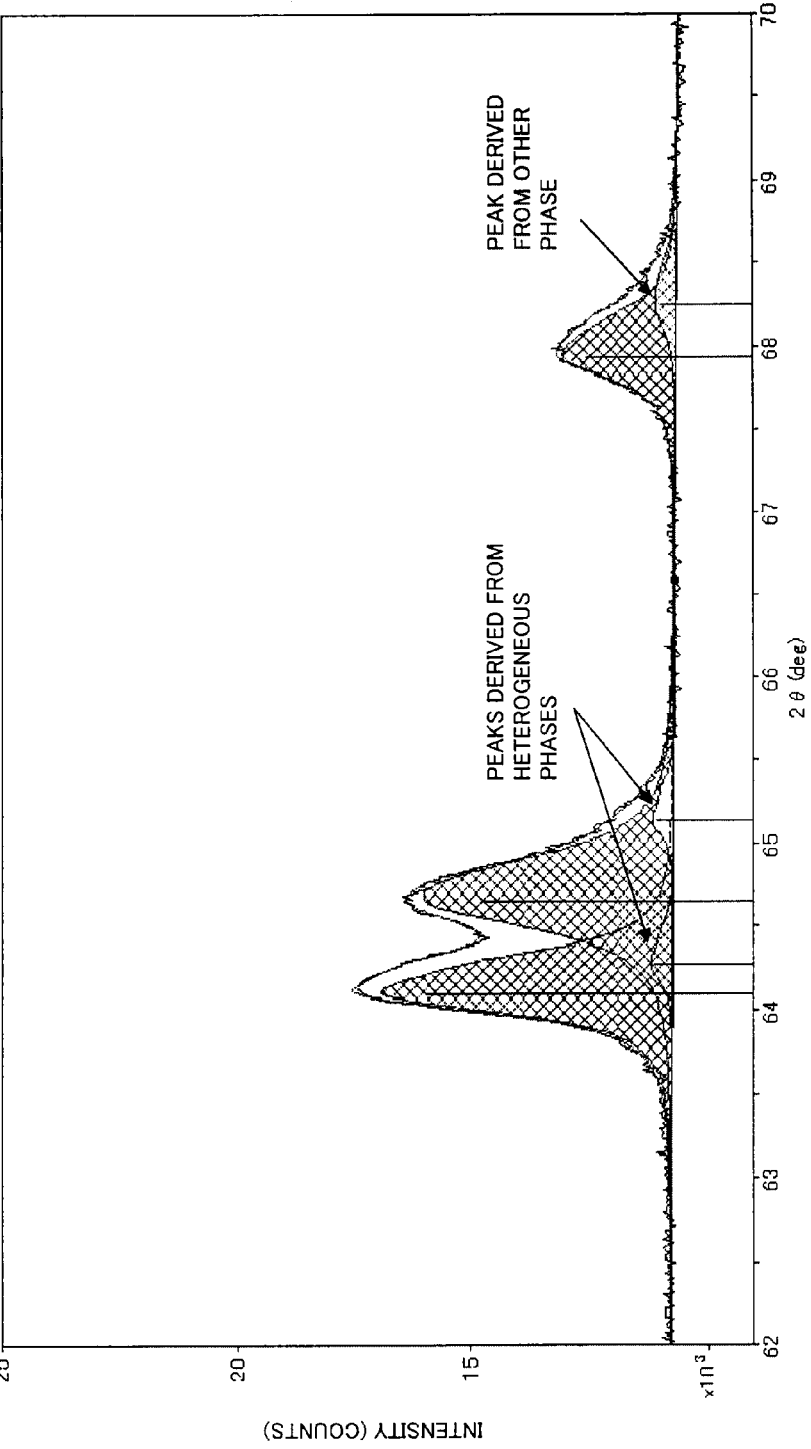
FIG. 77 is a graph showing an XRD pattern of a manufactured lithium nickel manganese cobalt-based composite oxide in Example 8.
Figure 78:
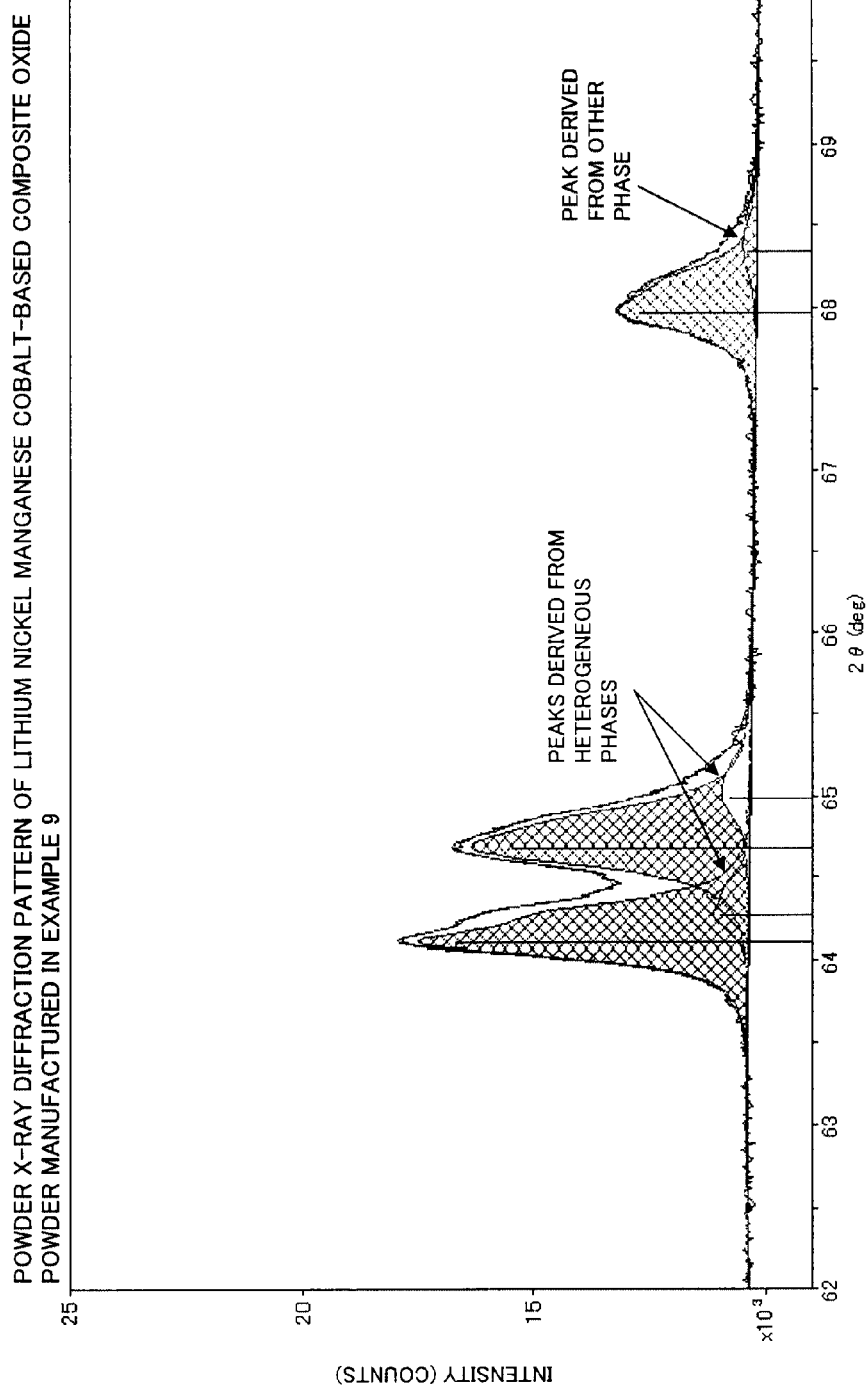
FIG. 78 is a graph showing an XRD pattern of a manufactured lithium nickel manganese cobalt-based composite oxide in Example 9.
Figure 79:
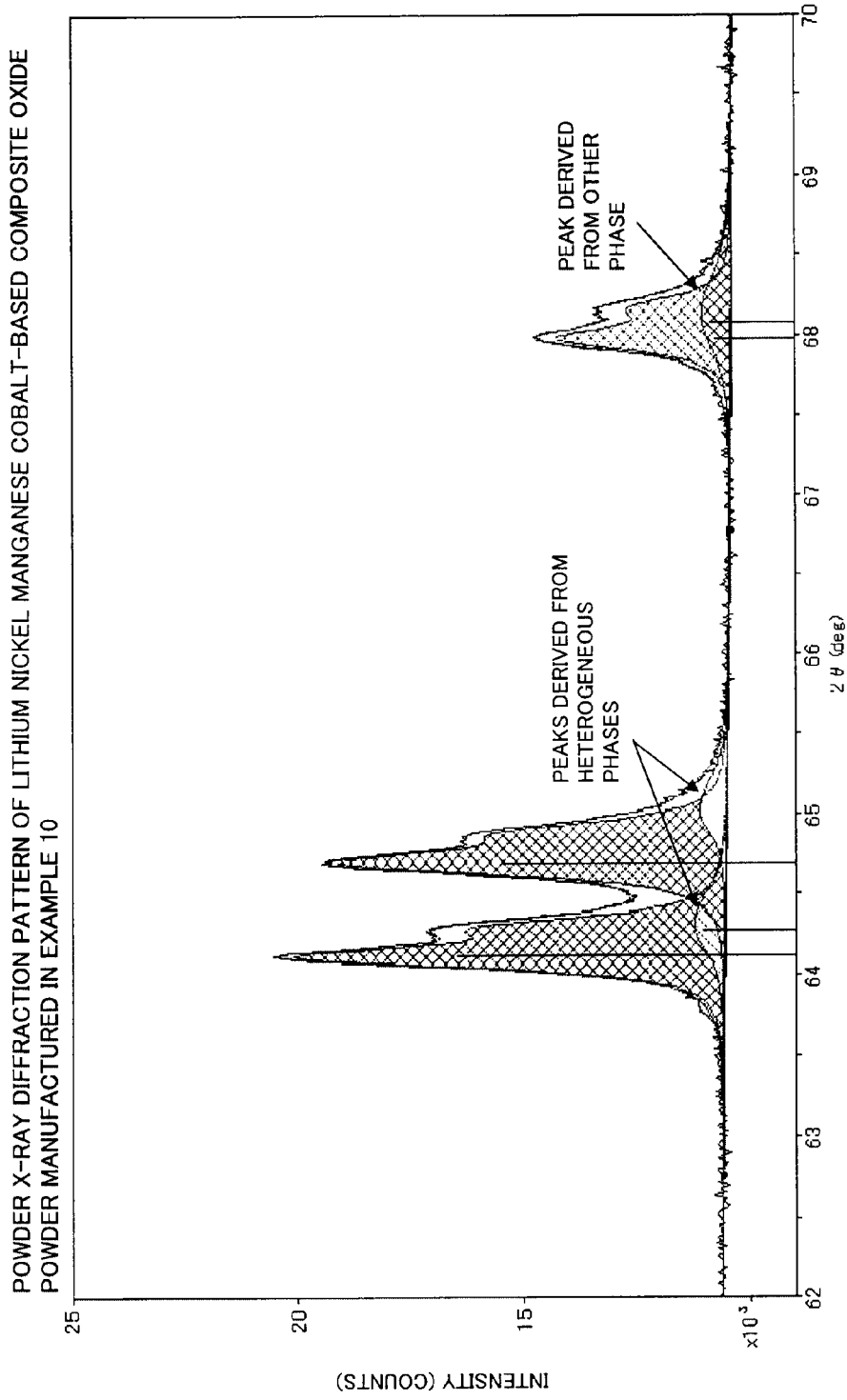
FIG. 79 is a graph showing an XRD pattern of a manufactured lithium nickel manganese cobalt-based composite oxide in Example 10.
Figure 80:
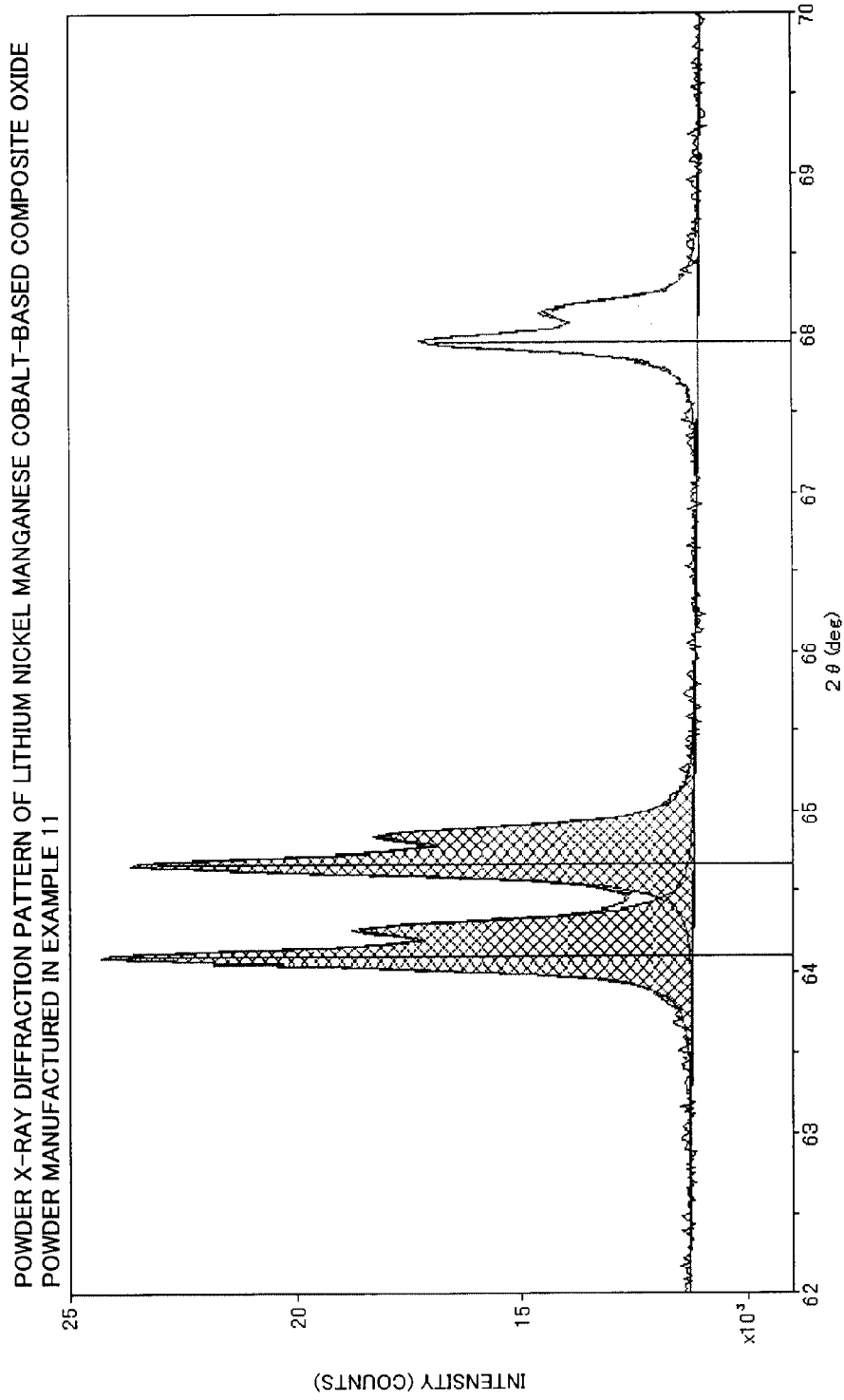
FIG. 80 is a graph showing an XRD pattern of a manufactured lithium nickel manganese cobalt-based composite oxide in Example 11.
Figure 81:
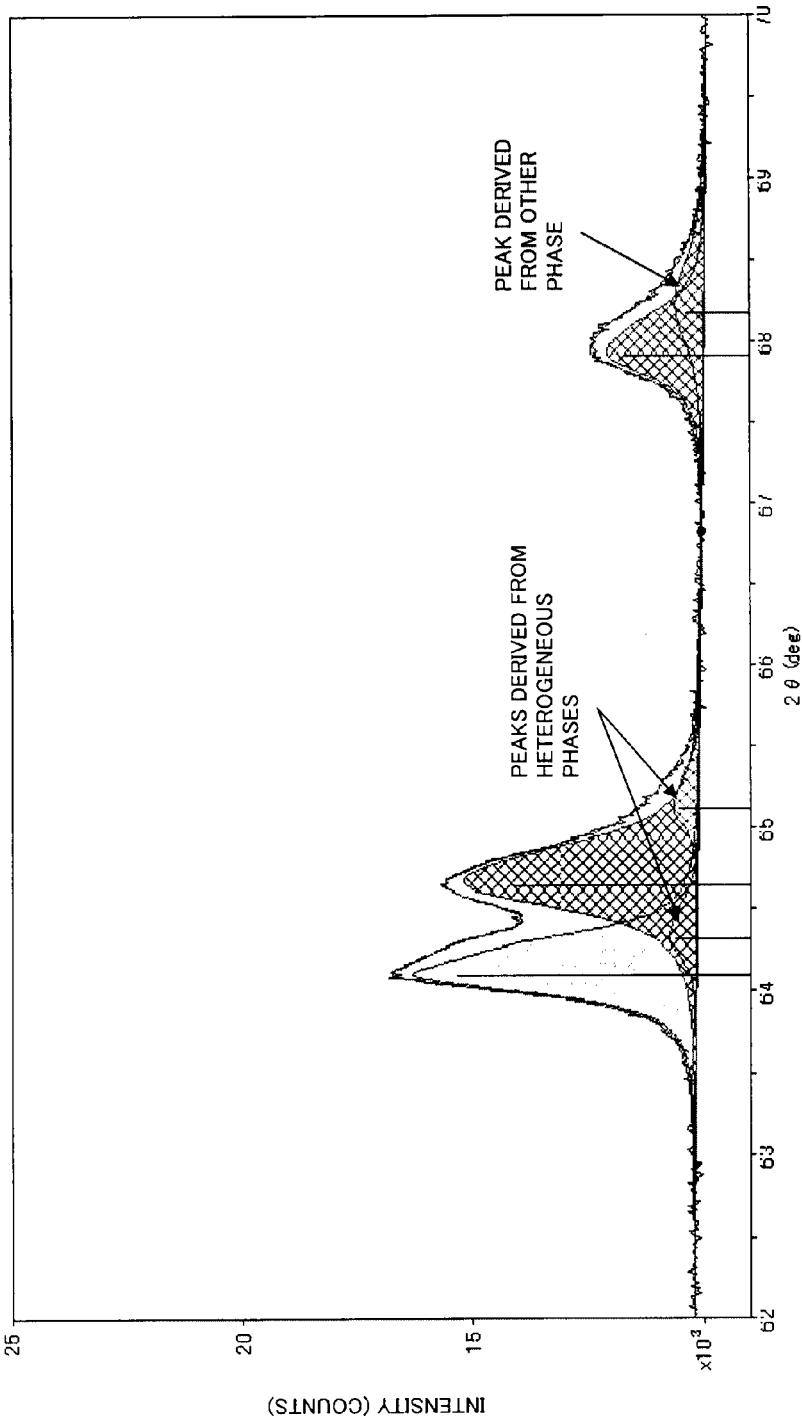
FIG. 81 is a graph showing an XRD pattern of a manufactured lithium nickel manganese cobalt-based composite oxide in Example 12.
Figure 82:
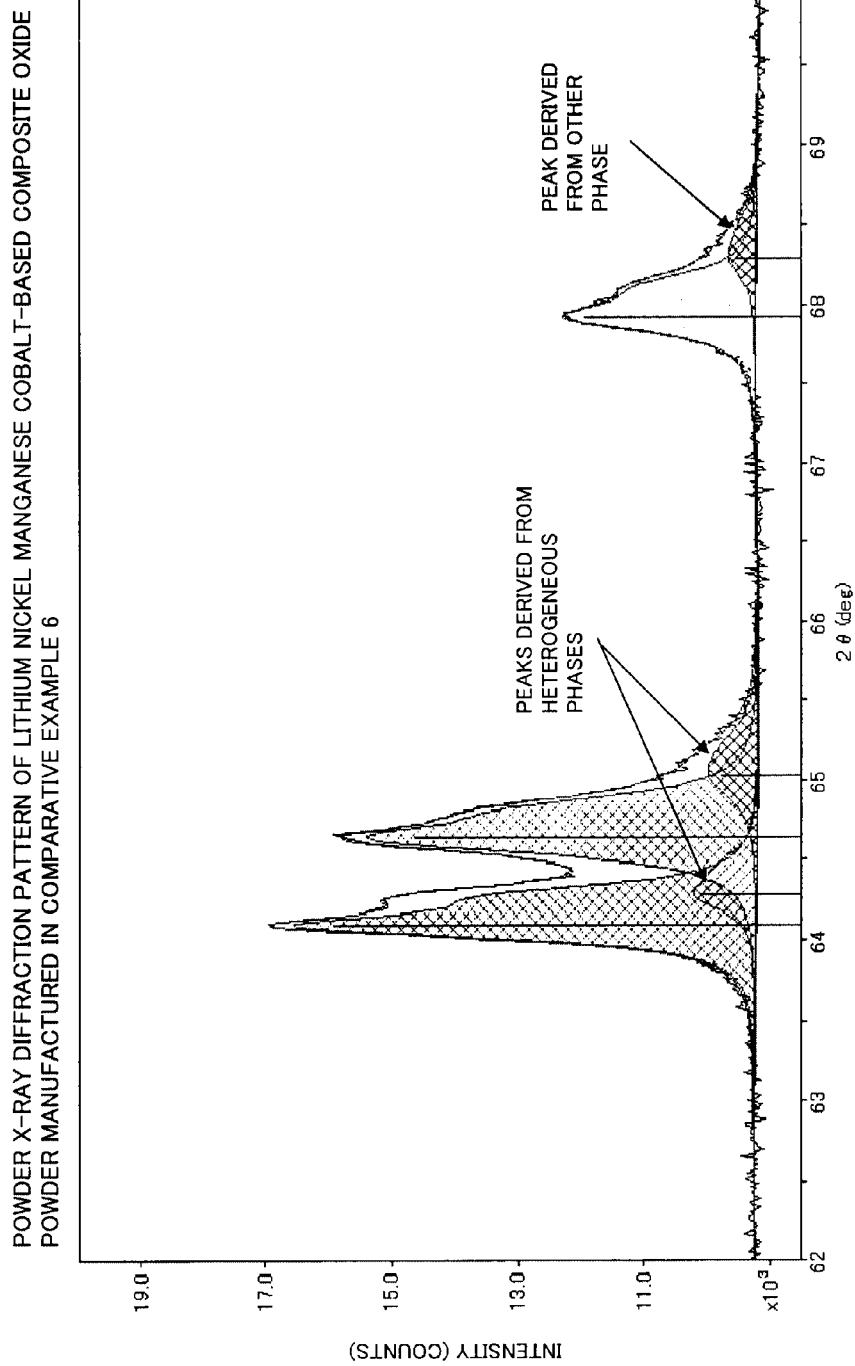
FIG. 82 is a graph showing an XRD pattern of a manufactured lithium nickel manganese cobalt-based composite oxide in Comparative Example 6.
Figure 83:
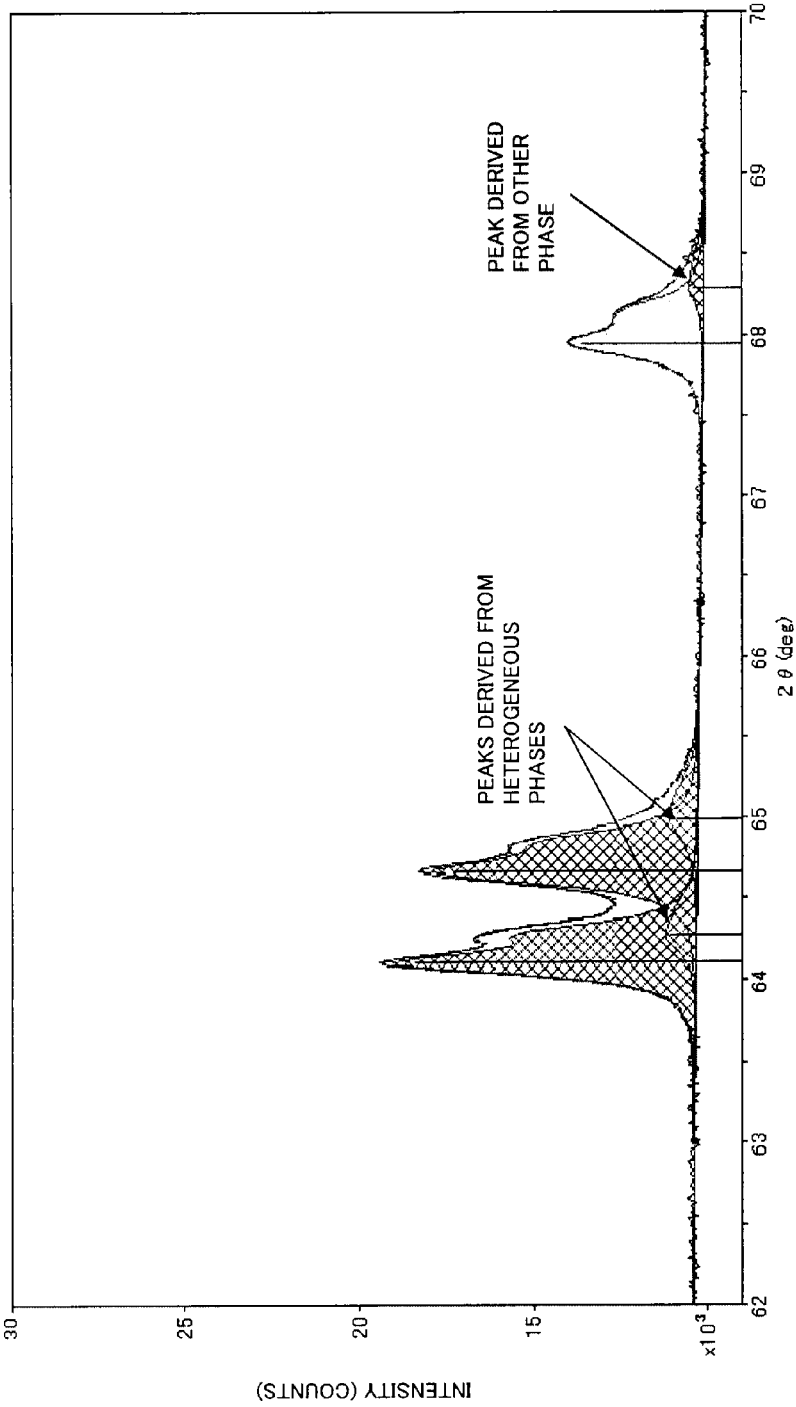
FIG. 83 is a graph showing an XRD pattern of a manufactured lithium nickel manganese cobalt-based composite oxide in Comparative Example 7.
Figure 84:
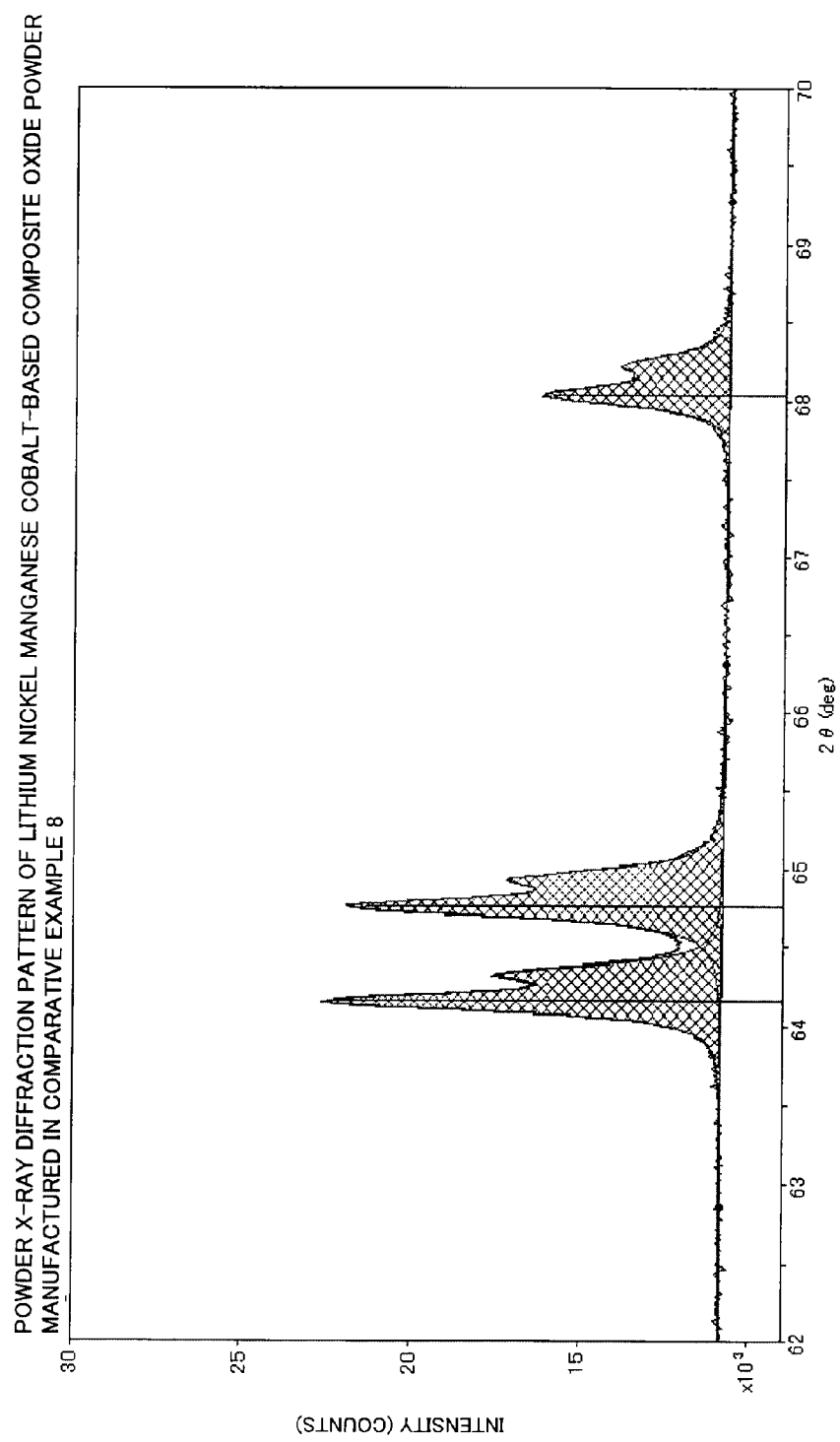
FIG. 84 is a graph showing an XRD pattern of a manufactured lithium nickel manganese cobalt-based composite oxide in Comparative Example 8.

The concentration distribution curves (XPS analysis) of the additive elements in the lithium nickel manganese cobalt-based composite oxides manufactured in Examples 10 and 12 and Comparative Example 6 from the surface in the depth direction are respectively shown in FIGS. 58 to 60. The pore distribution curves of lithium nickel manganese cobalt-based composite oxide powders manufactured in Examples 8 to 12 and Comparative Examples 6 to 8 are respectively shown in FIGS. 61 to 68, the SEM images (photographs) (10,000× magnification) in FIGS. 69 to 76, and the powder X-ray diffraction patterns in FIGS. 77 to 84.

TABLE 10

| Positive electrode material | | Other element | Other element molar ratio (mol %) | | | Additive element | Additive element molar ratio (mol %) | | | R$_0$/R$_{10}$ |
|---|---|---|---|---|---|---|---|---|---|---|
| | | | Feed value | Analytic value | ✕1) | | Feed value | Analytic value | ✕1) | |
| Examples | 8 | — | — | — | — | W | 1.0 | 1.05 | 6.7 | |
| | 9 | — | — | — | — | W | 1.0 | 1.04 | 6.5 | |
| | 10 | — | — | — | — | W | 1.0 | 1.03 | 8.8 | 4.3 |
| | 11 | — | — | — | — | W | 1.0 | 1.03 | 13 | |
| | 12 | B | 0.25 | 0.22 | 24 | W | 1.0 | 1.03 | 7.0 | 3.8 |
| Comparative Examples | 6 | — | — | — | — | W | 1.0 | 1.01 | 7.8 | 4.5 |
| | 7 | B | 0.25 | 0.23 | 53 | W | 1.0 | 1.00 | 94 | |
| | 8 | — | — | — | — | — | — | — | — | |

✕1) The ratio of the atomic ratio of the total of the additive element or the other element relative to the total of the metal elements other than lithium and the additive element or the other element in the surface of the primary particles to that in the entire primary particles.

TABLE 11

| Positive electrode material | | Mercury ✕2) intrusion volume (ml/g) | Pore radius (nm) | | Partial pore volume (ml/g) | | Average primary particle diameter B (µm) | Median diameter A (µm) | 90% cumulative diameter (D$_{90}$) (µm) | A/B | Bulk density (g/cm³) | BET specific surface area (m²/g) | Note |
|---|---|---|---|---|---|---|---|---|---|---|---|---|---|
| | | | Peak ✕3) top 1 | Peak ✕4) top 2 | Peak ✕3) top 1 | Peak ✕4) top 2 | | | | | | | |
| Examples | 8 | 0.62 | 109 | 946 | 0.10 | 0.32 | 0.2 | 5.0 | 7.4 | 25.0 | 1.7 | 3.3 | |
| | 9 | 0.63 | 170 | 947 | 0.09 | 0.31 | 0.2 | 5.1 | 7.6 | 25.5 | 1.7 | 2.2 | |
| | 10 | 0.58 | 164 | 945 | 0.07 | 0.29 | 0.3 | 5.0 | 7.5 | 16.7 | 1.7 | 1.7 | |
| | 11 | 0.65 | 209 | 948 | 0.05 | 0.32 | 0.5 | 5.1 | 7.5 | 10.2 | 1.7 | 1.3 | |
| | 12 | 0.68 | 110 | 778 | 0.11 | 0.33 | 0.2 | 5.2 | 7.9 | 26.0 | 1.6 | 2.8 | |
| Comparative Examples | 6 | 1.23 | — | 403 | — | 0.55 | 0.2 | 2.7 | 4.9 | 13.5 | 1.0 | 2.8 | Particles were irregular in shape |
| | 7 | 0.83 | — | 330,941 | — | 0.59 | 0.5 | 2.1 | 3.9 | 4.2 | 1.2 | 1.5 | |
| | 8 | 0.62 | 167 | 946 | 0.04 | 0.33 | 0.7 | 4.8 | 7.0 | 6.9 | 1.6 | 1.2 | |

✕2) Mercury intrusion volume when pressure was elevated from 3.86 kPa to 413 MPa in a measurement by a mercury intrusion porosimetry.
✕3) Related to sub peaks appearing at 80 nm or more and less than 400 nm (pore radius) in a pore distribution curve.
✕4) Related to main peaks appearing at 300 nm or more and 1500 nm or less (pore radius) in a pore distribution curve.

TABLE 12

| Positive electrode material | | x | y | z | z lower limit[×5)] | z upper limit[×6)] | Carbon concentration C (wt %) | Volume resistivity ($\Omega \cdot$ cm) |
|---|---|---|---|---|---|---|---|---|
| Examples | 8 | 0.099 | −0.003 | 0.118 | 0.048 | 0.183 | 0.054 | $6.3 \times 10^4$ |
| | 9 | 0.099 | −0.003 | 0.134 | 0.048 | 0.183 | 0.040 | $4.8 \times 10^4$ |
| | 10 | 0.099 | −0.003 | 0.133 | 0.048 | 0.183 | 0.037 | $9.7 \times 10^4$ |
| | 11 | 0.099 | −0.003 | 0.100 | 0.048 | 0.183 | 0.033 | $8.0 \times 10^4$ |
| | 12 | 0.098 | −0.004 | 0.122 | 0.049 | 0.184 | 0.054 | $1.5 \times 10^5$ |
| Comparative Examples | 6 | 0.100 | −0.002 | 0.111 | 0.047 | 0.182 | 0.031 | $6.3 \times 10^4$ |
| | 7 | 0.098 | −0.004 | 0.134 | 0.049 | 0.184 | 0.047 | $3.0 \times 10^6$ |
| | 8 | 0.098 | 0.013 | 0.113 | 0.034 | 0.170 | 0.028 | $1.7 \times 10^4$ |

[×5)] $(1 - x)(0.05 - 0.98y)$

[×6)] $(1 - x)(0.20 - 0.88y)$

TABLE 13

| Positive electrode material | | FWHM (110) | Integrated intensity | | | Integrated intensity ratio | | | Lattice constant (Å) | |
|---|---|---|---|---|---|---|---|---|---|---|
| | | | $I_{018}$ ($I_{018}$*) | $I_{110}$ ($I_{110}$*) | $I_{113}$ ($I_{113}$*) | $I_{018}$*/$I_{018}$ | $I_{110}$*/$I_{110}$ | $I_{113}$*/$I_{113}$ | a | c |
| Examples | 8 | 0.391 | 1865 (117) | 2069 (107) | 819 (170) | 0.063 | 0.052 | 0.208 | 2.881 | 14.277 |
| | 9 | 0.262 | 1757 (219) | 1751 (228) | 927 (119) | 0.125 | 0.130 | 0.128 | 2.880 | 14.279 |
| | 10 | 0.174 | 1878 (249) | 1809 (195) | 800 (299) | 0.133 | 0.108 | 0.374 | 2.880 | 14.279 |
| | 11 | 0.138 | 2225 | 2155 | 1157 | 0 | 0 | 0 | 2.881 | 14.285 |
| | 12 | 0.353 | 1755 (170) | 1843 (153) | 710 (329) | 0.097 | 0.083 | 0.463 | 2.882 | 14.278 |
| Comparative Examples | 6 | 0.226 | 1639 (263) | 1609 (286) | 776 (132) | 0.160 | 0.178 | 0.170 | 2.881 | 14.275 |
| | 7 | 0.185 | 1767 (230) | 1693 (261) | 904 (115) | 0.130 | 0.154 | 0.127 | 2.881 | 14.277 |
| | 8 | 0.142 | 1981 | 2028 | 1045 | 0 | 0 | 0 | 2.877 | 14.275 |

TABLE 14

| Positive electrode material | | Powder properties of spray-dried substances | | | | | | |
|---|---|---|---|---|---|---|---|---|
| | | Median diameter (μm)[×7)] | | | | | Bulk density (g/cm$^3$) | BET specific surface area (m$^2$/g) |
| | | US 0 min. | US 1 min. | US 3 min. | US 5 min. | Δ $D_{50}$ | | |
| Examples | 8 | 5.8 | 5.7 | 5.7 | 5.3 | 0.5 | 1.1 | 87.5 |
| | 9 | 5.8 | 5.7 | 5.7 | 5.3 | 0.5 | 1.1 | 87.5 |
| | 10 | 5.8 | 5.7 | 5.7 | 5.3 | 0.5 | 1.1 | 87.5 |
| | 11 | 5.8 | 5.7 | 5.7 | 5.3 | 0.5 | 1.1 | 87.5 |
| | 12 | 5.5 | 5.5 | 5.2 | 4.7 | 0.8 | 1.1 | 87.5 |
| Comparative Examples | 6 | 6.9 | 6.1 | 4.6 | 3.2 | 3.7 | 1.0 | 53.2 |
| | 7 | 5.6 | 3.3 | 0.4 | 0.4 | 5.2 | 0.9 | 54.5 |
| | 8 | 5.0 | 5.2 | 5.0 | 4.9 | 0.1 | 1.1 | 91.0 |

[×7)] US stands for ultra sonic dispersion and the figure that follows US indicates the processing time (min.).

<Fabrication and Evaluation of Battery>

Lithium secondary batteries were fabricated using the lithium nickel manganese cobalt-based composite oxide powders manufactured in Examples 8 to 12 and Comparative Examples 6 to 8 as the positive electrode materials (positive electrode active substances) according to the above-mentioned method and evaluated. The results are shown in Table 15.

The following should be noted: (1) The acceptance standard set for the rate test in Examples is that the initial discharge capacity of the first cycle described above is 145 mAh/g or more and that the high-rate discharge capacity of the third cycle at 11 mA/cm$^2$ is 102 mAh/g or more; and (2) The acceptance standard set for the low-temperature load characteristics test and high-temperature cycle test in Examples is that the low-temperature resistance before the cycle is 400Ω or less and the low-temperature resistance after the high-temperature cycle test is 500Ω or less and that the high-temperature cycle retention ratio is 78% or more.

TABLE 15

| Positive electrode material | | Initial discharge capacity (mAh/g)/ 3.0-4.2 V, 0.2 mA/cm² | Third cycle discharge capacity (mAh/g)/ 30-42 V, 11 mA/cm² | Low-temperature resistance (Ω) | | High-temperature cycle capacity retention ratio (%) | Evaluation result |
|---|---|---|---|---|---|---|---|
| | | | | Before cycle | After cycle | | |
| Examples | 8 | 145 | 106 | 309 | 430 | 85 | ○ |
| | 9 | 145 | 104 | 356 | 454 | 85 | ○ |
| | 10 | 147 | 105 | 343 | 453 | 87 | ○ |
| | 11 | 145 | 103 | 380 | 484 | 79 | ○ |
| | 12 | 145 | 103 | 362 | 452 | 88 | ○ |
| Comparative Examples | 6 | 145 | 107 | 380 | 454 | 86 | ○ |
| | 7 | 143 | 100 | 373 | 456 | 85 | X |
| | 8 | 146 | 94 | 574 | 563 | 77 | X |

Table 15 shows that lithium secondary batteries with excellent load characteristics can be realized with the lithium nickel manganese cobalt-based composite oxide powder for the lithium secondary battery positive electrode material of the first invention.

INDUSTRIAL APPLICABILITY

The usage of the lithium secondary batteries of the present invention are not particularly limited and the lithium secondary batteries can be used in a variety of known usages. Specific examples thereof include laptop personal computers, tablet personal computers, mobile personal computers, electronic book players, cellular phones, portable fax machines, portable copiers, portable printers, headphone stereos, video movies, liquid crystal televisions, handy cleaners, portable CDs, MiniDisks, transceivers, electronic notepads, pocket calculators, memory cards, portable tape recorders, radios, backup power supplies, motors, lightings, toys, game machines, watches, strobes, cameras, automotive power supplies.

Although the present invention has been described in detail with reference to specific embodiments, it is readily apparent for persons skilled in the art that various modifications can be made without departing from the spirit and scope of the present invention.

The present application is based on Japanese Patent Application (JP 2007-229205) filed in the Japan Patent Office on Sep. 4, 2007 and Japanese Patent Application (JP 2008-119939) filed in the Japan Patent Office on May 1, 2008, the entire contents of which are hereby incorporated by reference.

The invention claimed is:

1. A lithium transition metal-based compound powder for a lithium secondary battery positive electrode material, the lithium transition metal-based compound powder containing, as a main component, a lithium transition metal-based compound that has a function of allowing elimination and insertion of lithium ions, and including a crystal structure belonging to a layer structure, wherein primary particles are aggregated to form secondary particles, the ratio A/B of a median diameter A of the secondary particles to an average diameter (average primary particle diameter B) is in the range of 8 to 100, and wherein the lithium transition metal-based compound powder is prepared by firing a fine and homogeneous mixture of a raw material of the main component of the lithium transition metal-based compound and an additive that suppresses particle growth and sintering during firing which is at least one additive selected from the group consisting of Mo and W, wherein said lithium transition metal-based compound comprises a lithium nickel manganese cobalt-based composite oxide, and said lithium transition metal-based compound powder has a continuous composition slope structure in which said additive that suppresses particle growth and sintering during firing exists by having a concentration gradient in a depth direction from particle surfaces.

* * * * *